US011313709B2

(12) United States Patent
Akuzawa et al.

(10) Patent No.: US 11,313,709 B2
(45) Date of Patent: Apr. 26, 2022

(54) PHYSICAL QUANTITY MEASUREMENT DEVICE FOR FLUID WITH NARROWED FLOW PATH

(71) Applicant: DENSO CORPORATION, Kariya (JP)

(72) Inventors: Hiroyuki Akuzawa, Kariya (JP); Kengo Ito, Kariya (JP); Hiroshi Tagawa, Kariya (JP); Teruaki Kaifu, Kariya (JP); Noboru Kitahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/985,663

(22) Filed: Aug. 5, 2020

(65) Prior Publication Data

US 2020/0363252 A1    Nov. 19, 2020

Related U.S. Application Data

(63) Continuation of application No. PCT/JP2019/003955, filed on Feb. 5, 2019.

(30) Foreign Application Priority Data

Feb. 7, 2018 (JP) .............................. JP2018-020388
Dec. 26, 2018 (JP) .............................. JP2018-243415
(Continued)

(51) Int. Cl.
*G01F 1/69* (2006.01)
*G01F 5/00* (2006.01)
(Continued)

(52) U.S. Cl.
CPC ................ *G01F 1/69* (2013.01); *G01F 1/684* (2013.01); *G01F 1/688* (2013.01); *G01F 5/00* (2013.01);
(Continued)

(58) Field of Classification Search
CPC .......... G01F 1/69; G01F 15/14; G01F 15/185; G01F 1/688; G01F 1/684; G01F 5/00;
(Continued)

(56) References Cited

U.S. PATENT DOCUMENTS 6,332,356 B1   12/2001  Hecht et al.
2003/0046977 A1   3/2003  Lenzing et al.
(Continued)

FOREIGN PATENT DOCUMENTS

JP    2010-101889    5/2010
JP    2012-225699    11/2012
(Continued)

OTHER PUBLICATIONS

U.S. Appl. No. 16/985,496, filed Aug. 5, 2020, Physical Quantity Measurement Device
(Continued)

*Primary Examiner* — David Z Huang
(74) *Attorney, Agent, or Firm* — Nixon & Vanderhye P.C.

(57) ABSTRACT

A physical quantity measurement device includes a housing forming a measurement flow path in which a sensor support supports a physical quantity sensor. The measurement flow path includes a sensor path in which the physical quantity sensor is disposed, an upstream curved path between the sensor path and an inlet, and a downstream curved path between the sensor path and an outlet. The housing includes a measurement narrowed portion that gradually narrows the measurement flow path in a direction from the inlet toward the physical quantity sensor. An upstream end of the sensor support is provided upstream of the measurement narrowed portion in an arrangement cross section along an imaginary straight line passing through the physical quantity sensor
(Continued)

and extending in an arrangement direction in which the upstream curved path and the downstream curved path are arranged.

14 Claims, 60 Drawing Sheets

(30) Foreign Application Priority Data

| Dec. 27, 2018 | (JP) | JP2018-246193 |
|---|---|---|
| Dec. 27, 2018 | (JP) | JP2018-246194 |
| Dec. 27, 2018 | (JP) | JP2018-246195 |
| Dec. 27, 2018 | (JP) | JP2018-246196 |
| Dec. 27, 2018 | (JP) | JP2018-246197 |

(51) Int. Cl.

| *G01F 1/684* | (2006.01) |
|---|---|
| *G01F 1/688* | (2006.01) |
| *G01F 15/14* | (2006.01) |
| *G01F 15/18* | (2006.01) |
| *F02M 35/10* | (2006.01) |
| *G01K 1/14* | (2021.01) |
| *G01K 13/02* | (2021.01) |
| *G01K 13/024* | (2021.01) |

(52) U.S. Cl.
CPC ............ *G01F 15/14* (2013.01); *G01F 15/185* (2013.01); *F02M 35/1038* (2013.01); *F02M 35/10386* (2013.01); *G01K 1/14* (2013.01); *G01K 13/02* (2013.01); *G01K 13/024* (2021.01)

(58) Field of Classification Search
CPC . G01K 13/024; G01K 13/02; F02M 35/10386
See application file for complete search history.

(56) References Cited

U.S. PATENT DOCUMENTS

| 2003/0159501 | A1  | 8/2003  | Renninger et al. |
|---|---|---|---|
| 2005/0097947 | A1  | 5/2005  | Yonezawa |
| 2011/0072895 | A1* | 3/2011  | Okamoto ............ G01F 5/00 |
|              |     |         | 73/114.34 |
| 2012/0103086 | A1  | 5/2012  | Goka et al. |
| 2013/0019675 | A1  | 1/2013  | Ban et al. |
| 2013/0055799 | A1  | 3/2013  | Tsujii |
| 2013/0192354 | A1  | 8/2013  | Kaifu et al. |
| 2015/0122012 | A1  | 5/2015  | Tokuyasu et al. |
| 2017/0074703 | A1  | 3/2017  | Tsuchiya |
| 2017/0211958 | A1  | 7/2017  | Yogo et al. |
| 2017/0276526 | A1* | 9/2017  | Taniguchi ............ G01F 15/18 |
| 2017/0363455 | A1  | 12/2017 | Tokuyasu et al. |
| 2019/0162569 | A1  | 5/2019  | Tokuyasu et al. |

FOREIGN PATENT DOCUMENTS

| JP | 2014-98621   | 5/2014 |
|---|---|---|
| JP | 2015-21464   | 2/2015 |
| JP | 2015-68794   | 4/2015 |
| JP | 5961731      | 8/2016 |
| JP | 6272399      | 1/2018 |
| WO | 2019/156040  | 8/2019 |
| WO | 2019/156041  | 8/2019 |
| WO | 2019/156042  | 8/2019 |
| WO | 2019/156044  | 8/2019 |
| WO | 2019/156045  | 8/2019 |
| WO | 2019/156048  | 8/2019 |

OTHER PUBLICATIONS

U.S. Appl. No. 16/985,547, filed Aug. 5, 2020, Physical Quantity Measurement Device.
U.S. Appl. No. 16/985,322, filed Aug. 5, 2020, Physical Quantity Measurement Device.
U.S. Appl. No. 16/985,359, filed Aug. 5, 2020, Physical Quantity Measurement Device.
U.S. Appl. No. 16/985,416, filed Aug. 5, 2020, Physical Quantity Measurement Device.
U.S. Appl. No. 16/985,663, filed Aug. 5, 2020 Physical Quantity Measurement Device.
U.S. Appl. No. 16/985,627, filed Aug. 5, 2020, Physical Quantity Measurement Device.
U.S. Appl. No. 16/985,496, to Tagawa et al., "Physical Quanity Measurement Device", filed Aug. 5, 2020 (234 pages).
U.S. Appl. No. 16/985,547, to Kitahara et al., "Physical Quanity Measurement Device", filed Aug. 5, 2020 (233 pages).
U.S. Appl. No. 16/985,322, to Ito et al., "Physical Quanity Measurement Device", filed Aug. 5, 2020 (233 pages).
U.S. Appl. No. 16/985,359, to Ito, "Physical Quanity Measurement Device", filed Aug. 5, 2020 (81 pages).
U.S. Appl. No. 16/985,416, to Akuzawa et al., "Physical Quanity Measurement Device", filed Aug. 5, 2020 (233 pages).
U.S. Appl. No. 16/985,627, to Ito, "Physical Quanity Measurement Device", filed Aug. 5, 2020 (58 pages).
U.S. Appl. No. 17/522,980 to Kengo Ito filed Nov. 10, 2021 (59 pages).

* cited by examiner

<COMMON>

<COMMON>

<COMMON>

<COMMON>

<COMMON>

<COMMON>

⟨A⟩

FIG. 13
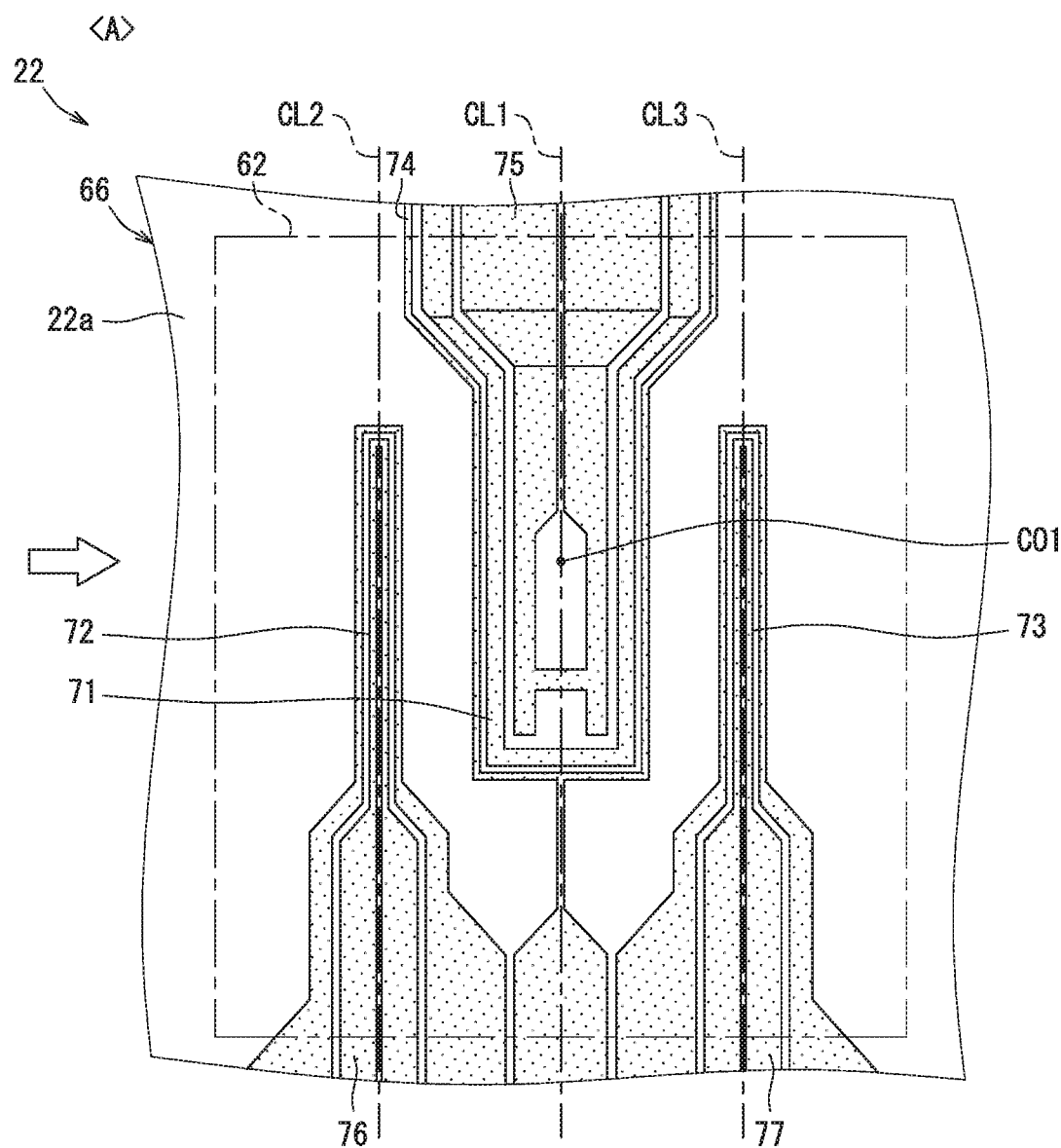
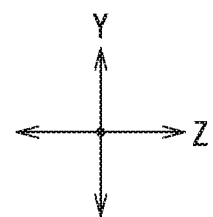

<B>

<B>

<B>

⟨B⟩

<D>

⟨D⟩

<H>

<COMMON>

| θ26 [deg] | 30 | 45 | 60 | 90 |
|---|---|---|---|---|
| BEHAVIOR OF BACKFLOW | | | | |

PHYSICAL QUANTITY MEASUREMENT DEVICE FOR FLUID WITH NARROWED FLOW PATH

CROSS REFERENCE TO RELATED APPLICATIONS

The present application is a continuation application of International Patent Application No. PCT/JP2019/003955 filed on Feb. 5, 2019, which designated the U.S. and claims the benefit of priority from Japanese Patent Application No. 2018-020388 filed on Feb. 7, 2018, Japanese Patent Application No. 2018-243415 filed on Dec. 26, 2018, Japanese Patent Application No. 2018-246193 filed on Dec. 27, 2018, Japanese Patent Application No. 2018-246194 filed on Dec. 27, 2018, Japanese Patent Application No. 2018-246195 filed on Dec. 27, 2018, Japanese Patent Application No. 2018-246196 filed on Dec. 27, 2018, and Japanese Patent Application No. 2018-246197 filed on Dec. 27, 2018. The entire disclosures of all of the above applications are incorporated herein by reference.

TECHNICAL FIELD

The present invention relates to a physical quantity measurement device.

BACKGROUND

A physical quantity measurement device that measures a physical quantity of a fluid. For example, an air flow rate measurement device includes a passage forming member that forms a measured passage in which air flows, and a sensor that detects a flow rate of air flowing through the measured passage.

SUMMARY

According to at least one embodiment of the present disclosure, a physical quantity measurement device measures a physical quantity of a fluid. The physical quantity measurement device includes a measurement flow path, a physical quantity sensor that is provided in the measurement flow path and detects the physical quantity of the fluid, a sensor support supporting the physical quantity sensor in the measurement flow path, and a housing that defines the measurement flow path. The measurement flow path includes a measurement inlet through which the fluid flows into the measurement flow path, and a measurement outlet through which the fluid flowing from the measurement inlet flows out of the measurement flow path. The measurement flow path includes a sensor path in which the physical quantity sensor is disposed, an upstream curved path provided between the sensor path and the measurement inlet in the measurement flow path, and a downstream curved path provided between the sensor path and the measurement outlet in the measurement flow path. The upstream curved path is curved in the housing so as to extend from the sensor path toward the measurement inlet, and the downstream curved path is curved in the housing so as to extend from the sensor path toward the measurement outlet. The housing includes a measurement narrowed portion that gradually reduces and narrows the measurement flow path in a direction from the measurement inlet toward the physical quantity sensor. An arrangement line is defined as an imaginary straight line that passes through the physical quantity sensor and extends in an arrangement direction in which the upstream curved path and the downstream curved path are arranged. An upstream end of the sensor support is provided upstream of the measurement narrowed portion in an arrangement cross section along the arrangement line.

BRIEF DESCRIPTION OF DRAWINGS

The details of one or more embodiments are set forth in the accompanying drawings and the description below. Other features and advantages will be apparent from the description and drawings, and from the claims.

FIG. 13 is a diagram showing a wiring pattern of a membrane portion.

DETAILED DESCRIPTION

Figure 1:
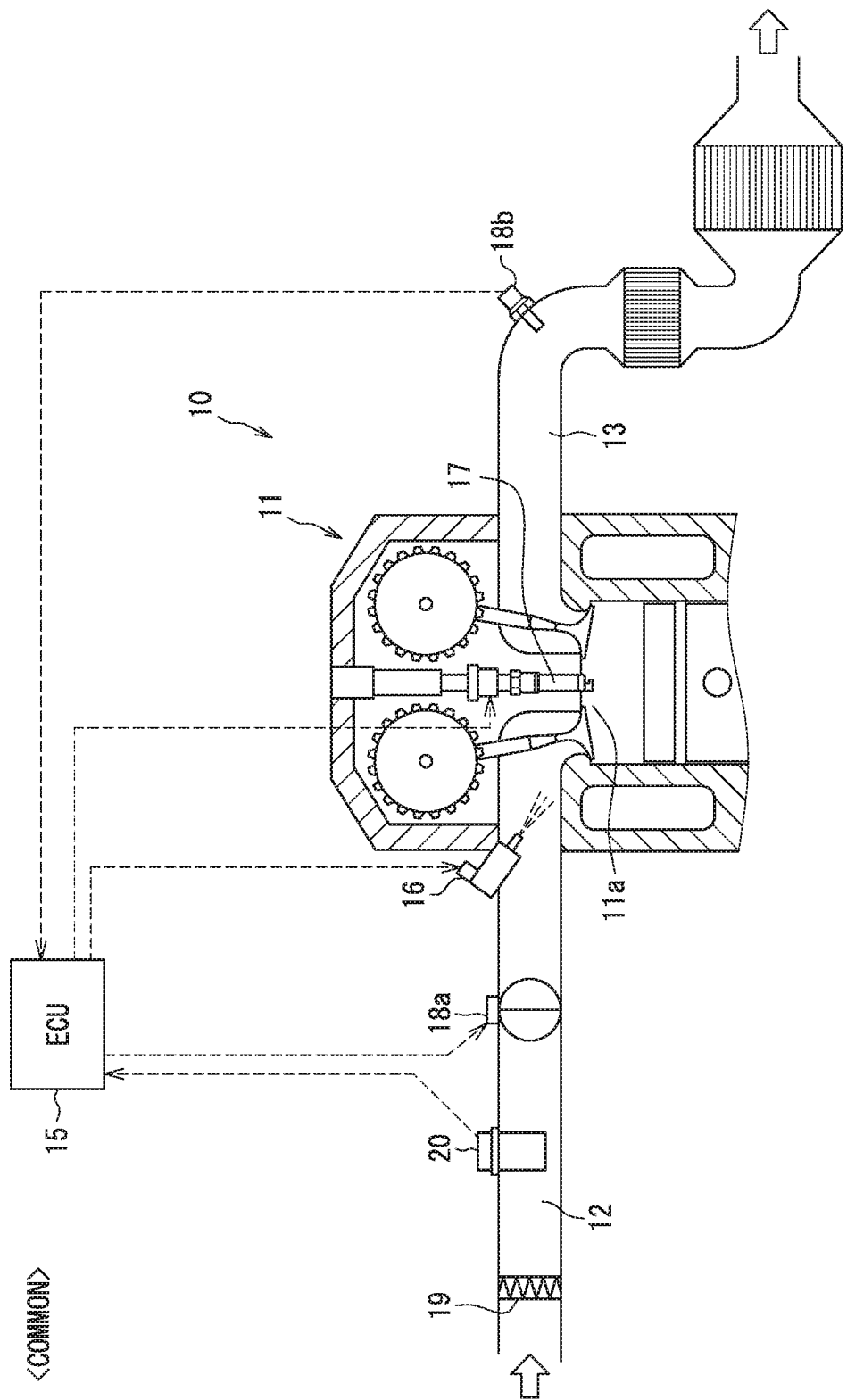
FIG. 1 is a diagram showing a configuration of a combustion system according to a first embodiment.

A comparative example will be described below. A physical quantity measurement device of the comparative example, for example, an air flow rate measurement device includes a passage forming member that forms a measured passage in which air flows, and a sensor that detects a flow rate of air flowing through the measured passage. The passage forming member forms a narrowing portion that gradually narrows the measured passage in a direction from upstream of the sensor toward the sensor. A sensor assembly having the sensor is attached to the passage forming member, and the sensor assembly has a sensor support that supports the sensor. In the measured passage, the sensor support is provided downstream of an upstream end of the narrowed portion. In the comparative example, a regulating effect of the narrowed portion regulating air flowing from upstream toward the sensor can be obtained.

However, in the measured passage, when the air flowing from upstream toward the sensor reaches the sensor support, the sensor support becomes an obstacle to the air, and this sensor support may cause turbulence in the air flow. In particular, in the comparative example, since an upstream end of the narrowed portion is provided upstream of the sensor support, the sensor support may cause turbulence of air flow during regulation of the air flowing toward the sensor. In this case, the turbulence of the air flow generated by the sensor support will be regulated by a part of the narrowed portion that is arranged downstream of the sensor support, but the turbulence cannot be regulated by a part of the narrowed portion that is arranged upstream of the sensor support. As described above, when the upstream end of the narrowed portion is provided upstream of the sensor support, the regulation effect of the narrowed portion may be reduced, and the flow-rate detection accuracy of the sensor is likely to be reduced. Therefore, the accuracy in measurement of a physical quantity such as a flow rate of a fluid such as air may decrease, and a measurement accuracy of the physical quantity measurement device may decrease.

In contrast, the present disclosure provides a physical quantity measurement device capable of improving an accuracy in measurement of a physical quantity.

A disclosed aspect is a physical quantity measurement device that measures a physical quantity of a fluid. The physical quantity measurement device includes a measurement flow path, a physical quantity sensor that is provided in the measurement flow path and detects the physical quantity of the fluid, a sensor support supporting the physical quantity sensor in the measurement flow path, and a housing that defines the measurement flow path. The measurement flow path includes a measurement inlet through which the fluid flows into the measurement flow path, and a measurement outlet through which the fluid flowing from the measurement inlet flows out of the measurement flow path. The measurement flow path includes a sensor path in which the physical quantity sensor is disposed, an upstream curved path provided between the sensor path and the measurement inlet in the measurement flow path, and a downstream curved path provided between the sensor path and the measurement outlet in the measurement flow path. The upstream curved path is curved in the housing so as to extend from the sensor path toward the measurement inlet, and the downstream curved path is curved in the housing so as to extend from the sensor path toward the measurement outlet. The housing includes a measurement narrowed portion that gradually reduces and narrows the measurement flow path in a direction from the measurement inlet toward the physical quantity sensor. An arrangement line is defined as an imaginary straight line that passes through the physical quantity sensor and extends in an arrangement direction in which the upstream curved path and the downstream curved path are arranged. An upstream end of the sensor support is provided upstream of the measurement narrowed portion in an arrangement cross section along the arrangement line.

According to the above aspect, the measurement narrowed portion gradually narrows the measurement flow path in the direction from the measurement inlet toward the physical quantity sensor, Therefore, the fluid flowing from the measurement inlet along the measurement narrowed portion can be regulated by the measurement narrowed portion. Moreover, since the upstream end of the sensor support is provided upstream of the measurement narrowed portion in the arrangement cross section, the air passing through the upstream end of the sensor support along the arrangement cross section is regulated by the entire measurement narrowed portion in the arrangement cross section. In this case, even if turbulence of the air flow occurs due to the air flowing in the measurement flow path and reaching the sensor support, this turbulence of the air flow can be reduced by the entire measurement narrowed portion. That is, decrease in flow regulation effect of the measurement narrowed portion can be reduced by the presence of the sensor support. Therefore, deterioration of accuracy in detection of physical quantity by the physical quantity sensor can be reduced, and as a result, an accuracy in measurement of the physical quantity by the physical quantity measurement device can be enhanced.

Hereinafter, multiple embodiments of the present disclosure will be described with reference to the drawings. Incidentally, the same reference numerals are assigned to the corresponding components in each embodiment, and thus, duplicate descriptions may be omitted. When only a part of the configuration is described in each embodiment, the configuration of the other embodiments described above can be applied to the other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular. Unspecified combinations of the configurations described in the plurality of embodiments and the modification examples are also disclosed in the following description.

First Embodiment

A combustion system 10 shown in FIG. 1 includes an internal combustion engine 11 such as a gasoline engine, an intake passage 12, an exhaust passage 13, an air flow meter 20, and an ECU 15, and the combustion system 10 is mounted on a vehicle, for example. The air flow meter 20 is provided in the intake passage 12 and measures physical quantities such as a flow rate, a temperature, a humidity, and a pressure of an intake air supplied to the internal combustion engine 11. The air flow meter 20 is a flow rate measurement device that measures the flow rate of air, and corresponds to a physical quantity measurement device that measures a fluid such as intake air. The intake air is a gas supplied to a combustion chamber 11a of the internal combustion engine 11. In the combustion chamber 11a, a mixture of the intake air and a fuel is ignited by an ignition plug 17.

The ECU (Engine Control Unit) 15 is a controller for controlling an operation of the combustion system 10. The ECU 15 is a calculation processing circuit including a processor, a storage medium such as a RAM, a ROM and a flash memory, a microcomputer including an input and output unit, a power supply circuit, and the like. The ECU 15 receives a sensor signal output from the air flow meter 20, sensor signals output from a large number of vehicle-mounted sensors, and the like. The ECU 15 uses measurement results of the air flow meter 20 to perform an engine control such as control of a fuel injection amount and an EGR amount of an injector 16. The ECU 15 is a controller that controls an operation of the internal combustion engine 11, and the combustion system 10 may be referred to as an engine control system. The ECU 15 corresponds to an external device.

The ECU 15 may also be referred to as an electronic control unit. The control unit or the control system is provided by (a) an algorithm as a plurality of logic called an if-then-else form, or (b) a learned model tuned by machine learning, e.g., an algorithm as a neural network.

The controller is provided by a control system including at least one computer. The control system may include a plurality of computers linked by data communication devices. The computer includes at least one processor (hardware processor) that is hardware. The hardware processor can be provided by the following (i), (ii), or (iii).

(i) The hardware processor may be at least one processor core that executes a program stored in at least one memory. In this case, the computer is provided by at least one memory and at least one processor core. The processor core is called CPU: Central Processing Unit, GPU: Graphics Processing Unit, or RISC-CPU, for example. The memory is also called a storage medium. The memory is a non-transitory and tangible storage medium, which non-temporarily stores a program and/or data readable by the processor. The storage medium may be a semiconductor memory, a magnetic disk, an optical disk, or the like. The program may be distributed as a single unit or as a storage medium in which the program is stored.

(ii) The hardware processor may be a hardware logic circuit. In this case, the computer is provided by a digital circuit including a number of programmed logic units (gate circuits). The digital circuit is also called, for example, a logic circuit array, an ASIC (Application Specific Integrated Circuit), a FPGA (Field Programmable Gate Array), an SOC (System on a Chip), a PGA (Programmable Gate Array), or a CPLD (Complex Programmable Logic Device), for example. The digital circuit may comprise a memory storing programs and/or data. The computer may be provided by an analog circuit. A computer may be provided by a combination of a digital circuit and an analog circuit.

(iii) The hardware processor may be a combination of the above (i) and the above (ii). (i) and (ii) are placed on different chips or on a common chip. In these cases, the part (ii) is also called an accelerator.

The control device, the signal source, and the control object provide various elements. At least some of these elements may be referred to as blocks, modules, or sections. Furthermore, elements included in the control system are referred to as functional means only when intentional.

A control units and methods described in the present disclosure may be implemented by a special purpose computer which is configured with a memory and a processor programmed to execute one or more particular functions embodied in computer programs of the memory. Alternatively, the control unit and the method described in the present disclosure may be implemented by a dedicated computer configured as a processor with one or more dedicated hardware logic circuits. Alternatively, the control unit and the method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The combustion system 10 includes measurement units as in-vehicle sensors. As the measurement units, in addition to the air flow meter 20, there are a throttle sensor 18a and an air-fuel ratio sensor 18b, for example. Each of these measurement units is electrically connected to the ECU 15 and outputs a detection signal to the ECU 15. The air flow meter 20 is in the intake passage 12, and provided downstream of an air cleaner 19 and upstream of a throttle valve provided with the throttle sensor 18a. The air cleaner 19 includes an air case that forms a part of the intake passage 12, and an air filter that removes foreign matters such as dust from the intake air. The air filter is attached to the air case.

Figure 2:
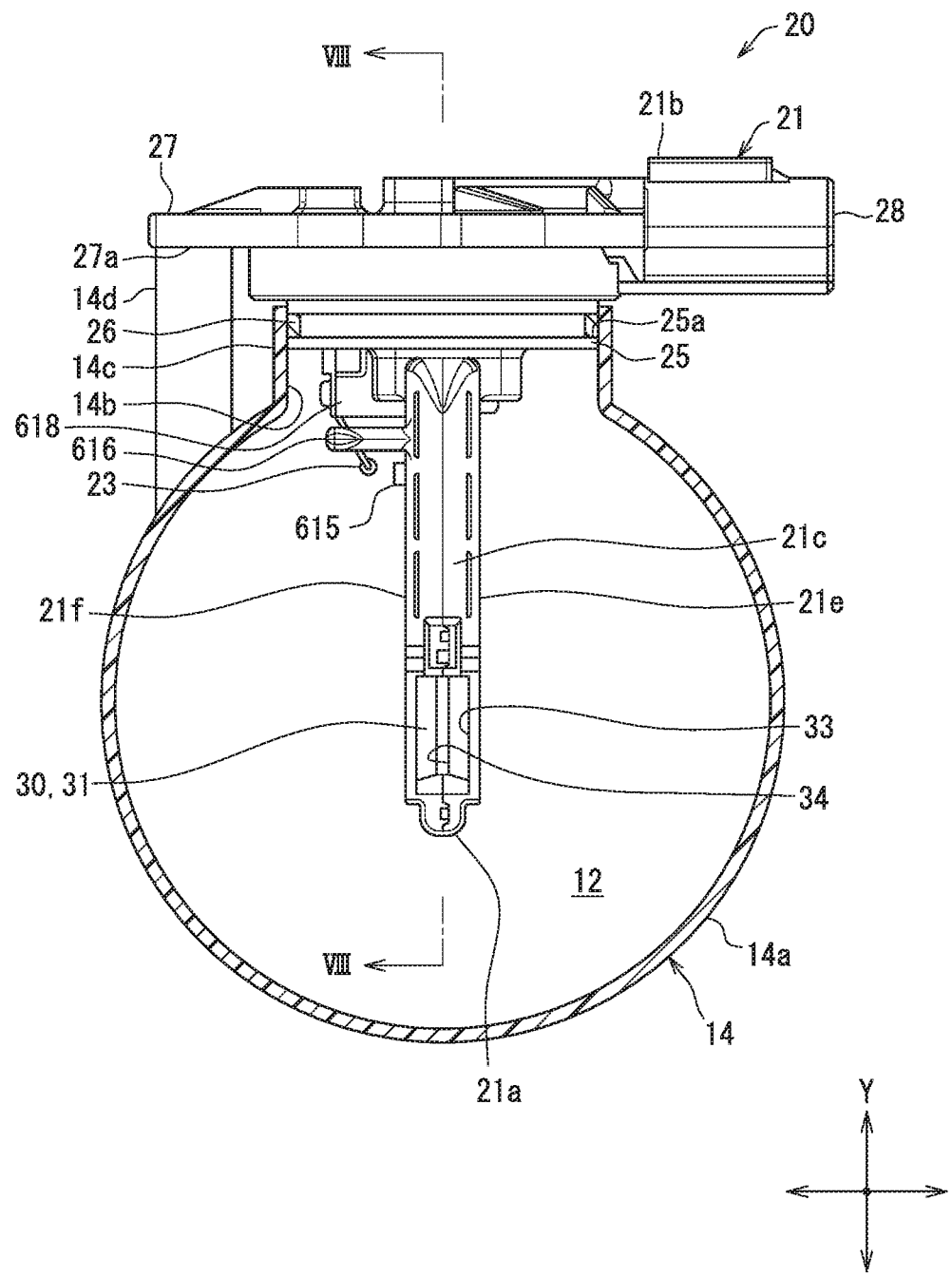
FIG. 2 is a front view of an air flow meter attached to an intake pipe.
Figure 3:
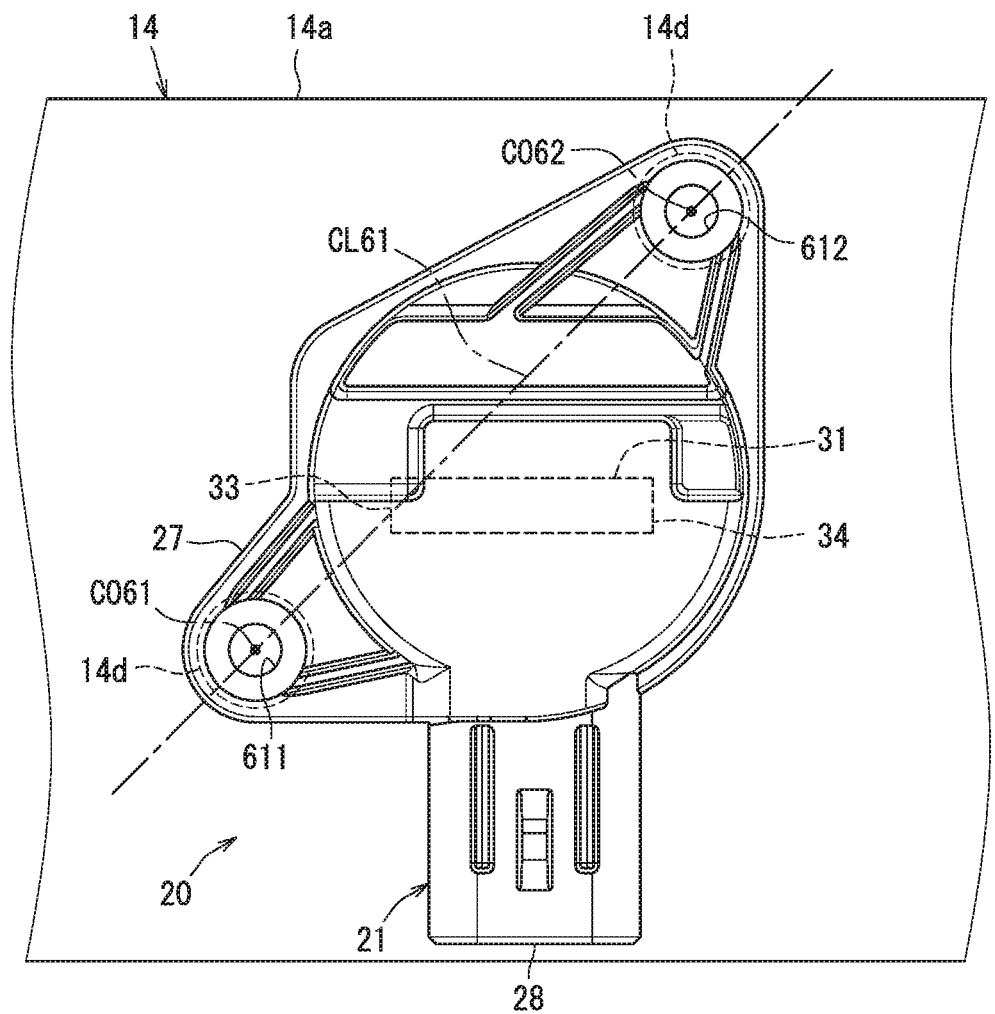
FIG. 3 is a plan view of the air flow meter attached to the intake pipe.
Figure 8:
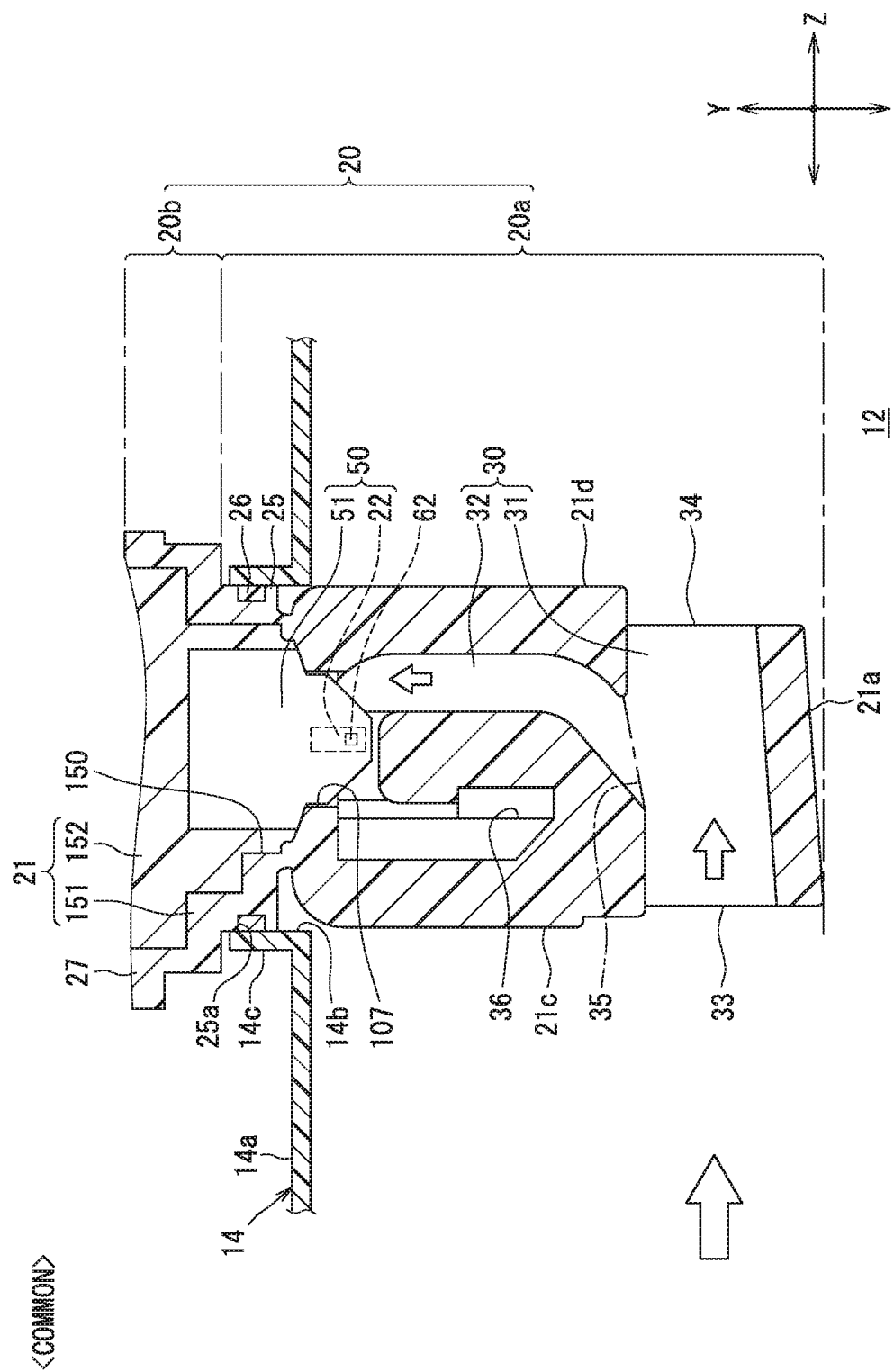
FIG. 8 is a cross-sectional view taken along a line VIII-VIII of FIG. 2.

As shown in FIGS. 2, 3 and 8, the air flow meter 20 is attached to a piping unit 14 as an attachment object. The piping unit 14 includes an intake pipe 14a, a pipe flange 14c, and a pipe boss 14d, and is a forming member that forms the intake passage 12. The piping unit 14 forms at least a part of the air case, for example. In such configuration in which the piping unit 14 forms the air case, the air filter is attached to the piping unit 14 in addition to the air flow meter 20. In the piping unit 14, the intake pipe 14a, the pipe flange 14c and the pipe boss 14d are made of a resin material, for example.

The intake pipe 14a is a pipe such as a duct that forms the intake passage 12. The intake pipe 14a is provided with an airflow insertion hole 14b as a through hole that penetrates through an outer periphery of the intake pipe 12a. The pipe flange 14c is formed in an annular shape and extends along a circumferential edge of the airflow insertion hole 14b. The pipe flange 14c extends from an outer surface of the intake pipe 14a in a direction away from the intake passage 12. The pipe boss 14d is a columnar member, and is a support portion that supports the air flow meter 20. The pipe boss 14d extends from the outer surface of the intake pipe 14a along the pipe flange 14c. Multiple pipe bosses 14d (e.g. two pipe bosses 14d) are provided for the intake pipe 14a. In the present embodiment, both the pipe flange 14c and the pipe bosses 14d extend in a height direction Y from the intake pipe 14a.

The air flow meter 20 is inserted into the pipe flange 14c and the airflow insertion hole 14b such that the air flow meter 20 enters the intake passage 12 while the air flow meter 20 is fixed to the pipe boss 14d via a fixing tool such as a bolt. The air flow meter 20 is not in contact with an end surface of the pipe flange 14c, but is in contact with an end surface of the pipe boss 14d. Therefore, the relative position and angle of the air flow meter 20 with respect to the piping unit 14 are set not by the pipe flange 14c but by the pipe boss 14d. The end surfaces of the multiple pipe bosses 14d are coplanar with each other. In FIG. 8, illustration of the pipe bosses 14d are omitted.

In the present embodiment, a width direction X, the height direction Y, and a depth direction Z are defined for the air flow meter 20, and those directions X, Y, and Z are orthogonal to each other. The air flow meter 20 extends in the height direction Y, and the intake passage 12 extends in the depth direction Z. The air flow meter 20 includes an inward portion 20a positioned in the intake passage 12 and an outward portion 20b protruding outward from the pipe flange 14c without being in the intake passage 12, and the inward portion 20a and the outward portion 20b are aligned in the height direction Y.

As shown in FIGS. 2, 4, 7 and 8, the air flow meter 20 includes a housing 21, a flow rate sensor 22 that detects a flow rate of the intake air, and an intake air temperature sensor 23 that detects a temperature of the intake air. The housing 21 is made of, for example, a resin material. The flow rate sensor 22 is accommodated in the housing 21. The housing 21 of the air flow meter 20 is attached to the intake pipe 14a such that the flow rate sensor 22 can come in contact with the intake air flowing through the intake passage 12.

The housing 21 is attached to the piping unit 14 as an attachment object. An outer surface of the housing 21 includes a pair of end surfaces 21a and 21b opposite in the height direction Y. One of the pair of end surfaces 21a and 21b included in the inward portion 20a is referred to as a housing distal end surface 21a, and another included in the outward portion 20b is referred to as a housing basal end surface 21b. The housing distal end surface 21a and the housing basal end surface 21b are orthogonal to the height direction Y. An end surface of the pipe flange 14c is also orthogonal to the height direction Y. The attachment object to which the air flow meter 20 and the housing 21 are attached may not be the piping unit 14 as long as the attachment object is a forming member that forms the intake passage 12.

A surface of the outer surface of the housing 21 facing upstream in the intake passage 12 is referred to as a housing upstream surface 21c, and a surface of the outer surface of the housing 21 opposite the housing upstream surface 21c is referred to as a housing downstream surface 21d. In addition, one of a pair of opposite surfaces of the housing 21 opposite each other along the housing upstream surface 21c and the housing basal end surface 21b is referred to as a housing front surface 21e, and the other is referred to as a housing back surface 21f. The housing front surface 21e and a surface of a sensor SA 50 on which the flow rate sensor 22 is provided face in the same direction.

Regarding the housing 21, a direction in which the housing distal end surface 21a faces in the height direction Y may be referred to as a housing distal end direction, and a direction in which the housing basal end surface 21b faces in the height direction Y may be referred to as a housing basal end direction. Further, a direction in which the housing upstream surface 21c faces in the depth direction Z may be referred to as a housing upstream direction, and a direction in which the housing downstream surface 21*d* faces in the depth direction Z may be referred to as a housing downstream direction. Further, a direction in which the housing front surface 21*e* faces in the width direction X may be referred to as a housing front direction, and a direction in which the housing back surface 21*f* faces in the width direction X may be referred to as a housing back direction.

As shown in FIGS. 2 to 7, the housing 21 includes a seal holder 25, a flange 27 and a connector 28. The air flow meter 20 includes a seal member 26, and the seal member 26 is attached to the seal holder 25.

The seal holder 25 is provided inside the pipe flange 14*c* and holds the seal member 26 so as not to be displaced in the height direction Y. The seal holder 25 is included in the inward portion 20*a* of the air flow meter 20. The seal holder 25 includes a holding groove 25*a* that holds the seal member 26. The holding groove 25*a* extends in the directions X and Z orthogonal to the height direction Y. The holding groove 25*a* makes a loop around the housing 21. The seal member 26 is a member such as an O-ring that is inside the pipe flange 14*c* and seals the intake passage 12. The seal member 26 is in a state of being inserted into the holding groove 25*a*, and is in tight contact with both an inner surface of the holding groove 25*a* and an inner peripheral surface of the pipe flange 14*c*. Both a portion where the seal member 26 and the inner surface of the holding groove 25*a* are in tight contact with each other and a portion where the seal member 26 and the inner peripheral surface of the pipe flange 14*c* are in tight contact with each other make a loop around the housing 21.

The flange 27 has a fixing hole such as a screw hole for fixing a fixing tool such as a screw. The fixing tool is used for fixing the housing 21 to the intake pipe 14*a*. In the present embodiment, the fixing hole is, for example, flange holes 611 and 612, and the fixing tool is screws. Note that, in FIG. 3, the screws inserted in the flange holes 611 and 612 are omitted.

A surface of the flange 27 facing in the housing distal end direction is overlapped and in contact with an end surface of the pipe boss 14*d*, and this overlapped portion is referred to as an angle setting surface 27*a*. Both the angle setting surface 27*a* and the end surface of the pipe boss 14*d* extend in a direction orthogonal to the height direction Y, and extend in the width direction X and the depth direction Z. The end surface of the pipe boss 14*d* sets the position and angle of the angle setting surface 27*a* relative to the intake pipe 14*a*. The angle setting surface 27*a* sets the position and angle of the housing 21 relative to the intake pipe 14*a* in the air flow meter 20.

In the intake pipe 14*a* of the piping unit 14, a main flow of air flowing through the intake passage 12 is along the depth direction Z. A direction of the main flow is called a main flow direction, and the depth direction Z coincides with the main flow direction. In the housing 21, the angle setting surface 27*a* of the flange 27 extends in the main flow direction and the depth direction Z. The end surface of the pipe boss 14*d* also extends in the main flow direction and the depth direction Z.

The connector 28 is a protection portion for protecting a connector terminal 28*a* electrically connected to the flow rate sensor 22. The connector terminal 28*a* is electrically connected to the ECU 15. More specifically, an electrical wiring extending from the ECU 15 is connected to the connector 28 via a plug. The flange 27 and the connector 28 are included in the outward portion 20*b* of the air flow meter 20.

Figure 4:
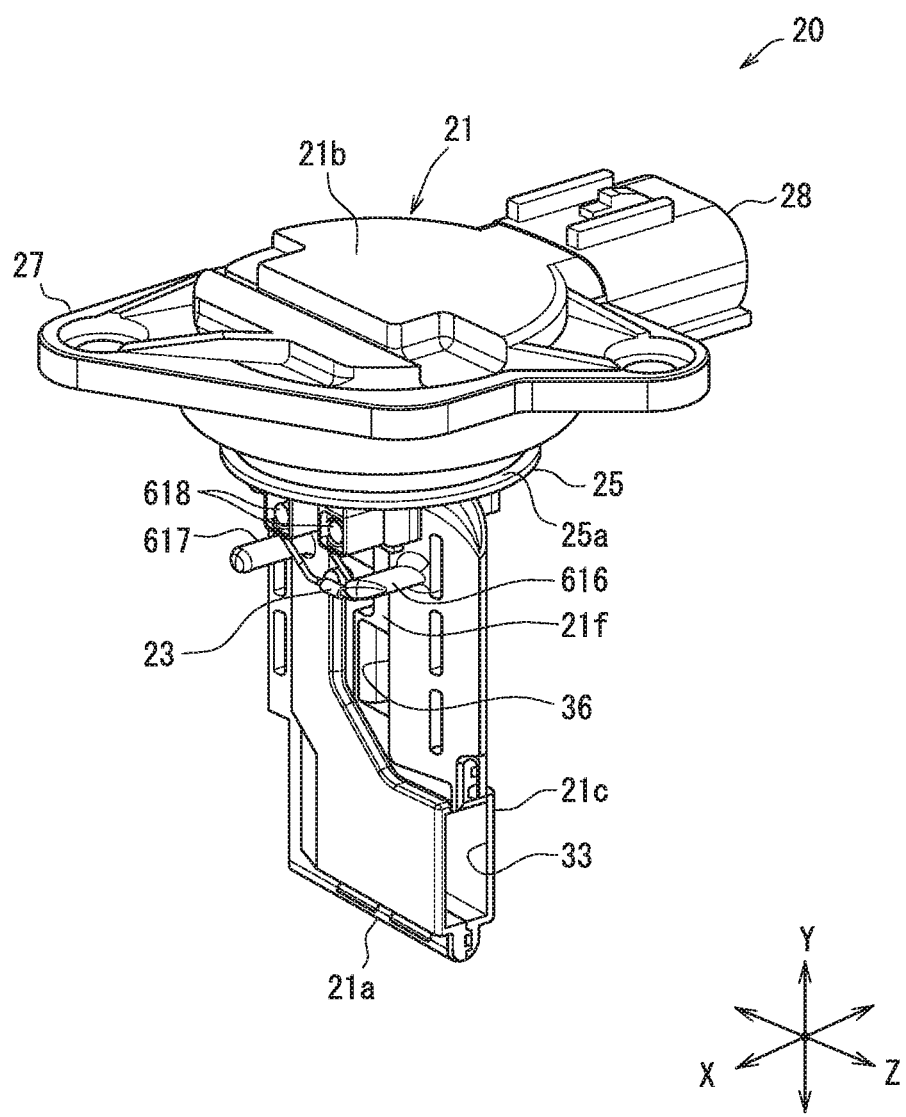
FIG. 4 is a perspective view of the air flow meter viewed from a through inlet.
Figure 5:
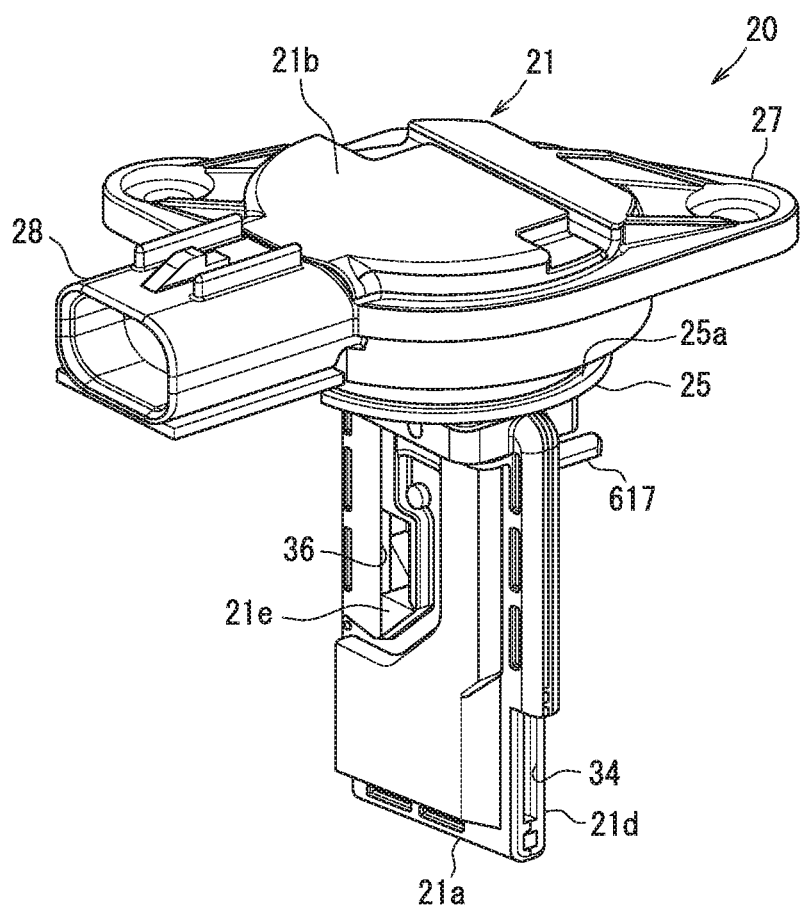
FIG. 5 is a perspective view of the air flow meter viewed from a through outlet.
Figure 6:
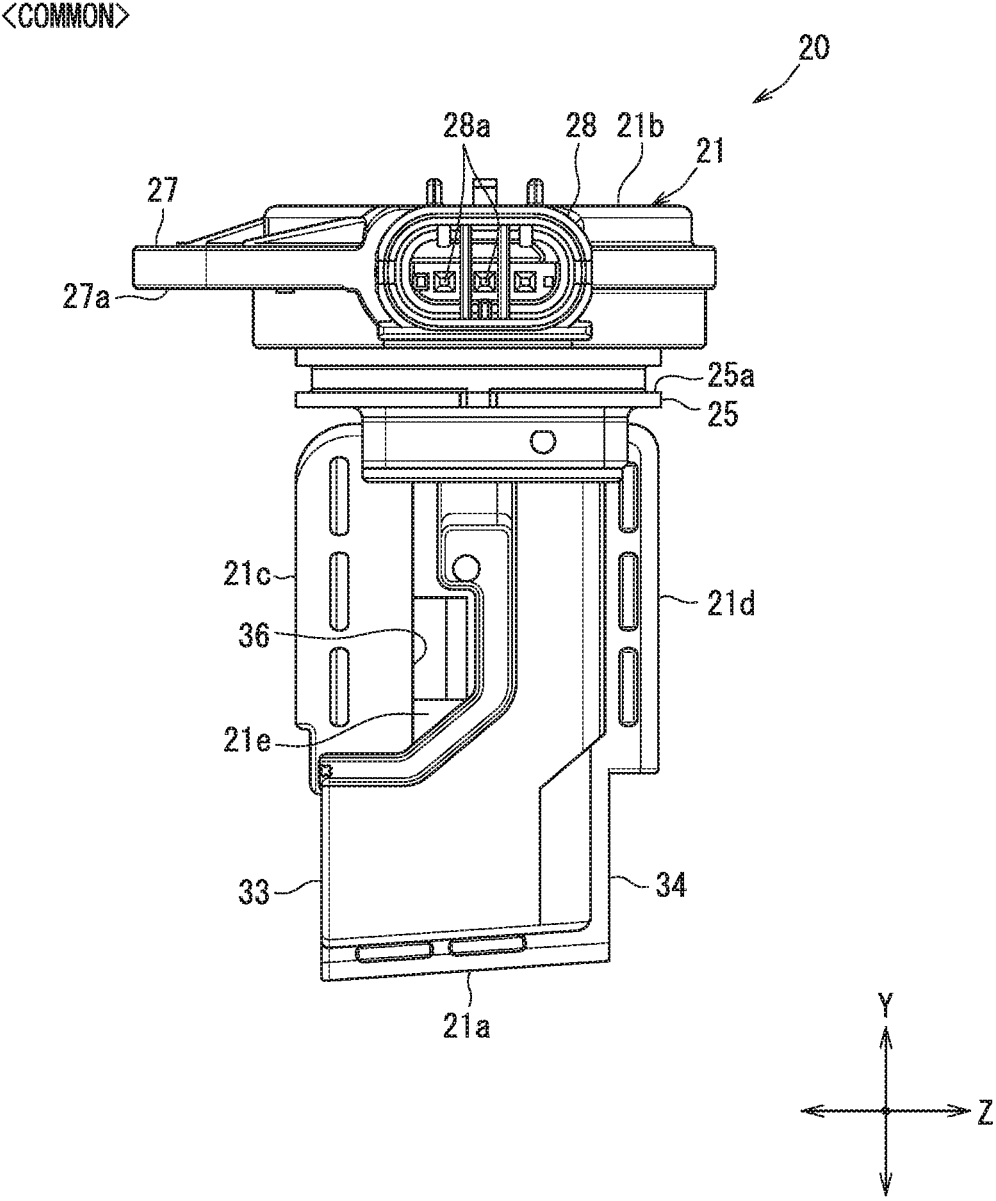
FIG. 6 is a side view of the air flow meter viewed from a connector portion.
Figure 7:
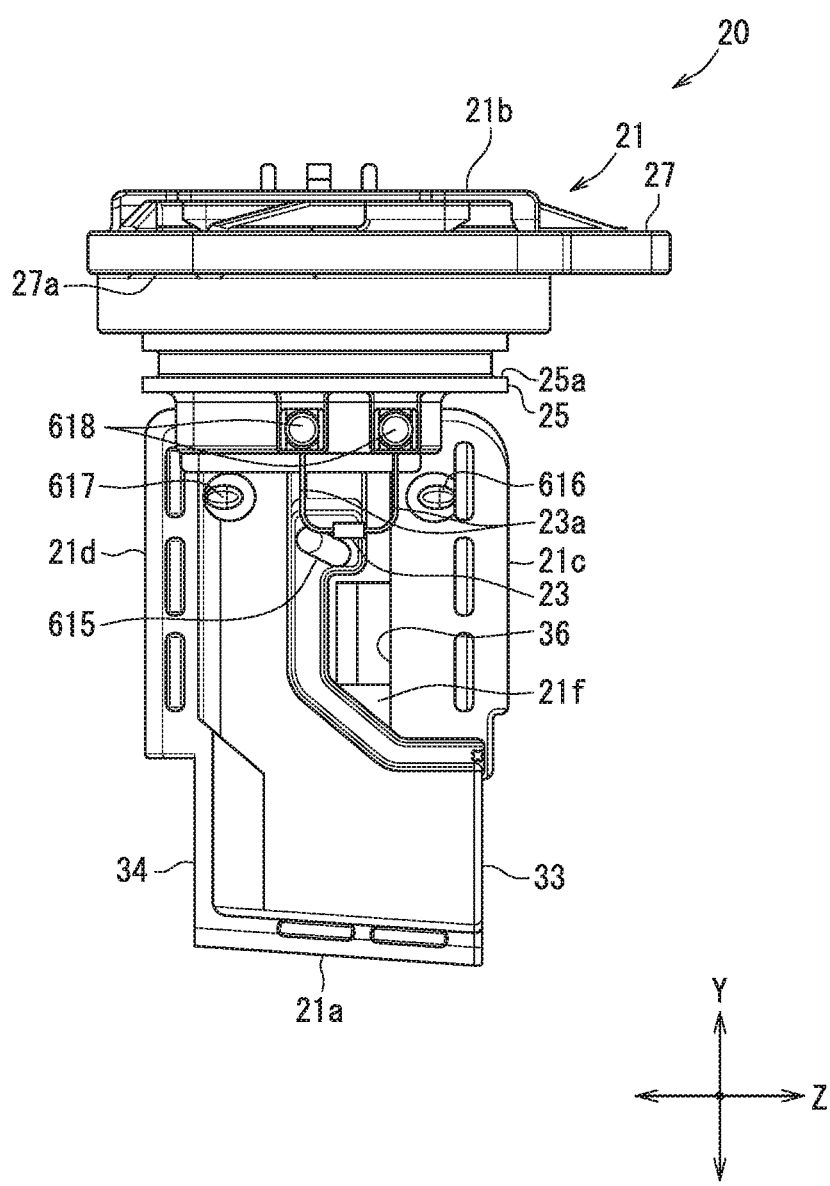
FIG. 7 is a side view of the air flow meter viewed from a side opposite the connector portion.

As shown in FIGS. 2, 4, 7, the intake air temperature sensor 23 is provided outside the housing 21. The intake air temperature sensor 23 is a temperature sensitive element that senses the temperature of intake air. The intake air temperature sensor 23 is provided on the housing back surface 21*f*. The intake air temperature sensor 23 is connected to a lead wire 23*a* formed by wiring or the like. The housing 21 includes an intake air temperature support 618. The intake air temperature support 618 is a protrusion provided on the housing back surface 21*f*. The intake air temperature support 618 protrudes from the intake air temperature sensor 23 in the housing back direction along the width direction X. The intake air temperature support 618 supports the intake air temperature sensor 23 by supporting the lead wire 23*a*. The intake air temperature support 618 is provided at a position shifted from the intake air temperature sensor 23 in the housing basal end direction along the height direction Y. The lead wire 23*a* extends from the intake air temperature support 618 in the housing distal end direction.

The lead wire 23*a* extends through the intake air temperature support 618 in the height direction Y. At the time of manufacturing of the air flow meter 20, a through hole is formed in the intake air temperature support 618 so as to penetrate through the intake air temperature support 618 in the height direction Y. Then, while the lead wire 23*a* inserted through this through hole, the intake air temperature support 618 is crushed in the width direction X to crush the through hole. Accordingly, the lead wire 23*a* inserted through the through hole is embedded in the intake air temperature support 618. In this case, an end surface of the intake air temperature support 618 is crushed while being heated by a heating tool such as a heater such that the intake air temperature support 618 is thermally deformed. The thermally deformed portion of the intake air temperature support 618 covers and holds the lead wire 23*a*. This work can also be called thermal crimping.

As shown in FIG. 8, the housing 21 includes a bypass flow path 30. The bypass flow path 30 is provided inside the housing 21. The bypass flow path 30 includes at least a part of an internal space of the housing 21. An inner surface of the housing 21 is a forming surface and forms the bypass flow path 30.

The bypass flow path 30 is disposed in the inward portion 20*a* of the air flow meter 20. The bypass flow path 30 includes a through flow path 31 and a measurement flow path 32. The flow rate sensor 22 and its surrounding portions of the sensor SA 50, which will be described later, are in the measurement flow path 32. The through flow path 31 is formed by the inner surface of the housing 21. The measurement flow path 32 is formed by the inner surface of the housing 21 and the outer surface of a part of the sensor SA 50. The intake passage 12 may be referred to as a main passage, and the bypass flow path 30 may be referred to as a sub-passage.

The through flow path 31 penetrates through the housing 21 in the depth direction Z. The through flow path 31 includes a through inlet 33 that is an upstream end part of the through flow path 31, and a through outlet 34 that is a downstream end part of the through flow path 31. The measurement flow path 32 is a branch flow path branched from an intermediate part of the through flow path 31. The flow rate sensor 22 is provided in the measurement flow path 32. The measurement flow path 32 has a measurement inlet 35 which is an upstream end part of the measurement flow path 32, and a measurement outlet 36 which is a downstream end part of the measurement flow path 32. A boundary between the through flow path 31 and the measurement flow path 32 is a portion where the measurement flow path 32 branches from the through flow path 31. The measurement inlet 35 is included in the boundary. The boundary between the through flow path 31 and the measurement flow path 32 may also be referred to as a flow path boundary. The measurement inlet 35 faces in the housing distal end direction while being inclined so as to face toward the measurement outlet 36.

The measurement flow path 32 extends from the through flow path 31 in the housing basal end direction. The measurement flow path 32 is provided between the through flow path 31 and the housing basal end surface 21b. The measurement flow path 32 is curved so that a portion between the measurement inlet 35 and the measurement outlet 36 bulges in the housing basal end direction. The measurement flow path 32 includes an arched portion that curves continuously, a bent portion that bends in a stepwise manner, and a portion that extends straight in the height direction Y or the depth direction Z.

The flow rate sensor 22 is a thermal flow rate detection unit having a heater. The flow rate sensor 22 outputs a detection signal according to a temperature change caused by heat generation of the heater. The flow rate sensor 22 is a rectangular parallelepiped chip component, and the flow rate sensor 22 may also be referred to as a sensor chip. The flow rate sensor 22 may also be referred to as a physical quantity sensor or a physical quantity detection unit that detects a flow rate of intake air as a physical quantity of a fluid.

The air flow meter 20 has a sensor sub-assembly including the flow rate sensor 22, and the sensor sub-assembly is referred to as the sensor SA 50. The sensor SA 50 is embedded in the housing 21 while a part of the sensor SA 50 extending into the measurement flow path 32. In the air flow meter 20, the sensor SA 50 and the bypass flow path 30 are arranged in the height direction Y. More specifically, the sensor SA 50 and the through flow path 31 are arranged in the height direction Y. The sensor SA 50 corresponds to a detection unit. The sensor SA 50 may also be referred to as a measurement unit or a sensor package.

<Description of Configuration Group A>

Figure 9:
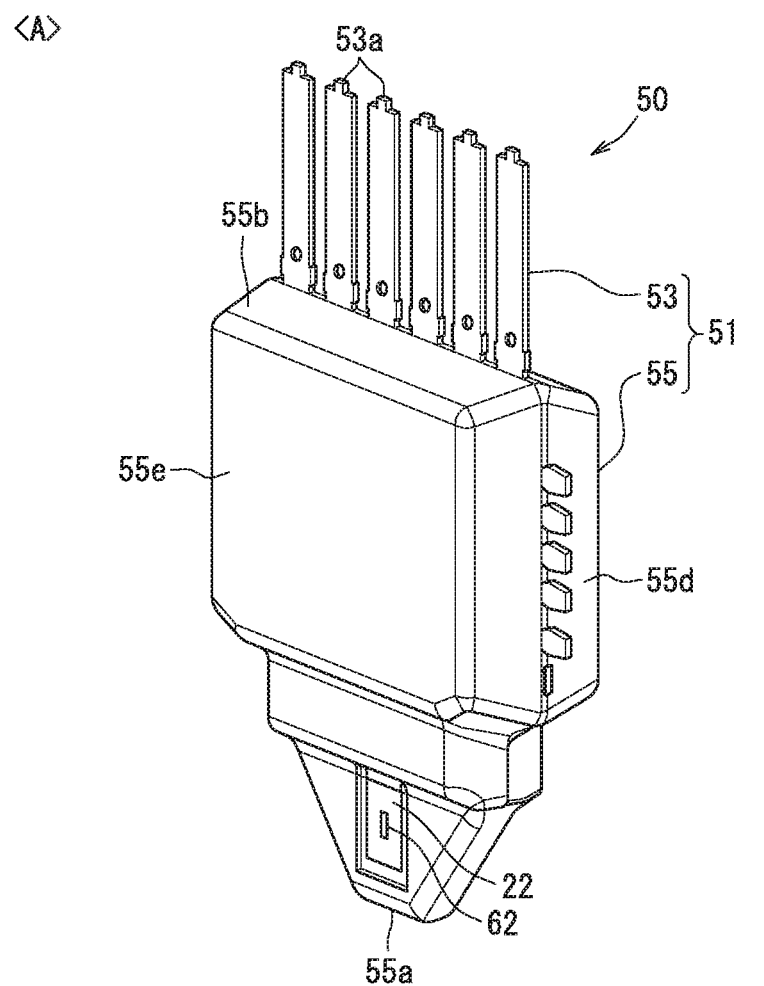
FIG. 9 is a perspective view of a sensor SA according to a configuration group A.
Figure 10:
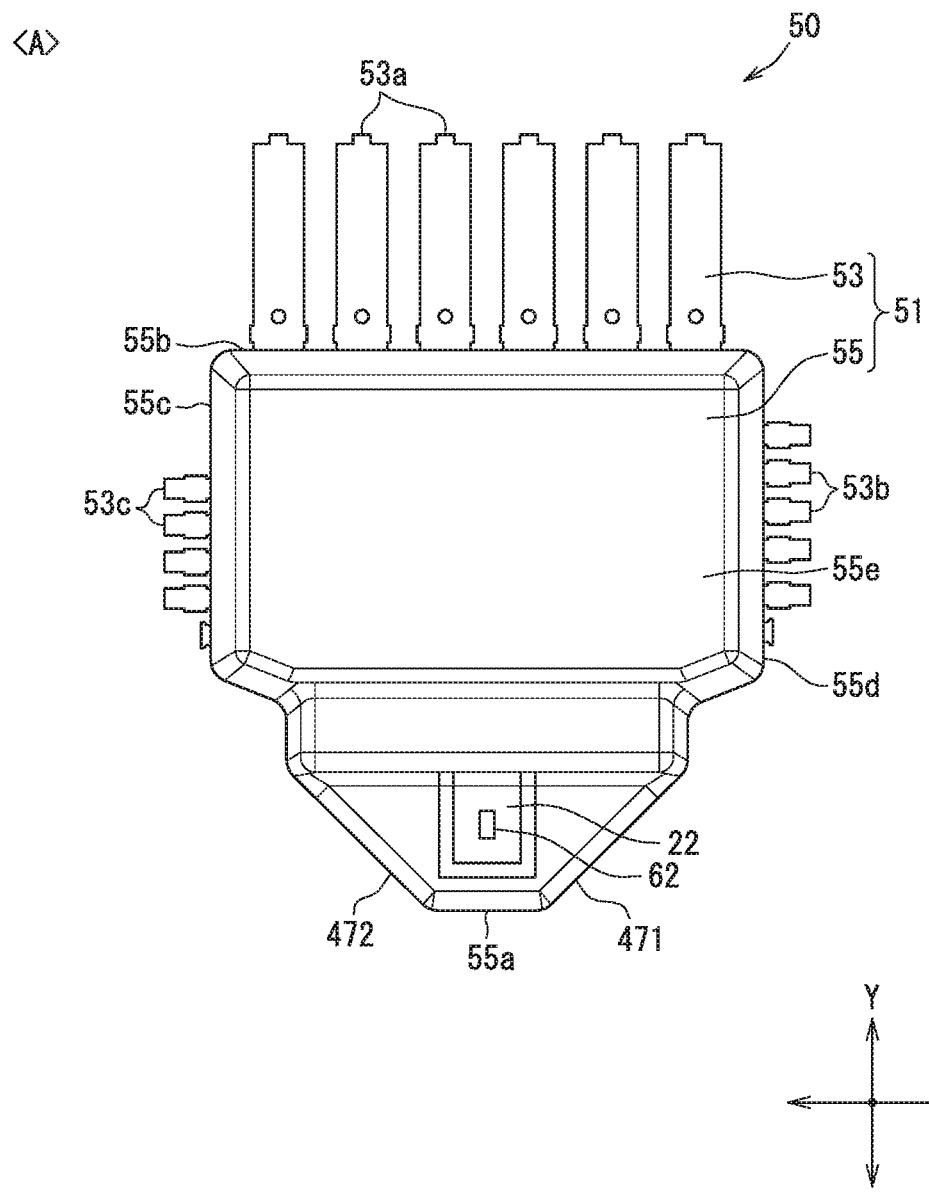
FIG. 10 is a plan view of the sensor SA viewed from a molded front surface.
Figure 11:
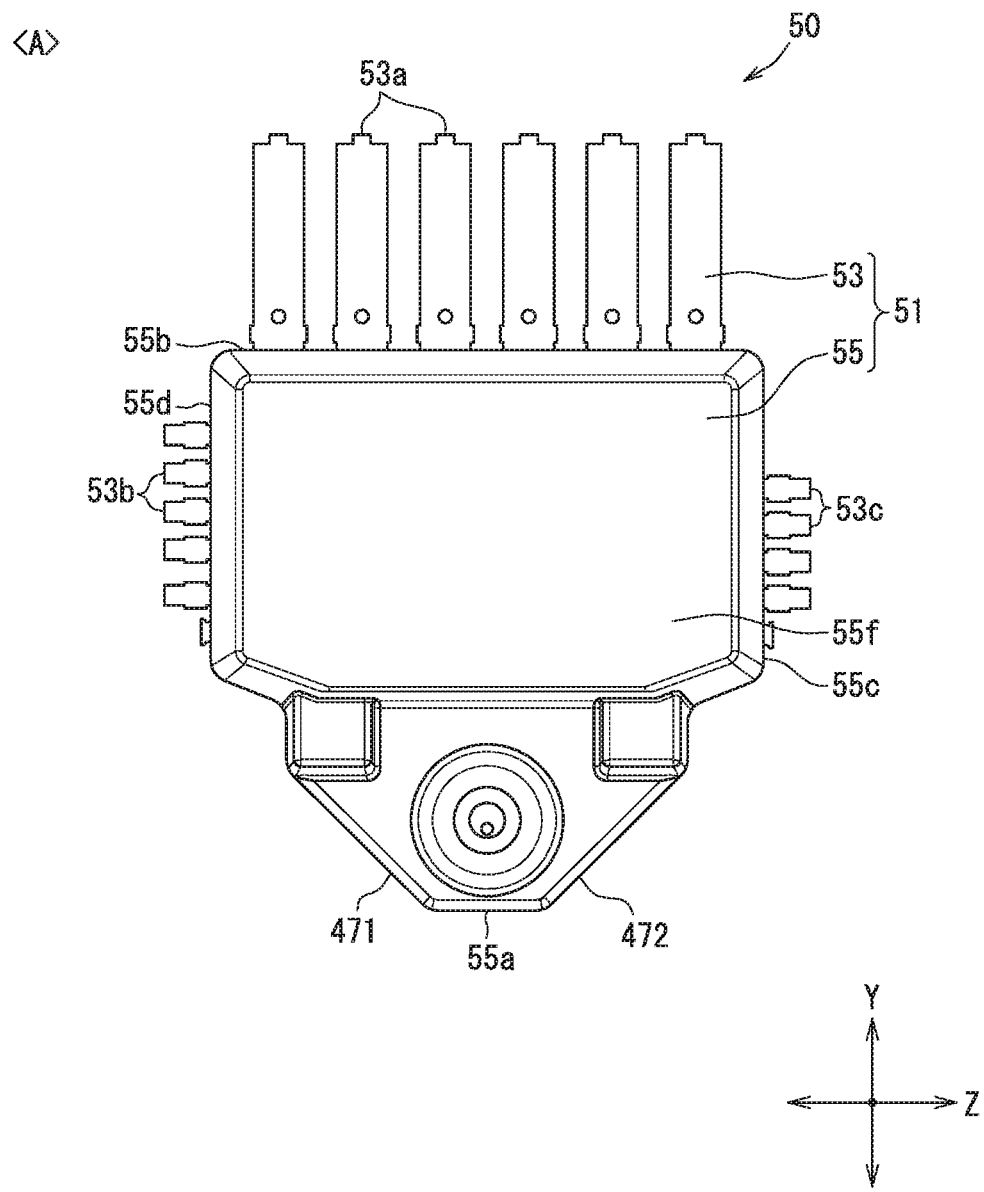
FIG. 11 is a plan view of the sensor SA viewed from a molded back surface.

As shown in FIGS. 9, 10 and 11, the sensor SA 50 includes a sensor support 51 in addition to the flow rate sensor 22. The sensor support 51 is attached to the housing 21 and supports the flow rate sensor 22. The sensor support 51 includes an SA substrate 53 and a molded portion 55. The SA substrate 53 is a substrate on which the flow rate sensor 22 is mounted. The molded portion 55 covers at least a part of the flow rate sensor 22 and at least a part of the SA substrate 53. The SA substrate 53 may also be called a lead frame.

The molded portion 55 is formed in a plate shape as a whole. An outer surface of the molded portion 55 includes a pair of end surfaces 55a and 55b opposite in the height direction Y. One of the pair of end surfaces 55a and 55b facing in the housing distal end direction is referred to as a molded distal end surface 55a, and the other facing in the housing basal end direction is referred to as a molded basal end surface 55b. The molded distal end surface 55a is an end part of the molded portion 55 and an end part of the sensor support 51, and corresponds to a support end. The molded portion 55 corresponds to a protective resin.

The outer surface of the molded portion 55 includes a pair of surfaces 55c, 55d facing each other across the molded distal end surface 55a and the molded basal end surface 55b. One of the pair of surfaces 55c, 55d is referred to as a molded upstream surface 55c, and the other is referred to as a molded downstream surface 55d. In FIG. 8, the sensor SA 50 is arranged inside the housing 21. The molded distal end surface 55a faces in a direction toward a tip end of the air flow meter 20. The molded upstream surface 55c is arranged upstream of the molded downstream surface 55d in the measurement flow path 32. In the sensor support 51, the molded upstream surface 55c corresponds to an upstream end portion, and a molded downstream surface 55d corresponds to a downstream end portion.

The molded upstream surface 55c of the sensor SA 50 is arranged upstream of the molded downstream surface 55d in the measurement flow path 32. A flow direction of air in a part of the measurement flow path 32 where the flow rate sensor 22 is disposed is opposite to a flow direction of air in the intake passage 12. Therefore, the molded upstream surface 55c is arranged downstream of the molded downstream surface 55d in the intake passage 12. The air flowing along the flow rate sensor 22 flows in the depth direction Z, and this depth direction Z may also be referred to as a flow direction.

As shown in FIGS. 9 and 10, in the sensor SA 50, the flow rate sensor 22 is exposed on one side of the sensor SA 50. The outer surface of the mold molded portion 55 includes a plate surface referred to as a molded front surface 55e on the same side as the flow rate sensor 22 being exposed, and a plate surface referred to as a molded back surface 55f opposite the molded front surface 55e. One of the plate surfaces of the sensor SA 50 is formed by the molded front surface 55e. The molded front surface 55e corresponds to a support front surface, and the molded back surface 55f corresponds to a support back surface.

Regarding the molded portion 55, along the height direction Y, a direction in which the molded distal end surface 55a faces may be referred to as a molding direction, and a direction in which the molded basal end surface 55b faces may be referred to as a molding basal end direction. Along the depth direction Z, a direction in which the molded upstream surface 55c faces may be referred to as the molded upstream direction, and a direction in which the molded downstream surface 55d faces may be referred to as the molded downstream direction. Further, along the width direction X, a direction in which the molded front surface 55e faces may be referred to as a molded frontward direction, and a direction in which the molded back surface 55f faces may be referred to as a molded backward direction.

The SA substrate 53 is formed of a metal material or the like in a plate shape as a whole, and is a conductive substrate. A plate surface of the SA substrate 53 is orthogonal to the width direction X and extends in the height direction Y and the depth direction Z. The flow rate sensor 22 is mounted on the SA substrate 53. The SA substrate 53 includes a lead terminal 53a, an upstream test terminal 53b, and a downstream test terminal 53c. The SA substrate 53 has a part covered by the molded portion 55 and a part not covered by the molded portion 55, and the part not covered forms the terminals 53a, 53b, 53c. In FIG. 8 and other drawings, the terminals 53a, 53b, 53c are omitted.

The lead terminal 53a projects in the height direction Y from the molded basal end surface 55b. Multiple lead terminals 53a are provided. The lead terminals 53a include a terminal connected to the connector terminal 28a, a terminal connected to the intake air temperature sensor 23, and an adjustment terminal for adjusting a detection accuracy of the flow rate sensor 22. In the present embodiment, the sensor SA 50 has six lead terminals 53a. These six lead terminals 53a include three terminals connected to the connector terminal 28a, two terminals connected to the intake air temperature sensor 23, and one adjustment terminal. The three terminals connected to the connector terminal 28a include a ground terminal connected to a ground, a power supply terminal to which a predetermined voltage such as 5V is applied, and an output terminal that outputs a signal related to a detection result of the flow rate sensor 22. The two terminals connected to the intake air temperature sensor 23 include a ground terminal connected to the ground, and an output terminal that outputs a signal related to a detection result of the intake air temperature sensor 23.

The upstream test terminal 53b projects in the depth direction Z from the molded upstream surface 55c. Multiple upstream test terminals 53b are provided. The upstream test terminals 53b include a capacitor check terminal for confirming an operation of a capacitor mounted on the SA substrate 53, an IC test terminal for confirming an operation of the flow rate sensor 22, and a ground terminal for grounding.

The downstream test terminal 53c projects in the depth direction Z from the molded downstream surface 55d. Multiple downstream test terminals 53c are provided. Similar to the upstream test terminals 53b, the downstream test terminals 53c include a capacitor check terminal, an IC test terminal and a ground terminal.

Figure 12:
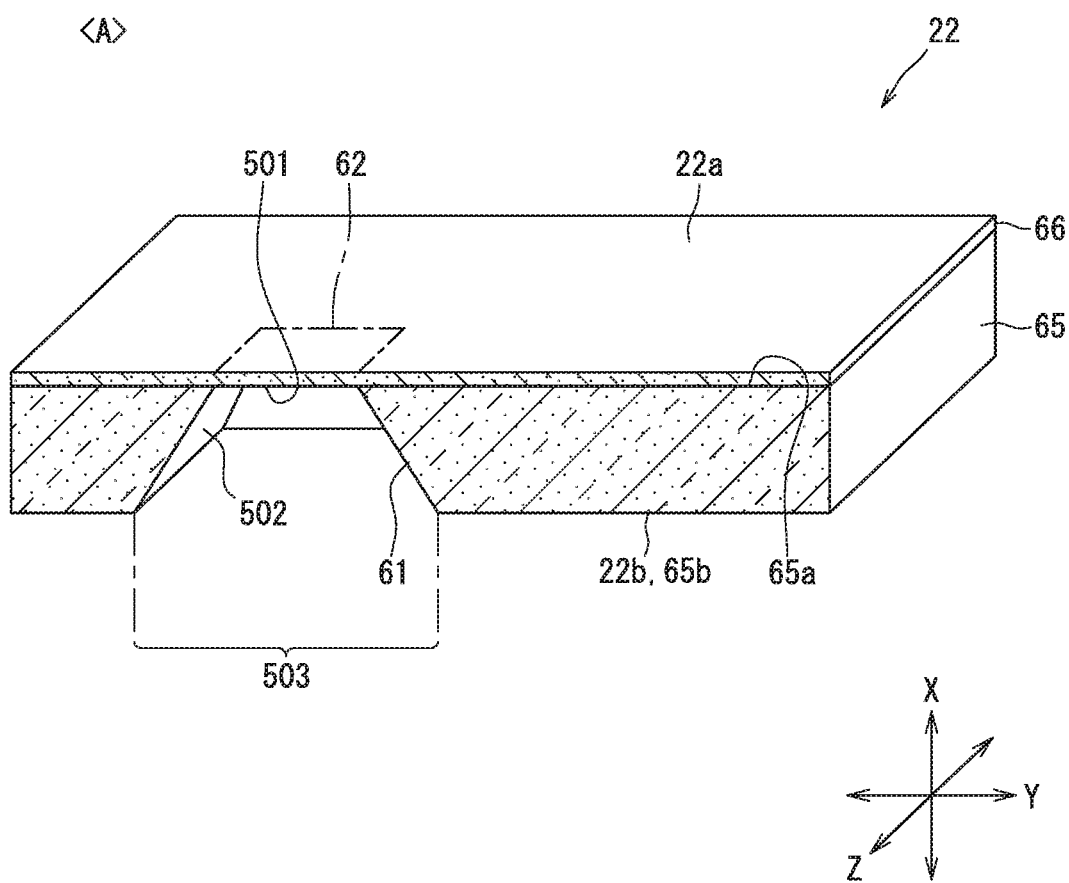
FIG. 12 is a perspective view of a flow rate sensor.

As shown in FIG. 12, the flow rate sensor 22 is formed in a plate shape as a whole. The flow rate sensor 22 has a sensor front surface 22a as one surface, and a sensor back surface 22b opposite the sensor front surface 22a. In the flow rate sensor 22, the sensor back surface 22b faces the SA substrate 53, and a part of the sensor front surface 22a is exposed to an outside of the sensor SA 50.

The flow rate sensor 22 includes a sensor recess portion 61 and a membrane portion 62. The sensor recess portion 61 is provided on the sensor back surface 22b, and the membrane portion 62 is provided on the sensor front surface 22a. The membrane portion 62 forms a sensor recess bottom surface 501 that is a bottom surface of the sensor recess portion 61. The part of the membrane portion 62 that forms the sensor recess bottom surface 501 is a bottom of the sensor recess portion 61. The sensor recess portion 61 is formed by the sensor back surface 22b being recessed toward the sensor front surface 22a. A sensor recess opening 503 that is an opening of the sensor recess portion 61 is provided on the sensor back surface 22b. A sensor recess inner wall surface 502 which is an inner wall surface of the sensor recess portion 61 connects the sensor recess bottom surface 501 and the sensor recess opening 503. The membrane portion 62 is a sensing portion that senses a flow rate.

The flow rate sensor 22 includes a sensor substrate 65 and a sensor film 66. The sensor substrate 65 is a base material of the flow rate sensor 22 and is formed in a plate shape from a semiconductor material such as silicon. The sensor substrate 65 includes a sensor substrate front surface 65a as one surface, and a sensor substrate back surface 65b opposite the sensor substrate front surface 65a. The sensor substrate 65 has a through hole penetrating through the sensor substrate 65 in the width direction X. The sensor recess portion 61 is formed by this through hole. The sensor substrate 65 may have a recess that forms the sensor recess portion 61 instead of the through hole. In this case, the bottom surface of the sensor recess portion 61 is not formed by the membrane portion 62 but by a bottom surface of the recess of the sensor substrate 65.

The sensor film 66 is overlaid on the sensor substrate front surface 65a of the sensor substrate 65 and extends in a film shape along the sensor substrate front surface 65a. In the flow rate sensor 22, the sensor front surface 22a is formed by the sensor film 66, and the sensor back surface 22b is formed by the sensor substrate 65. In this case, the sensor back surface 22b is the sensor substrate back surface 65b of the sensor substrate 65.

The sensor film 66 has a multilayer structure including multiple layers such as an insulating layer, a conductive layer, and a protective layer. Each of these is formed in a film shape and extends along the sensor substrate front surface 65a. The sensor film 66 has a wiring pattern such as wiring and resistors, and this wiring pattern is formed by a conductive layer.

In the flow rate sensor 22, the sensor recess portion 61 is formed by processing a part of the sensor substrate 65 by wet etching. In the manufacturing process of the flow rate sensor 22, a mask such as a silicon nitride film is attached to the sensor substrate back surface 65b of the sensor substrate 65, and anisotropic etching is performed on the sensor substrate back surface 65b using an etching solution until the sensor film 66 is exposed. The sensor recess portion 61 may be formed by performing dry etching on the sensor substrate 65.

The sensor SA 50 has a flow rate detection circuit that detects a flow rate of air. At least a part of this flow rate detection circuit is included in the flow rate sensor 22. As shown in FIG. 13, the sensor SA 50 includes a heating resistor 71, temperature measuring resistors 72, 73, and an indirectly heated resistor 74 as circuit elements included in the flow rate detection circuit. These resistors 71 to 74 are included in the flow rate sensor 22 and are formed by the conductive layer of the sensor film 66. In this case, the sensor film 66 includes the resistors 71 to 74, and these resistors 71 to 74 are included in the wiring pattern of the conductive layer. The resistors 71 to 74 correspond to detection elements. In FIG. 13, the wiring pattern including the resistors 71 to 74 is illustrated by dot hatching. The flow rate detection circuit may also be referred to as a flow rate measurement unit that measures the flow rate of air.

The heating resistor 71 is a resistance element that generates heat according to energization of the heating resistor 71. The heating resistor 71 generates heat to heat the sensor film 66, and corresponds to a heater. The temperature measuring resistors 72, 73 are resistance elements for detecting a temperature of the sensor film 66, and correspond to a temperature detector. The resistance values of the temperature measuring resistors 72, 73 change according to the temperature of the sensor film 66. In the flow rate detection circuit, the temperature of the sensor film 66 is detected using the resistance values of the temperature measuring resistors 72, 73. The flow rate detection circuit raises the temperature of the sensor film 66 and the temperatures of the temperature measuring resistors 72 and 73 by the heating resistor 71. When an air flow occurs in the measurement flow path 32, the flow rate detection circuit detects an air flow rate and a flow direction by using change in temperature detected by the temperature measuring resistors 72, 73.

The heating resistor 71 is arranged substantially at the center of the membrane portion 62 in each of the height direction Y and the depth direction Z. The heating resistor 71 is formed in a rectangular shape extending in the height direction Y as a whole. The center line CL1 of the heating resistor 71 passes through the center CO1 of the heating resistor 71 and extends linearly in the height direction Y. The center line CL1 passes through the center of the membrane portion 62. The heating resistor 71 is arranged at a position spaced inward from a peripheral edge of the membrane portion 62. An end of the heating resistor 71 facing in a molding distal end direction and an end of the heating resistor 71 facing in a molding basal end direction are the same in distance from the center CO1.

Each of the temperature measuring resistors 72, 73 is formed in a rectangular shape extending in the height direction Y as a whole. The temperature measuring resistors 72, 73 are arranged in the depth direction Z. The heating resistor 71 is disposed between the temperature measuring resistors 72, 73. An upstream temperature measuring resistor 72 among the temperature measuring resistors 72, 73 is provided at a position separated from the heating resistor 71 in a molded upstream direction. A downstream temperature measuring resistor 73 among the temperature measuring resistors 72, 73 is provided at a position separated from the heating resistor 71 in a molded downstream direction. The center line CL2 of the upstream temperature measuring resistor 72 and the center line CL3 of the downstream temperature measuring resistor 73 both linearly extend parallel to the center line CL1 of the heating resistor 71. The heating resistor 71 is disposed at an intermediate position between the upstream temperature measuring resistor 72 and the downstream temperature measuring resistor 73 in the depth direction Z.

Regarding the sensor SA 50 of the present embodiment, in FIG. 10, a direction in which the molded upstream surface 55c faces is referred to as the molded upstream direction, and a direction in which the molded downstream surface 55d faces is referred to as the molded downstream direction. Further, a direction in which the molded distal end surface 55a faces is referred to as the molding distal end direction, and a direction in which the molded basal end surface 55b faces is referred to as the molding basal end direction.

Returning to the explanation of FIG. 13, the indirectly heated resistor 74 is a resistance element for detecting a temperature of the heating resistor 71. The indirectly heated resistor 74 extends along the peripheral edge of the heating resistor 71. A resistance value of the indirectly heated resistor 74 changes according to the temperature of the heating resistor 71. In the flow rate detection circuit, the temperature of the heating resistor 71 is detected using the resistance value of the indirectly heated resistor 74.

The sensor SA 50 includes a heating wire 75 and temperature measuring wires 76. 77. These wires 75 to 77 are included in the wiring pattern of the sensor film 66, like the resistors 71 to 74. The heating wire 75 extends from the heating resistor 71 in the molding basal end direction along the height direction Y. The upstream temperature measuring wire 76 extends from the upstream temperature measuring resistor 72 in the molding distal end direction along the height direction Y. The downstream temperature measuring wire 77 extends from the downstream temperature measuring resistor 73 in the molding distal end direction along the height direction Y.

Figure 14:
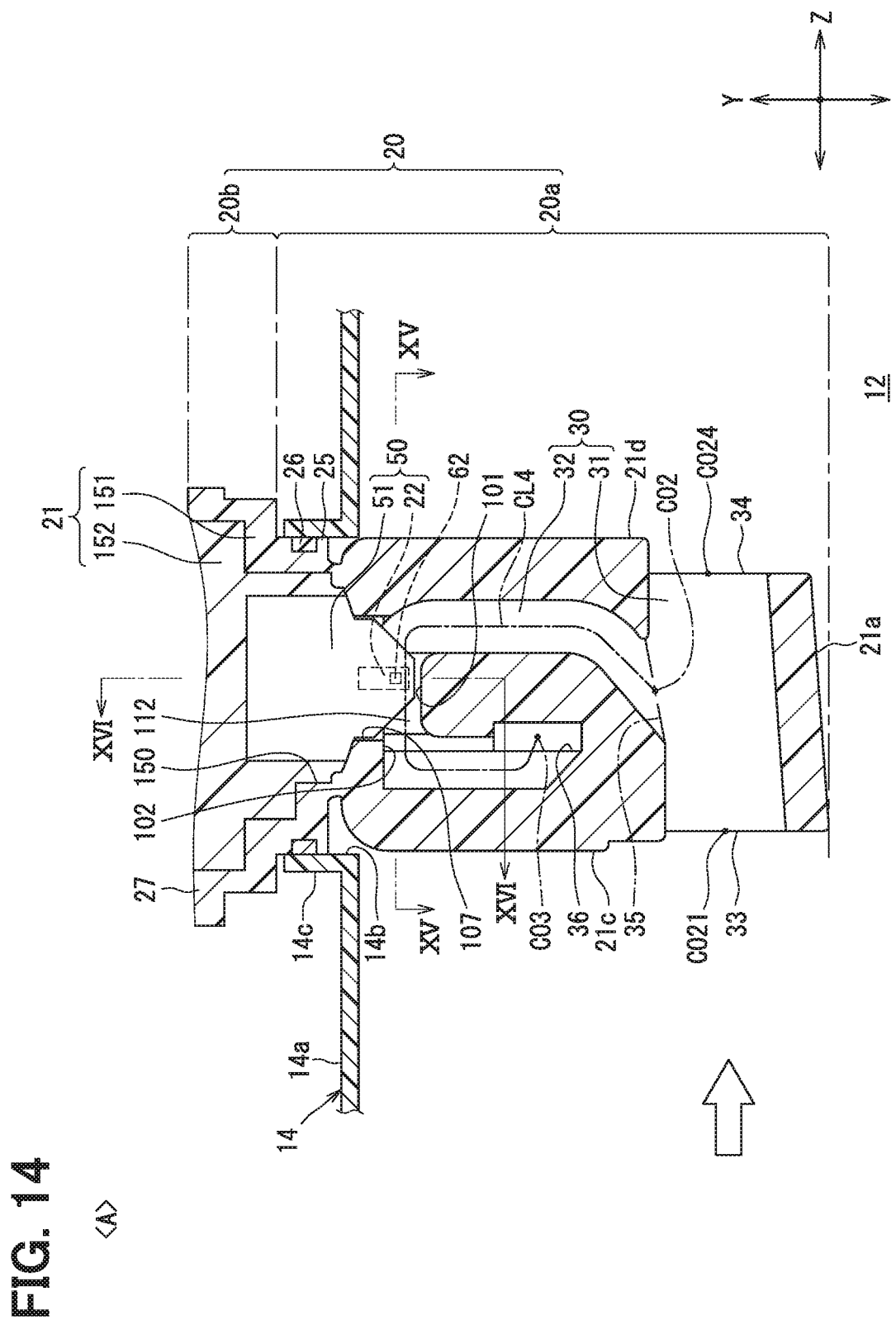
FIG. 14 is a vertical cross-sectional view of the air flow meter.
Figure 15:
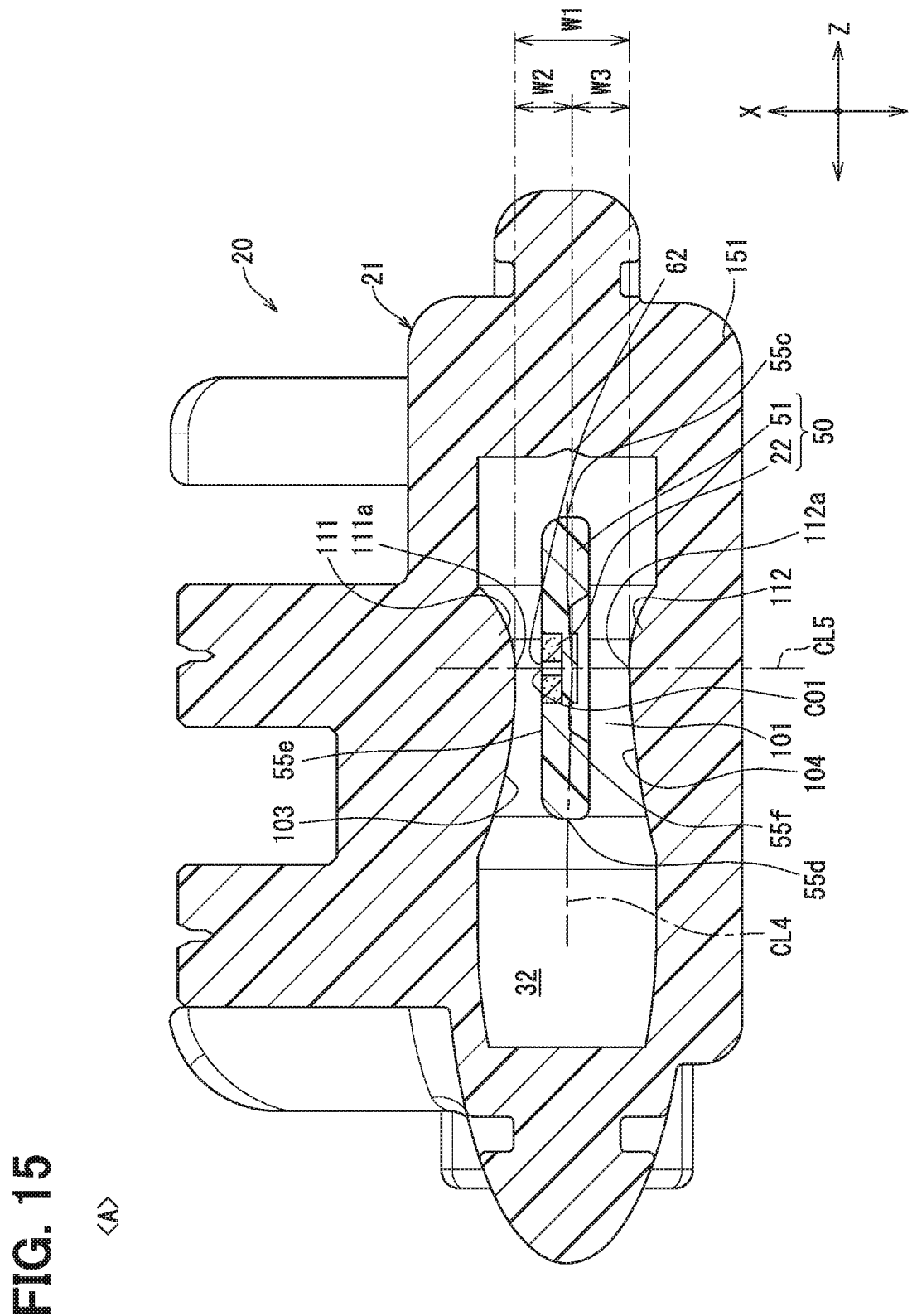
FIG. 15 is a cross-sectional view taken along a line XV-XV in FIG. 14.

As shown in FIGS. 14 and 15, a center line CL4 of the measurement flow path 32 passes through a center CO2 of the measurement inlet 35 and a center CO3 of the measurement outlet 36, and extends linearly along the measurement flow path 32. The sensor SA 50 is provided in the measurement flow path 32 between the measurement inlet 35 and the measurement outlet 36. The sensor SA 50 is disposed at a position downstream away from the measurement inlet 35 and upstream away from the measurement outlet 36. In FIG. 14, a center line of a region of the measurement flow path 32 excluding an internal space of a SA insertion hole 107 is shown as the center line CL4.

In the through flow path 31, an opening area of the through outlet 34 is smaller than the opening area of the through inlet 33. A height of the through outlet 34 and a height of the through inlet 33 are the same in the height direction Y while a width of the through outlet 34 is smaller than a width of the through inlet 33 in the width direction X. The opening area of the through inlet 33 is an area of a region including a center CO21 of the through inlet 33. The opening area of the through outlet 34 is an area of a region including a center CO24 of the through outlet 34.

In the measurement flow path 32, a total value of respective opening areas of multiple measurement outlets 36 is smaller than an opening area of the measurement inlet 35. This may be simply said that the opening area of the measurement outlet 36 is smaller than the opening area of the measurement inlet 35. The opening area of the measurement inlet 35 is an area of a region including a center CO2 of the measurement inlet 35. The opening area of the measurement outlet 36 is an area of a region including a center CO3 of the measurement outlet 36.

Figure 16:
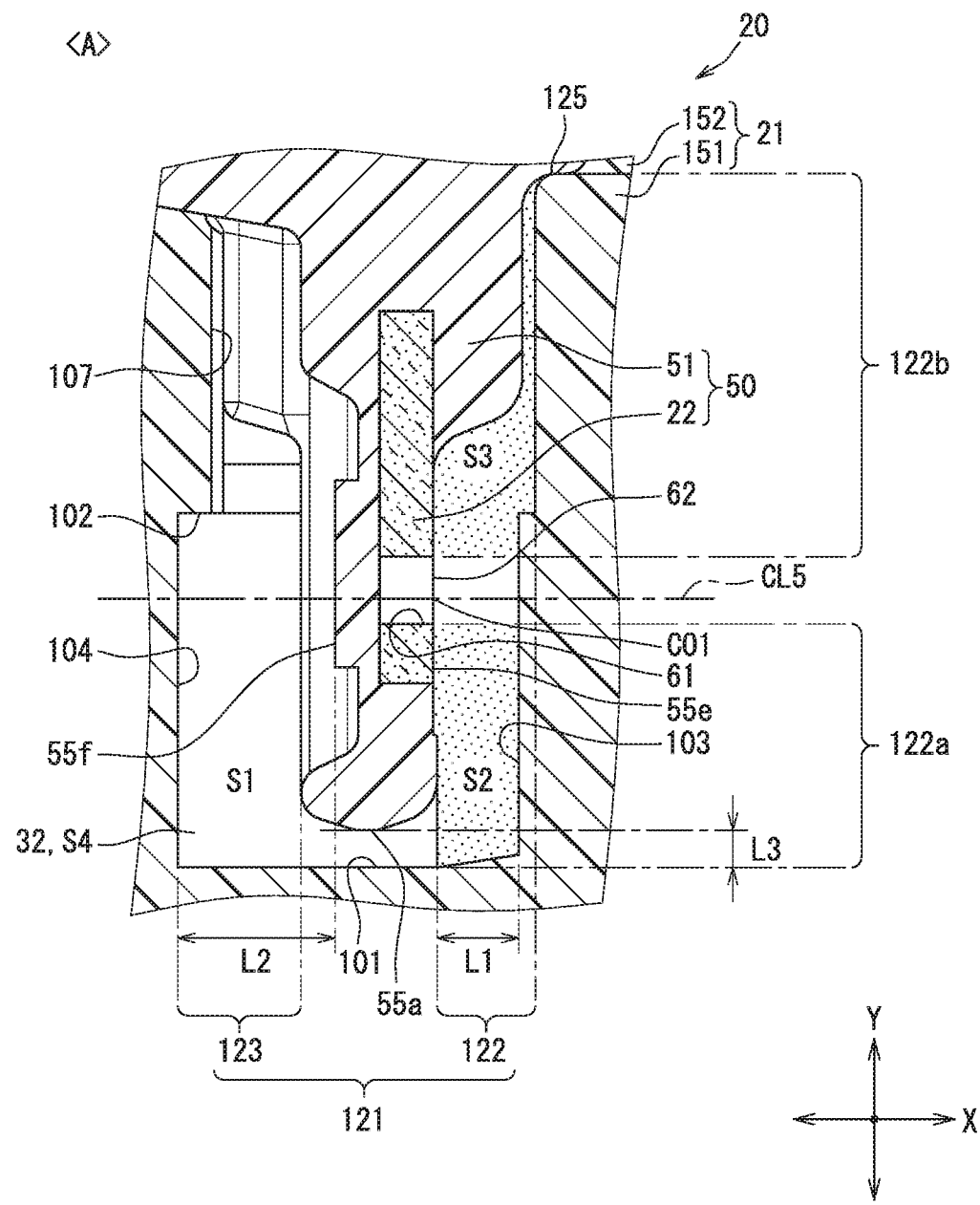
FIG. 16 is a cross-sectional view taken along a line XVI-XVI in FIG. 14.

As shown in FIGS. 15, 16, the housing 21 includes a measurement floor surface 101, a measurement ceiling surface 102, a front measurement wall surface 103, and a back measurement wall surface 104 as formation surfaces forming the measurement flow path 32. The measurement floor surface 101, the measurement ceiling surface 102, the front measurement wall surface 103, and the back measurement wall surface 104 all extend along the center line CL4 of the measurement flow path 32. The measurement floor surface 101, the measurement ceiling surface 102, the front measurement wall surface 103, and the back measurement wall surface 104 form a part of the measurement flow path 32 extending in the depth direction Z. The measurement floor surface 101 corresponds to a floor surface, the front measurement wall surface 103 corresponds to a front wall surface, and the back measurement wall surface 104 corresponds to a back wall surface. The width direction X corresponds to a front-back direction in which the front wall surface and the back wall surface faces each other.

The measurement floor surface 101 and the measurement ceiling surface 102 are provided between the front measurement wall surface 103 and the back measurement wall surface 104. The measurement floor surface 101 faces the molded distal end surface 55a of the sensor SA 50 and extends straight in the depth direction Z. The measurement ceiling surface 102 is opposite and facing to the measurement floor surface 101 across the center line CL4 in the height direction Y. The SA insertion hole 107 is provided in a portion of the housing 21 that forms the measurement ceiling surface 102, and the sensor SA 50 is inserted into the SA insertion hole 107. The SA insertion hole 107 is closed by the sensor SA 50. The measurement flow path 32 also includes a gap between the sensor SA 50 and the housing 21 in the internal space of the SA insertion hole 107.

The front measurement wall surface 103 and the back measurement wall surface 104 are a pair of wall surfaces facing each other across the measurement floor surface 101 and the measurement ceiling surface 102. The front measurement wall surface 103 faces the molded front surface 55e of the sensor SA 50, and extends in the housing basal end direction from an edge of the measurement floor surface 101 on an airflow-meter front side. The front measurement wall surface 103 faces the flow rate sensor 22 of the sensor SA 50. The back measurement wall surface 104 faces the molded back surface 55f of the sensor SA 50, and extends in the housing basal end direction from an edge of the measurement floor surface 101 on an airflow-meter back side. In FIGS. 15, 16, the internal structure of the sensor SA 50 is simplified and only the molded portion 55 and the flow rate sensor 22 are shown.

The housing 21 has a front narrowed portion 111 and a back narrowed portion 112. These narrowed portions 111, 112 gradually narrow the measurement flow path 32 such that a cross-sectional area S4 of the measurement flow path 32 gradually decreases from an upstream part such as the measurement inlet 35 in a direction toward the flow rate sensor 22. Further, the narrowed portions 111, 112 gradually narrow the measurement flow path 32 such that the cross-sectional area S4 of the measurement flow path 32 gradually decreases from a downstream part such as the measurement outlet 36 in a direction toward the flow rate sensor 22. Regarding the measurement flow path 32, an area orthogonal to the center line CL4 is referred to as the cross-sectional area S4, and this cross-sectional area S4 may also be referred to as a flow path area.

The front narrowed portion 111 is a convex portion in which a part of the front measurement wall surface 103 protrudes toward the back measurement wall surface 104. The back narrowed portion 112 is a convex portion in which a part of the back measurement wall surface 104 protrudes toward the front measurement wall surface 103. The front narrowed portion 111 and the back narrowed portion 112 are arranged along the height direction Y and face each other in the width direction X. These narrowed portions 111, 112 are bridged by the measurement ceiling surface 102 and the measurement floor surface 101. The narrowed portions 111, 112 gradually reduce a measurement width dimension W1 in a direction from upstream to the flow rate sensor 22. The measurement width dimension W1 is a distance in the width direction X between the front measurement wall surface 103 and the back measurement wall surface 104. Further, the narrowed portions 111, 112 gradually reduce the measurement width dimension W1 in a direction from downstream to the flow rate sensor 22.

The narrowed portions 111, 112 gradually approach the center line CL4 in the direction from upstream to the flow rate sensor 22 in the measurement flow path 32. In the measurement flow path 32, the distances W2, W3 in the width direction X between the narrowed portions 111, 112 and the center line CL4 gradually decrease in the direction from upstream to the flow rate sensor 22. The narrowed portions 111, 112 gradually approach the center line CL4 in the direction from downstream to the flow rate sensor 22 in the measurement flow path 32. In the measurement flow path 32, the distances W2, W3 in the width direction X between the narrowed portions 111, 112 and the center line CL4 gradually decrease in the direction from downstream to the flow rate sensor 22.

In the narrowed portions 111, 112, the parts closest to the center line CL4 are peaks 111a, 112a. In this case, in the narrowed portions 111, 112, the distances W2, W3 from the center line CL4 are smallest at the peaks 111a, 112a. The peaks 111a, 112a are a front peak 111a of the front narrowed portion 111 and a back peak 112a of the back narrowed portion 112. The front peak 111a and the back peak 112a are arranged in the width direction X and face each other.

The flow rate sensor 22 is disposed between the front narrowed portion 111 and the back narrowed portion 112. More specifically, the center CO1 of the heating resistor 71 of the flow rate sensor 22 is provided between the front peak 111a and the back peak 112a. Regarding the heating resistor 71, a center line CL5 is defined as a straight imaginary line that passes through the center CO1, is orthogonal to the center line CL1 and extends in the width direction X. Both the front peak 111a and the back peak 112a are located on the center line CL5. In this case, the center CO1 of the heating resistor 71 and the front peak 111a are aligned in the width direction X. The center CO1 of the heating resistor 71 and the front peak 111a face each other in the width direction X.

As shown in FIG. 16, the sensor support 51 of the sensor SA 50 is provided at a position closer to the front narrowed portion 111 than to the back narrowed portion 112 in the width direction X. That is, the sensor support 51 is provided at a position closer to the front measurement wall surface 103 than to the back measurement wall surface 104. On the center line CL5 of the heating resistor 71, a front distance L1 that is a distance in the width direction X between the flow rate sensor 22 and the front measurement wall surface 103 is smaller than a back distance L2 that is a distance in the width direction X between the flow rate sensor 22 and the back measurement wall surface 104. That is, there is a relationship of L1<L2. The front distance L1 is a distance between the center CO1 of the heating resistor 71 and the front peak 111a of the front narrowed portion 111. The back distance L2 is a distance on the center line CL5 of the heating resistor 71 between the molded back surface 55f and the back peak 112a of the back narrowed portion 112.

The molded distal end surface 55a of the sensor support 51 is arranged at a position closer to the measurement floor surface 101 than to the measurement ceiling surface 102 in the height direction Y. In this case, in the measurement flow path 32, a floor distance L3 is smaller than the front distance L1. That is, there is a relationship of L1>L3. The floor distance L3 is a distance between the molded distal end surface 55a and the measurement floor surface 101 in the height direction Y. More specifically, the floor distance L3 is a distance between the molded distal end surface 55a and a portion of the measurement floor surface 101 that is closest to the molded distal end surface 55a within a region of the measurement floor surface 101 facing the molded distal end surface 55a.

In the measurement flow path 32, a sensor region 121 is defined as a planar region that is defined by the inner surface of the housing 21 and an outer surface of the sensor SA 50, is orthogonal to the center line CL4 and passes through the center CO1 of the heating resistor 71. The air flowing from the measurement inlet 35 to the measurement outlet 36 in the measurement flow path 32 needs to pass through the sensor region 121.

The sensor region 121 includes a front region 122 and a back region 123. The front region 122 is between the front measurement wall surface 103 and the molded front surface 55e in the width direction X. The back region 123 is between the back measurement wall surface 104 and the molded back surface 55f in the width direction X. These regions 122 and 123 extend in the height direction Y from the measurement floor surface 101 toward the measurement ceiling surface 102. In the measurement flow path 32, the sensor SA 50 is arranged between the front region 122 and the back region 123 in the width direction X.

The front region 122 includes a floor region 122a and a ceiling region 122b. The floor region 122a is a region in the front region 122 that extends from a floor-directed end of the flow rate sensor 22 toward the measurement floor surface 101. An edge of the floor region 122a facing in the housing distal end direction is defined by the measurement floor surface 101. Therefore, the floor region 122a is between the flow rate sensor 22 and the measurement floor surface 101 in the height direction Y. The ceiling region 122b is a region in the front region 122 that extends from a ceiling-directed end of the flow rate sensor 22 toward the measurement ceiling surface 102. An edge of the front region 122 facing in the housing basal end direction is defined by a ceiling boundary which is a boundary between the inner surface of the housing 21 and the outer surface of the sensor SA 50. Therefore, the ceiling region 122b is between the flow rate sensor 22 and the ceiling boundary in the height direction Y.

An area of the sensor region 121 is defined as a region area S1, and the region area S1 is a cross-sectional area of a portion of the measurement flow path 32 where the flow rate sensor 22 is provided. The region area S1 includes a floor area S2 which is an area of the floor region 122a, and a ceiling area S3 which is an area of the ceiling region 122b. In the front region 122, the ceiling area S3 is smaller than the floor area S2. That is, there is a relationship of S3<S2.

According to the present embodiment described thus far, the front distance L1 is larger than the floor distance L3 in the measurement flow path 32. According this configuration, an amount of air flowing along the front measurement wall surface 103 or the molded front surface 55e is likely to be larger than an amount of air flowing along the measurement floor surface 101 or the molded distal end surface 55a. In this case, since air easily flows along the flow rate sensor 22 on the molded front surface 55e, decrease in flow rate detection accuracy of the flow rate sensor 22 caused by shortage of an amount of air flowing along the flow rate sensor 22 is unlikely to occur. Therefore, the flow rate detection accuracy of the flow rate sensor 22 can be increased, and as a result, the air flow rate measurement accuracy of the air flow meter 20 can be increased.

In the configuration in which the floor distance L3 is smaller than the front distance L1, the measurement flow path 32 may be narrowed from the measurement floor surface 101 and the region area S1 of the sensor region 121 may become insufficient. In the measurement flow path 32, if the cross-sectional area such as the region area S1 becomes insufficient, a pressure loss increases, and air becomes difficult to flow from the through flow path 31 into the measurement flow path 32. In this case, an air flow rate in the measurement flow path 32 may become insufficient, and separation or turbulence of air flow may easily occur in the measurement flow path 32. As a result, the detection result of the flow rate sensor 22 is likely to include noise due to the separation or turbulence.

With respect to this, according to the present embodiment, the front distance L1 is smaller than the back distance L2 in the measurement flow path 32. In this case, even if the area between the molded distal end surface 55a of the sensor SA 50 and the measurement floor surface 101 is narrow, the back region 123 between the molded back surface 55f and the back measurement wall surface 104 is relatively wide. According to this configuration, the shortage of the region area S1 of the sensor region 121 can be avoided by the back region 123, and the shortage of the air flow rate in the measurement flow path 32 is less likely to occur. In this case, separation and turbulence of air flow is less likely to occur in the measurement flow path 32, and noise contamination in the detection result of the flow rate sensor 22 can be reduced. Further, in this case, since the pressure loss in the measurement flow path 32 is reduced and the flow rate is likely to be increased, a range of flow rate detection by the flow rate sensor 22 can be expanded. That is, fluctuation of an output from the air flow meter 20 can be reduced, and the air flow meter 20 can have a large dynamic range. Therefore, the air flow meter 20 can realize both reduction in output fluctuation and increase in dynamic range.

The front distance L1 is smaller than the back distance L2. According to this configuration, at the time of manufacturing of the air flow meter 20, even if a relative position of the sensor SA 50 with respect to the housing 21 shifts in the width direction X due to an error in attaching the sensor SA 50 to the housing 21, the front distance L1 can be easily kept smaller than the back distance L2. As described above, even if an error in attaching the sensor SA 50 to the housing 21 occurs, the relationship between the front distance L1 and the back distance L2 can realize a configuration in which the detection accuracy of the flow rate sensor 22 is difficult to decrease.

According to this embodiment, the housing 21 includes the front narrowed portion 111. In this configuration, the front narrowed portion 111 gradually narrows the measurement flow path 32 in the direction from the measurement inlet 35 toward the flow rate sensor 22. Thus, even if separation or turbulence is generated in the air flow, the front narrowed portion 111 reduces the separation and turbulence by regulating the air flow. In this case, the separation or turbulence is unlikely to reach the flow rate sensor 22. Thus, the detection accuracy of the flow rate sensor 22 can be improved. Moreover, since the front distance L1 is the distance between the front narrowed portion 111 and the flow rate sensor 22, air flowing along the flow rate sensor 22 can be reliably regulated by the front narrowed portion 111.

According to the present embodiment, the front distance L1 is the distance between the front peak 111a of the front narrowed portion 111 and the flow rate sensor 22. In the front narrowed portion 111, a portion having the highest regulation effect is likely to be the front peak 111a. Therefore, since the portion having the highest regulation effect faces the flow rate sensor 22, occurrence of separation and turbulent in the air flow along the flow rate sensor 22 can be reliably reduced. Accordingly, the detection accuracy of the flow rate sensor 22 can be further improved.

According to the present embodiment, the housing 21 includes the back narrowed portion 112. In this configuration, the back narrowed portion 112 gradually narrows the measurement flow path 32 in the direction from the measurement inlet 35 toward the flow rate sensor 22. Thus, even if separation or turbulence is generated in the air flow, the back narrowed portion 112 reduces the separation and turbulence by regulating the air flow. In the measurement flow path 32, air flowing toward the flow rate sensor 22 at a height position near the flow rate sensor 22 in the height direction Y is expected to easily pass through both the front side and the back side of the sensor support 51. Therefore, the regulation of the air flow along the back measurement wall surface 104 by the back narrowed portion 112 is effective in preventing the separation and the turbulence from reaching the flow rate sensor 22.

According to the present embodiment, in the measurement flow path 32, the ceiling area S3 of the ceiling region 122b is smaller than the floor area S2 of the floor region 122a. According to this configuration, the pressure loss is more likely to increase in the ceiling region 122b than in the floor region 122a, and it is difficult for air to flow in the ceiling region 122b. Therefore, even if the measurement flow path 32 has a configuration in which an air flow along the measurement ceiling surface 102 tends to be lager in velocity and volume than an air flow along the measurement floor surface 101, the velocity and volume of air flow can be equalized in the ceiling region 122b and the floor region 122a. As a result, deterioration in detection accuracy of the flow rate sensor 22 due to mixing of the fast and slow airflows reaching the sensor region 121 can be reduced.

According to the present embodiment, the measurement flow path 32 is curved so that the measurement ceiling surface 102 becomes an outer curve and the measurement floor surface 101 becomes an inner curve. According to this configuration, an air flow along the measurement ceiling surface 102 tends to be lager in velocity and volume than the air flow along the measurement floor surface 101 due to centrifugal force or the like. Therefore, the fact that the ceiling area S3 is smaller than the floor area S2 is effective for equalizing the velocities and volumes of the air flows in the ceiling region 122b and the floor region 122a.

According to the present embodiment, the front distance L1 is the distance between the front measurement wall surface 103 and the heating resistor 71. In the flow rate sensor 22, since a flow rate of air flowing along the heating resistor 71 is detected, the detection accuracy of the flow rate sensor 22 can be increased by managing the positional relationship between the heating resistor 71 and the front measurement wall surface 103.

According to the present embodiment, in the sensor SA 50, the molded front surface 55e and the molded back surface 55f are both formed by the resin molded portion 55. In this configuration, smoothness of the molded front surface 55e and the molded back surface 55f can be easily managed. Thus, separation or turbulence is less likely to be generated in air flowing along the molded front surface 55e and the molded back surface 55f.

<Description of Configuration Group B>

Figure 17:
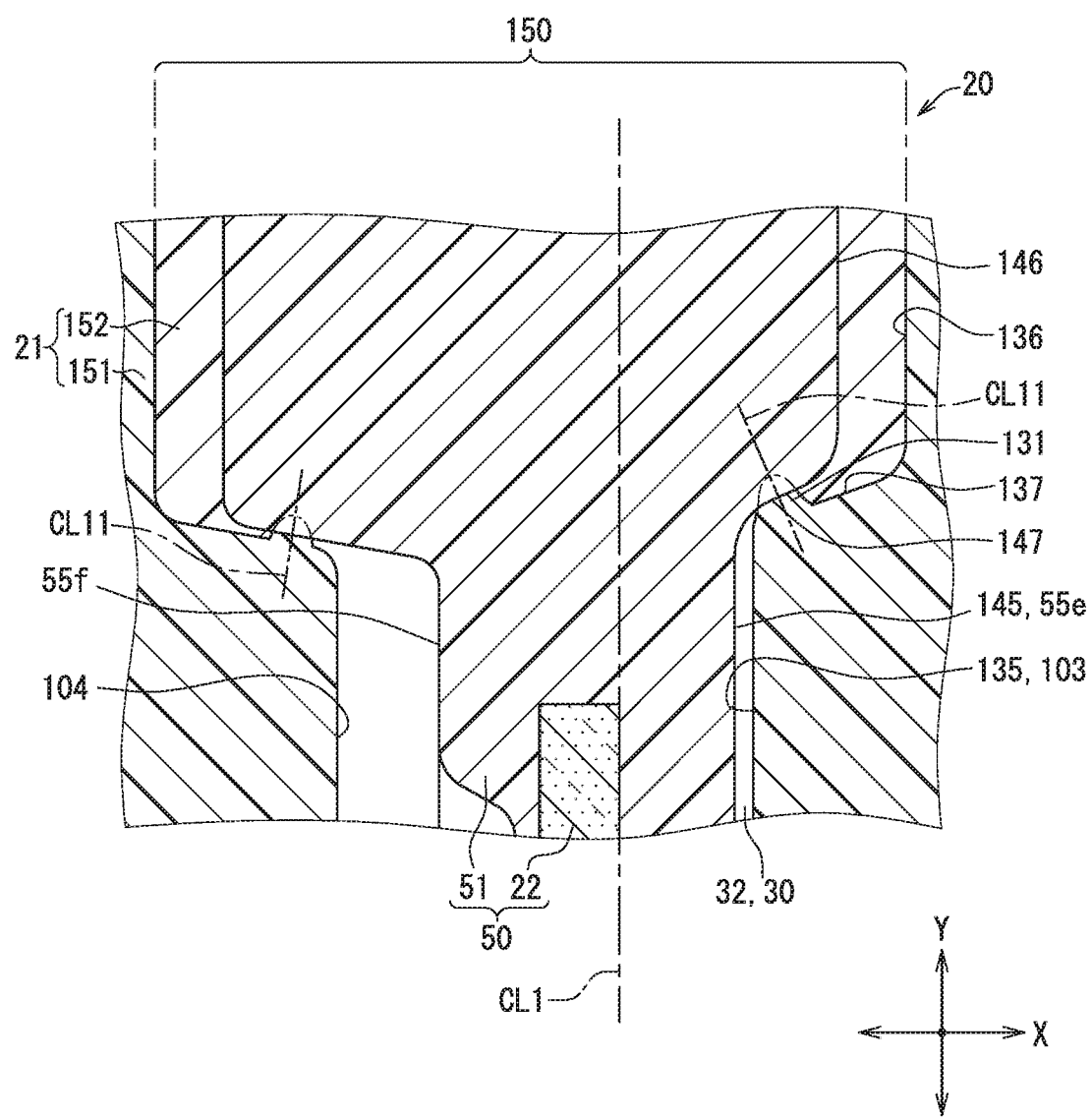
FIG. 17 is a vertical cross-sectional view of an air flow meter around a housing partition according to a configuration group B.
Figure 18:
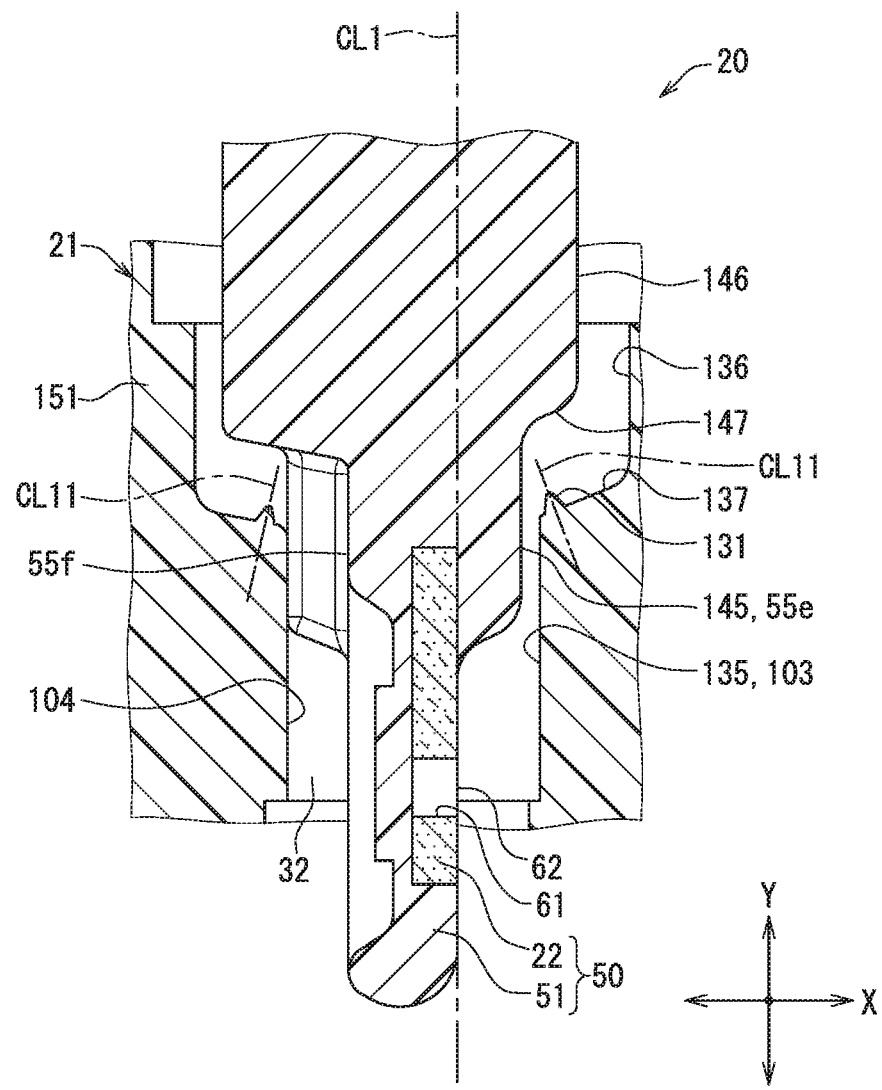
FIG. 18 is a view showing a state before a sensor SA is assembled to a housing.

As shown in FIGS. 8 and 17, the housing 21 includes an SA container space 150. The SA container space 150 is provided at a position shifted from the bypass flow path 30 in the housing basal end direction. The SA container space 150 houses a part of the sensor SA 50. At least the molded basal end surface 55b of the sensor SA 50 is housed in the SA container space 150. The measurement flow path 32 and the SA container space 150 are arranged in the height direction Y. The sensor SA 50 is positioned to extend in the height direction Y across a boundary between the measurement flow path 32 and the SA container space 150. At least the molded distal end surface 55a and the flow rate sensor 22 of the sensor SA 50 are housed in the measurement flow path 32. The SA container space 150 corresponds to a container space. In FIGS. 17, 18, the internal structure of the sensor SA 50 is simplified and only the molded portion 55 and the flow rate sensor 22 are shown.

The housing 21 includes a first housing part 151 and a second housing part 152. The housing parts 151 and 152 are assembled and integrated with each other so as to form the housing 21. The first housing part 151 forms the SA container space 150. The first housing part 151 forms the bypass flow path 30 in addition to the SA container space 150. An inner surface of the first housing part 151 that is an inner surface of the housing 21 defines the SA container space 150 and the bypass flow path 30. A housing opening 151a (see FIG. 19) is provided at an open end of the first housing part 151. The SA container space 150 is open through the housing opening 151a in a direction away from the measurement flow path 32.

When the sensor SA 50 is housed in the SA container space 150 and the measurement flow path 32, a gap is formed between the outer surface of the sensor SA 50 and the inner surface of the first housing part 151. The second housing part 152 fills this gap. More specifically, the second housing part 152 is inserted between the outer surface of the sensor SA 50 and the inner surface of the first housing part 151 in the SA container space 150.

As shown in FIG. 17, the housing 21 includes a housing partition 131. The housing partition 131 is a protrusion provided on the inner surface of the first housing part 151, and projects from the first housing part 151 toward the sensor SA 50. In this case, the first housing part 151 includes the housing partition 131. A tip end of the housing partition 131 is in contact with the outer surface of the sensor SA 50. The housing partition 131 is between the outer surface of the sensor SA 50 and the inner surface of the first housing part 151 and separates the SA container space 150 from the measurement flow path 32.

The inner surface of the first housing part 151 includes a housing flow path surface 135, a housing container surface 136, and a housing step surface 137. The housing flow path surface 135, the housing container surface 136, and the housing step surface 137 extend in a direction intersecting the height direction Y. Each of the surfaces 135, 136, 137 extends to make a loop around the sensor SA 50. In the sensor SA 50, the center line CL1 of the heating resistor 71 extends in the height direction Y. The housing flow path surface 135, the housing container surface 136, and the housing step surface 137 extend in a circumferential direction around the center line CL1.

In the first housing part 151, the housing step surface 137 is provided between the housing distal end surface 21a and the housing basal end surface 21b. The housing step surface 137 faces in the housing basal end direction along the height direction Y. The housing step surface 137 is inclined with respect to the center line CL1. The housing step surface 137 faces inward in a radial direction, i.e. in a direction toward the center line CL1. The housing step surface 137 intersects the height direction Y and corresponds to a housing intersecting surface. On the inner surface of the first housing part 151, an external corner between the housing flow path surface 135 and the housing step surface 137 and an internal corner between the housing container surface 136 and the housing step surface 137 are chamfered. The height direction Y corresponds to an arrangement direction in which the measurement flow path and the container space are arranged.

The housing flow path surface 135 forms the measurement flow path 32. The housing flow path surface 135 extends from an inner peripheral edge of the housing step surface 137 in the housing distal end direction. The housing flow path surface 135 extends from the housing step surface 137 in a direction away from the SA container space 150. On the other hand, the housing container surface 136 forms the SA container space 150. The housing container surface 136 extends from an outer peripheral edge of the housing step surface 137 in the housing basal end direction. The housing container surface 136 extends from the housing step surface 137 in a direction away from the measurement flow path 32. The housing step surface 137 is provided between the housing flow path surface 135 and the housing container surface 136, and forms a step on the inner surface of the first housing part 151. The housing step surface 137 connects the housing flow path surface 135 and the housing container surface 136.

An outer surface of the molded portion 55 forms the outer surface of the sensor SA 50. The outer surface of the sensor SA 50 includes an SA flow path surface 145, an SA container surface 146, and an SA step surface 147. The SA flow path surface 145, the SA container surface 146, and the SA step surface 147 extend in a direction intersecting the height direction Y. Each of the surfaces 145, 146, 147 extends to make a loop on the outer surface of the sensor SA 50. The SA flow path surface 145, the SA container surface 146, and the SA step surface 147 extend in the circumferential direction around the center line CL1 of the heating resistor 71.

In the sensor SA 50, the SA step surface 147 is provided between the molded distal end surface 55a and the molded basal end surface 55b. The SA step surface 147 faces toward the molded distal end surface 55a in the height direction Y. The SA step surface 147 is inclined with respect to the center line CL1. The SA step surface 147 faces outward in a radial direction, i.e. in a direction away from the center line CL1. The SA step surface 147 intersects the height direction Y and corresponds to a unit intersecting surface. Further, the SA flow path surface 145 corresponds to a unit flow path surface, and the SA container surface 146 corresponds to a unit container surface. On the outer surface of the sensor SA 50, an internal corner between the SA flow path surface 145 and the SA step surface 147 and an external corner between the SA container surface 146 and the SA step surface 147 are chamfered.

The SA flow path surface 145 forms the measurement flow path 32. The SA flow path surface 145 extends from an inner peripheral edge of the SA step surface 147 in the molding distal end direction along the height direction Y. The SA flow path surface 145 extends from the SA step surface 147 in a direction away from the SA container space 150. On the other hand, the SA container surface 146 forms the SA container space 150. The SA container surface 146 extends from an outer peripheral edge of the SA step surface 147 in the molding basal end direction. The SA container surface 146 extends from the SA step surface 147 in a direction away from the measurement flow path 32. The SA step surface 147 is provided between the SA flow path surface 145 and the SA container surface 146, and forms a step on the outer surface of the sensor SA 50. The SA step surface 147 connects the SA flow path surface 145 and the SA container surface 146.

In the sensor SA 50, the molded upstream surface 55c, the molded downstream surface 55d, the molded front surface 55e, and the molded back surface 55f form the SA flow path surface 145, the SA container surface 146, and the SA step surface 147.

In the air flow meter 20, the housing step surface 137 facing in the housing basal end direction and the SA step surface 147 facing in the housing distal end direction face each other. Further, the housing flow path surface 135 facing radially inward and the SA flow path surface 145 facing radially outward face each other. Similarly, the housing container surface 136 facing radially inward and the SA container surface 146 facing radially outward face each other.

Figure 19:
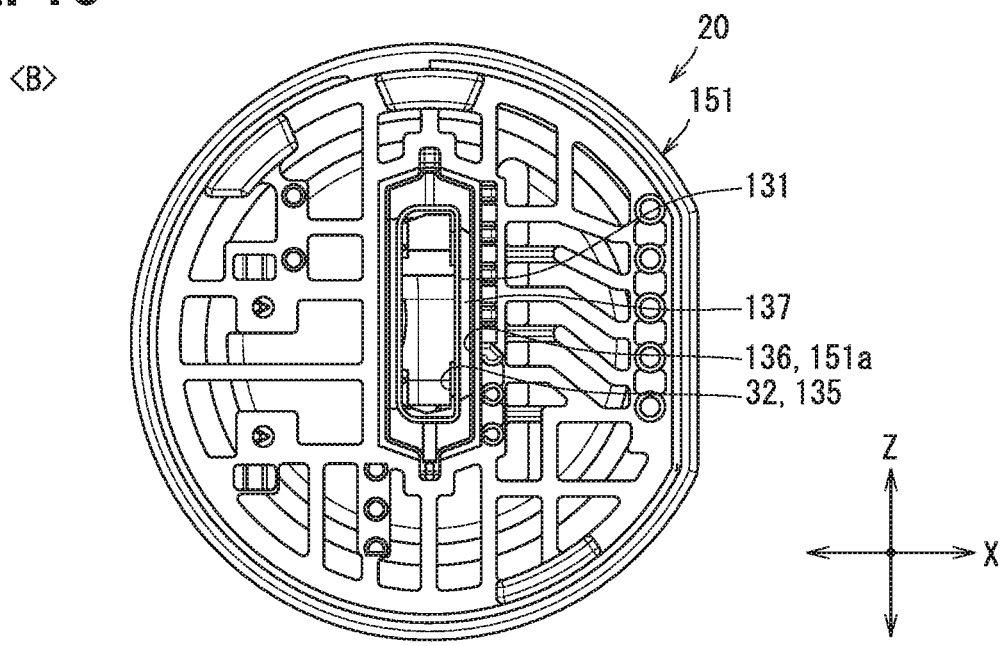
FIG. 19 is a plan view showing the housing before the sensor SA is assembled.

The housing partition 131 is provided on the housing step surface 137 and extends in the housing basal end direction along the height direction Y. A center line CL11 of the housing partition 131 extends linearly in the height direction Y. The housing partition 131, together with the housing step surface 137, extends to make a loop around the sensor SA 50. In this case, as shown in FIG. 19, the housing partition 131 has a portion extending in the width direction X and a portion extending in the depth direction Z. The housing partition 131 has a substantially rectangular frame shape as a whole.

Returning to the description of FIG. 17, the tip end of the housing partition 131 is in contact with the SA step surface 147 of the outer surface of the sensor SA 50. The housing partition 131 and the SA step surface 147 are in tight contact with each other, and enhance a sealing property of the part that separates the SA container space 150 from the measurement flow path 32. The SA step surface 147 is flat and extends straight in a direction intersecting the height direction Y. In the present embodiment, the housing step surface 137 and the SA step surface 147 do not extend parallel to each other. The SA step surface 147 is inclined with respect to the housing step surface 137. As described above, even if the SA step surface 147 and the housing step surface 137 are not parallel to each other, the sealing property is improved at the part where the outer surface of the sensor SA 50 and the inner surface of the first housing part 151 because the housing partition 131 is in contact with the SA step surface 147. The housing step surface 137 and the SA step surface 147 may extend parallel to each other.

The housing partition 131 is orthogonal to the housing step surface 137. In this case, the center line CL11 of the housing partition 131 and the housing step surface 137 are orthogonal to each other. The housing partition 131 has a tapered shape. The directions X, Z orthogonal to the height direction Y are width directions of the housing partition 131, and widths of the housing partition 131 in the width directions gradually decreases toward the tip end of the housing partition 131. Each of a pair of lateral surfaces of the housing partition 131 extends straight from the housing step surface 137. In this case, the housing partition 131 has a tapered cross section.

The housing partition 131 is arranged at a position on the housing step surface 137 closer to the housing flow path surface 135 than to the housing container surface 136. In this case, in the directions X, Z orthogonal to the height direction Y, a distance between the housing partition 131 and the housing container surface 136 is smaller than a distance between the housing partition 131 and the housing flow path surface 135.

A portion of the housing step surface 137, which is between the housing flow path surface 135 and the housing partition 131, and the housing flow path surface 135 form the measurement flow path 32. A portion of the housing step surface 137, which is between the housing container surface 136 and the housing partition 131, and the housing container surface 136 form the SA container space 150.

A portion of the SA step surface 147, which is between the SA flow path surface 145 and the housing partition 131, and the SA flow path surface 145 form the measurement flow path 32. A portion of the SA step surface 147, which is between the SA container surface 146 and the housing partition 131, and the SA container surface 146 form the SA container space 150.

Next, referring to FIGS. 18 to 21, a manufacturing method of the air flow meter 20 will be described focusing on a procedure of mounting the sensor SA 50 to the housing 21.

The manufacturing process of the air flow meter 20 includes a step of manufacturing the sensor SA 50 and a step of manufacturing the first housing part 151 by, for example, resin molding. After these steps, a step of assembling the sensor SA 50 with the first housing part 151 is performed.

At the step of manufacturing the sensor SA 50, the molded portion 55 of the sensor SA 50 is manufactured by resin molding using an injection molding machine or an injection molding device provided with a mold device. At this step, a molten resin obtained by melting a resin material is injected from an injection molding machine and press-fitted into the mold device. Further, at this step, an epoxy thermosetting resin such as an epoxy resin is used as the resin material for forming the molded portion 55.

At the step of manufacturing the first housing part 151, the first housing part 151 is manufactured by resin molding or the like using an injection molding device or the like. At this step, a thermoplastic resin such as polybutylene terephthalate (PBT) or polyphenylene sulfide (PPS) is used as the resin material forming the first housing part 151. The first housing part 151 formed of the thermoplastic resin as described above is softer than the molded portion 55 formed of the thermosetting resin. In other words, the first housing part 151 has lower hardness and higher flexibility than the molded portion 55.

Figure 20:
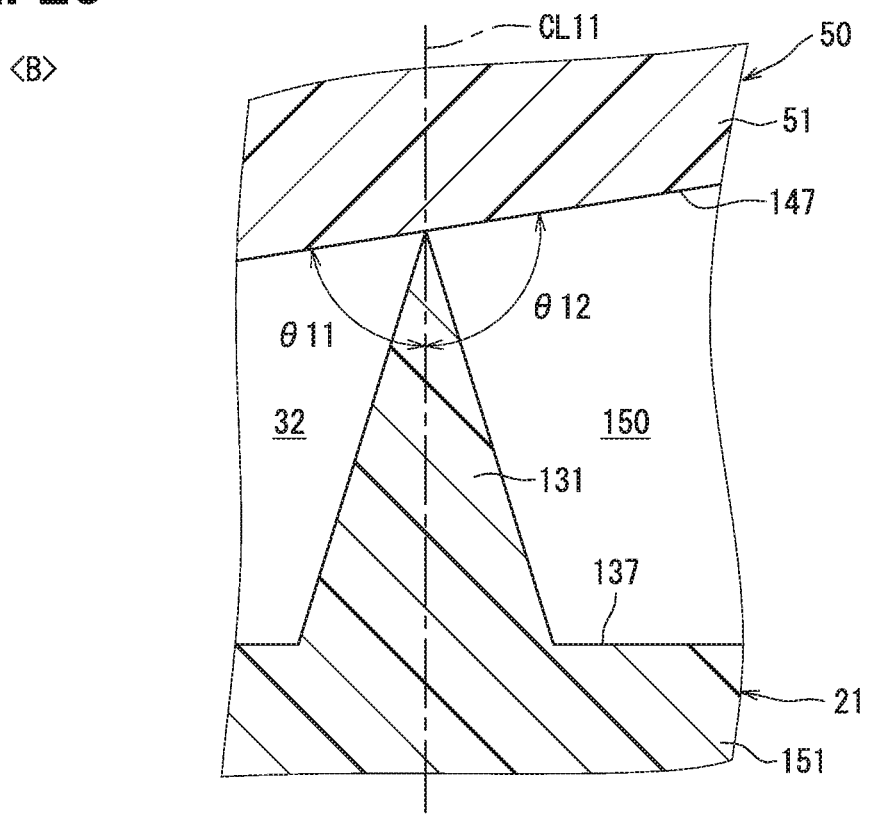
FIG. 20 is a view showing a state before the sensor SA deforms a housing partition of the housing.
Figure 21:
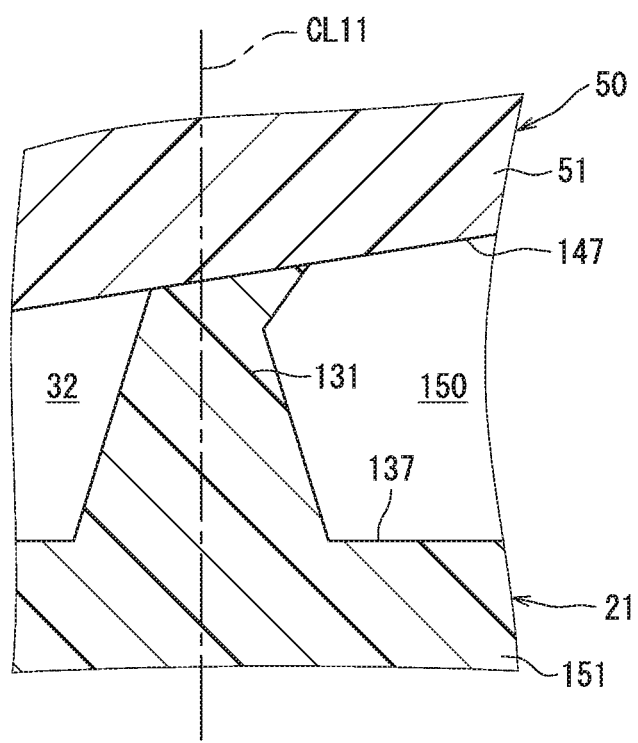
FIG. 21 is a view showing a state after the sensor SA deforms the housing partition of the housing.

At the step of assembling the sensor SA 50 to the first housing part 151, the sensor SA 50 is inserted into the first housing part 151 through the housing opening 151*a* as shown in FIG. 18. At this step, as shown in FIG. 20, the SA step surface 147 contacts the tip end of the housing partition 131, and then, the sensor SA 50 is further pushed into the first housing part 151 in the housing distal end direction. In this case, since the hardness of the first housing part 151 is lower than the hardness of the molded portion 55, the tip end of the housing partition 131 is deformed via crushing by the SA step surface 147 as shown in FIG. 21. The crushing of the tip end of the housing partition 131 newly generates a tip end surface which is easily come into tight contact with the SA step surface 147. Accordingly, the sealing performance between the housing partition 131 and the SA step surface 147 is improved. In FIG. 17, a portion of the housing partition 131 which was crushed by the sensor SA 50 is illustrated by a chain double-dashed line as an imaginary line.

At the step of assembly of the sensor SA 50, when the tip end of the housing partition 131 is crushed by the SA step surface 147, fragments of the housing partition 131 may be generated as crushed dust, and the crushed dust may enter the measurement flow path 32. If the crushed dust that has entered the measurement flow path 32 comes into contact with or adheres to the flow rate sensor 22 as foreign matter in the measurement flow path 32, the detection accuracy of the flow rate sensor 22 may be reduced.

On the other hand, in the present embodiment, the crushed dust is difficult to enter the measurement flow path 32. More specifically, as shown in FIG. 20, angles between the center line CL11 of the housing partition 131 and the SA step surface 147 include a container angle θ12 facing the SA container space 150 and a flow path angle θ11 facing the measurement flow path 32. The container angle θ12 is larger than the flow path angle θ11. That is, there is a relationship of θ12>θ11. According to this configuration, the tip end of the housing partition 131 is more likely to tilt or collapse toward the SA container space 150 than toward the measurement flow path 32. Therefore, even if the crushed dust is generated, it is difficult for the crushed dust to enter the measurement flow path 32.

The flow path angle θ11 is an angle at a portion closest to the SA step surface 147 in the outer surface of the housing partition 131. The container angle θ12 is an angle on another side of the center line CL11 opposite the flow path angle θ11.

After the sensor SA 50 is attached to the first housing part 151, a step of manufacturing the second housing part 152 by resin molding or the like using an injection molding device or the like is performed. At this step, the mold device is mounted on the first housing part 151 together with the sensor SA 50, and a molten resin obtained by melting a resin material is injected from an injection molding machine and press-fitted into the mold device. According to the injection of the molten resin into the mold device, the molten resin is filled in a gap between the first housing part 151 and the sensor SA 50. In this case, since the housing partition 131 is in contact with the outer surface of the sensor SA 50 as described above, the molten resin is prevented from entering the measurement flow path 32 through the gap between the first housing part 151 and the sensor SA 50. Then, the second housing part 152 is formed by solidifying the molten resin inside the mold device.

Similar to the first housing part 151, a thermoplastic resin such as polybutylene terephthalate (PBT) or polyphenylene sulfide (PPS) is used as the resin material forming the second housing part 152. Both of the first housing part 151 and the second housing part 152 contain a carbon material having conductivity. Examples of the carbon material include carbon powder, carbon fiber, nanocarbon, graphene, and carbon microparticles.

The first housing part 151 is easier to discharge when charged than the second housing part 152. For example, the first housing part 151 is larger in content rate and content of the carbon material than the second housing part 152. A portion of the housing 21 that easily becomes a path for electric charges during discharging is referred to as a conductive portion. The conductive portion is larger in the first housing part 151 than in the second housing part 152. The conductive portion includes multiple ones of carbon powder, carbon fiber, nanocarbon, graphene and carbon microparticles. Examples of the nanocarbon include carbon nanotube, carbon nanofiber, and fullerene.

According to the present embodiment described above, the housing partition 131 protruding from the inner surface of the housing 21 is between the sensor SA 50 and the housing 21 and separates the measurement flow path 32 from the SA container space 150. In this configuration, since the tip end of the housing partition 131 and the sensor SA 50 easily come into contact with each other, a gap is unlikely to be formed between the inner surface of the housing 21 and the outer surface of the sensor SA 50. When the molten resin is injected into the SA container space 150 of the first housing part 151 for forming the second housing part 152, the molten resin is prevented from entering the measurement flow path 32 through the gap between the first housing part 151 and the sensor SA 50.

In this case, unintentional change of the shape of the measurement flow path 32, which is caused by a solidified portion of the molten resin which has entered the measurement flow path 32 through the gap between the first housing part 151 and the sensor SA 50, is unlikely to occur. In addition, contact or adhesion of the solidified portion with or to the flow rate sensor 22 as a foreign matter, which is caused by peeling off of the solidified portion from the first housing part 151 and the sensor SA 50 in the measurement flow path 32, is also unlikely to occur. Therefore, deterioration in detection accuracy of the flow rate sensor 22 due to the molten resin which has entered the measurement flow path 32 from the SA container space 150 can be reduced. Therefore, the air flow rate detection accuracy of the flow rate sensor 22 can be increased, and as a result, the air flow rate measurement accuracy of the air flow meter 20 can be increased.

According to the present embodiment, the housing partition 131 makes a loop around the sensor SA 50. In this configuration, the housing partition 131 can create a state where the outer surface of the sensor SA 50 and the inner surface of the first housing part 151 are in contact with each other on an entire outer circumference of the sensor SA 50. Therefore, the housing partition 131 can enhance the sealing property in the entire boundary between the measurement flow path 32 and the SA container space 150.

According to the present embodiment, the housing partition 131 is arranged at a position on the housing step surface 137 closer to the housing flow path surface 135 than to the housing container surface 136. In this structure, the measurement flow path 32 and the SA container space 150 are partitioned by the housing partition 131 at a position as close as possible to the measurement flow path 32. Thus, a part of the gap between the first housing part 151 and the sensor SA 50 included in the measurement flow path 32 can be made as small as possible. Here, in the measurement flow path 32, the gap between the first housing part 151 and the sensor SA 50 is a region in which turbulence of airflow is likely to occur due to inflow of air flowing from the measurement inlet 35 toward the measurement outlet 36. Therefore, as the gap between the first housing part 151 and the sensor SA 50 is smaller, turbulence is less likely to occur in the air flow in the measurement flow path 32, and the detection accuracy of the flow rate sensor 22 is likely to be improved. Therefore, since the housing partition 131 is provided at a position as close as possible to the housing flow path surface 135, the detection accuracy of the flow rate sensor 22 can be improved.

According to the present embodiment, the container angle θ12 is larger than the flow path angle θ11. In this configuration, when the sensor SA 50 is inserted into the SA container space 150 of the first housing part 151, the housing partition 131 is likely to be crushed and deformed so as to be folded or collapsed toward the SA container space 150. Therefore, when the housing partition 131 is deformed and brought into contact with the outer surface of the sensor SA 50, unintentional entry of the crushed dust of the housing partition 131 into the measurement flow path 32 is difficult to occur. As a result, deterioration in detection accuracy of the flow rate sensor 22 due to contact or adhesion of the crushed dust with or to the flow rate sensor 22 in the measurement flow path 32 can be reduced.

According to the present embodiment, the housing partition 131 provided on the housing step surface 137 is in contact with the SA step surface 147. In this configuration, both the housing step surface 137 and the SA step surface 147 intersect the height direction Y and face each other. Thus, when the sensor SA 50 is inserted into the first housing part 151, the SA step surface 147 is engaged with the housing partition 131. Therefore, the housing partition 131 can be brought into tight contact with the SA step surface 147 by simply pushing the sensor SA 50 into the first housing part 151 toward the measurement flow path 32. As a result, the measurement flow path 32 and the SA container space 150 can be certainly partitioned by the housing partition 131, and an increase in work load at the time of assembling the sensor SA 50 to the first housing part 151 can be suppressed.

In the present embodiment, the housing step surface 137 of the first housing part 151 faces to the housing opening 151a. In this configuration, the SA step surface 147 of the sensor SA 50 can be pressed against the housing step surface 137 by simply pushing the sensor SA 50 inserted into the SA container space 150 through the housing opening 151a toward the measurement flow path 32. Therefore, the housing partition 131 of the SA step surface 147 can be easily brought into tight contact with the housing step surface 137.

<Description of Configuration Group D>

Figure 22:
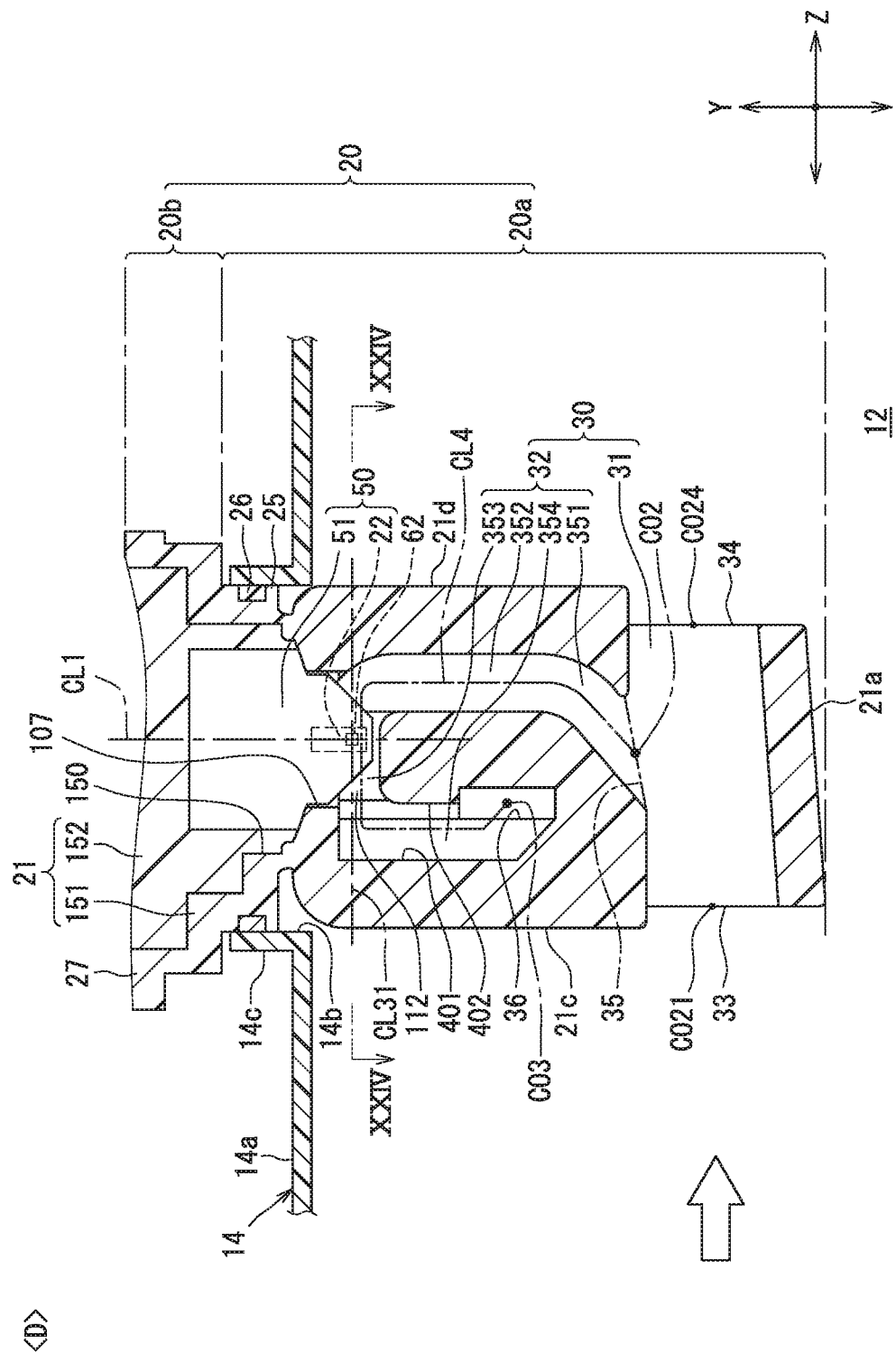
FIG. 22 is a vertical cross-sectional view of an air flow meter according to a configuration group D.
Figure 23:
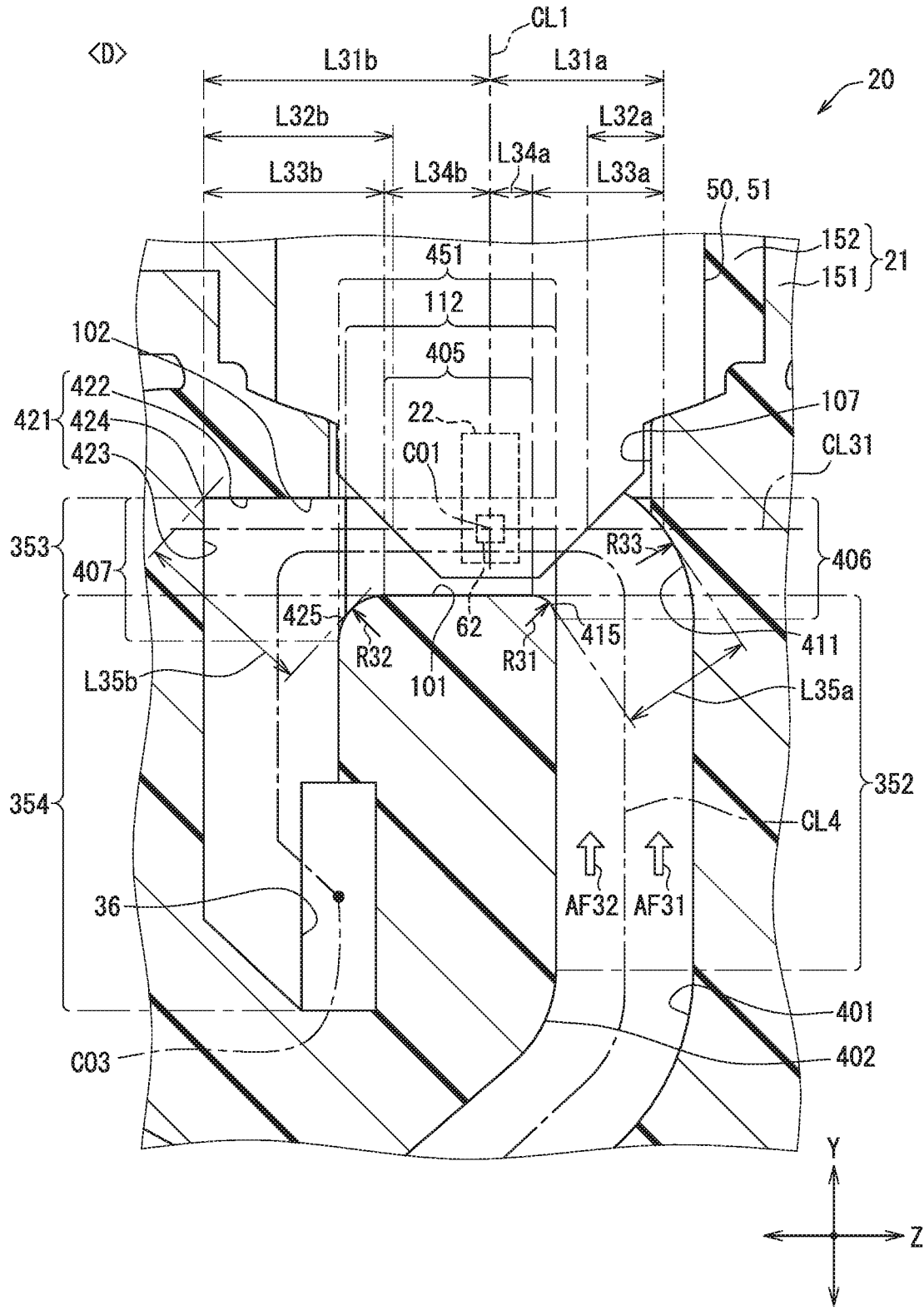
FIG. 23 is an enlarged view around a sensor path of FIG. 22.

As shown in FIGS. 22 and 23, the measurement flow path 32 is curved so that the portion between the measurement inlet 35 and the measurement outlet 36 bulges toward the flow rate sensor 22. The measurement flow path 32 has a U shape as a whole. In the measurement flow path 32, the measurement inlet 35 and the measurement outlet 36 are arranged in the depth direction Z. In this case, the depth direction Z corresponds to an arrangement direction, and the height direction Y is orthogonal to the depth direction Z. In the measurement flow path 32, the portion between the measurement inlet 35 and the measurement outlet 36 is curved to bulge in the housing basal end direction along the height direction Y.

The inner surface of the housing 21 includes an outer measurement curved surface 401 and an inner measurement curved surface 402. The outer measurement curved surface 401 and the inner measurement curved surface 402 extend along the center line CL4 of the measurement flow path 32. The inner surface of the housing 21 includes the front measurement wall surface 103 and the back measurement wall surface 104 as described above, in addition to the outer measurement curved surface 401 and the inner measurement curved surface 402. The outer measurement curved surface 401 and the inner measurement curved surface 402 face each other in the directions Y and Z orthogonal to the width direction X. The outer measurement curved surface 401 and the inner measurement curved surface 402 face each other across the front measurement wall surface 103 and the back measurement wall surface 104.

The outer measurement curved surface 401 defines an outer outline of a curved part of the measurement flow path 32. The outer measurement curved surface 401 is provided circumferentially outward of the measurement flow path 32 and the flow rate sensor 22. The outer measurement curved surface 401 connects the measurement inlet 35 and the measurement outlet 36. The outer measurement curved surface 401 is concavely curved such that the portion between the measurement inlet 35 and the measurement outlet 36 is concaved toward the flow rate sensor 22 as a whole. The outer measurement curved surface 401 includes the measurement ceiling surface 102. The SA insertion hole 107 is provided on the outer measurement curved surface 401.

The inner measurement curved surface 402 defines an inner outline of the curved part of the measurement flow path 32. The inner measurement curved surface 402 is provided circumferentially inward of the measurement flow path 32. The inner measurement curved surface 402 connects the measurement inlet 35 and the measurement outlet 36. The inner measurement curved surface 402 is curved such that the portion between the measurement inlet 35 and the measurement outlet 36 bulges toward the flow rate sensor 22 as a whole. The inner measurement curved surface 402 does not have a portion concaved in a direction away from the outer measurement curved surface 401. The whole of the inner measurement curved surface 402 is curved in a convex shape so as to bulge toward the outer measurement curved surface 401. The inner measurement curved surface 402 includes the measurement floor surface 101.

As shown in FIG. 23, the measurement flow path 32 includes a sensor path 405, an upstream curved path 406, and a downstream curved path 407. The sensor path 405 is a portion of the measurement flow path 32 where the flow rate sensor 22 is provided. The sensor path 405 extends straight in the depth direction Z. The sensor path 405 extends in the main flow direction parallel to the angle setting surface 27a of the flange 27. The upstream curved path 406 and the downstream curved path 407 are arranged in the depth direction Z. The sensor path 405 is provided between the upstream curved path 406 and the downstream curved path 407. The sensor path 405 connects these curved paths 406 and 407.

A surface of the housing 21 defining the sensor path 405 includes at least a part of the measurement floor surface 101. In this embodiment, a length of the sensor path 405 in the depth direction Z is defined by the measurement floor surface 101. Specifically, an upstream end part of the measurement floor surface 101 is included in an upstream end part of the sensor path 405. A downstream end part of the measurement floor surface 101 is included in a downstream end part of the sensor path 405. In this case, the length of the sensor path 405 in the depth direction Z is the same as the length of the measurement floor surface 101. The surface of the housing 21 defining the sensor path 405 includes not only the part of the measurement floor surface 101 but also a part of the measurement ceiling surface 102, a part of the front measurement wall surface 103, and a part of the back measurement wall surface 104. In the present embodiment, the measurement floor surface 101 extends straight in the depth direction Z. Since the measurement floor surface 101 extends straight in this way, it can be said that the sensor path 405 extends straight.

The upstream curved path 406 extends from the sensor path 405 toward the measurement inlet 35 in the measurement flow path 32. The upstream curved path 406 is provided between the sensor path 405 and the measurement inlet 35. The upstream curved path 406 is curved in the housing 21 such that the upstream curved path 406 extends from the sensor path 405 toward the measurement inlet 35. A downstream end part of the upstream curved path 406 faces and is open in the depth direction Z to the sensor path 405. An upstream end part of the upstream curved path 406 faces and is open in the height direction Y to the measurement inlet 35. In the upstream curved path 406, the open direction of the upstream end part intersects with the open direction of the downstream end part, and the intersection angle is 90 degrees, for example. An inner surface of the upstream curved path 406 includes a part of the front measurement wall surface 103 and a part of the back measurement wall surface 104.

The downstream curved path 407 extends from the sensor path 405 toward the measurement outlet 36 in the measurement flow path 32. The downstream curved path 407 is provided between the sensor path 405 and the measurement outlet 36. The downstream curved path 407 is curved in the housing 21 such that the downstream curved path 407 extends from the sensor path 405 toward the measurement outlet 36. An upstream end part of the downstream curved path 407 faces and is open in the depth direction Z to the sensor path 405. A downstream end part of the downstream curved path 407 faces and is open in the height direction Y to the measurement outlet 36. In the downstream curved path 407, similar to the upstream curved path 406, the open direction of the upstream end part intersects with the open direction of the downstream end part, and the intersection angle is 90 degrees, for example. An inner surface of the downstream curved path 407 includes a part of the front measurement wall surface 103 and a part of the back measurement wall surface 104.

In the measurement flow path 32, the sensor path 405 is included in a detection measurement path 353. The upstream curved path 406 is positioned to extend in the height direction Y across a boundary between an introduction measurement path 352 and the detection measurement path 353. In this case, the upstream curved path 406 includes a part of the introduction measurement path 352 and a part of the detection measurement path 353. The downstream curved path 407 is positioned to extend in the height direction Y across a boundary between the detection measurement path 353 and a discharge measurement path 354. In this case, the downstream curved path 407 includes a part of the detection measurement path 353 and a part of the discharge measurement path 354.

The inner surface of the housing 21 includes an upstream outer curved surface 411 and an upstream inner curved surface 415 which are surfaces defining the upstream curved path 406. The upstream outer curved surface 411 defines an outer outline of a curved part of the upstream curved path 406. The upstream outer curved surface 411 is provided circumferentially outward of the upstream curved path 406. The upstream outer curved surface 411 concavely extends along the center line CL4 of the measurement flow path 32. The upstream outer curved surface 411 is arched so as to be continuously curved along the center line CL4. The upstream outer curved surface 411 connects the upstream end part and the downstream end part of the upstream curved path 406. The upstream outer curved surface 411 corresponds to an upstream outer arched surface.

The upstream inner curved surface 415 defines an inner outline of the curved part of the upstream curved path 406. The upstream inner curved surface 415 is provided circumferentially inward of the upstream curved path 406. The upstream inner curved surface 415 convexly extends along the center line CL4 of the measurement flow path 32. The downstream inner curved surface 425 is arched so as to be continuously curved along the center line CL4. The upstream inner curved surface 415 connects the upstream end part and the downstream end part of the upstream curved path 406. The upstream inner curved surface 415 corresponds to an upstream inner arched surface. The inner surface of the housing 21 includes not only the upstream outer curved surface 411 and the upstream inner curved surface 415 but also a part of the front measurement wall surface 103 and a part of the back measurement wall surface 104 which are surfaces defining the upstream curved path 406.

The inner surface of the housing 21 includes a downstream outer curved surface 421 and an downstream inner curved surface 425 which are surfaces defining the downstream curved path 407. The downstream outer curved surface 421 defines an outer outline of a curved part of the downstream curved path 407. The downstream outer curved surface 421 is provided circumferentially outward of the downstream curved path 407. The downstream outer curved surface 421 extends along the center line CL4 of the measurement flow path 32. The downstream outer curved surface 421 is bent at a predetermined angle along the center line CL4. The bending angle of the downstream outer curved surface 421 is, for example, 90 degrees.

The downstream outer curved surface 421 includes a downstream outer horizontal surface 422, a downstream outer vertical surface 423, and a downstream outer internal corner 424. The downstream outer horizontal surface 422 extends straight downstream from the upstream end part of the downstream curved path 407 in the depth direction Z. The downstream outer vertical surface 423 extends straight upstream from the downstream end part of the downstream curved path 407 in the height direction Y. The downstream outer horizontal surface 422 and the downstream outer vertical surface 423 are connected to each other. The downstream outer horizontal surface 422 and the downstream outer vertical surface 423 join inwardly each other to form the downstream outer internal corner 424. The downstream outer internal corner 424 has a shape in which the downstream outer curved surface 421 is bent at a substantially right angle.

The downstream inner curved surface 425 defines an inner outline of the curved part of the downstream curved path 407. The downstream inner curved surface 425 is provided circumferentially inward of the downstream curved path 407. The downstream inner curved surface 425 convexly extends along the center line CL4 of the measurement flow path 32. The downstream inner curved surface 425 is arched so as to be continuously curved along the center line CL4. The downstream inner curved surface 425 connects the upstream end part and the downstream end part of the downstream curved path 407. The downstream inner curved surface 425 corresponds to a downstream inner arched surface. The inner surface of the housing 21 includes not only the downstream outer curved surface 421 and the downstream inner curved surface 425 but also a part of the front measurement wall surface 103 and a part of the back measurement wall surface 104 which are surfaces defining the downstream curved path 407.

In the measurement flow path 32, the outer measurement curved surface 401 includes the upstream outer curved surface 411 and the downstream outer curved surface 421. Each of the upstream outer curved surface 411 and the downstream outer curved surface 421 includes a part of the measurement ceiling surface 102. The inner measurement curved surface 402 includes not only the above-described measurement floor surface 101 but also the upstream inner curved surface 415 and the downstream inner curved surface 425.

In the measurement flow path 32, a degree of bulge of the downstream inner curved surface 425 in a direction expanding the measurement flow path 32 is smaller than a degree of bulge of the upstream inner curved surface 415 in the direction expanding the measurement flow path 32. Specifically, a length of the downstream inner curved surface 425 is larger than a length of the upstream inner curved surface 415 in a direction in which the center line CL4 of the measurement flow path 32 extends. In this case, a radius of curvature R32 of the downstream inner curved surface 425 is larger than a radius of curvature R31 of the upstream inner curved surface 415. That is, there is a relationship of R32>R31. In other words, the curve of the downstream inner curved surface 425 is gentler than the curve of the upstream inner curved surface 415.

In the measurement flow path 32, a degree of recess of the downstream outer curved surface 421 in the direction expanding the measurement flow path 32 is larger than a degree of recess of the upstream outer curved surface 411 in the direction expanding the measurement flow path 32. Specifically, the downstream outer curved surface 421 is bent at a right angle while the upstream outer curved surface 411 is arched. In this case, in the direction in which the center line CL4 of the measurement flow path 32 extends, a length of the bent portion of the downstream outer curved surface 421 is quite small and is smaller than a length of the upstream outer curved surface 411. If a radius of curvature can be calculated for the bent portion of the downstream outer curved surface 421, this radius of curvature is substantially zero and is smaller than the radius of curvature R33 of the upstream outer curved surface 411. In this case, the curve of the downstream outer curved surface 421 is sharper than the curve of the upstream outer curved surface 411.

In the upstream curved path 406, the degree of recess of the upstream outer curved surface 411 in the direction expanding the measurement flow path 32 is smaller than the degree of bulge of the upstream inner curved surface 415 in the direction expanding the measurement flow path 32. Specifically, the length of the upstream outer curved surface 411 is larger than the length of the upstream inner curved surface 415 in the direction in which the center line CL4 of the measurement flow path 32 extends. In this case, the radius of curvature R33 of the upstream outer curved surface 411 is larger than the radius of curvature R31 of the upstream inner curved surface 415. That is, there is a relationship of R33>R31.

In the downstream curved path 407, the degree of recess of the downstream outer curved surface 421 in the direction expanding the measurement flow path 32 is larger than the degree of bulge of the downstream inner curved surface 425 in the direction expanding the measurement flow path 32. Specifically, the length of the downstream outer curved surface 421 is smaller than the length of the downstream inner curved surface 425 in the direction in which the center line CL4 of the measurement flow path 32 extends.

In the downstream curved path 407, the degree of recess of the downstream outer curved surface 421 is larger than the degree of bulge of the downstream inner curved surface 425. Thus, a cross sectional area of the downstream curved path 407 becomes as large as possible in cross sectional area S4 of the measurement flow path 32. Specifically, in a direction orthogonal to both the center line CL4 of the measurement flow path 32 and the width direction X, a distance L35b between the downstream outer curved surface 421 and the downstream inner curved surface 425 is larger than a distance L35a between the upstream outer curved surface 411 and the upstream inner curved surface 415. That is, there is a relationship of L35b>L35a.

The distance L35b between the downstream outer curved surface 421 and the downstream inner curved surface 425 is a distance at a portion of the downstream curved path 407 in which the downstream outer curved surface 421 and the downstream inner curved surface 425 are most distant from each other. The portion in which the downstream outer curved surface 421 and the downstream inner curved surface 425 are most distant from each other is, for example, a portion in which the downstream outer internal corner 424 of the downstream outer curved surface 421 and a center part of the downstream inner curved surface 425 face each other. The distance L35a between the upstream outer curved surface 411 and the upstream inner curved surface 415 is a distance at a portion of the upstream curved path 406 in which the upstream outer curved surface 411 and the upstream inner curved surface 415 are most distant from each other. The portion in which the upstream outer curved surface 411 and the upstream inner curved surface 415 are most distant from each other is, for example, a portion in which a center part of the upstream outer curved surface 411 and a center part of the upstream inner curved surface 415 face each other.

Regarding the measurement flow path 32, an arrangement line CL31 is defined as an imaginary straight line that passes through the flow rate sensor 22 and extends in the depth direction Z. The arrangement line CL31 passes through the center CO1 of the heating resistor 71 of the flow rate sensor 22 and is orthogonal to both the center lines CL1 and CL5 of the heating resistor 71. Regarding the arrangement line CL31, the depth direction Z corresponds to an arrangement direction in which the upstream curved path 406 and the downstream curved path 407 are arranged. In the sensor path 405, the arrangement line CL31 and the center line CL4 of the measurement flow path 32 are parallel to each other. The arrangement line CL31 extends parallel to the angle setting surface 27a of the housing 21.

The arrangement line CL31 passes through the sensor path 405, the upstream curved path 406 and the downstream curved path 407 and intersects with the upstream outer curved surface 411 and the downstream outer curved surface 421. In the downstream outer curved surface 421, the arrangement line CL31 intersects with the downstream outer vertical surface 423. The sensor path 405 extends straight along the arrangement line CL31. On the arrangement line CL31, a distance L31$b$ between the flow rate sensor 22 and the downstream outer curved surface 421 is larger than a distance L31$a$ between the flow rate sensor 22 and the upstream outer curved surface 411. That is, there is a relationship of L31$b$>L31$a$. Thus, the flow rate sensor 22 is provided at a position relatively near the upstream outer curved surface 411. The distances L31$a$, L31$b$ are from the center line CL5 of the heating resistor 71.

In the sensor SA 50, the sensor support 51 is provided at the position relatively near to the upstream outer curved surface 411, so that the flow rate sensor 22 is provided at the position relatively near to the upstream outer curved surface 411. On the arrangement line CL31, a distance L32$b$ between the sensor support 51 and the downstream outer curved surface 421 is larger than a distance L32$a$ between the sensor support 51 and the upstream outer curved surface 411. That is, there is a relationship of L32$b$>L32$a$. In the measurement flow path 32, also out of the arrangement line CL31, a distance between the sensor support 51 and the downstream outer curved surface 421 is larger in the depth direction Z than a distance between the sensor support 51 and the upstream outer curved surface 411.

In FIG. 23, the distance L32$a$ is defined as a distance between the upstream outer curved surface 411 and a portion of the molded upstream surface 55$c$ of the sensor support 51 through which the arrangement line CL31 passes. Further, the distance L32$b$ is defined as a distance between the downstream outer curved surface 421 and a portion of the molded downstream surface 55$d$ of the sensor support 51 through which the arrangement line CL31 passes.

The sensor path 405 is provided between the upstream outer curved surface 411 and the downstream outer curved surface 421 at a position relatively near to the upstream outer curved surface 411. In this case, on the arrangement line CL31, a distance L33$b$ between the sensor path 405 and the downstream outer curved surface 421 is larger than a distance L33$a$ between the sensor path 405 and the upstream outer curved surface 411. That is, there is a relationship of L33$b$>L33$a$.

The flow rate sensor 22 is provided at a position relatively near the upstream curved path 406 in the sensor path 405. In this case, on the arrangement line CL31, a distance L34$b$ between the flow rate sensor 22 and the downstream curved path 407 is larger than a distance L34$a$ between the flow rate sensor 22 and the upstream curved path 406. That is, there is a relationship of L34$b$>L34$a$. The sum of the distance L34$a$ and the distance L34$b$ is the length of the sensor path 405 in the depth direction Z.

Figure 24:
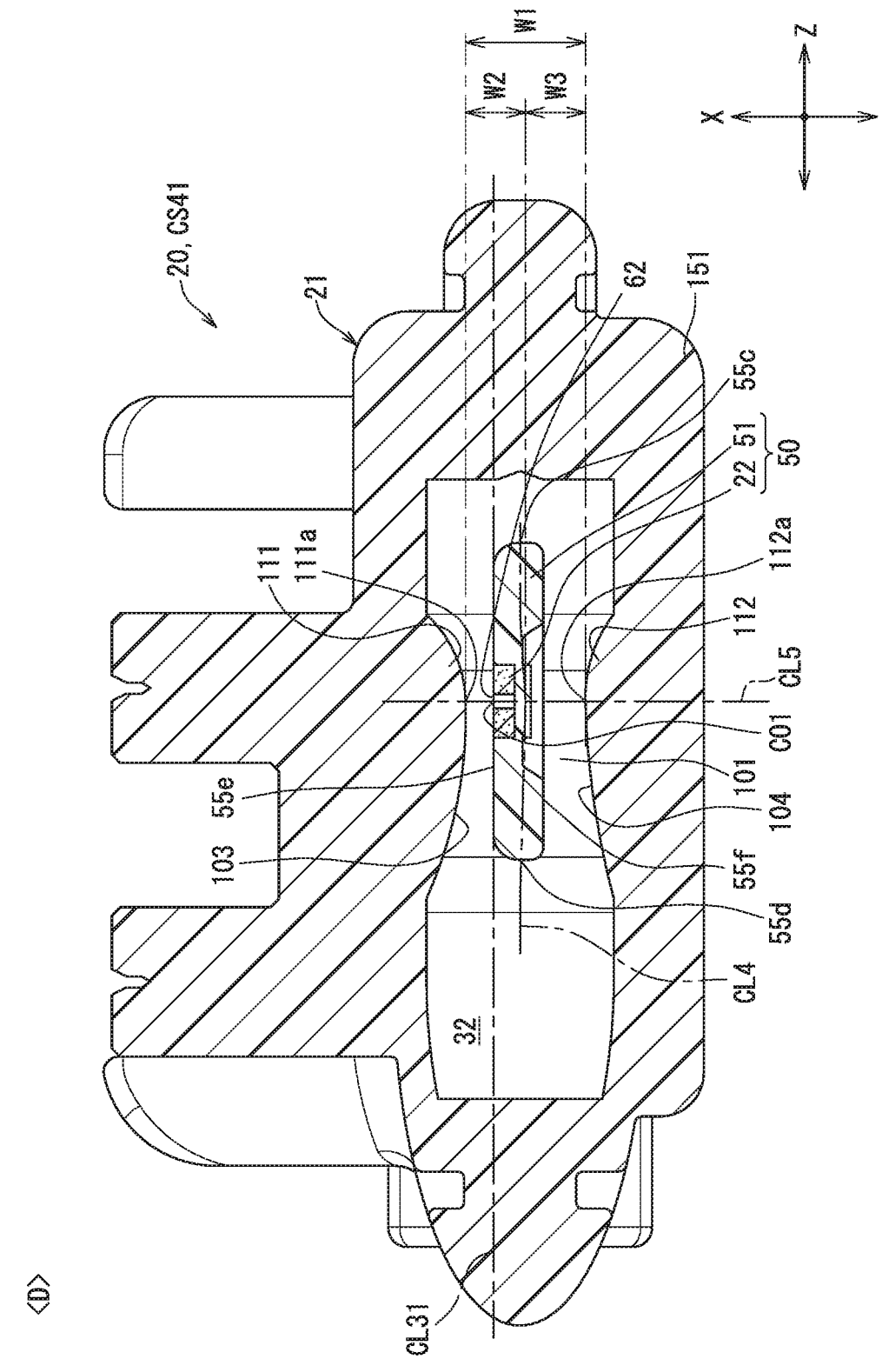
FIG. 24 is a cross-sectional view taken along a line XXIV-XXIV of FIG. 22.
Figure 25:
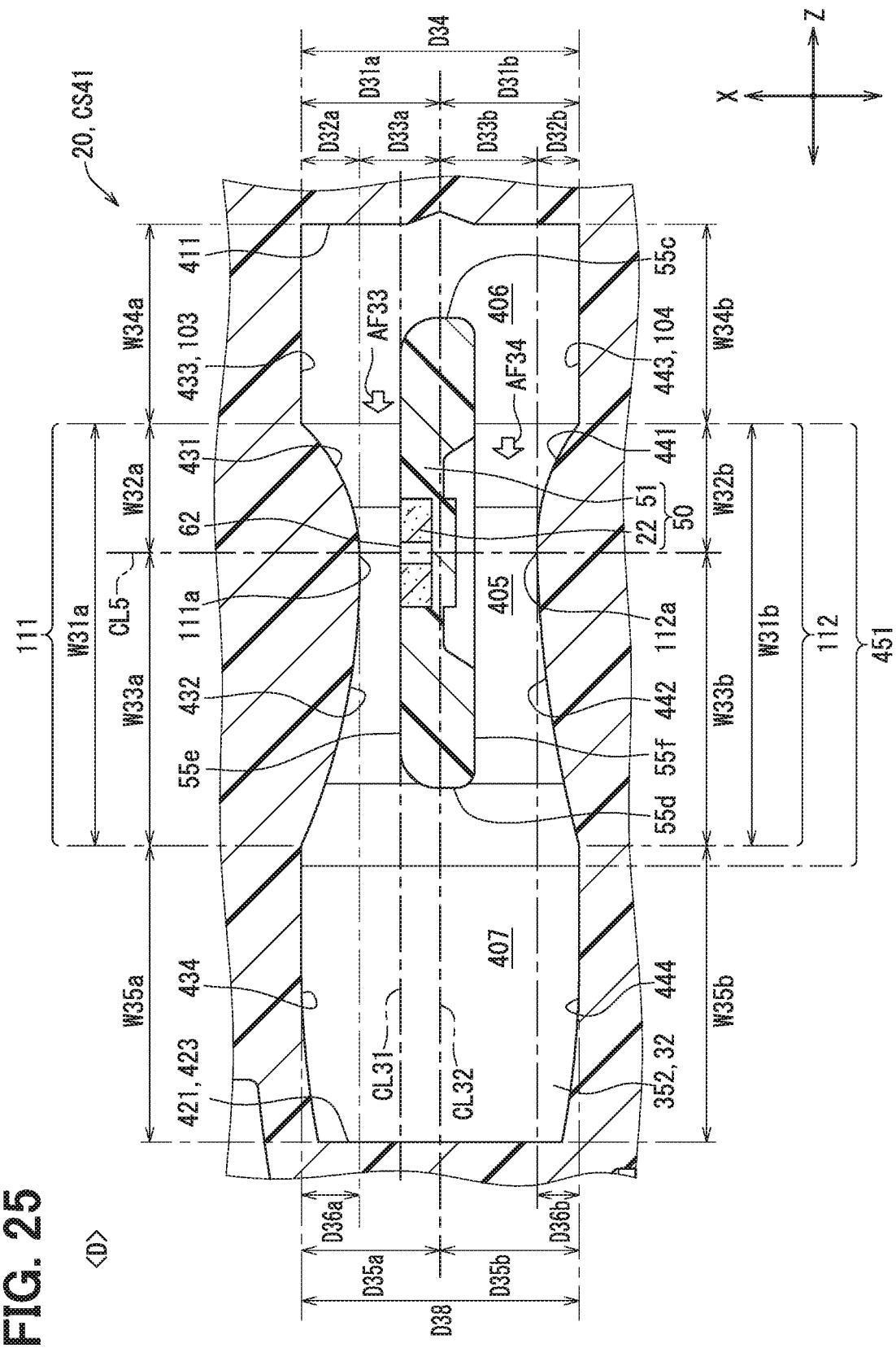
FIG. 25 is an enlarged view around the sensor path of FIG. 24.

As described above, the housing 21 includes the narrowed portions 111, 112 shown in FIGS. 24 and 25. These narrowed portions 111, 112 are provided on the measurement wall surfaces 103, 104, and form a part of the measurement wall surfaces 103, 104. FIGS. 24, 25 show an arrangement cross section CS41. The arrangement cross section CS41 is a cross section that extends along the arrangement line CL41 and extends in a direction in which the measurement wall surfaces 103, 104 face each other. Further, the arrangement cross section CS41 is orthogonal to the height direction Y.

The front measurement wall surface 103 includes a front narrowing surface 431, a front expanding surface 432, a front narrowing upstream surface 433, and a front expanding downstream surface 434. The front narrowing surface 431 and the front expanding surface 432 are formed by the front narrowed portion 111 and are included in an outer surface of the front narrowed portion 111. That is, the front narrowed portion 111 includes the front narrowing surface 431 and the front expanding surface 432. In the front narrowed portion 111, the front narrowing surface 431 extends in the depth direction Z from the front peak 111$a$ toward the upstream curved path 406 while the front expanding surface 432 extends in the depth direction Z from the front peak 111$a$ toward the downstream curved path 407. The front peak 111$a$ is a boundary between the front narrowing surface 431 and the front expanding surface 432.

The front narrowing surface 431 is inclined with respect to the center line CL4 of the measurement flow path 32 in the detection measurement path 353. The front narrowing surface 431 faces toward the upstream outer curved surface 411. The front narrowing surface 431 gradually reduces and narrows the measurement flow path 32 in a direction from the measurement inlet 35 toward the flow rate sensor 22. The cross-sectional area S4 of the measurement flow path 32 gradually decreases in a direction from an upstream end part of the front narrowing surface 431 toward the front peak 111$a$. The front narrowing surface 431 is arched such that a portion of the front narrowing surface 431 between the upstream end part and a downstream end part of the front narrowing surface 431 bulges toward the center line CL4 of the measurement flow path 32.

The front expanding surface 432 is inclined with respect to the center line CL4 of the measurement flow path 32 in the detection measurement path 353. The front expanding surface 432 faces toward the downstream outer curved surface 421. The front expanding surface 432 gradually expands the measurement flow path 32 in a direction from the flow rate sensor 22 toward the measurement outlet 36. The cross-sectional area S4 of the measurement flow path 32 gradually increases in a direction from the front peak 111$a$ toward a downstream end part of the front expanding surface 432. The front expanding surface 432 is arched such that a portion of the front expanding surface 432 between an upstream end part and the downstream end part of the front expanding surface 432 bulges toward the center line CL4 of the measurement flow path 32.

The front narrowing upstream surface 433 extends straight from the upstream end part of the front narrowing surface 431 toward the measurement inlet 35 parallel to the arrangement line CL31. The front narrowing upstream surface 433 is provided between the upstream outer curved surface 411 and the front narrowing surface 431 in the upstream curved path 406. The front narrowing upstream surface 433 connects the upstream outer curved surface 411 and the front narrowing surface 431. The front expanding downstream surface 434 extends straight from the downstream end part of the front expanding surface 432 toward the measurement outlet 36 parallel to the arrangement line CL31. The front expanding downstream surface 434 is provided between the downstream outer curved surface 421 and the front expanding surface 432 in the downstream curved path 407. The front expanding downstream surface 434 connects the downstream outer curved surface 421 and the front expanding surface 432. The front narrowing upstream surface 433 and the front expanding downstream surface 434 are arranged in the depth direction Z and are coplanar with each other because the positions in the width direction X are overlapped.

The back measurement wall surface 104 includes a back narrowing surface 441, a back expanding surface 442, a back narrowing upstream surface 443, and a back expanding downstream surface 444. The back narrowing surface 441 and the back expanding surface 442 are formed by the back narrowed portion 112 and are included in an outer surface of the back narrowed portion 112. That is, the back narrowed portion 112 includes the back narrowing surface 441 and the back expanding surface 442. In the back narrowed portion 112, the back narrowing surface 441 extends in the depth direction Z from the back peak 112a toward the upstream curved path 406 while the back expanding surface 442 extends in the depth direction Z from the back peak 112a toward the downstream curved path 407. The back peak 112a is a boundary between the back narrowing surface 441 and the back expanding surface 442.

The back narrowing surface 441 is inclined with respect to the center line CL4 of the measurement flow path 32 in the detection measurement path 353. The back narrowing surface 441 faces toward the upstream outer curved surface 411. The back narrowing surface 441 gradually reduces and narrows the measurement flow path 32 in a direction from the measurement inlet 35 toward the flow rate sensor 22. The cross-sectional area S4 of the measurement flow path 32 gradually decreases in a direction from an upstream end part of the back narrowing surface 441 toward the back peak 112a. The back narrowing surface 441 is arched such that a portion of the back narrowing surface 441 between the upstream end part and a downstream end part of the front narrowing surface 431 bulges toward the center line CL4 of the measurement flow path 32.

The back expanding surface 442 is inclined with respect to the center line CL4 of the measurement flow path 32 in the detection measurement path 353. The back expanding surface 442 faces toward the downstream outer curved surface 421. The back expanding surface 442 gradually expands the measurement flow path 32 in a direction from the flow rate sensor 22 toward the measurement outlet 36. The cross-sectional area S4 of the measurement flow path 32 gradually increases in a direction from the back peak 112a toward a downstream end part of the back expanding surface 442. The back expanding surface 442 is arched such that a portion of the back expanding surface 442 between an upstream end part and the downstream end part of the back expanding surface 442 bulges toward the center line CL4 of the measurement flow path 32.

The back narrowing upstream surface 443 extends straight from the upstream end part of the back narrowing surface 441 toward the measurement inlet 35 parallel to the arrangement line CL31. The back narrowing upstream surface 443 is provided between the upstream outer curved surface 411 and the back narrowing surface 441 in the upstream curved path 406. The back narrowing upstream surface 443 connects the upstream outer curved surface 411 and the back narrowing surface 441. The back expanding downstream surface 444 extends straight from the downstream end part of the back expanding surface 442 toward the measurement outlet 36 parallel to the arrangement line CL31. The back expanding downstream surface 444 is provided between the downstream outer curved surface 421 and the back expanding surface 442 in the downstream curved path 407. The back expanding downstream surface 444 connects the downstream outer curved surface 421 and the back expanding surface 442. The back narrowing upstream surface 443 and the back expanding downstream surface 444 are arranged in the depth direction Z and are coplanar with each other because the positions in the width direction X are overlapped.

The narrowed portions 111, 112 correspond to a measurement narrowed portion. The front narrowing surface 431 and the back narrowing surface 441 correspond to a measurement narrowing surface. The front expanding surface 432 and the back expanding surface 442 correspond to a measurement expanding surface. As described above, the center CO1 of the heating resistor 71, the front peak 111a, and the back peak 112a are aligned in the width direction X. The front peak 111a and the back peak 112a are located on the center line CL5 of the heating resistor 71.

In the depth direction Z in which the arrangement line CL31 extends, a length W31a of the front narrowed portion 111 and a length W31b of the back narrowed portion 112 are the same. In the front narrowed portion 111, a length W32a of the front narrowing surface 431 in the depth direction Z is smaller than a length W33a of the front expanding surface 432 in the depth direction Z. In the back narrowed portion 112, a length W32b of the back narrowing surface 441 in the depth direction Z is smaller than a length W33b of the back expanding surface 442 in the depth direction Z. In the narrowed portions 111, 112, the length W32a of the front narrowing surface 431 and the length W32b of the back narrowing surface 441 are the same, and the length W33a of the front expanding surface 432 and the length W33b of the back expanding surface 442 are the same.

The front narrowed portion 111 is provided at a position relatively near the upstream curved path 406 in the depth direction Z. In this case, on the arrangement line CL31, a distance W34a between the front narrowed portion 111 and the upstream outer curved surface 411 is larger than a distance W35a between the front narrowed portion 111 and the downstream outer curved surface 421. The back narrowed portion 112 is, similar to the front narrowed portion 111, provided at a position relatively near the upstream curved path 406 in the depth direction Z. In this case, on the arrangement line CL31, a distance W34b between the back narrowed portion 112 and the upstream outer curved surface 411 is larger than a distance W35b between the back narrowed portion 112 and the downstream outer curved surface 421.

Regarding the positional relationship between the upstream outer curved surface 411 and the narrowed portions 111, 112, the distance W34a and the distance W34b are the same. Regarding the positional relationship between the downstream outer curved surface 421 and the narrowed portions 111, 112, the distance W35a and the distance W35b are the same.

In the measurement flow path 32, the measurement width dimension W1 (see FIG. 15) between the front measurement wall surface 103 and the back measurement wall surface 104 varies depending on the position. This measurement width dimension W1 is different in the sensor path 405, the upstream curved path 406, and the downstream curved path 407. The measurement width dimension W1 is not uniform in each of the sensor path 405, the upstream curved path 406, and the downstream curved path 407. However, a distance D34 between the front narrowing upstream surface 433 and the back narrowing upstream surface 443 in the upstream curved path 406 is the same as a distance D38 between the front expanding downstream surface 434 and the back expanding downstream surface 444 in the downstream curved path 407.

The sensor support 51 is provided in the upstream curved path 406 at a central position between the front narrowing upstream surface 433 and the back narrowing upstream surface 443. Here, a center line CL32 of the sensor SA50 is defined. The center line CL32 is a straight imaginary line that passes through the center of the sensor support 51 in the width direction X on the center line CL5 of the heating resistor 71. The center line CL32 is orthogonal to the center line CL5 and extends in the depth direction Z. The center line CL32 is parallel to the arrangement line CL31. In this case, in the upstream curved path 406, a distance D31a between the center line CL32 and the front narrowing upstream surface 433 is the same as a distance D31b between the center line CL32 and the back narrowing upstream surface 443.

The sensor support 51 is provided in the downstream curved path 407 at a central position between the front expanding downstream surface 434 and the back expanding downstream surface 444. In the downstream curved path 407, a distance D35a between the center line CL32 and the front expanding downstream surface 434 is the same as a distance D35b between the center line CL32 and the back expanding downstream surface 444. Regarding the positional relationship between the front measurement wall surface 103 and the sensor support 51, the distance D31a and the distance D35a are the same. Regarding the positional relationship between the back measurement wall surface 104 and the sensor support 51, the distance D31b and the distance D35b are the same.

Since front narrowing upstream surface 433 and the front expanding downstream surface 434 are coplanar with each other in the front measurement wall surface 103, a protrusion height of the front narrowed portion 111 in the upstream curved path 406 and a protrusion height of the front narrowed portion 111 in the downstream curved path 407 are the same. Specifically, a protrusion height D32a of the front peak 111a with respect to the front narrowing upstream surface 433 and a protrusion height D36a of the front peak 111a with respect to the front expanding downstream surface 434 are the same.

A protrusion height of the front narrowing surface 431 with respect to the front narrowing upstream surface 433 gradually increases in a direction from the front narrowing upstream surface 433 toward the front peak 111a. This increase rate gradually decreases in the direction from the front narrowing upstream surface 433 toward the front peak 111a. Hence, the front narrowing surface 431 is an arched surface. A protrusion height of the front expanding surface 432 with respect to the front expanding downstream surface 434 gradually decreases in a direction from the front peak 111a toward the front expanding downstream surface 434. This decrease rate gradually increases in the direction from the front peak 111a toward the front expanding downstream surface 434. Hence, the front expanding surface 432 is an arched surface.

As described above, in the front narrowed portion 111, the length W33a of the front expanding surface 432 is larger than the length W32a of the front narrowing surface 431. In this case, the decrease rate of the protrusion height of the front expanding surface 432 from the front peak 111a to the front expanding downstream surface 434 is smaller than the increase rate of the protrusion height of the front narrowing surface 431 from the front narrowing upstream surface 433 to the front peak 111a. The front narrowing surface 431 and the front expanding surface 432 form a continuous arched surface. A tangent line of the front narrowing surface 431 at the front peak 111a and a tangent line of the front expanding surface 432 at the front peak 111a are both parallel to the arrangement line CL31.

Regarding the front narrowed portion 111, a front narrowing ratio is defined as a ratio between the length W32a of the front narrowing surface 431 and the protrusion height D32a of a narrowing side of the front peak 111a. A front expanding ratio is defined as a ratio between the length W33a of the front expanding surface 432 and the protrusion height D36a of an expanding side of the front peak 111a. For example, the front narrowing ratio is calculated by dividing the protrusion height D32a on the narrowing side by the length W32a, and the front expanding ratio is calculated by dividing the protrusion height D36a on the expanding side by the length W33a. In this case, the front expanding ratio is smaller than the front narrowing ratio.

Since back narrowing upstream surface 443 and the back expanding downstream surface 444 are coplanar with each other in the back measurement wall surface 104, a protrusion height of the back narrowed portion 112 in the upstream curved path 406 and a protrusion height of the back narrowed portion 112 in the downstream curved path 407 are the same. Specifically, a protrusion height D32b of the back peak 112a with respect to the back narrowing upstream surface 443 and a protrusion height D36b of the back peak 112a with respect to the back expanding downstream surface 444 are the same.

A protrusion height of the back narrowing surface 441 with respect to the back narrowing upstream surface 443 gradually increases in a direction from the back narrowing upstream surface 443 toward the back peak 112a. This increase rate gradually decreases in the direction from the back narrowing upstream surface 443 toward the back peak 112a. Hence, the back narrowing surface 441 is an arched surface. A protrusion height of the back expanding surface 442 with respect to the back expanding downstream surface 444 gradually decreases in a direction from the back peak 112a toward the back expanding downstream surface 444. This decrease rate gradually increases in the direction from the back peak 112a toward the back expanding downstream surface 444. Hence, the back expanding surface 442 is an arched surface.

As described above, in the back narrowed portion 112, the length W33b of the back expanding surface 442 is larger than the length W32b of the back narrowing surface 441. In this case, the decrease rate of the protrusion height of the back expanding surface 442 from the back peak 112a to the back expanding downstream surface 444 is smaller than the increase rate of the protrusion height of the back narrowing surface 441 from the back narrowing upstream surface 443 to the back peak 112a. The back narrowing surface 441 and the back expanding surface 442 form a continuous arched surface. A tangent line of the back narrowing surface 441 at the back peak 112a and a tangent line of the back expanding surface 442 at the back peak 112a are both parallel to the arrangement line CL31.

Regarding the back narrowed portion 112, a back narrowing ratio is defined as a ratio between the length W32b of the back narrowing surface 441 and the protrusion height D32b of a narrowing side of the back peak 112a. A back expanding ratio is defined as a ratio between the length W33b of the back expanding surface 442 and the protrusion height D36b of an expanding side of the back peak 112a. For example, the back narrowing ratio is calculated by dividing the protrusion height D36b on the narrowing side by the length W32b, and the back expanding ratio is calculated by dividing the protrusion height D32b on the expanding side by the length W33b. In this case, the back expanding ratio is smaller than the back narrowing ratio.

In a relationship between the front narrowed portion 111 and the back narrowed portion 112, the front narrowing ratio is larger than the front expanding ratio, and the back narrowing ratio is larger than the back expanding ratio. This is because the protrusion heights D32a, D36a of the front peak 111a are larger than the protrusion heights D32b, D36b of the back peak 112a.

Rates at which the narrowed portions 111, 112 reduce the measurement flow path 32 are defined as reduction rates. The reduction rates are proportional to the narrowing ratios. Thus, the larger the front narrowing ratio of the front narrowed portion 111, the larger a front reduction rate at which the front narrowed portion 111 reduces the measurement flow path 32. For example, the front narrowing ratio and the front reduction rate have the same value. Similarly, the larger the back narrowing ratio of the back narrowed portion 112, the larger a back reduction rate at which the back narrowed portion 112 reduces the measurement flow path 32. Therefore, in the present embodiment, since the front narrowing ratio is larger than the back narrowing ratio, the front reduction rate is larger than the back reduction rate. For example, the back narrowing ratio and the back reduction rate have the same value.

The sensor support 51 is disposed at a center position between the front measurement wall surface 103 and the back measurement wall surface 104 in the upstream curved path 406 and the downstream curved path 407. However, the sensor support 51 is located relatively near the front measurement wall surface 103 in the sensor path 405. This is because the protrusion height of the front narrowed portion 111 on the front measurement wall surface 103 is larger than the protrusion height of the back narrowed portion 112 on the back measurement wall surface 104. Specifically, the protrusion heights D32a, D36a of the front peak 111a with respect to the front narrowing upstream surface 433 and the front expanding downstream surface 434 are larger than the protrusion heights D32b, D36b of the back peak 112a with respect to the back narrowing upstream surface 443 and the back expanding downstream surface 444. As a result, a distance D33a between the center line CL32 of the sensor support 51 and the front peak 111a is smaller than a distance D33b between the center line CL32 and the back peak 112a.

The housing 21 includes a measurement partition 451. The measurement partition 451 is provided between the introduction measurement path 352 and the discharge measurement path 354 in the depth direction Z. The measurement partition 451 partitions the introduction measurement path 352 and the discharge measurement path 354. In addition, the measurement partition 451 is provided between the through flow path 31 or a branch measurement path 351 and the detection measurement path 353 in the height direction Y. The measurement partition 451 partitions the through flow path 31 or the branch measurement path 351 and the detection measurement path 353. The measurement partition 451 connects the front measurement wall surface 103 and the back measurement wall surface 104 in the width direction X. The measurement partition 451 forms the inner measurement curved surface 402. An outer surface of the measurement partition 451 includes the measurement floor surface 101, the upstream inner curved surface 415, and the inner measurement curved surface 402 such as the downstream inner curved surface 425.

The narrowed portions 111, 112 extend from the measurement partition 451 toward the measurement ceiling surface 102. The narrowed portions 111, 112 do not extend out of the measurement partition 451 in the depth direction Z toward either the upstream outer curved surface 411 or the downstream outer curved surface 421. In the depth direction Z, a width of the measurement partition 451 is equal to or larger than the lengths W31a, W31b of the narrowed portions 111, 112. The narrowed portions 111, 112 are provided between the upstream curved path 406 and the downstream curved path 407. In the present embodiment, the upstream end parts of the narrowed portions 111, 112 are provided in the upstream curved path 406. The downstream end parts of the narrowed portions 111, 112 are provided in the downstream curved path 407. Even in this configuration, the narrowed portions 111, 112 are provided between the upstream curved path 406 and the downstream curved path 407.

As shown in FIGS. 4 to 7, the through inlet 33 is provided on the housing upstream surface 21c, and is open toward an upstream side in the intake passage 12. Therefore, the main flow in the intake passage 12 in the main flow direction is likely to enter the through inlet 33. The through outlet 34 is provided on the housing downstream surface 21d, and is open toward a downstream side in the intake passage 12. Therefore, the air flowing out of the through outlet 34 is likely to flow downstream together with the main flow in the intake passage 12.

The measurement outlet 36 is provided on both the housing front surface 21e and the housing back surface 21f. The housing front surface 21e and the housing back surface 21f extend along the arrangement line CL31. The measurement outlet 36 is open in a direction orthogonal to the arrangement line CL31. Therefore, the main flow in the intake passage 12 in the main flow direction is less likely to enter the measurement outlet 36. The air flowing out of the measurement outlet 36 is likely to flow downstream together with the main flow in the intake passage 12. When the main flow passes near the measurement outlet 36 in the intake passage 12, the air immediately before the measurement outlet 36 in the measurement flow path 32 is pulled by the main flow, and therefore the air is likely to flow out of the measurement outlet 36. As a result, the air in the measurement flow path 32 easily flows out of the measurement outlet 36. The width direction X corresponds to the direction orthogonal to the arrangement line CL31.

Next, a flow mode of air flowing through the measurement flow path 32 will be described.

As shown in FIG. 23, the air flowing from the through flow path 31 into the measurement flow path 32 through the measurement inlet 35 includes an outer curving flow AF31 along the outer measurement curved surface 401 and an inner curving flow AF32 along the inner measurement curved surface 402. As described above, in the measurement flow path 32, the outer measurement curved surface 401 is concavely curved as a whole. Thus, the outer curving flow AF31 is likely to be along the outer measurement curved surface 401. The inner measurement curved surface 402 is convexly curved as a whole. Thus, the inner curving flow AF32 is likely to be along the inner measurement curved surface 402. Further, the outer measurement curved surface 401 and the inner measurement curved surface 402 are curved in a direction orthogonal to the width direction X. The narrowed portions 111, 112 narrow the measurement flow path 32 in the width direction X. Therefore, in the measurement flow path 32, airflow turbulence that causes mixing of the outer curving flow AF31 and the inner curving flow AF32 is less likely to occur.

The outer curving flow AF31 that has reached the upstream curved path 406 in the measurement flow path 32 changes its flow direction by flowing along the upstream outer curved surface 411. Since the upstream outer curved surface 411 is curved more gently than the downstream outer curved surface 421, the curve of the upstream outer curved surface 411 is sufficiently mild. Hence, turbulence flow such as swirling flow is less likely to occur in the outer curving flow AF31.

As shown in FIG. 25, an airflow through the measurement flow path 32 includes a front offset flow AF33 between the sensor support 51 and the front narrowing surface 431, and a back offset flow AF34 between the sensor support 51 and the back narrowing surface 441. Air of the curving flows AF31, AF32 that has flowed along the front measurement wall surface 103 and reached the narrowed portions 111, 112 is likely to be included in the front offset flow AF33. Air of the curving flows AF31, AF32 that has flowed along the back measurement wall surface 104 and reached the narrowed portions 111, 112 is likely to be included in the back offset flow AF34.

With respect to the front side of the sensor support 51, a degree of airflow narrowing by the front narrowing surface 431 gradually increases in a direction toward the front peak 111a, and accordingly, an effect of regulating the front offset flow AF33 gradually increases in the direction toward the front peak 111a. Moreover, since the protrusion heights D32a, D36a of the front peak 111a are larger than the protrusion heights D32b, D36b of the back peak 112a, the flow regulating effect of the front narrowing surface 431 is sufficiently enhanced. As a result, the front offset flow AF33 which has been sufficiently regulated by the front narrowing surface 431 and the sensor support 51 reaches the flow rate sensor 22. Therefore, a flow rate detection accuracy of the flow rate sensor 22 is likely to be high.

The front offset flow AF33 is gradually accelerated toward the front peak 111a. Then, the front offset flow AF33 is jet out of between the front peak 111a and the sensor support 51 as a jet flow toward the downstream curved path 407. This is because an area between the front narrowed portion 111 and the sensor support 51 is expanded by the front expanding surface 432. If the area between the front expanding surface 432 and the sensor support 51 is sharply expanded, there is a concern that a turbulence such as a vortex is likely to occur due to separation of the front offset flow AF33 from the front expanding surface 432. However, since the length W33a of the front expanding surface 432 is larger than the length W32a of the front narrowing surface 431, the area between the front expanding surface 432 and the sensor support 51 is gently expanded. Therefore, separation of the front offset flow AF33 from the front expanding surface 432 is unlikely to occur, and a turbulence such as vortex flow is less likely to occur downstream of the front peak 111a.

With respect to the back side of the sensor support 51, a degree of airflow narrowing by the back narrowing surface 441 gradually increases in a direction toward the back peak 112a, and accordingly, an effect of regulating the back offset flow AF34 gradually increases in the direction toward the back peak 112a. In this case, the back offset flow AF34 which has been sufficiently regulated by the back narrowing surface 441 and the sensor support 51 reaches the back peak 112a. Therefore, a turbulence is unlikely to occur in the back offset flow AF34 even after passing through the back peak 112a.

The back offset flow AF34 is gradually accelerated toward the back peak 112a. Then, the back offset flow AF34 is jet out of between the back peak 112a and the sensor support 51 as a jet flow toward the downstream curved path 407. This is because an area between the back narrowed portion 112 and the sensor support 51 is expanded by the back expanding surface 442. If the area between the back expanding surface 442 and the sensor support 51 is sharply expanded, there is a concern that a turbulence such as a vortex is likely to occur due to separation of the back offset flow AF34 from the back expanding surface 442. However, since the length W33b of the back expanding surface 442 is larger than the length W32b of the back narrowing surface 441, the area between the back expanding surface 442 and the sensor support 51 is gently expanded. Therefore, separation of the back offset flow AF34 from the back expanding surface 442 is unlikely to occur, and a turbulence such as vortex flow is less likely to occur downstream of the back peak 112a.

The front offset flow AF33 and the back offset flow AF34 are expected to join together in the sensor path 405 and the downstream curved path 407 after passing by the sensor support 51. For example, if the back offset flow AF34 has turbulence, turbulence of air flow may be generated downstream of the sensor support 51, and the front offset flow AF33 is difficult to pass between the front narrowed portion 111 and the sensor support 51. In this case, there is a concern that a flow rate and a flow velocity of the front offset flow AF33 passing through the flow rate sensor 22 become insufficient, and the flow rate detection accuracy of the flow rate sensor 22 may decrease. In contrast, in the present embodiment, the back offset flow AF34 is regulated by the back narrowed portion 112. Thus, generation of turbulence downstream of the sensor support 51 caused by turbulence of the back offset flow AF34 flowing past the sensor support 51 can be reduced.

When the front offset flow AF33 and the back offset flow AF34 are discharged from between the sensor support 51 and the narrowed portions 111, 112 toward the downstream curved path 407, these offset flows AF33, AF34 proceed as a forward flow toward the downstream outer curved surface 421 along the arrangement line CL31. When the offset flows AF33, AF34 hit the downstream outer curved surface 421, the offset flows AF33, AF34 may bounce back from downstream outer curved surface 421 and flow backward in the measurement flow path 32 in a direction toward the flow rate sensor 22. In particular, when hitting the downstream outer vertical surface 423, the offset flows AF33, AF34 are likely to flow backward to the flow rate sensor 22 along the arrangement line CL31. If the backward flow reaches the flow rate sensor 22 against the forward flow, the direction of air flow detected by the flow rate sensor 22 may become opposite to the original flow, and the detection accuracy of the flow rate sensor 22 may decrease. Further, even if the backward flow does not reach the flow rate sensor 22, the backward flow causes the forward flow to become difficult to flow downstream. Therefore, the flow rate detected by the flow rate sensor 22 may become smaller than the actual flow rate, and the detection accuracy of the flow rate sensor 22 may decrease.

In contrast, in the present embodiment, the flow rate sensor 22 is provided at a position nearer to the upstream outer curved surface 411 than to the downstream outer curved surface 421. Thus, the flow rate sensor 22 is at a position separated as much as possible from the downstream outer curved surface 421. According to this configuration, the velocity energy of the offset flows AF33, AF34 is likely to decrease before the offset flows AF33, AF34 blown out between the sensor support 51 and the narrowed portions 111, 112 reach the downstream outer curved surface 421. Hence, even if the offset flows AF33, AF34 bounce back from the downstream outer curved surface 421 and become the backward flow, the velocity energy of the backward flow is too low to reach the flow rate sensor 22. Further, the farther the flow rate sensor 22 is from the downstream outer curved surface 421, the longer the distance for the backward flow to reach the flow rate sensor 22. Thus, the backward flow can be suppressed from reaching the flow rate sensor 22.

The imaginary line passing through the flow rate sensor 22 is defined as the arrangement line CL31. Thus, air of the front offset flow AF33 that has passed through the flow rate sensor 22 is likely to flow along the arrangement line CL31. Therefore, maximum enlargement in distance L31b between the flow rate sensor 22 and the downstream outer curved surface 421 on the arrangement line CL31 can maximizes a distance for the air of the front offset flow AF33 passing through the flow rate sensor 22 to reach the downstream outer curved surface 421. The arrangement line CL31 passes through the downstream outer vertical surface 423 in the present embodiment. In this configuration, when the air that has passed through the flow rate sensor 22 hits the downstream outer vertical surface 423 and bounces back, the air is likely to return to the flow rate sensor 22 as it is. In such configuration in which the arrangement line CL31 passes through the downstream outer vertical surface 423, the maximum enlargement in distance L31b between the flow rate sensor 22 and the downstream outer curved surface 421 on the arrangement line CL31 is effective for suppressing of the backward flow from reaching the flow rate sensor 22.

According to the present embodiment described thus far, the degree of recess of the downstream outer curved surface 421 is larger than the degree of recess of the upstream outer curved surface 411. In this configuration, the cross-sectional area and volume of the downstream curved path 407 can be increased as much as possible by increasing the degree of recess of the downstream outer curved surface 421. Therefore, the pressure loss in air flow through the downstream curved path 407 can be decreased. As described above, the decrease of the pressure loss in the downstream curved path 407 reduces occurrence of a clogged-like state of air in the downstream curved path 407 after passing through the flow rate sensor 22. Thus, it is unlikely to occur that the air passing through the flow rate sensor 22 becomes insufficient in volume and velocity. Therefore, the flow rate detection accuracy of the flow rate sensor 22 can be increased, and as a result, the flow rate measurement accuracy of the air flow meter 20 can be increased.

Here, in order to increase the cross-sectional area and volume of the downstream curved path 407 as much as possible, there may be a method of expanding the downstream curved path 407 in the width direction X and the depth direction Z. However, in this method, there is a concern that the housing 21 may become large in the width direction X and the depth direction Z. In this case, air flow in the intake passage 12 may be disturbed by the housing 21, and the detection accuracy of the flow rate sensor 22 is likely to decrease. Further, in this case, a necessary amount of resin material for molding the housing 21 increases, and thus a manufacturing cost of the housing 21 tends to increase.

On the other hand, in the present embodiment, the cross-sectional area and volume of the downstream curved path 407 are increased as much as possible by increasing the degree of recess of the downstream outer curved surface 421. Hence, the housing 21 can be prevented from becoming large. In this case, air flow in the intake passage 12 may not be disturbed by the housing 21, and the detection accuracy of the flow rate sensor 22 can be enhanced. Further, in this case, a necessary amount of resin material for molding the housing 21 tends to decrease, and thus a manufacturing cost of the housing 21 can be reduced.

According to the present embodiment, the curved portion of the downstream outer curved surface 421 is formed by the downstream outer internal corner 424. According to this configuration, the degree of recess of the downstream outer curved surface 421 can be maximized without the downstream outer curved surface 421 providing a detour. That is, it is possible to realize a configuration in which the downstream curved path 407 has the largest cross-sectional area and volume within a range in which the downstream curved path 407 can be expanded by change in shape of the downstream outer curved surface 421.

According to the present embodiment, the distance L35b between the downstream outer curved surface 421 and the downstream inner curved surface 425 is larger than the distance L35a between the upstream outer curved surface 411 and the upstream inner curved surface 415. According to this configuration, it is possible to realize a configuration in which the downstream outer curved surface 421 and the downstream inner curved surface 425 are separated from each other as far as possible in a direction orthogonal to the center line CL4 of the measurement flow path 32. Therefore, unless the downstream curved path 407 or the housing 21 is expanded in the width direction X, the cross-sectional area and volume of the downstream curved path 407 can be increased as much as possible by the positional relationship between the downstream outer curved surface 421 and the downstream inner curved surface 425.

According to the present embodiment, the degree of bulge of the downstream inner curved surface 425 is larger than the degree of bulge of the upstream inner curved surface 415. Therefore, unless the downstream curved path 407 or the housing 21 is expanded in the width direction X, the cross-sectional area and volume of the downstream curved path 407 can be increased as much as possible by the shape of the downstream inner curved surface 425.

According to the present embodiment, the radius of curvature R32 of the downstream inner curved surface 425 is larger than the radius of curvature R31 of the upstream inner curved surface 415. Thus, the degree of bulge of the downstream inner curved surface 425 is smaller than the degree of bulge of the upstream inner curved surface 415. In this configuration, while the degree of bulge of the downstream inner curved surface 425 is made as small as possible, the air reaching the downstream curved path 407 from the flow rate sensor 22 easily flows toward the measurement outlet 36 along an arch of the downstream inner curved surface 425. Therefore, increase in pressure loss in the downstream curved path 407 due to air disruption in the downstream curved path 407 can be reduced by the shape of the downstream inner curved surface 425.

According to the present embodiment, on the arrangement line CL31, the distance L31b between the flow rate sensor 22 and the downstream outer curved surface 421 is larger than the distance L31a between the flow rate sensor 22 and the upstream outer curved surface 411. In this configuration, the flow rate sensor 22 can be placed at a position as far as possible from the downstream outer curved surface 421 between the upstream outer curved surface 411 and the downstream outer curved surface 421. Therefore, even if the air that has passed through the flow rate sensor 22 in the measurement flow path 32 hits the downstream outer curved surface 421 and flows backward in the direction toward the flow rate sensor 22, the backward flow is difficult to reach the flow rate sensor 22. Further, even if a turbulence of air flow due to the backward flow occurs in the downstream curved path 407, this turbulence hardly reach the flow rate sensor 22. Therefore, decrease in detection accuracy of the flow rate sensor 22 can be reduced. As a result, an accuracy in measurement of the flow rate by the air flow meter 20 can be enhanced.

In order to maximize the distance L31b between the flow rate sensor 22 and the downstream outer curved surface 421, the downstream outer curved surface 421 may be separated from the flow rate sensor 22 by extending the detection measurement path 353 in the depth direction Z, for example. However, in this method, there is a concern that the housing 21 may become large in the depth direction Z. In contrast, in the present embodiment, the distance L31b between the flow rate sensor 22 and the downstream outer curved surface 421 is maximized by setting the flow rate sensor 22 at a position near the upstream outer curved surface 411 in the detection measurement path 353. Accordingly, the housing 21 can be prevented from becoming large.

According to the present embodiment, the sensor path 405 in which the flow rate sensor 22 is disposed extends along the arrangement line CL31. In this configuration, air flowing along the flow rate sensor 22 is likely to travel straight along the arrangement line CL31. Thus, turbulence of air flow is less likely to occur around the flow rate sensor 22. In this case, a flow velocity of the air around the flow rate sensor 22 is likely to be stabilized. Thus, the detection accuracy of the flow rate sensor 22 can be improved. Moreover, the flow rate sensor 22 is arranged at a position as far as possible from the downstream outer curved surface 421. Hence, the turbulence of air flow in the downstream curved path 407 is less likely to affect the flow rate sensor 22. As a result, turbulence of air flow around the flow rate sensor 22 can be suppressed. In this case, a flow velocity of the air around the flow rate sensor 22 can be further stabilized. Thus, the detection accuracy of the flow rate sensor 22 can be more improved.

According to the present embodiment, in the sensor path 405 extending along the arrangement line CL31, the flow rate sensor 22 is provided at a position closer to the upstream curved path 406 than to the downstream curved path 407. In this configuration, in the sensor path 405, turbulence of air around the flow rate sensor 22 can be suppressed and the flow velocity of the air can be stabilized. And further, the flow rate sensor 22 can be arranged at a position as far as possible from the downstream outer curved surface 421.

According to the present embodiment, on the arrangement line CL31, the sensor support 51 is provided at a position closer to the upstream outer curved surface 411 than to the downstream curved path 407. In this configuration, the sensor support 51 can be arranged at a position as far as possible from the downstream curved path 407. Hence, turbulence of air flowing into the downstream curved path 407 due to the presence of the sensor support 51 can be reduced.

According to the present embodiment, the arrangement line CL31 passes through the downstream outer vertical surface 423 of the downstream outer curved surface 421. In this configuration, the downstream outer vertical surface 423 extends straight to upstream from a downstream end part of the downstream curved path 407. Hence, the arrangement line CL31 passes through a farthest part of the downstream outer curved surface 421 from the flow rate sensor 22. In this way, the distance for the air passing through the flow rate sensor 22 to reach the downstream outer curved surface 421 is enlarged as large as possible. As a result, it can be reduced that the air passing through the flow rate sensor 22 bounces at the downstream outer curved surface 421 and flows back to the flow rate sensor 22 as backward flow.

According to the present embodiment, since the downstream inner curved surface 425 is arched, the distance L35b between the downstream outer curved surface 421 and the downstream inner curved surface 425 in the downstream curved path 407 can be increased as much as possible. In this configuration, the downstream inner curved surface 425 is arched, and thus the cross-sectional area of the downstream curved path 407 is increased as much as possible. The volume of the downstream curved path 407 is maximized.

Therefore, even if turbulence of air flow occurs in the downstream curved path 407 due to air bounce on the downstream outer curved surface 421, the air in the downstream curved path 407 easily flows toward the measurement outlet 36 together with this turbulence. Therefore, it can be more certainly reduced that the backward flow reaches the flow rate sensor 22 from the downstream curved path 407.

According to the present embodiment, the narrowed portions 111, 112 that gradually narrow and then gradually expand the measurement flow path 32 are provided between the upstream end part of the upstream curved path 406 and the downstream end part of the downstream curved path 407. In this configuration, the air that has passed through the narrowed portions 111, 112 is blown out as a jet flow toward the downstream curved path 407 at high velocity. Thus there is a concern that the air is likely to bounce on the downstream outer curved surface 421. Therefore, such arrangement of the flow rate sensor 22 at a position as far as possible from the downstream outer curved surface 421 is effective to prevent the air bounded at the downstream outer curved surface 421 from reaching the flow rate sensor 22.

According to the present embodiment, in the narrowed portions 111, 112, the lengths W33a, W33b of the expanding surfaces 432, 442 are larger than the length W32a, W32b of the narrowing surfaces 431, 441. In this configuration, a degree of expansion and an expansion rate of the expanding surfaces 432, 442 in the measurement flow path 32 are moderated so as to prevent turbulence such as separation of air flow caused by sharp expansion in the measurement flow path 32. As a result, turbulence of flow in the downstream curved path 407 caused by air which has passed through the narrowed portions 111, 112 can be reduced.

According to the present embodiment, the narrowed portions 111, 112 are provided at a position closer to the upstream outer curved surface 411 than to the downstream outer curved surface 421. In this configuration, the narrowed portions 111, 112 can be placed at a position as far as possible from the downstream outer curved surface 421 between the upstream outer curved surface 411 and the downstream outer curved surface 421. Therefore, the velocity energy of the air which has passed through the narrowed portions 111, 112 at the time of hitting the downstream outer curved surface 421 can be reduced without enlarging the housing 21.

According to the present embodiment, the front measurement wall surface 103 and the back measurement wall surface 104 face each other through the upstream curved path 406. The measurement wall surfaces 103, 104 are provided with the narrowed portions 111, 112. In this configuration, a direction in which the air curves in the upstream curved path 406 and a direction in which the air is narrowed by the narrowed portions 111, 112 are substantially orthogonal to each other. Therefore, when an airflow such as the outer curving flow AF31 along the upstream outer curved surface 411 and an airflow such as the inner curving flow AF32 along the upstream inner curved surface 415 pass through the narrowed portions 111, 112, turbulence caused by mixing of the airflows can be reduced. Therefore, an effect of regulating airflow by the narrowed portions 111, 112 can be enhanced.

According to the present embodiment, the upstream outer curved surface 411 is arched. In this configuration, a direction of airflow such as the outer curving flow AF31 along the outer measurement curved surface 401 is gradually changed by the upstream outer curved surface 411. Thus, turbulence is less likely to be generated in the airflow along the upstream outer curved surface 411. Therefore, turbulence is less likely to be generated in air flow that reaches the flow rate sensor 22 such as the outer curving flow AF31. Turbulence is less likely to be generated also in air blown toward the downstream curved path 407.

According to the present embodiment, the inner measurement curved surface 402 extending along the measurement flow path 32 is curved so as to bulge toward the flow rate sensor 22 as a whole. In this configuration, a concave portion is not formed on the inner measurement curved surface 402. Thus, air flow such as the inner curving flow AF32 along the inner measurement curved surface 402 is prevented from entering the concave portion and is less likely to cause turbulence such as vortex. Therefore, turbulence is less likely to be generated in air flow that reaches the flow rate sensor 22 such as the inner curving flow AF32. Turbulence is less likely to be generated also in air blown toward the downstream curved path 407.

According to the present embodiment, the measurement outlets 36 are provided on the housing front surface 21e and the housing back surface 21f of the outer surface of the housing 21. In this configuration, when air flows along the measurement outlets 36 of the housing front surface 21e and the housing back surface 21f in the intake passage 12, this air pulls out air in the measurement flow path 32 to flow out of the measurement outlet 36. Therefore, even if turbulence of air flow occurs in the downstream curved path 407 due to bounce of air or the like, the air flowing outside the housing 21 in the intake passage 12 is used to accelerate an air flow together with the turbulence of air flow from the downstream curved path 407 toward the measurement outlet 36.

<Description of Configuration Group E>

Figure 26:
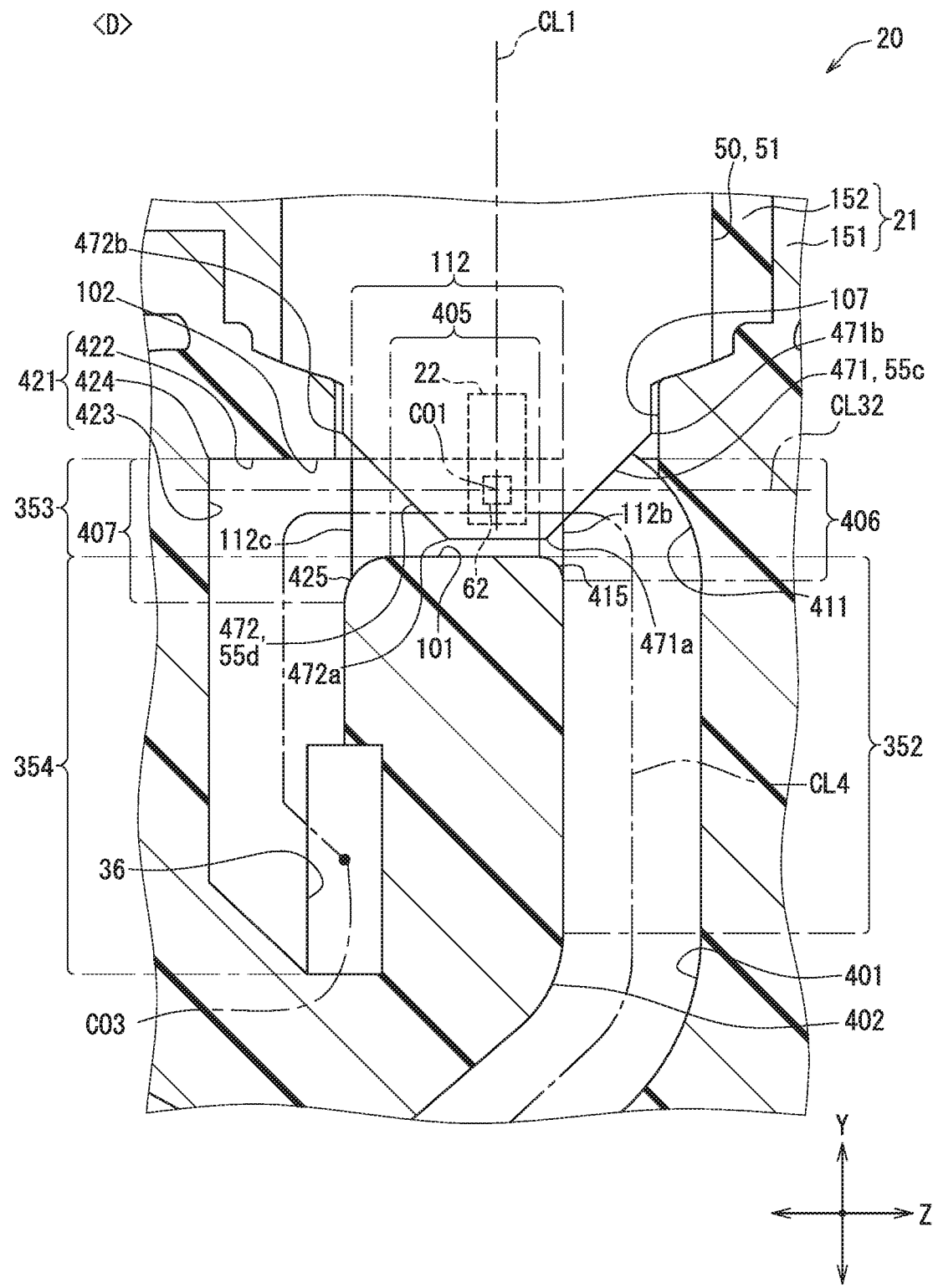
FIG. 26 is an enlarged view around the sensor path and a vertical cross-sectional view of the air flow meter according to a configuration group E.

As shown in FIGS. 10, 11, 26, the molded upstream surface 55c of the sensor SA 50 has a molded upstream inclined surface 471. The molded upstream inclined surface 471 extends obliquely and straightly from the upstream end part of the molded distal end surface 55a toward the molded basal end surface 55b, and corresponds to an upstream inclined portion inclined with respect to the height direction Y. The molded downstream surface 55d has a molded downstream inclined surface 472. The molded downstream inclined surface 472 extends obliquely from the downstream end part of the molded distal end surface 55a toward the molded basal end surface 55b, and corresponds to a downstream inclined portion inclined with respect to the height direction Y. The molded upstream inclined surface 471 and the molded downstream inclined surface 472 are both inclined with respect to the arrangement cross section CS41, and extend through the arrangement cross section CS41 in the height direction Y.

Figure 27:
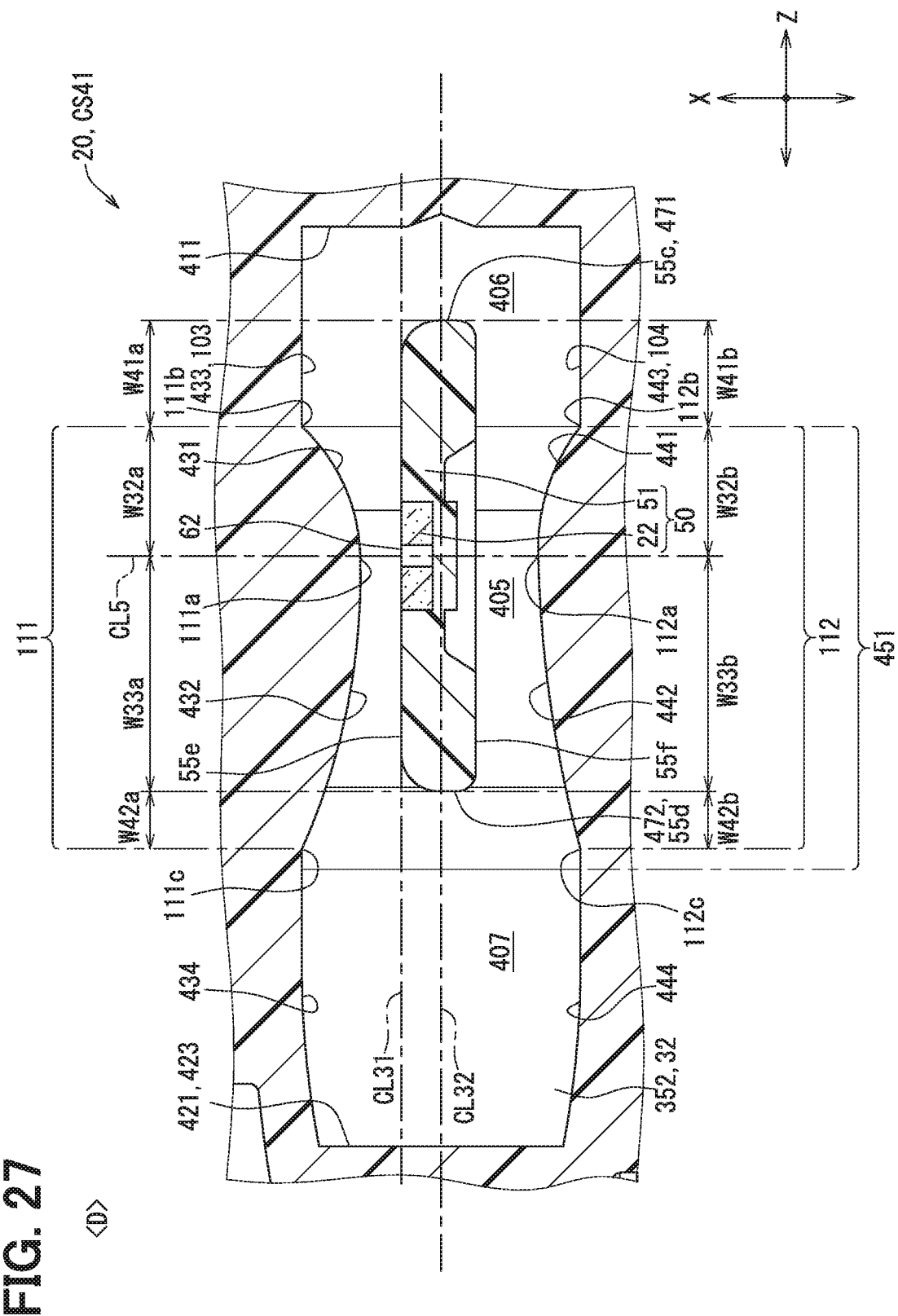
FIG. 27 is an enlarged view around the sensor path and a horizontal cross-sectional view of the air flow meter.

As shown in FIGS. 26 and 27, a front upstream end 111b, which is an upstream end of the front narrowed portion 111, is arranged at a boundary between the front narrowing surface 431 and the front narrowing upstream surface 433. A front downstream end 111c, which is a downstream end of the front narrowed portion 111, is arranged at a boundary between the front expanding surface 432 and the front expanding downstream surface 434. A back upstream end 112b, which is an upstream end of the back narrowed portion 112, is arranged at a boundary between the back narrowing surface 441 and the back narrowing upstream surface 443. A back downstream end 112c, which is a downstream end of the back narrowed portion 112, is arranged at a boundary between the back expanding surface 442 and the back expanding downstream surface 444.

The molded upstream inclined surface 471 of the sensor SA 50 is arranged at a position so as to extend across both the front upstream end 111b of the front narrowed portion 111 and the back upstream end 112b of the back narrowed portion 112 in the depth direction Z. An edge of the molded upstream inclined surface 471 facing in the molding distal end direction is referred to as a distal end edge 471a, and an edge of the molded upstream inclined surface 471 facing in molding basal end direction is referred to as a basal end edge 471b. In this case, the distal end edge 471a is provided downstream of the upstream ends 111b, 112b of the narrowed portions 111, 112 in the depth direction Z. The basal end edge 471b of the molded upstream inclined surface 471 is provided upstream of the front narrowed portion 111 and the back narrowed portion 112 in the depth direction Z. The upstream ends 111b, 112b of the narrowed portions 111, 112 are provided at positions closer in the depth direction Z to the distal end edge 471a than to the basal end edge 471b of the molded upstream inclined surface 471.

The molded downstream inclined surface 472 is arranged at a position so as to extend across both the front downstream end 111c of the front narrowed portion 111 and the back downstream end 112c of the back narrowed portion 112 in the depth direction Z. An edge of the molded downstream inclined surface 472 facing in the molding distal end direction is referred to as a distal end edge 472a, and an edge of the molded downstream inclined surface 472 facing in molding basal end direction is referred to as a basal end edge 472b. In this case, the distal end edge 472a is provided upstream of the downstream ends 111c, 112c of the narrowed portions 111, 112 in the depth direction Z. The basal end edge 472b of the molded downstream inclined surface 472 is provided downstream of the narrowed portions 111, 112 in the depth direction Z. The downstream ends 111c, 112c of the narrowed portions 111, 112 are provided at positions closer in the depth direction Z to the distal end edge 472a than to the basal end edge 472b of the molded downstream inclined surface 472.

As shown in FIG. 27, in the arrangement cross section CS41 of the air flow meter 20, the molded upstream inclined surface 471 of the molded upstream surface 55c is provided upstream of the narrowed portions 111, 112. In this case, the molded upstream inclined surface 471 is provided between the upstream outer curved surface 411 and the upstream ends 111b, 112b of the narrowed portions 111, 112. In the arrangement cross section CS41, a distance W41a between the molded upstream inclined surface 471 and the front narrowed portion 111 in the depth direction Z is the same as a distance W41b between the molded upstream inclined surface 471 and the back narrowed portion 112. Further, the distance W41a is smaller than the length W32a of the front narrowing surface 431, and the distance W41b is smaller than the length W32b of the back narrowing surface 441.

In the arrangement cross section CS41, the molded downstream inclined surface 472 of the molded downstream surface 55d is provided upstream of the downstream ends 111c, 112c of the narrowed portions 111, 112. In this case, in the depth direction Z, the molded downstream inclined surface 472 of the molded downstream surface 55d is provided between the peaks 111a, 112a and the downstream ends 111c, 112c of the narrowed portions 111, 112. In the arrangement cross section CS41, a distance W42a between the molded downstream inclined surface 472 and the front downstream end 111c of the front narrowed portion 111 in the depth direction Z is the same as a distance W42b between the molded downstream inclined surface 472 and the back downstream end 112c of the back narrowed portion 112. The distance W42a is smaller than the length W33a of the front expanding surface 432, and the distance W42b is smaller than the length W33b of the back expanding surface 442.

A portion of the molded upstream inclined surface 471 of the sensor support 51, which is positioned on the arrangement cross section CS41, is at a position aligned with the introduction measurement path 352 in the height direction Y. This portion is provided downstream of the upstream inner curved surface 415 in the housing downstream direction in the upstream curved path 406. In the measurement flow path 32, the introduction measurement path 352 may be referred to as a first section, the detection measurement path 353 may be referred to as a second section, and the discharge measurement path 354 may be referred to as a third section. The discharge measurement path 354 includes a portion that extends straight in the height direction Y and a portion that extends from the measurement outlet 36 in a direction tilted from the height direction Y.

The flow rate sensor 22 is arranged according to a position where the flow velocity of air flowing through the measurement flow path 32 is the largest. More specifically, the flow rate sensor 22 is provided at the position where the flow velocity of air is the largest. In the present embodiment, the position where the flow velocity of air is the largest in the measurement flow path 32 is the position where the front peak 111a is provided. The flow rate sensor 22 is positioned to face the front peak 111a.

According to the present embodiment described above, since the narrowed portions 111 is provided in the measurement flow path 32, the air flowing through the measurement flow path 32 can be regulated. Moreover, in the arrangement cross section CS41, the molded upstream surface 55c of the sensor support 51 is provided upstream of the narrowed portions 111, 112. In this configuration, the air that has flowed past the molded upstream surface 55c along the arrangement cross section CS41 is regulated by the entire narrowed portions 111, 112 in the arrangement cross section CS41. In this case, even if turbulence of the air flow occurs due to the air flowing in the measurement flow path 32 and reaching the sensor support 51, this turbulence of the air flow can be reduced by the entire narrowed portions 111, 112. That is, it is unlikely to occur that the flow regulation effect of the narrowed portions 111, 112 decreases by the presence of the sensor support 51. Therefore, deterioration of the flow rate detection accuracy of the flow rate sensor 22 can be reduced, and as a result, the flow rate measurement accuracy of the air flow meter 20 can be increased.

According to this embodiment, the molded upstream inclined surface 471 is positioned to extend over the upstream ends 111b, 112b of the narrowed portions 111, 112 in the depth direction Z. According to this configuration, it is not necessary to arrange the entire molded upstream inclined surface 471 and the entire molded upstream surface 55c upstream of the narrowed portions 111, 112 in the measurement flow path 32. Therefore, the sensor support 51 and the molded portion 55 can be miniaturized. Therefore, turbulence of the air flow in the measurement flow path 32 due to increase in size of the sensor support 51 to upstream can be reduced.

Further, a configuration in which the cross-sectional area S4 of the measurement flow path 32 decreases in a direction from the measurement inlet 35 toward the flow rate sensor 22 is referred to as a configuration narrowing the measurement flow path 32. The configuration narrowing the measurement flow path 32 includes the sensor support 51 together with the narrowing surfaces 431, 441. Hence, since the molded upstream inclined surface 471 is positioned to extend over the upstream ends 111b, 112b of the narrowed portions 111, 112 in the depth direction Z, the sensor support 51 and the narrowed portions 111, 112 are capable of continuously narrowing the measurement flow path 32 in a direction toward the flow rate sensor 22. As a result, increase and decrease in the cross-sectional area S4 of the measurement flow path 32 in the direction from the measurement inlet 35 toward the flow rate sensor 22 can be prevented. Thus, deterioration in regulation effect of the sensor support 51 and the narrowed portions 111, 112 can be suppressed.

In contrast, for example, if the sensor support 51 and the narrowed portions 111, 112 are separated from each other in an extending direction of the measurement flow path 32, the cross-sectional area S4 of the flow rate sensor 22 increases between the sensor support 51 and the narrowed portions 111, 112. That is, the sensor support 51 and the narrowed portions 111, 112 cannot continuously narrows the measurement flow path 32 in the direction toward the flow rate sensor 22. In this case, the cross-sectional area S4 of the measurement flow path 32 may increase and decrease in the direction from the measurement inlet 35 toward the flow rate sensor 22. Thus, the regulation effect of the sensor support 51 and the narrowed portions 111, 112 may be deteriorated.

In the configuration in which the molded upstream inclined surface 471 is positioned to extend over the upstream ends 111b, 112b of the narrowed portions 111, 112 in the depth direction Z, a volume of the sensor support 51 in the measurement flow path 32 gradually increases in the direction from the measurement inlet 35 toward the flow rate sensor 22. In this case, the sensor support 51 gradually decreases the cross-sectional area S4 of the measurement flow path 32 in the direction from the measurement inlet 35 toward the flow rate sensor 22, and thereby can gradually narrow the measurement flow path 32. Therefore, generation of turbulence of the air flow in the measurement flow path 32 due to an excessively high degree of narrowing of the sensor support 51 can be reduced.

According to the present embodiment, in the arrangement cross section CS41, the molded downstream surface 55d of the sensor support 51 is provided upstream of the downstream ends 111c, 112c of the narrowed portions 111, 112. In this configuration, turbulence of air which has flowed past the molded downstream surface 55d of the sensor support 51 can be suppressed by the regulation effect of the narrowed portions 111, 112. The regulation effect of the narrowed portions 111, 112 exerts by the expanding surfaces 432, 442 even downstream of the peaks 111a, 112a. Moreover, in this configuration, the sensor support 51 can be miniaturized as compared with, for example, a configuration in which the molded downstream surface 55d is arranged downstream of the narrowed portions 111, 112 in the arrangement cross section CS41. Accordingly, it is unlikely to occur that the flow regulation effect of the narrowed portions 111, 112 decreases due to increase in size of the sensor support 51.

According to the present embodiment, the molded downstream inclined surface 472 is positioned to extend over the downstream ends 111c, 112c of the narrowed portions 111, 112 in the depth direction Z. According to this configuration, it is not necessary to arrange the entire molded downstream inclined surface 472 and the entire molded downstream surface 55d upstream of the downstream ends 111c, 112c of the narrowed portions 111, 112 in the measurement flow path 32. Therefore, the sensor support 51 and the molded portion 55 can be miniaturized. Therefore, turbulence of the air flow in the measurement flow path 32 due to increase in size of the sensor support 51 to downstream can be reduced.

Further, a configuration in which the cross-sectional area S4 of the measurement flow path 32 increases in a direction from the flow rate sensor 22 toward the measurement outlet 36 is referred to as a configuration expanding the measurement flow path 32. The configuration expanding the measurement flow path 32 includes the sensor support 51 together with the expanding surfaces 432, 442. Hence, since the molded downstream inclined surface 472 is positioned to extend over the downstream ends 111c, 112c of the narrowed portions 111, 112 in the depth direction Z, the sensor support 51 and the narrowed portions 111, 112 are capable of continuously expanding the measurement flow path 32 in a direction toward the measurement outlet 36. As a result, increase and decrease in the cross-sectional area S4 of the measurement flow path 32 in the direction from the flow rate sensor 22 toward the measurement outlet 36 can be prevented. Thus, deterioration in regulation effect of the sensor support 51 and the narrowed portions 111, 112 can be suppressed.

According to the present embodiment, in the narrowed portions 111, 112 provided downstream of the molded distal end surface 55a of the sensor support 51 in the arrangement cross section CS41, the lengths W33a, W33b of the expanding surfaces 432, 442 are larger than the length W32a, W32b of the narrowing surfaces 431,441. In this configuration, the measurement flow path 32 is gently expanded toward the measurement outlet 36 such that turbulence such as separation caused by the narrowed portions 111, 112 excessively expanding the measurement flow path 32 does not occur in an air flow that has flowed past the molded distal end surface 55a and reached the narrowed portions 111, 112. Therefore, the turbulence of the airflow that has passed by the sensor support 51 and the narrowed portions 111 and 112 can be reduced.

According to the present embodiment, the front narrowed portion 111 is positioned on the front measurement wall surface 103 so as to face the flow rate sensor 22. Thus, an air flow along the flow rate sensor 22 can be further regulated by the front narrowed portion 111 in the configuration in which the regulation effect of the front narrowed portion 111 has been improved by positioning of the molded upstream surface 55c upstream of the front narrowed portion 111 in the arrangement cross section CS41.

According to the present embodiment, the back narrowed portion 112 is provided on a side of the flow rate sensor 22 opposite the front narrowed portion 111. Thus, an air flow between the sensor support 51 and the back measurement wall surface 104 can be also regulated by the back narrowed portion 112 in the configuration in which the regulation effect of the front narrowed portion 111 has been improved by positioning of the molded upstream surface 55c upstream of the front narrowed portion 111 in the arrangement cross section CS41. Therefore, deterioration in detection accuracy of the flow rate sensor 22 due to turbulence of the air flow along the flow rate sensor 22, which is caused by turbulence of the air flow between the sensor support 51 and the back measurement wall surface 104, can be reduced.

According to the present embodiment, the sensor support 51 is provided at a position closer to the front narrowed portion 111 than to the back narrowed portion 112 in the width direction X. Thus, the regulation effect of the front narrowed portion 111 with respect to the air flow along the flow rate sensor 22 can be further enhanced in the configuration in which the regulation effect of the front narrowed portion 111 has been improved by positioning of the molded upstream surface 55c upstream of the front narrowed portion 111 in the arrangement cross section CS41.

According to the present embodiment, the reduction rate of the measurement flow path 32 by the front narrowed portion 111 is larger than the reduction rate of the measurement flow path 32 by the back narrowed portion 112. Thus, the regulation effect of the front narrowed portion 111 can be enhanced more than the regulation effect of the back narrowed portion 112 in the configuration in which the regulation effect of the front narrowed portion 111 has been improved by positioning of the molded upstream surface 55c upstream of the front narrowed portion 111 in the arrangement cross section CS41. Moreover, it is possible to realize a configuration in which foreign matter such as dust contained in the air flowing toward the flow rate sensor 22 is more likely to enter between the sensor support 51 and the back narrowed portion 112 than between the sensor support 51 and the front narrowed portion 111.

According to the present embodiment, the flow rate sensor 22 is arranged according to a position in the measurement flow path 32 where the flow velocity is the largest. Thus, decrease in velocity and volume of the air flow along the flow rate sensor 22 can be reduced in the configuration in which the regulation effect of the front narrowed portion 111 has been improved by positioning of the molded upstream surface 55c upstream of the front narrowed portion 111 in the arrangement cross section CS41.

According to the present embodiment, a portion of the molded upstream surface 55c of the sensor support 51 that is located on the arrangement cross section CS41 is included in the upstream curved path 406. Thus, even if turbulence of air flow generates in the upstream curved path 406, this turbulence can be reduced by the narrowed portions 111, 112 in the configuration in which the regulation effect of the front narrowed portion 111 has been improved by positioning of the molded upstream surface 55c upstream of the front narrowed portion 111 in the arrangement cross section CS41.

According to the present embodiment, the opening area of the measurement outlet 36 is smaller than the opening area of the measurement inlet 35. Since the measurement outlet 36 is narrower than the measurement inlet 35 in this way, it is possible to realize a configuration in which the entire measurement flow path 32 is narrowed toward the measurement outlet 36. Thus, the regulation effect can be further enhanced in the entire measurement flow path 32 in the configuration in which the regulation effect of the front narrowed portion 111 has been improved by positioning of the molded upstream surface 55c upstream of the front narrowed portion 111 in the arrangement cross section CS41.

According to the present embodiment, the opening area of the through outlet 34 is smaller than the opening area of the through inlet 33. Since the through outlet 34 is narrower than the through inlet 33 in this way, it is possible to realize a configuration in which the entire through flow path 31 is narrowed toward the measurement inlet 35 or the through outlet 34. Thus, the regulation effect can be further enhanced in the entire through flow path 31 in the configuration in which the regulation effect of the front narrowed portion 111 has been improved by positioning of the molded upstream surface 55c upstream of the front narrowed portion 111 in the arrangement cross section CS41.

<Description of Configuration Group H>

As shown in FIG. 3, the housing 21 includes the flange holes 611, 612. The flange holes 611, 612 are provided in the flange 27 and are through holes that extend through the flange 27 in the height direction Y. The flange holes 611, 612 are provided at positions separated from each other in the width direction X and the depth direction Z. In the width direction X, the through flow path 31 is arranged between the flange holes 611, 612. The flange holes 611, 612 include a first flange hole 611 provided between the connector 28 and the through flow path 31 in the width direction X, and a second flange hole 612 facing the first flange hole 611 across the through flow path 31 in the width direction X.

A flange hole line CL61 is defined as a linear imaginary line passing through a center CO61 of the first flange hole 611 and a center CO62 of the second flange hole 612. This flange hole line CL61 overlaps the through inlet 33 of the through flow path 31. In other words, the through inlet 33 is provided between the first flange hole 611 and the second flange hole 612 in a plan view of the air flow meter 20 from above in the housing basal end direction. Center lines of the screws inserted into the flange holes 611, 612 extend in the height direction Y and pass through the centers CO61, CO62 of the flange holes 611, 612.

When the housing 21 is fixed to the pipe bosses 14d with the screws, the center lines of the screws may deviate from the centers CO61, CO62 of the flange holes 611, 612 due to the position shifts of the screws with respect to the flange holes 611, 612. In this case, the housing 21 may be displaced in the width direction X and the depth direction Z from the screws as axes. However, a portion of the housing 21 that overlaps the flange hole line CL61 in plan view is difficult to be displaced in the width direction X and the depth direction Z as compared with other portions of the housing 21. As described above, since a part of the through inlet 33 overlaps the flange hole line CL61 in the plan view, the through inlet 33 is unlikely to be displaced in the intake passage 12. Thus, a production error is unlikely to occur in position of the through inlet 33 in the intake passage 12, and it is possible to prevent ease of air flowing into the through inlet 33 in the intake passage 12 from varying from product to product. As a result, an accuracy in measurement of the flow rate by the air flow meter 20 can be enhanced.

The through inlet 33 is preferably arranged at or close to the center of the intake passage 12 in the directions X, Y orthogonal to the depth direction Z. This is because the center of the intake passage 12 is the position where the flow rate and the flow velocity are most likely to be large and the air flow is most likely to be stable.

The flange holes 611, 612 are not provided with metal bushes. In this configuration, the screws is likely to directly contact portions of the flange 27 defining the flange holes 611, 612. The flange holes 611, 612 may be provided with metal bushes. In this configuration, the screws is more likely to contact the bushes than the portions of the flange 27 defining the flange holes 611, 612.

Figure 28:
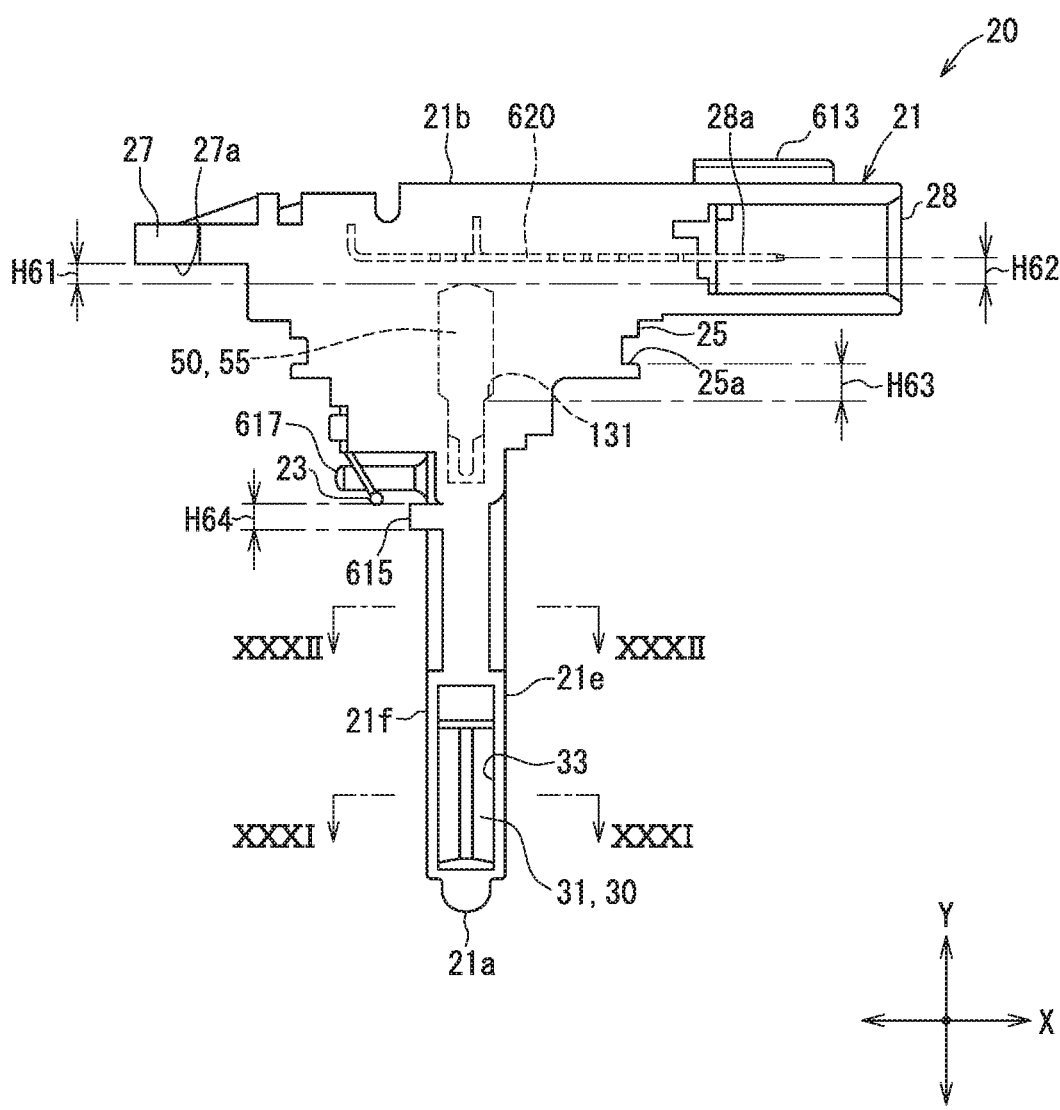
FIG. 28 is a schematic front diagram of an air flow meter according to a configuration group H.

As shown in FIG. 28, the housing 21 includes a connector guide 613. The connector guide 613 is provided on an outer surface of the connector 28 and extends in an opening direction of the connector 28. The connector guide 613 guides a position of the plug relative to the connector 28 when the plug is attached to the connector 28, and guides an insertion direction of the plug. The connector guide 613 is provided, for example, in a portion of the connector 28 that forms the housing basal end surface 21b, and projects most in the housing basal end direction in the housing 21.

The angle setting surface 27a of the flange 27 is provided at a position shifted from the molded portion 55 of the sensor SA 50 in the housing basal end direction along the height direction Y. According to this configuration, even if the flange 27 is deformed due to the angle setting surface 27a being engaged with the pipe boss 14d, unintentional change in position of the molded portion 55 due to the deformation of the flange 27 is unlikely to occur. Therefore, unintentional change of the flow rate sensor 22 in the measurement flow path 32 can be reduced.

The connector terminal 28a of the connector 28 is provided at a position shifted from the molded portion 55 of the sensor SA 50 in the housing basal end direction along the height direction Y. According to this configuration, even if the connector terminal 28a is deformed due to the plug being connected with the connector terminal 28a at the time of attaching the plug to the connector 28, unintentional change in position of the molded portion 55 due to the deformation of the connector terminal 28a is unlikely to occur.

The connector terminal 28a is provided at a position shifted from the angle setting surface 27a in the housing basal end direction along the height direction Y. In this case, a distance H62 between the connector terminal 28a and the molded portion 55 in the height direction Y is larger than a distance H61 between the angle setting surface 27a and the molded portion 55 in the height direction Y. The connector terminal 28a may not be provided at the position shifted from the angle setting surface 27a in the housing basal end direction.

The holding groove 25a of the seal holder 25 is provided at a position shifted from the housing partition 131 of the housing 21 in the housing basal end direction. According to this configuration, even if the holding groove 25a is deformed due to the seal member 26 contacting both the inner surface of the holding groove 25a and the inner surface of the pipe flange 14c, unintentional deformation of the housing partition 131 due to the deformation of the holding groove 25a is unlikely to occur. Therefore, unintentional stop of partitioning by the housing partition 131 between the SA container space 150 and the measurement flow path 32 can be reduced.

The housing 21 includes an end protection protrusion 615, an upstream protection protrusion 616, and a downstream protection protrusion 617. All of these protection protrusions 615 to 617 are protrusions provided on the housing back surface 21f. The end protection protrusion 615 is provided at a position shifted from the intake air temperature sensor 23 in the housing distal end direction along the height direction Y. The end protection protrusion 615 does not project more than the intake air temperature sensor 23 projects in the housing back direction along the width direction X. The upstream protection protrusion 616 is provided at a position shifted from the intake air temperature sensor 23 in the housing upstream direction along the depth direction Z. The downstream protection protrusion 617 is provided at a position shifted from the intake air temperature sensor 23 in the housing downstream direction along the depth direction Z. The upstream protection protrusion 616 and the downstream protection protrusion 617 project more than the intake air temperature sensor 23 in the housing back direction along the width direction X. The intake air temperature sensor 23 faces the upstream protection protrusion 616 and the downstream protection protrusion 617 in the housing basal end direction along the height direction Y.

In the height direction Y, a distance H63 between the holding groove 25a and the housing partition 131 is larger than a distance H64 between an end of the end protection protrusion 615 facing in the housing distal end direction and the intake air temperature sensor 23. Further, the distance H63 is larger than any of the distances H61, H62, and H64.

Figure 29:
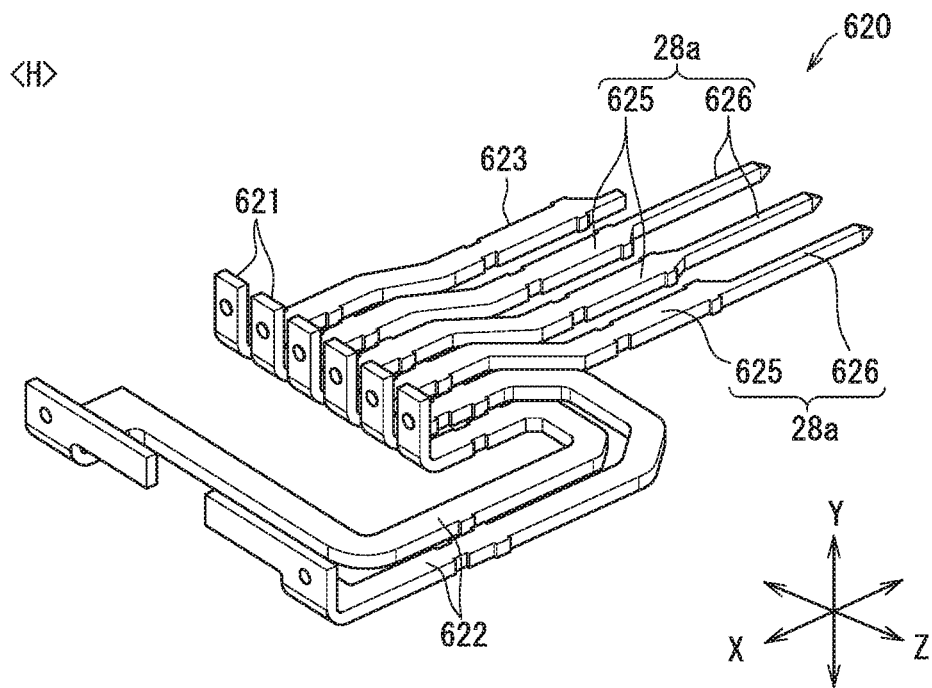
FIG. 29 is a perspective view of a connection terminal.
Figure 30:
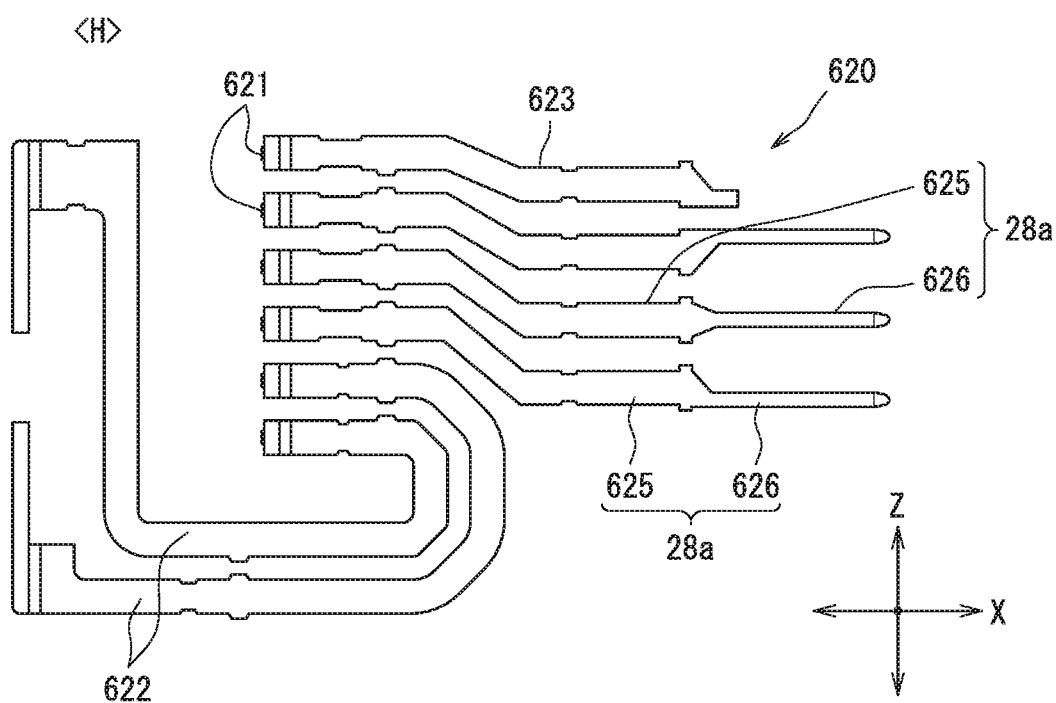
FIG. 30 is a top view of the connection terminal.

A connection terminal 620 having the connector terminal 28a is attached to the housing 21. As shown in FIGS. 29 and 30, the connection terminal 620 includes a lead connection terminal 621, an intake temperature connection terminal 622, and an adjustment connection terminal 623 in addition to the connector terminal 28a. Multiple lead connection terminals 621 are provided to the connection terminal 620 and extend in the height direction Y. The lead connection terminals 621 include a terminal connected to the connector terminal 28a, a terminal connected to the intake temperature connection terminal 622, and a terminal connected to the adjustment connection terminal 623.

The connector terminal 28a, the intake temperature connection terminal 622 and the adjustment connection terminal 623 extend from the lead connection terminals 621 in the directions X, Z orthogonal to the height direction Y. The intake temperature connection terminal 622 is a terminal electrically connected to the lead wire 23a of the intake air temperature sensor 23. A free end of the intake temperature connection terminal 622 is bent and extends in the height direction Y similar to the lead connection terminals 621. The direction in which the bent end of the intake temperature connection terminal 622 extends is the same as the direction in which the lead connection terminals 621 extend. Therefore, the intake temperature connection terminal 622 and the lead connection terminals 621 can be formed by simply bending a base material of the connection terminal 620 in the same direction. The adjustment connection terminal 623 is a terminal for adjusting an output signal or the like from the connector terminal 28a, for example, when the air flow meter 20 is manufactured.

The connector terminal 28a includes a connector base portion 625 and a connector connection portion 626. The connector base portion 625 is a portion of the connector terminal 28a extending from the lead connection terminal 621 and forms a basal end portion of the connector terminal 28a. The connector connection portion 626 is a portion of the connector terminal 28a extending from the connector base portion 625 and forms a distal end portion of the connector terminal 28a. While the connector base portion 625 and the connector connection portion 626 have the same thickness in the height direction Y, the connector base portion 625 is larger in width in the depth direction Z than the connector connection portion 626. That is, the connector base portion 625 is thicker than the connector connection portion 626.

In this embodiment, three connector terminals 28a are provided, and these connector terminals 28a are parallel to each other and arranged in the depth direction Z. In one of the three connector terminals 28a which is arranged in the middle of them, the connector connection portion 626 extends from a central position of the connector base portion 625 in the depth direction Z. In another of the three connector terminals 28a which is arranged in one end of them, the connector connection portion 626 extends from an edge portion of the connector base portion 625 that faces in a direction away from the adjacent connector terminal 28a. In this connector terminal 28a, the connector base portion 625 protrudes from the connector connection portion 626 toward the adjacent connector terminal 28a. In another of the three connector terminals 28a which is arranged in another end of them, the connector connection portion 626 extends from an edge portion of the connector base portion 625 that faces in a direction away from the adjacent connector terminal 28a.

A width of the connection terminal 620 in the depth direction Z is defined by the intake temperature connection terminal 622. The connection terminal 620 has two intake temperature connection terminals 622, and these connection terminals 620 are arranged in the depth direction Z. The connection terminal 620 has six lead connection terminals 621, and these lead connection terminals 621 are arranged in the depth direction Z. The intake temperature connection terminal 622 and the lead connection terminal 621 are arranged in the width direction X. A width of an area where the two intake temperature connection terminals 622 arranged is larger in the depth direction Z than a width of an area where the six lead connection terminals 621 are arranged. In this case, the area where the six lead connection terminals 621 are arranged is smaller than and does not depart from, in the depth direction Z, the area where the two intake temperature connection terminals 622 are arranged.

Figure 32:
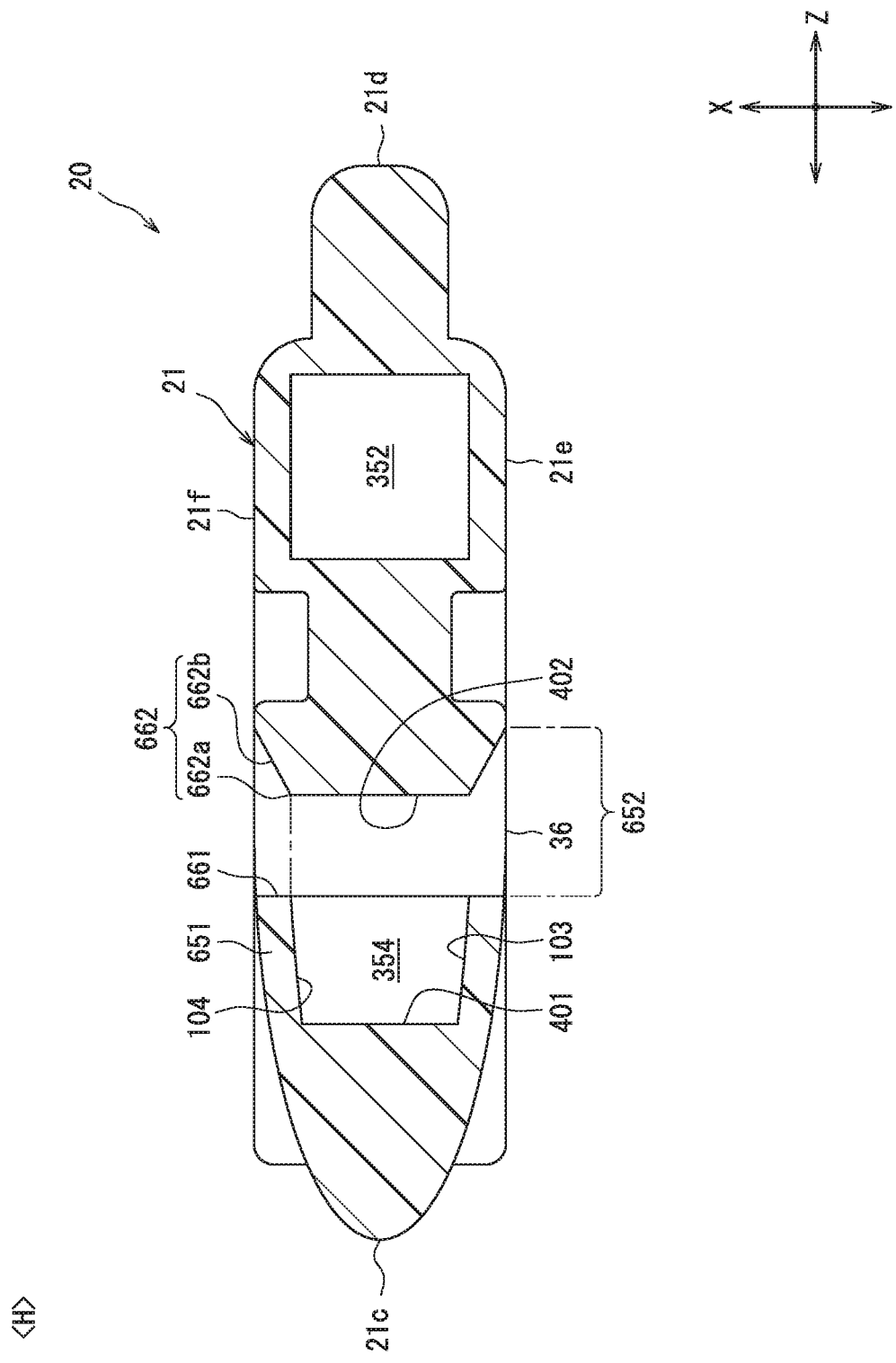
FIG. 32 is a cross-sectional view taken along a line XXXII-XXXII of FIG. 28.

As shown in FIG. 32, the inner surface of the housing 21 includes a front through wall surface 631 and a back through wall surface 632 in addition to a through ceiling surface 341 and the through floor surface 345 as formation surfaces that form the through flow path 31. The front through wall surface 631 and the back through wall surface 632 are a pair of wall surfaces that face each other across the through ceiling surface 341 and the through floor surface 345, and connect the through ceiling surface 341 and the through floor surface 345. The front through wall surface 631 extends from the front measurement wall surface 103 in the housing distal end direction, and the back through wall surface 632 extends from the back measurement wall surface 104 in the housing distal end direction.

The inner surface of the housing 21 includes a front through narrowing surface 635 and a back through narrowing surface 636. The front through narrowing surface 635 is included in the front through wall surface 631, and the back through narrowing surface 636 is included in the back through wall surface 632. These through narrowing surfaces 635, 636 gradually narrow the through flow path 31 so that the cross-sectional area of the through flow path 31 gradually decreases in a direction from the through inlet 33 toward the through outlet 34. The through narrowing surfaces 635, 636 are provided between the measurement inlet 35 and the through outlet 34 in the through flow path 31. The through narrowing surfaces 635, 636 connect an outlet ceiling surface 343 and the through floor surface 345, and gradually reduce a distance in the width direction X between the front through wall surface 631 and the back through wall surface 632 in a direction from the measurement inlet 35 toward the through outlet 34. The through narrowing surfaces 635, 636 are inclined with respect to the depth direction Z in which the center line of the through flow path 31 extends, and both the through narrowing surfaces 635, 636 face toward the through inlet 33.

The inner surface of the housing 21 includes a front narrowing peak 637 and a back narrowing peak 638. The front narrowing peak 637 is included in the front through wall surface 631 and is a surface connecting the front through narrowing surface 635 and the through outlet 34. The back narrowing peak 638 is included in the back through wall surface 632 and is a surface connecting the back through narrowing surface 636 and the through outlet 34. These narrowing peaks 637, 638 extend in the depth direction Z parallel with the center line of the through flow path 31 and face each other.

As shown in FIG. 32, the housing 21 includes a housing outer wall 651. The housing outer wall 651 forms the outer surface of the housing 21 and is a tubular portion extending in the height direction Y. The outer surface of the housing outer wall 651 forms a housing upstream surface 21c, a housing downstream surface 21d, a housing front surface 21e, and a housing back surface 21f. The housing front surface 21e and the housing back surface 21f include a flat surface extending straight in the depth direction Z and an inclined surface that is inclined with respect to the flat surface so as to face in the housing upstream direction. The measurement outlet 36 is provided on each of the housing front surface 21e and the housing back surface 21f and at a position extending in the depth direction Z across a boundary between the flat surface and the inclined surface.

The housing outer wall 651 is provided with a measurement hole 652. The measurement hole 652 is provided on each of the housing front surface 21e and the housing back surface 21f, and the outer ends of these measurement holes 652 define the measurement outlets 36, respectively. The measurement hole 652 extends in the width direction X from the measurement outlet 36. The measurement hole 652 facing in the housing front direction is between and connects the measurement outlet 36 provided on the housing front surface 21e and the front measurement wall surface 103. The measurement hole 652 facing in the housing back direction is between and connects the measurement outlet 36 provided on the housing back surface 21f and the back measurement wall surface 104.

An inner surface of the measurement hole 652 includes an upstream forming surface 661 and a downstream forming surface 662. The upstream forming surface 661 faces in the housing downstream direction and forms an upstream edge of the measurement hole 652 in the housing upstream direction. The downstream forming surface 662 faces in the housing upstream direction and forms a downstream edge of the measurement hole 652 in the housing downstream direction. The upstream forming surface 661 and the downstream forming surface 662 are between and connect the measurement outlet 36 and the measurement wall surfaces 103, 104 in the width direction X.

The downstream forming surface 662 has a downstream inclined surface 662a and a downstream facing surface 662b. The downstream inclined surface 662a extends in a direction inclined with respect to the width direction X, and extends in the height direction Y while facing obliquely outward. The downstream facing surface 662b extends in the width direction X, and is parallel to and faces the upstream forming surface 661. A width of the downstream inclined surface 662a in the width direction X is smaller than a width of the upstream forming surface 661 in the width direction X. On the other hand, the width of the downstream inclined surface 662a in the width direction X is larger than a width of the downstream facing surface 662b in the width direction X.

In the measurement hole 652, since the downstream inclined surface 662a of the downstream forming surface 662 faces obliquely outward, the air flowing out of the measurement outlet 36 flows obliquely along the downstream inclined surface 662a in the housing downstream direction in the measurement flow path 32. In this case, the air flowing out from the measurement outlet 36 flows obliquely with respect to the width direction X in the in the housing downstream direction. Therefore, the air easily joins with air flowing in the intake passage 12 in the main flow direction. Therefore, for example, the turbulence of the airflow is less likely to occur around the measurement outlet 36 as compared with a case where the air flows out from the measurement outlet 36 in the width direction X.

Second Embodiment

In the first embodiment, the housing opening 151a communicating with the SA container space 150 is provided to the first housing part 151 and faces in the housing basal end direction. On the other hand, in the second embodiment, a base opening 291a communicating with an SA container space 290 is provided on a base member 291 so as to face in the housing front direction. In the present embodiment, an air flow meter 200 is included in the combustion system 10 instead of the air flow meter 20 as a physical quantity measurement device. In the present embodiment, components denoted by the same reference numerals as those in the drawings according to the first embodiment and the configurations not described are the same as those in the first embodiment, and have the same operation and effects. In the present embodiment, differences from the first embodiment will be mainly described.

Figure 33:
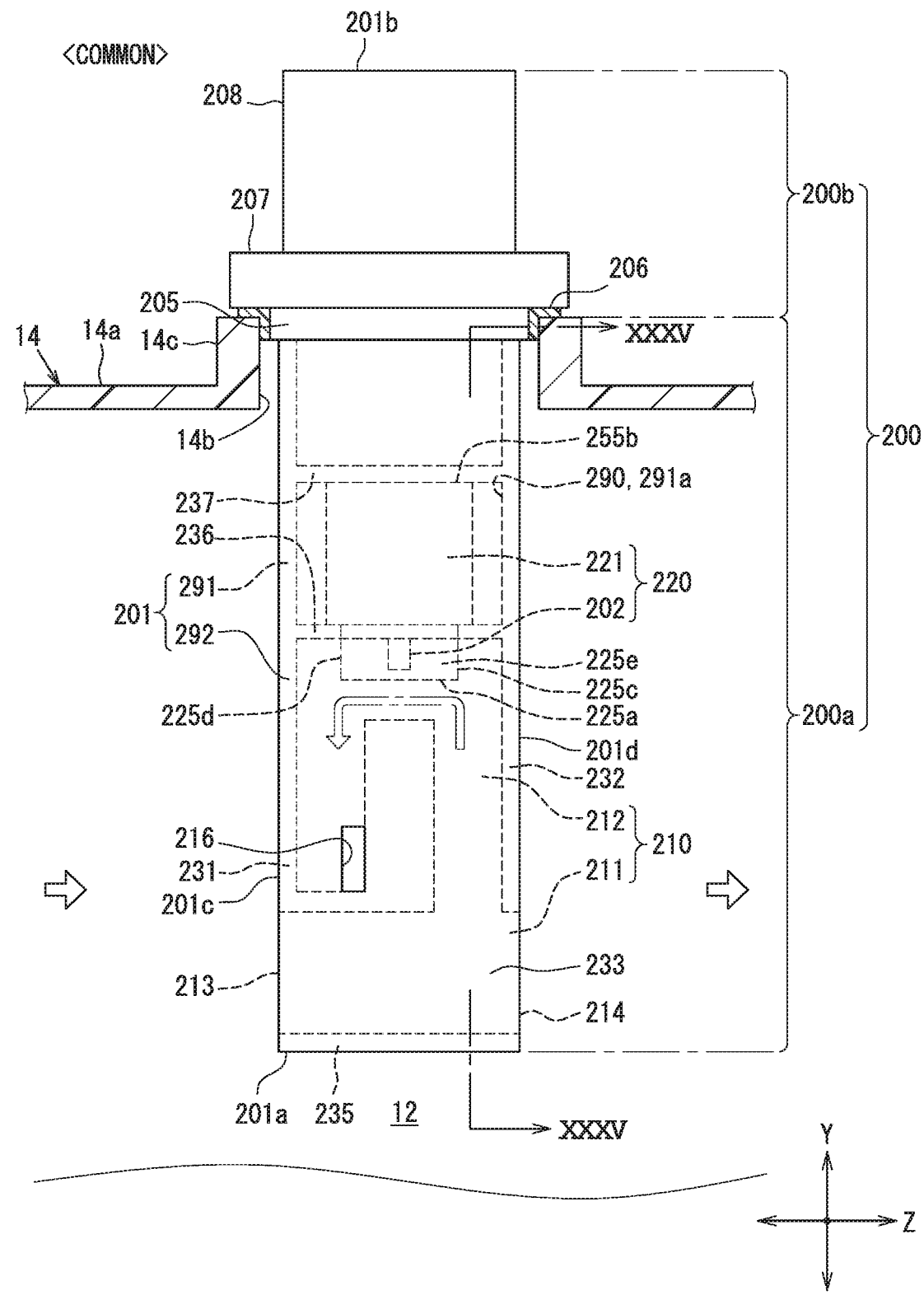
FIG. 33 is a side view of an air flow meter in a state of being attached to an intake pipe according to a second embodiment.
Figure 34:
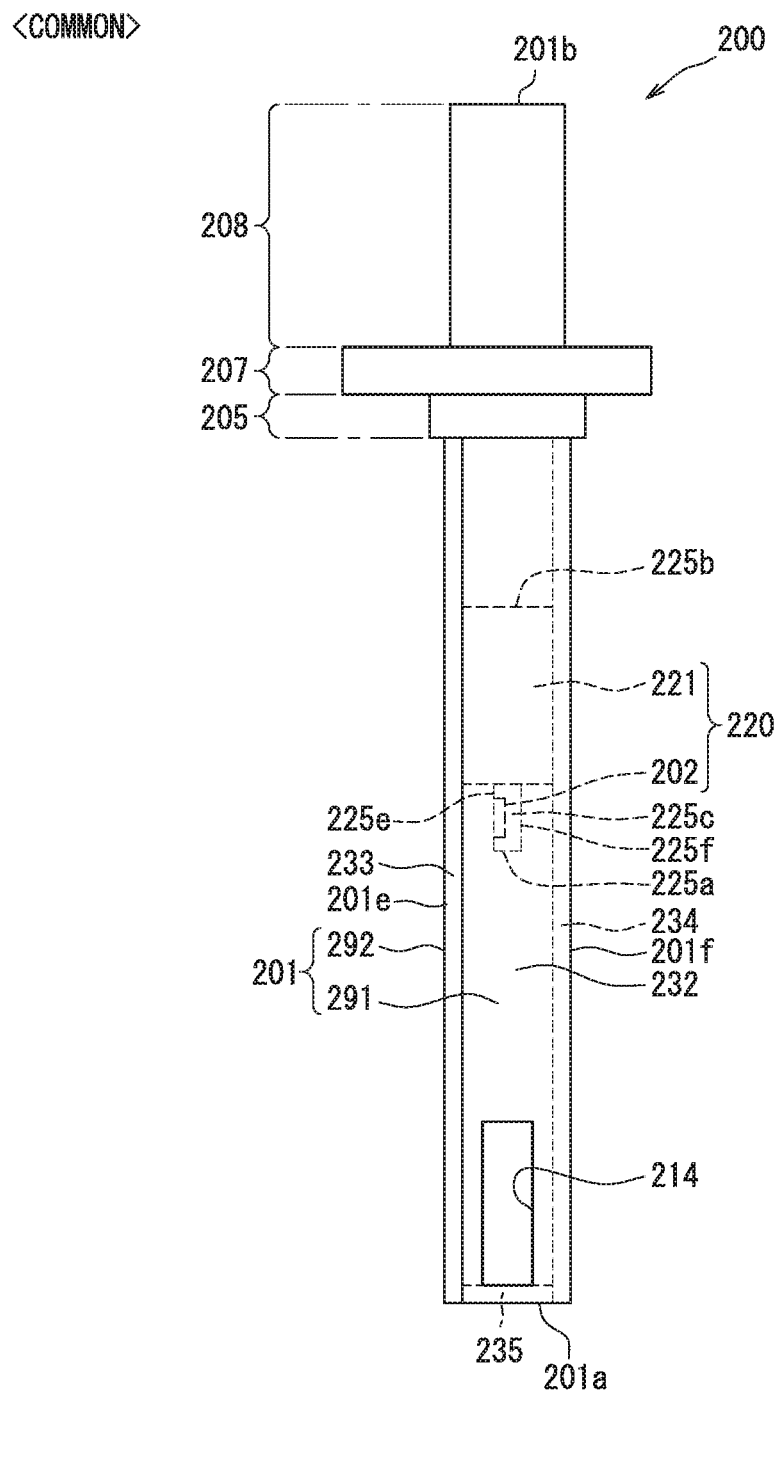
FIG. 34 is a front view of the air flow meter.

As shown in FIGS. 33 and 34, the air flow meter 200 is provided in the intake passage 12. The air flow meter 200 is a physical quantity measurement device that measures a physical quantity, similar to the air flow meter 20 of the first embodiment, and is attached to the piping unit 14 (refer to FIGS. 2 and 8).

The air flow meter 200 includes an inward portion 200a positioned in the intake passage 12 and an outward portion 200b located outward of the pipe flange 14c without being in the intake passage 12. The inward portion 200a and the outward portion 200b are arranged in the height direction Y.

The air flow meter 200 includes a housing 201, and a flow rate sensor 202 for detecting a flow rate of an intake air. The housing 201 is made of, for example, a resin material. The flow rate sensor 202 is accommodated in the housing 201. The housing 201 of the air flow meter 200 is attached to the intake pipe 14a such that the flow rate sensor 202 can come in contact with the intake air flowing through the intake passage 12.

The housing 21 is attached to the piping unit 14 as an attachment object. An outer surface of the housing 201 includes a pair of end surfaces 201a and 201b opposite in the height direction Y. One of the pair of end surfaces 201a and 201b included in the inward portion 200a is referred to as a housing distal end surface 201a, and another included in the outward portion 200b is referred to as a housing basal end surface 201b. The housing distal end surface 201a and the housing basal end surface 201b are orthogonal to the height direction Y.

A surface of the outer surface of the housing 201 facing upstream in the intake passage 12 is referred to as a housing upstream surface 201c, and a surface of the outer surface of the housing 201 opposite the housing upstream surface 201c is referred to as a housing downstream surface 201d. In addition, one of a pair of opposite surfaces of the housing 201 opposite each other along the housing upstream surface 201c and the housing basal end surface 201b is referred to as a housing front surface 201e, and the other is referred to as a housing back surface 201f. The housing front surface 201e and a surface of a sensor SA 220 on which the flow rate sensor 202 is provided face in the same direction.

Regarding the housing 201, a direction in which the housing distal end surface 201a faces in the height direction Y is referred to as a housing distal end direction, and a direction in which the housing basal end surface 201b faces in the height direction Y is referred to as a housing basal end direction. Further, a direction in which the housing upstream surface 201c faces in the depth direction Z is referred to as a housing upstream direction, and a direction in which the housing downstream surface 201d faces in the depth direction Z is referred to as a housing downstream direction. Further, a direction in which the housing front surface 201e faces in the width direction X is referred to as a housing front direction, and a direction in which the housing back surface 201f faces in the width direction X is referred to as a housing back direction.

Figure 35:
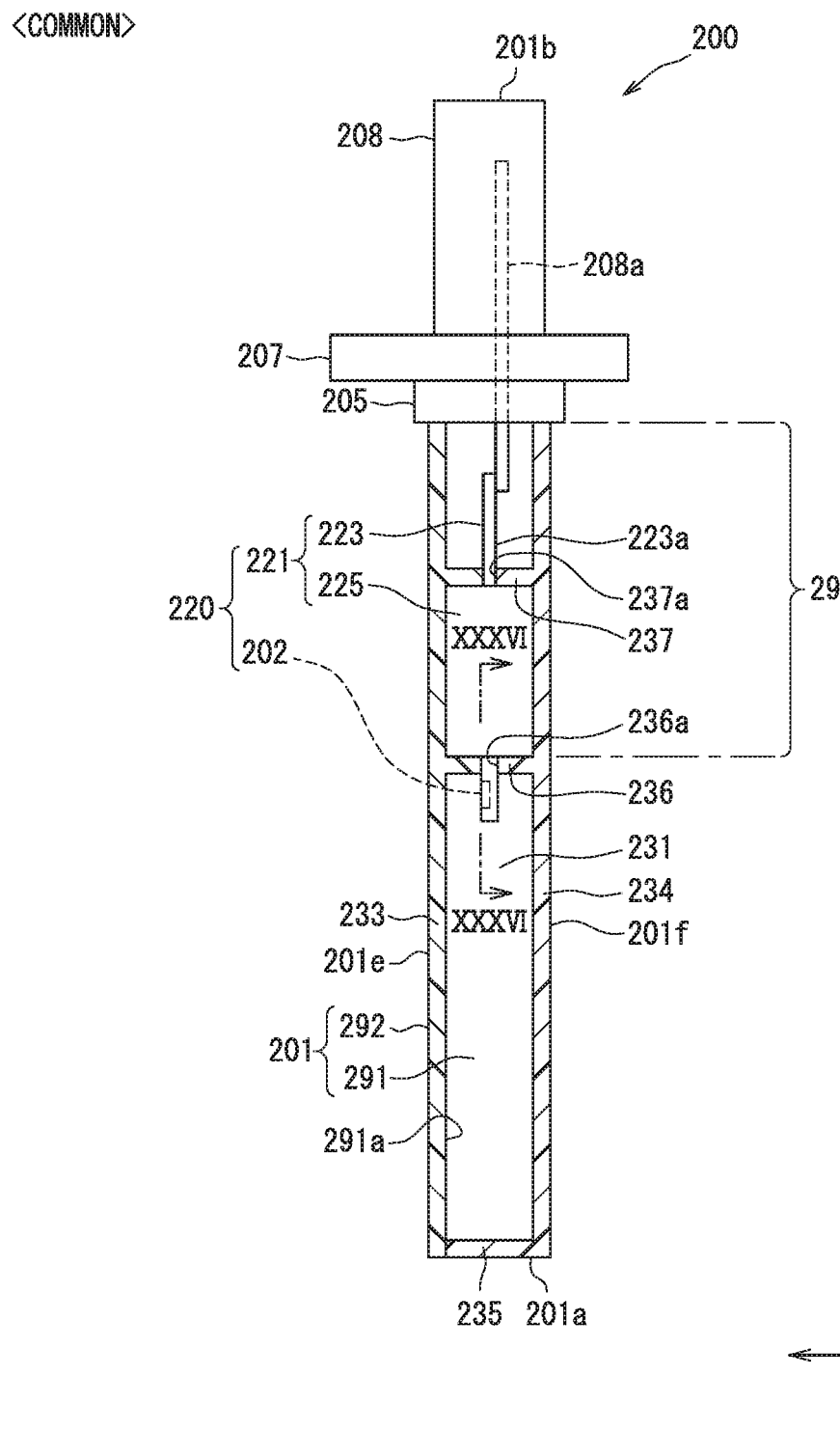
FIG. 35 is a cross-sectional view taken along a line XXXV-XXXV of FIG. 33.

As shown in FIGS. 33, 34 and 35, the housing 201 includes a seal holder 205, a flange 207 and a connector 208. The air flow meter 200 includes a seal member 206, and the seal member 206 is attached to the seal holder 205.

The seal holder 205 is provided inside the pipe flange 14c and holds the seal member 206 so as not to be displaced in the height direction Y. The seal holder 205 is included in the inward portion 200a of the air flow meter 200. The seal member 206 is a member such as an O-ring that is inside the pipe flange 14c and seals the intake passage 12. The seal member 206 is in tight contact with both an outer peripheral surface of the seal holder 205 and an inner peripheral surface of the pipe flange 14c. The connector 208 is a protection portion for protecting a connector terminal 208a electrically connected to the flow rate sensor 202. The connector terminal 208a is electrically connected to the ECU 15. More specifically, an electrical wiring extending from the ECU 15 is connected to the connector 208 via a plug. For example, the connector terminal 208a is electrically and mechanically connected to a plug terminal of the plug. The flange 207 and the connector 208 are included in the outward portion 200b of the air flow meter 200.

The housing 201 includes a bypass flow path 210. The bypass flow path 210 is provided inside the housing 201. The bypass flow path 210 includes at least a part of an internal space of the housing 201. An inner surface of the housing 201 is a forming surface and forms the bypass flow path 210.

The bypass flow path 210 is disposed in the inward portion 200a of the air flow meter 200. The bypass flow path 210 includes a through flow path 211 and a measurement flow path 212. The flow rate sensor 202 and its surrounding portions of the sensor SA 220, which will be described later, are in the measurement flow path 212. The through flow path 211 is formed by the inner surface of the housing 201. The measurement flow path 212 is formed by the inner surface of the housing 201 and the outer surface of a part of the sensor SA 220. The intake passage 12 may be referred to as a main passage, and the bypass flow path 210 may be referred to as a sub-passage.

The through flow path 211 penetrates through the housing 201 in the depth direction Z. The through flow path 211 includes a through inlet 213 that is an upstream end part of the through flow path 211, and a through outlet 214 that is a downstream end part of the through flow path 211. The measurement flow path 212 is a branch flow path branched from an intermediate part of the through flow path 211. The flow rate sensor 202 is provided in the measurement flow path 212. The measurement flow path 212 has a measurement inlet 215 which is an upstream end part of the measurement flow path 212, and a measurement outlet 216 which is a downstream end part of the measurement flow path 212. A boundary between the through flow path 211 and the measurement flow path 212 is a portion where the measurement flow path 212 branches from the through flow path 211. The measurement inlet 215 is included in the boundary. The boundary between the through flow path 211 and the measurement flow path 212 may also be referred to as a flow path boundary.

The measurement flow path 212 extends from the through flow path 211 in the housing basal end direction. The measurement flow path 212 is provided between the through flow path 211 and the housing basal end surface 201b. The measurement flow path 212 is curved so that a portion between the measurement inlet 215 and the measurement outlet 216 bulges in the housing basal end direction. The measurement flow path 212 includes an arched portion that curves continuously, a bent portion that bends in a stepwise manner, and a portion that extends straight in the height direction Y or the depth direction Z.

The air flow meter 200 has a sensor sub-assembly including the flow rate sensor 202, and the sensor sub-assembly is referred to as the sensor SA 220. The sensor SA 220 is embedded in the housing 201 while a part of the sensor SA 220 extending into the measurement flow path 212. In the air flow meter 200, the sensor SA 220 and the bypass flow path 210 are arranged in the height direction Y. More specifically, the sensor SA 220 and the through flow path 211 are arranged in the height direction Y. The sensor SA 220 corresponds to a detection unit. The sensor SA 220 may also be referred to as a measurement unit or a sensor package.

The housing 201 includes an upstream wall 231, a downstream wall 232, a front wall 233, a back wall 234, and an end wall 235. The upstream wall 231 forms the housing upstream surface 201c, and the downstream wall 232 forms the housing downstream surface 201d. The front wall 233 forms the housing front surface 201e, and the back wall 234 forms the housing back surface 201f. The upstream wall 231 and the downstream wall 232 are provided at positions separated from each other in the depth direction Z. The front wall 233 and the back wall 234 are provided at positions separated from each other in the width direction X. The measurement flow path 212 and the SA container space 290 described later are provided between the upstream wall 231 and the downstream wall 232 and between the front wall 233 and the back wall 234. The end wall 235 forms the housing distal end surface 201a of the housing, and is provided at a position separated from the seal holder 205 in the height direction Y.

The housing 201 includes a first intermediate wall 236 and a second intermediate wall 237. The intermediate walls 236, 237 have plate shapes extending in the directions X and Z orthogonal to the height direction Y, similarly to the end wall 235. The intermediate walls 236, 237 are provided between the end wall 235 and the seal holder 205 in the height direction Y. The first intermediate wall 236 is provided between the end wall 235 and the second intermediate wall 237. The bypass flow path 210 is provided between the first intermediate wall 236 and the end wall 235. The first intermediate wall 236 is provided between the measurement flow path 212 and the SA container space 290. The first intermediate wall 236 separates the measurement flow path 212 from the SA container space 290 in the height direction Y. The second intermediate wall 237 is provided between the first intermediate wall 236 and the seal holder 205. The second intermediate wall 237 partitions the SA container space 290 in the height direction Y.

The first intermediate wall 236 is provided with a first intermediate hole 236a. The first intermediate hole 236a penetrates through the first intermediate wall 236 in the height direction Y. An inner peripheral surface of the first intermediate wall 236 is included in the inner surface of the housing 201 and extends annularly along a circumferential edge of the first intermediate hole 236a. A portion of the sensor SA 220 provided with the flow rate sensor 202 penetrates through the first intermediate hole 236a in the height direction Y. As a result, in the sensor SA 220, the molded distal end surface 225a and the flow rate sensor 202 are disposed in the measurement flow path 212, and the molded basal end surface 225b is disposed in the SA container space 290.

The second intermediate wall 237 is provided with a second intermediate hole 237a. The second intermediate hole 237a penetrates through the second intermediate wall 237 in the height direction Y. A lead terminal 223a of the sensor SA 220 described later penetrates through the second intermediate hole 237a in the height direction Y. As a result, in the sensor SA 220, a molded portion 225 described later is arranged at a position shifted from the second intermediate wall 237 in the housing distal end direction, and at least an end of the lead terminal 223a is arranged at a position shifted from the second intermediate wall 237 in the housing basal end direction.

In the SA container space 290, a filler portion (not shown) is filled in a gap between the housing 201 and the sensor SA 220. The filler portion is formed of a thermosetting resin such as an epoxy resin, a urethane resin, or a silicon resin. The SA container space 290 is filled by potting with molten resin that is the thermosetting resin in a melted state, and the molten resin is solidified as the potting resin to form the filler portion. The filler portion can also be called a potting portion or a potting resin portion.

<Description of Configuration Group A>

The sensor SA 220 includes a sensor support 221 in addition to the flow rate sensor 202. The sensor support 221 is attached to the housing 201 and supports the flow rate sensor 202. The sensor support 221 includes an SA substrate 223 and the molded portion 225. The SA substrate 223 is a substrate on which the flow rate sensor 202 is mounted. The molded portion 225 covers at least a part of the flow rate sensor 202 and at least a part of the SA substrate 223. The SA substrate 223 may also be called a lead frame.

The molded portion 225 is formed in a plate shape as a whole. The molded portion 225 includes a pair of end surfaces 225a and 225b opposite in the height direction Y. One of the pair of end surfaces 225a and 225b facing in the housing distal end direction is referred to as a molded distal end surface 225a, and the other facing in the housing basal end direction is referred to as a molded basal end surface 225b. The molded distal end surface 225a is an end part of the molded portion 225 and an end part of the sensor support 221, and corresponds to a support end. The molded portion 225 corresponds to a protective resin.

The molded portion 225 includes a pair of surfaces 225c, 225d facing each other across the molded distal end surface 225a and the molded basal end surface 225b. One of the pair of surfaces 225c, 225d is referred to as a molded upstream surface 225c, and the other is referred to as a molded downstream surface 225d. The sensor SA 220 is arranged inside the housing 201. The molded distal end surface 225a faces in a direction toward a tip end of the air flow meter 200. The molded upstream surface 225c is arranged upstream of the molded downstream surface 225d in the measurement flow path 212.

The molded upstream surface 225c of the sensor SA 220 is arranged upstream of the molded downstream surface 225d in the measurement flow path 212. A flow direction of air in a part of the measurement flow path 212 where the flow rate sensor 202 is disposed is opposite to a flow direction of air in the intake passage 12 (see FIG. 8). Therefore, the molded upstream surface 225c is arranged downstream of the molded downstream surface 225d in the intake passage 12. The air flowing along the flow rate sensor 202 flows in the depth direction Z, and this depth direction Z may also be referred to as a flow direction.

In the sensor SA 220, the flow rate sensor 202 is exposed on one side of the sensor SA 220. The molded portion 225 includes a plate surface referred to as a molded front surface 225e on the same side as the flow rate sensor 202 being exposed, and a plate surface referred to as a molded back surface 225f opposite the molded front surface 225e. One of the plate surfaces of the sensor SA 220 is formed by the molded front surface 225e. The molded front surface 225e corresponds to a support front surface, and the molded back surface 225f corresponds to a support back surface.

The SA substrate 223 is formed of a metal material or the like in a plate shape as a whole, and is a conductive substrate. A plate surface of the SA substrate 223 is orthogonal to the width direction X and extends in the height direction Y and the depth direction Z. The flow rate sensor 202 is mounted on the SA substrate 223. The SA substrate 223 forms a lead terminal 223a connected to the connector terminal 208a. The SA substrate 223 has a part covered by the molded portion 225 and a part not covered by the molded portion 225, and the part not covered is the lead terminal 223a. The lead terminal 223a projects in the height direction Y from the molded basal end surface 225b. In FIGS. 33 and 34, illustration of the lead terminal 223a is omitted.

The flow rate sensor 202 has a similar configuration to the flow rate sensor 22 of the first embodiment. The flow rate sensor 202 includes portions and members corresponding to, for example, the sensor recess portion 61 of the flow rate sensor 22, the membrane portion 62, the sensor substrate 65, the sensor film 66, the heating resistor 71, the temperature measuring resistors 72, 73, the indirectly heated resistor 74, and the wires 75 to 77.

<Description of Configuration Group B>

As shown in FIGS. 33 and 34, the housing 201 includes an SA container space 290. The SA container space 290 is provided at a position shifted from the bypass flow path 210 in the housing basal end direction. The SA container space 290 houses a part of the sensor SA 220. At least the molded basal end surface 225b of the sensor SA 220 is housed in the SA container space 290. The measurement flow path 212 and the SA container space 290 are arranged in the height direction Y. The sensor SA 220 is positioned to extend in the height direction Y across a boundary between the measurement flow path 212 and the SA container space 290. At least the molded distal end surface 225a and the flow rate sensor 202 of the sensor SA 220 are housed in the measurement flow path 212. The SA container space 290 corresponds to a container space.

Figure 36:
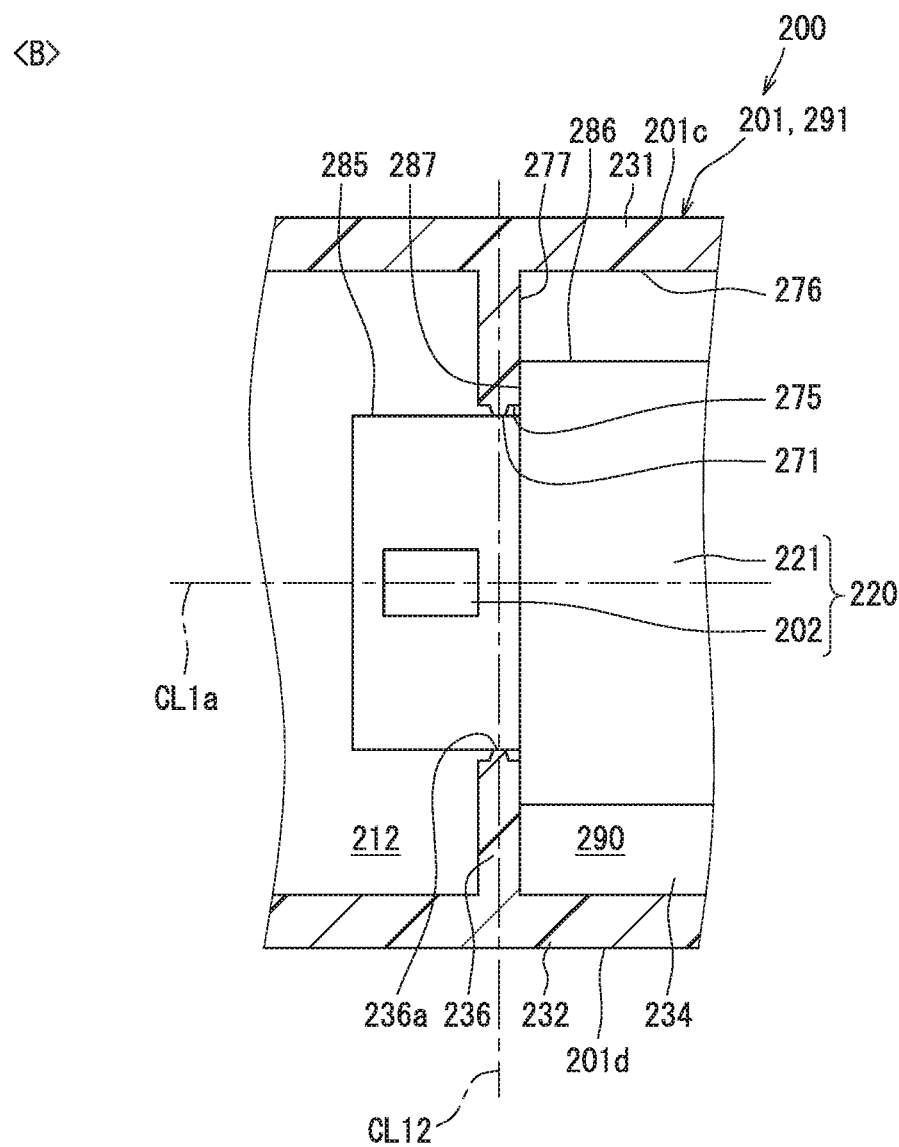
FIG. 36 is a cross-sectional view taken along a line XXXVI-XXXVI line of FIG. 35 according to a configuration group B.
Figure 37:
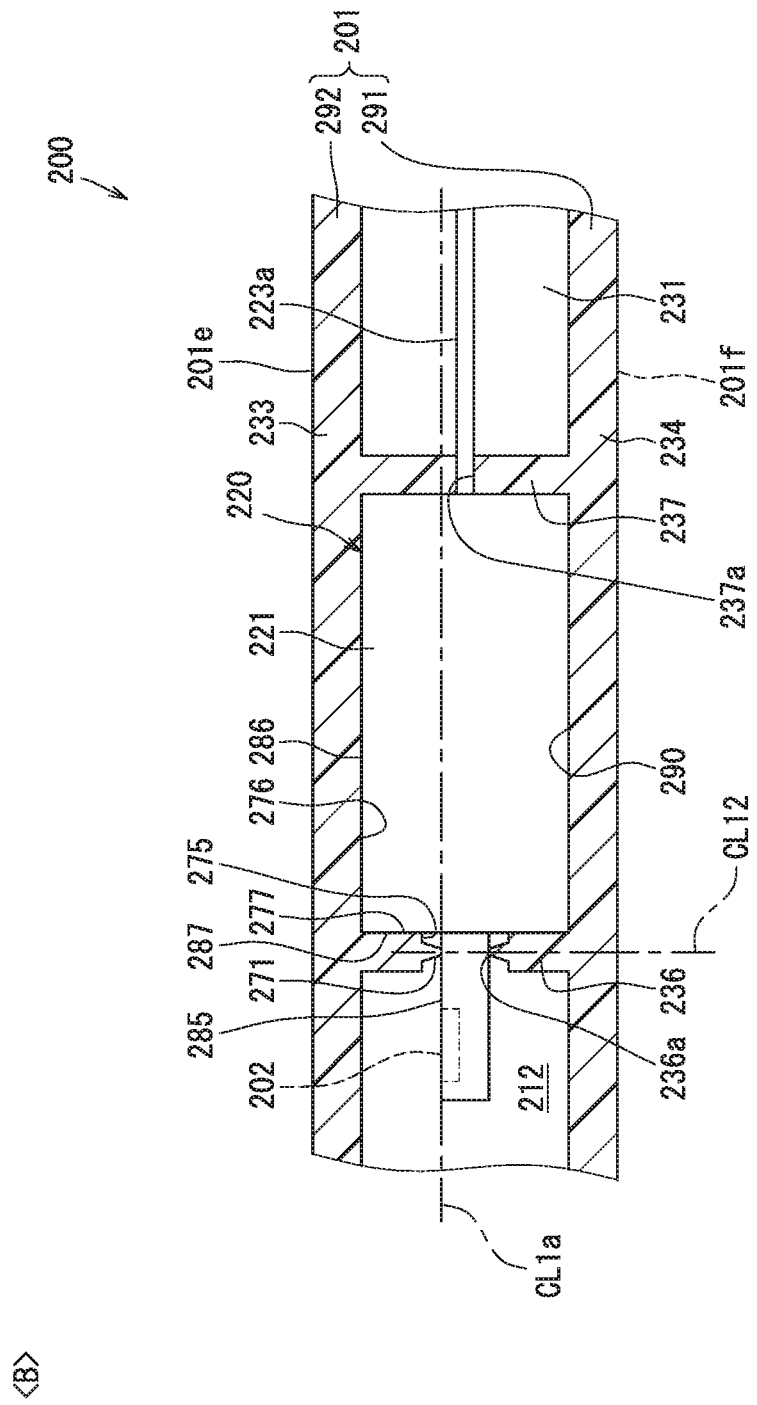
FIG. 37 is an enlarged view around a sensor SA of FIG. 35.

As shown in FIGS. 36 and 37, the housing 201 includes a housing partition 271. The housing partition 271 is a protrusion provided on the inner peripheral surface of the first intermediate wall 236, and projects from the first intermediate wall 236 toward the sensor SA 220. A tip end of the housing partition 271 is in contact with the outer surface of the sensor SA 220. The housing partition 271 is between the outer surface of the sensor SA 220 and the inner surface of the housing 201 and separates the SA container space 290 from the measurement flow path 212.

The inner surface of the housing 201 includes a housing flow path surface 275, a housing container surface 276, and a housing step surface 277. The housing flow path surface 275, the housing container surface 276, and the housing step surface 277 extend in a direction intersecting the height direction Y. Each of the surfaces 275, 276, 277 extends to make a loop around the sensor SA 220. In the sensor SA 220, similar to the first embodiment, the center line CL1a of the heating resistor linearly extends in the height direction Y. The housing flow path surface 275, the housing container surface 276, and the housing step surface 277 extend in a circumferential direction around the center line.

The housing step surface 277 is a wall surface of the first intermediate wall 236 facing in housing basal end direction. The housing step surface 277 faces in the housing basal end direction along the height direction Y. The housing step surface 277 is inclined with respect to the center line CL1a. The housing step surface 277 faces inward in a radial direction, i.e. in a direction toward the center line CL1a. The housing step surface 277 intersects the height direction Y and corresponds to a housing intersecting surface. In the present embodiment, the housing step surface 277 is orthogonal to the center line CL1a. On the inner surface of the housing 201, an external corner between the housing flow path surface 275 and the housing step surface 277 and an internal corner between the housing container surface 276 and the housing step surface 277 are chamfered.

The housing flow path surface 275 is an inner peripheral surface of the first intermediate wall 236. The housing flow path surface 275 forms the measurement flow path 212. The housing flow path surface 275 extends from an inner peripheral edge of the housing step surface 277 in the housing distal end direction. The housing flow path surface 275 extends from the housing step surface 277 in a direction away from the SA container space 290.

On the other hand, the housing container surface 276 is inner surfaces of the upstream wall 231, the downstream wall 232, the front wall 233, and the back wall 234. The housing container surface 276 forms the SA container space 290. The housing container surface 276 extends from an outer peripheral edge of the housing step surface 277 in the housing basal end direction. The housing container surface 276 extends from the housing step surface 277 in a direction away from the measurement flow path 212. The housing step surface 277 is provided between the housing flow path surface 275 and the housing container surface 276, and forms a step on the inner surface of the housing 201. The housing step surface 277 connects the housing flow path surface 275 and the housing container surface 276.

An outer surface of the molded portion 225 forms the outer surface of the sensor SA 220. The outer surface of the sensor SA 220 includes an SA flow path surface 285, an SA container surface 286, and an SA step surface 287. The SA flow path surface 285, the SA container surface 286, and the SA step surface 287 extend in a direction intersecting the height direction Y. Each of the surfaces 285, 286, 287 extends to make a loop on the outer surface of the sensor SA 220. The SA flow path surface 285, the SA container surface 286, and the SA step surface 287 extend in the circumferential direction around the center line CL1a of the heating resistor.

In the sensor SA 220, the SA step surface 287 is provided between the molded distal end surface 225a and the molded basal end surface 225b. The SA step surface 287 faces toward the molded distal end surface 225a in the height direction Y. The SA step surface 287 is inclined with respect to the center line CL1a. The SA step surface 287 faces outward in a radial direction, i.e. in a direction away from the center line CL1a. The SA step surface 287 intersects the height direction Y and corresponds to a unit intersecting surface. Further, the SA flow path surface 285 corresponds to a unit flow path surface, and the SA container surface 286 corresponds to a unit container surface. In the present embodiment, the SA step surface 287 is orthogonal to the center line CL1a. On the outer surface of the sensor SA 220, an internal corner between the SA flow path surface 285 and the SA step surface 287 and an external corner between the SA container surface 286 and the SA step surface 287 are chamfered.

The SA flow path surface 285 forms the measurement flow path 212. The SA flow path surface 285 extends from an inner peripheral edge of the SA step surface 287 in the molding distal end direction along the height direction Y. The SA flow path surface 285 extends from the SA step surface 287 in a direction away from the SA container space 290. On the other hand, the SA container surface 286 forms the SA container space 290. The SA container surface 286 extends from an outer peripheral edge of the SA step surface 287 in the molding basal end direction. The SA container surface 286 extends from the SA step surface 287 in a direction away from the measurement flow path 212. The SA step surface 287 is provided between the SA flow path surface 285 and the SA container surface 286, and forms a step on the outer surface of the sensor SA 220. The SA step surface 287 connects the SA flow path surface 285 and the SA container surface 286.

In the sensor SA 220, the molded upstream surface 225c, the molded downstream surface 225d, the molded front surface 225e, and the molded back surface 225f form the SA flow path surface 285, the SA container surface 286, and the SA step surface 287.

In the air flow meter 200, the housing step surface 277 facing in the housing basal end direction and the SA step surface 287 facing in the housing distal end direction face each other. Further, the housing flow path surface 275 facing radially inward and the SA flow path surface 285 facing radially outward face each other. Similarly, the housing container surface 276 facing radially inward and the SA container surface 286 facing radially outward face each other.

The housing partition 271 of the present embodiment is not provided on the housing step surface 277 as in the first embodiment, but is provided on the housing flow path surface 275. In this case, the housing partition 271 extends toward the first intermediate hole 236a in the directions X and Z intersecting the height direction Y. A center line CL12 of the housing partition 271 extends linearly in a direction intersecting the height direction Y. In the present embodiment, the center line CL12 is orthogonal to the height direction Y. The housing partition 271, together with the housing flow path surface 275, extends to make a loop around the sensor SA 220. In this case, the tip end of the housing partition 271 forms the first intermediate hole 236a. The tip end of the housing partition 271 is the inner peripheral surface of the first intermediate hole 236a. The housing partition 271 has a portion extending in the width direction X and a portion extending in the depth direction Z. The housing partition 271 has a substantially rectangular frame shape as a whole.

The tip end of the housing partition 271 is in contact with the SA flow path surface 285 of the sensor SA 220. The housing partition 271 and the SA flow path surface 285 are in tight contact with each other, and enhance a sealing property of the part that separates the SA container space 290 from the measurement flow path 212. The SA flow path surface 285 is flat and extends straight in a direction intersecting the height direction Y. In the present embodiment, the housing flow path surface 275 and the SA flow path surface 285 extend parallel to each other. In this case, the sealing property is improved at the part where the outer surface of the sensor SA 220 and the inner surface of the housing 201 because the housing partition 271 is in contact with the SA flow path surface 285. The housing flow path surface 275 and the SA flow path surface 285 may not be parallel to each other and may be inclined from each other.

The housing partition 271 is orthogonal to the housing flow path surface 275. In this case, the center line CL12 of the housing partition 271 and the housing flow path surface 275 are orthogonal to each other. The housing partition 271 has a tapered shape. In the present embodiment, the height direction Y is a width direction of the housing partition 271. A width of the housing partition 271 in the width direction gradually decreases toward the tip end of the housing partition 271. Each of a pair of lateral surfaces of the housing partition 271 extends straight from the housing flow path surface 275. In this case, the housing partition 271 has a tapered cross section.

The housing partition 271 is provided at a center of the housing flow path surface 275 in the height direction Y. In this case, a distance between the housing partition 271 and an edge of the housing flow path surface 275 facing in the housing distal end direction is smaller than a distance between the housing partition 271 and an edge of the housing flow path surface 275 facing in the housing basal end direction. The housing partition 271 may be shifted in position on the housing flow path surface 275 in the housing distal end direction, or may be shifted in position in the housing basal end direction.

A portion of the housing step surface 277, which is between the housing flow path surface 275 and the housing partition 271, and the housing flow path surface 275 form the measurement flow path 212. A portion of the housing step surface 277, which is between the housing container surface 276 and the housing partition 271, and the housing container surface 276 form the SA container space 290.

A portion of the SA step surface 287, which is between the SA flow path surface 285 and the housing partition 271, and the SA flow path surface 285 form the measurement flow path 212. A portion of the SA step surface 287, which is between the SA container surface 286 and the housing partition 271, and the SA container surface 286 form the SA container space 290.

Figure 38:
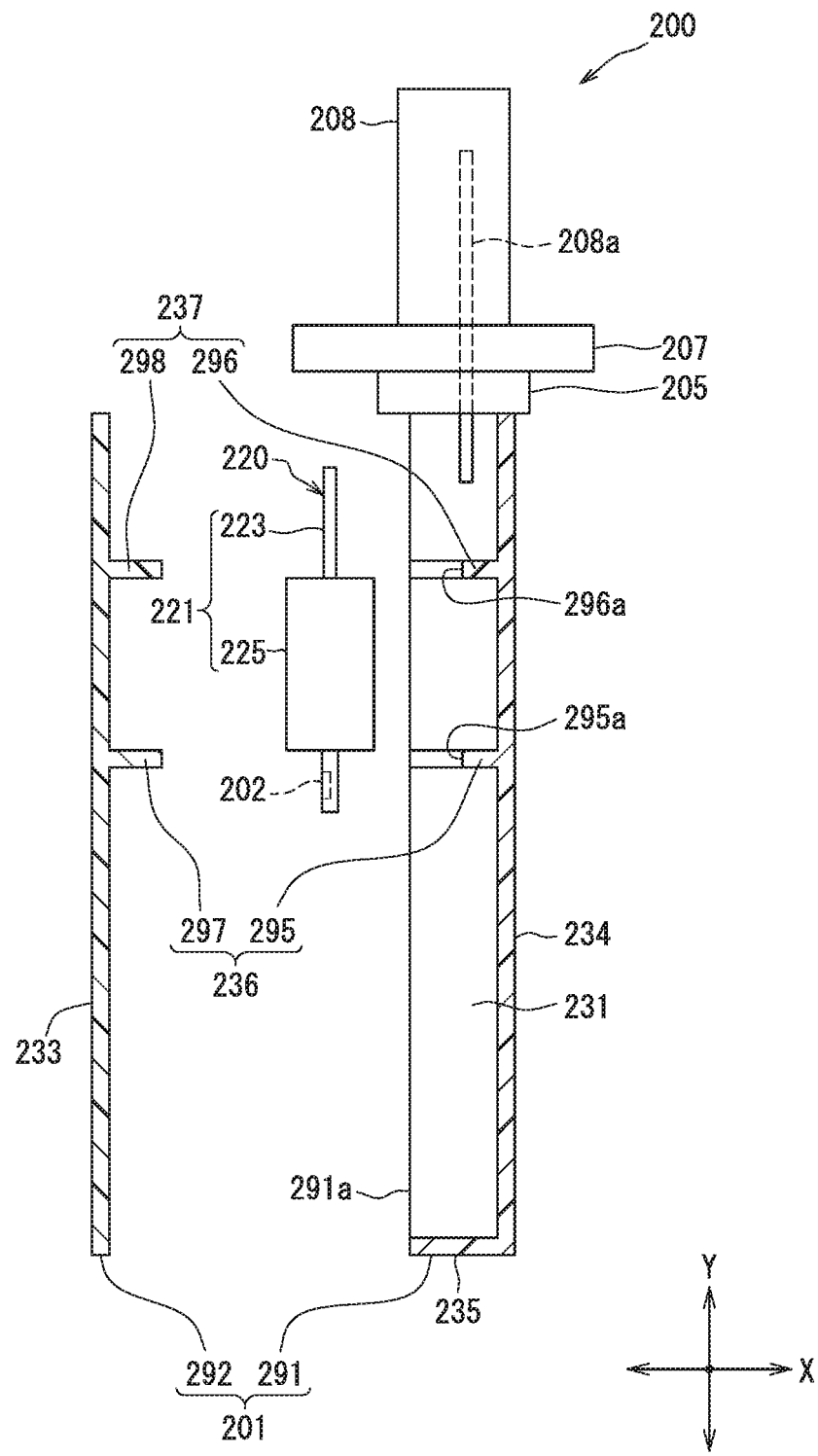
FIG. 38 is an exploded cross-sectional view of a base member, a cover member and the sensor SA in FIG. 35.

As shown in FIG. 38, the housing 201 includes a base member 291 and a cover member 292. These base member 291 and cover member 292 are assembled and integrated with each other so as to form the housing 201. The base member 291 in the housing 201 forms the upstream wall 231, the downstream wall 232, the back wall 234, the end wall 235, the seal holder 205, the flange 207, and the connector 208. The base member 291 is a box-shaped member that is open in the housing front direction as a whole. In the base member 291, the base opening 291a is provided at an open end which is a front end. The base opening 291a is defined by respective front ends of the upstream wall 231, the downstream wall 232, the end wall 235, and the seal holder 205 which are facing in the housing front direction. The bypass flow path 210 and the SA container space 290 are open in the housing front direction through the base opening 291a.

The cover member 292 forms the front wall 233 in the housing 201, and is a plate-shaped member as a whole. The cover member 292 is attached to the open end of the base member 291 and closes the base opening 291a. In the housing 201, the through flow path 211, the measurement flow path 212, and the SA container space 290 are provided between the base member 291 and the cover member 292.

In the housing 201, the first intermediate wall 236 includes a first base protrusion 295 and a first cover protrusion 297. The first base protrusion 295 is a protruding portion that protrudes from the back wall 234 of the base member 291 toward the cover member 292. The first base protrusion 295 includes a first recess 295a. The first recess 295a is a recessed portion provided on an end surface of the first base protrusion 295 and extends through the first base protrusion 295 in the height direction Y. The first cover protrusion 297 is a protruding portion that protrudes from the front wall 233 of the cover member 292 toward the base member 291. The first cover protrusion 297 is inside the first recess 295a. In the first intermediate wall 236, the end surface of the first cover protrusion 297 and a bottom surface of the first recess 295a are displaced from each other, and this displacement provides the first intermediate hole 236a.

In the housing 201, the second intermediate wall 237 includes a second base protrusion 296 and a second cover protrusion 298. The second base protrusion 296 is a protruding portion that protrudes from the back wall 234 of the base member 291 toward the cover member 292. The second base protrusion 296 includes a second recess 296a. The second recess 296a is a recessed portion provided on an end surface of the second base protrusion 296 and extends through the second base protrusion 296 in the height direction Y. The second cover protrusion 298 is a protruding portion that protrudes from the front wall 233 of the cover member 292 toward the base member 291. The second cover protrusion 298 is inside the second recess 296a. In the second intermediate wall 237, the end surface of the second cover protrusion 298 and a bottom surface of the second recess 296a are displaced from each other, and this displacement provides the second intermediate hole 237a.

The first base protrusion 295 and the second base protrusion 296 are included in the base member 291. The base protrusions 295, 296 protrude from the back wall 234 of the base member 291 toward the cover member 292. The recesses 295a, 296a are provided on the end surfaces of the base protrusions 295, 296. The first recess 295a is provided at an intermediate position on the first base protrusion 295 in the depth direction Z. The second recess 296a is provided at an intermediate position on the second base protrusion 296 in the depth direction Z.

The first cover protrusion 297 and the second cover protrusion 298 are included in the cover member 292. These cover protrusions 297, 298 protrude from the front wall 233 of the cover member 292 toward the base member 291.

The housing partition 271 includes a base protrusion 271a and a cover protrusion 271b. The base protrusion 271a is included in the base member 291. The base protrusion 271a is a protrusion provided on an inner peripheral surface of the first recess 295a in the first base protrusion 295. A part of the base protrusion 271a provided on the bottom surface of the first recess 295a extends in the width direction X toward the cover member 292. A pair of parts of the base protrusions 271a provided on a pair of wall surfaces of the first recess 295a face each other and extend in the depth direction Z. A distance between the pair of parts of the base protrusions 271a facing each other and provided on the pair of wall surfaces is slightly smaller in the depth direction Z than a width of a part of the sensor SA 220 that is inserted into the first recess 295a.

The cover protrusion 271b is included in the cover member 292. The cover protrusion 271b is a protrusion provided on the end surface of the first base protrusion 295 and extends in the width direction X toward the base member 291.

Figure 39:
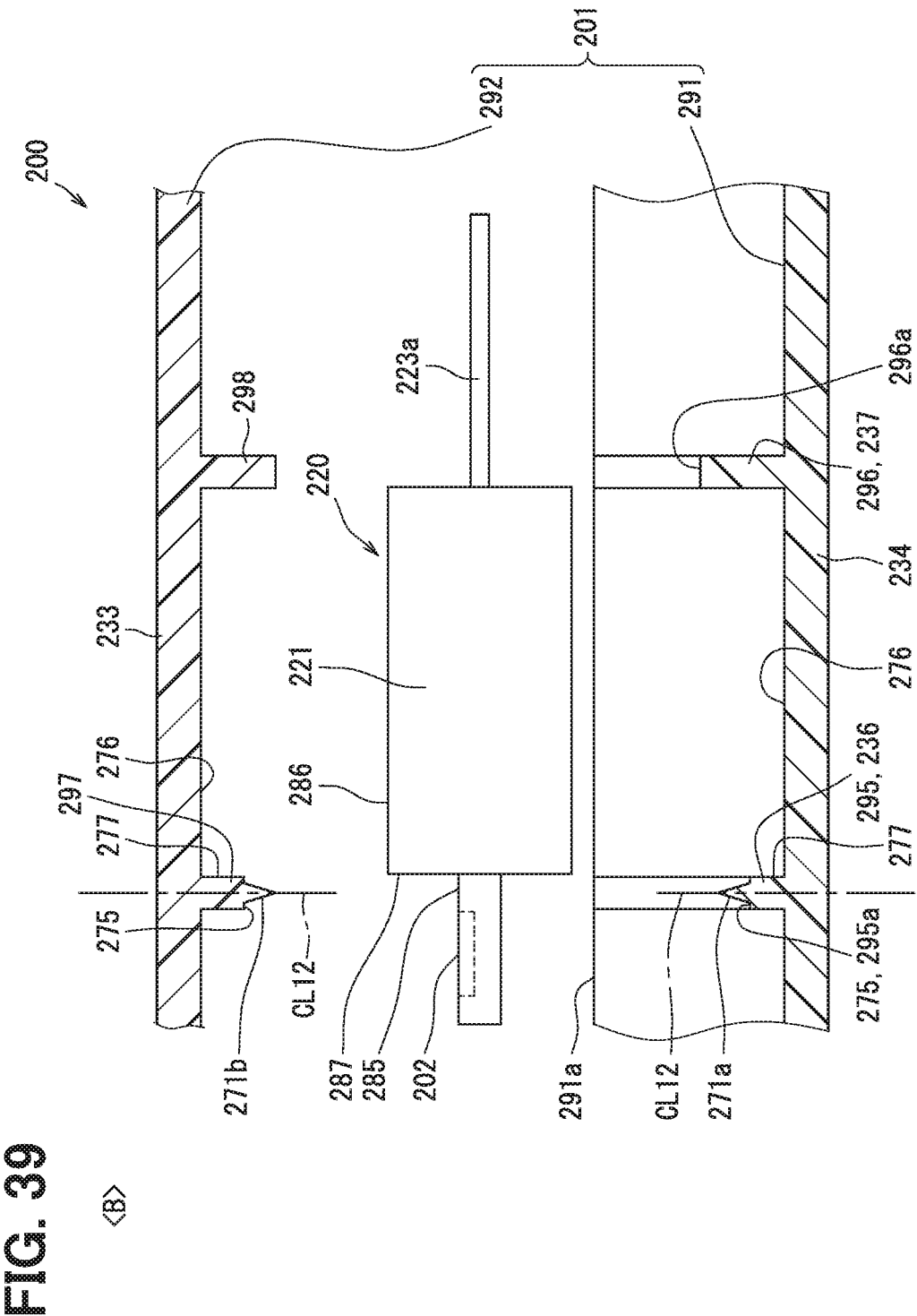
FIG. 39 is an enlarged view around a sensor SA of BH6.

Next, referring to FIGS. 38 and 39, a manufacturing method of the air flow meter 200 will be described focusing on a procedure of mounting the sensor SA 220 to the housing 201.

A manufacturing process of the air flow meter 200 includes a step of manufacturing the sensor SA 220, a step of manufacturing the base member 291, and a step of manufacturing the cover member 292. After these steps, a step of assembling the sensor SA 220, the base member 291, and the cover member 292 with each other is performed.

At the step of manufacturing the sensor SA 220, the molded portion 225 of the sensor SA 220 is manufactured by resin molding using an injection molding machine or an injection molding device provided with a mold device. At this step, similar to the step of manufacturing the molded portion 55 of the first embodiment, a molten resin obtained by melting a resin material is injected from an injection molding machine and press-fitted into the mold device. Further, at this step, an epoxy thermosetting resin such as an epoxy resin is used as the resin material for forming the molded portion 225.

At the step of manufacturing the base member 291, the base member 291 is manufactured by resin molding or the like using an injection molding device or the like. At the step of manufacturing the cover member 292, the cover member 292 is manufactured by resin molding or the like using an injection molding device or the like. At these steps, a thermoplastic resin such as polybutylene terephthalate (PBT) or polyphenylene sulfide (PPS) is used as the resin material forming the base member 291 and the cover member 292. The base member 291 and the cover member 292 formed of the thermoplastic resin as described above is softer than the molded portion 225 formed of the thermosetting resin. In other words, the base member 291 and the cover member 292 have lower hardness and higher flexibility than the molded portion 225.

At the step of assembling the sensor SA 220, the base member 291, and the cover member 292, first, in FIG. 38, the sensor SA 220 is first inserted into the base member 291 through the base opening 291a. In this work, the SA flow path surface 285 of the sensor SA 220 is inserted into the first recess 295a, and the lead terminal 223a is inserted into the second recess 296a. Accordingly, the sensor SA 220 is fixed between the first base protrusion 295 and the second base protrusion 296. After the SA flow path surface 285 of the sensor SA 220 contacts the base protrusion 271a of the first base protrusion 295, the sensor SA 220 is further pushed toward the back wall 234 into the base member 291. In this case, since the hardness of the base member 291 is lower than the hardness of the molded portion 225, the tip end of the base protrusion 271a is deformed so as to be pressed in the housing back direction and crushed by the SA flow path surface 285.

As described above, the inner peripheral surface of the first recess 295a of the base member 291 has the pair of parts of the base protrusion 271a provided on the pair of wall surfaces facing each other. In this configuration, by simply fitting the sensor SA 220 between the pair of wall surfaces, the sensor SA 220 scrapes the tip portions of the base protrusion 271a on the wall surfaces at the SA flow path surface 285, and accordingly, the base protrusion 271a on the wall surfaces is deformed. As a result, the tip portions of the base protrusion 271a are scraped and newly form end surfaces which are easily comes into contact with the SA flow path surface 285 of the sensor SA 220.

When the sensor SA 220 is pushed into the first recess 295a, the SA flow path surface 285 of the sensor SA 220 pushes the base protrusion 271a toward the back wall 234 and crushes the base protrusion 271a on the bottom surface of the inner peripheral surface of the first recess 295a. In this case, the tip portion of the base protrusion 271a on the bottom surface is deformed via crushing by the SA flow path surface 285, and the tip portion of the base protrusion 271a is crushed and newly form the end surfaces which are easily comes into contact with the SA flow path surface 285 of the sensor SA 220.

Further, as described above, the cover protrusion 271b is provided on the end surface of the first cover protrusion 297 in the cover member 292. In this configuration, when the cover member 292 is assembled to the base member 291, the cover protrusion 271b of the cover member 292 is pressed against the SA flow path surface 285 of the sensor SA 220. Therefore, the cover member 292 is pressed against the base member 291 such that the tip portion of the cover protrusion 271b of the first cover protrusion 297 is deformed via crushing by the SA flow path surface 285. In this case, the tip portion of the cover protrusion 271b is crushed and newly forms an end surface which is easily comes into contact with the SA flow path surface 285 of the sensor SA 220.

Then, a work of attaching the cover member 292 to the base member 291 is performed such that cover member 292 covers the base opening 291a and the sensor SA 220. In this work, the first cover protrusion 297 of the cover member 292 is inserted into the first recess 295a. The cover protrusion 271b on the end surface of the first cover protrusion 297 contacts the SA flow path surface 285 of the sensor SA220, and then the cover member 292 is further pressed against the sensor SA 220 toward the inside of the base member 291. In this case, since the hardness of the cover member 292 is lower than the hardness of the molded portion 225, the tip end of the cover protrusion 271b is deformed so as to be pressed in the housing front direction and crushed by the SA flow path surface 285. As a result, the end surface of the cover protrusion 271b in the crushed state is easily brought into contact with the SA flow path surface 285, and the sealing property between the cover protrusion 271b and the SA flow path surface 285 is improved.

In the above first embodiment, the crushed portion of the housing partition 131 is illustrated by the chain double-dashed line in FIG. 17. In contrast, in the present embodiment, the portions of the base protrusion 271a and the cover protrusion 271b crushed by the sensor SA 220 are not shown by chain double-dashed line.

After that, the sensor SA 220 is fixed to the base member 291 and the cover member 292 by joining portions of the sensor SA 220 that are in contact with the base member 291 and the cover member 292 with an adhesive or the like. Accordingly, integration of the base member 291 and the cover member 292 provides the housing 201. Further, in this case, the base protrusion 271a and the cover protrusion 271b form the housing partition 271.

According to the present embodiment described above, the housing partition 271 protruding from the inner surface of the housing 201 is between the sensor SA 220 and the housing 201 and separates the measurement flow path 212 from the SA container space 290. In this configuration, since the tip end of the housing partition 271 and the sensor SA 220 easily come into contact with each other, a gap is unlikely to be formed between the inner surface of the housing 201 and the outer surface of the sensor SA 220. When the molten potting resin is injected into the SA container space 290 of the housing 201 for forming the filler portion, the potting resin is prevented from entering the measurement flow path 212 through the gap between the housing 201 and the sensor SA 220.

In this case, unintentional change of the shape of the measurement flow path 212, which is caused by a solidified portion of the molten resin which has entered the measurement flow path 212 through the gap between the housing 201 and the sensor SA 220, is unlikely to occur. In addition, contact or adhesion of the solidified portion with or to the flow rate sensor 202 as a foreign matter, which is caused by peeling off of the solidified portion from the housing 201 and the sensor SA 220 in the measurement flow path 212, is also unlikely to occur. Therefore, deterioration in detection accuracy of the flow rate sensor 202 due to the molten resin which has entered the measurement flow path 212 from the SA container space 290 can be reduced. Therefore, the air flow rate detection accuracy of the flow rate sensor 202 can be increased, and as a result, the air flow rate measurement accuracy of the air flow meter 200 can be increased.

According to the present embodiment, the housing partition 271 makes a loop around the sensor SA 220. In this configuration, the housing partition 271 can create a state where the outer surface of the sensor SA 220 and the inner surface of the housing 201 are in contact with each other on an entire outer circumference of the sensor SA 220. Therefore, the housing partition 271 can enhance the sealing property in the entire boundary between the measurement flow path 212 and the SA container space 290.

In the present embodiment, the housing partition 271 is provided on the housing flow path surface 275. In this structure, the measurement flow path 212 and the SA container space 290 are partitioned by the housing partition 271 at a position as close as possible to the measurement flow path 212. Thus, a part of the gap between the housing 201 and the sensor SA 220 included in the measurement flow path 212 can be made as small as possible. Here, in the measurement flow path 212, the gap between the housing 201 and the sensor SA 220 is a region in which turbulence of airflow is likely to occur due to inflow of air flowing from the measurement inlet 215 toward the measurement outlet 216. Therefore, as the gap between the housing 201 and the sensor SA 220 is smaller, turbulence is less likely to occur in the air flow in the measurement flow path 212, and the detection accuracy of the flow rate sensor 202 is likely to be improved. Therefore, since the housing partition 271 is provided on the housing flow path surface 275, the detection accuracy of the flow rate sensor 202 can be improved.

Third Embodiment

In the above-described first embodiment, the through flow path 31 is not substantially narrowed in the height direction Y between the through inlet 33 and the measurement inlet 35. However, in a third embodiment, a through flow path 31 is narrowed in the height direction Y between a through inlet 33 and a measurement inlet 35. In the present embodiment, components denoted by the same reference numerals as those in the drawings according to the first embodiment and the configurations not described are the same as those in the first embodiment, and have the same operation and effects. In the present embodiment, differences from the first embodiment will be mainly described.

<Description of Configuration Group C>

Figure 40:
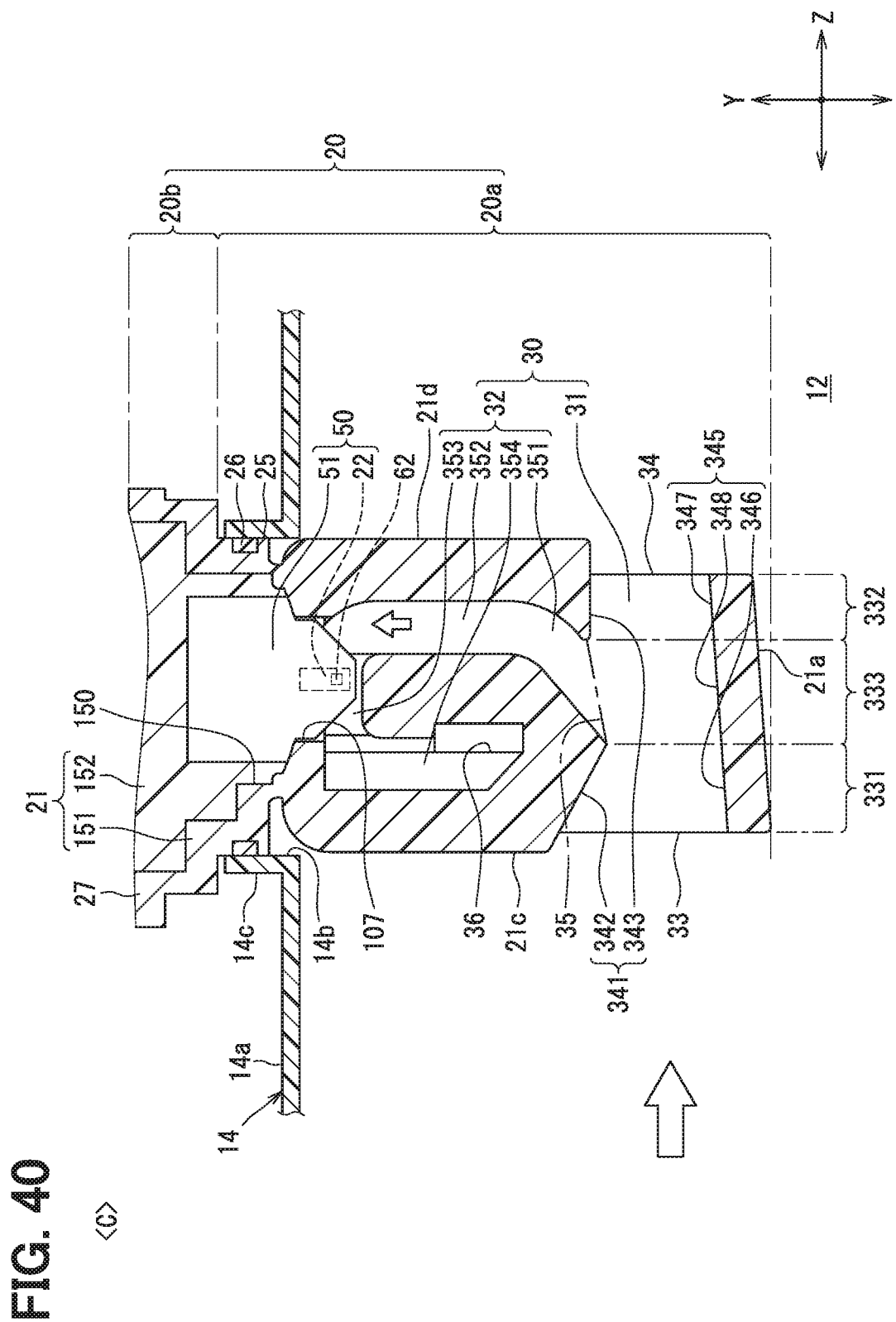
FIG. 40 is a vertical cross-sectional view of an air flow meter according to a configuration group C and a third embodiment.
Figure 41:
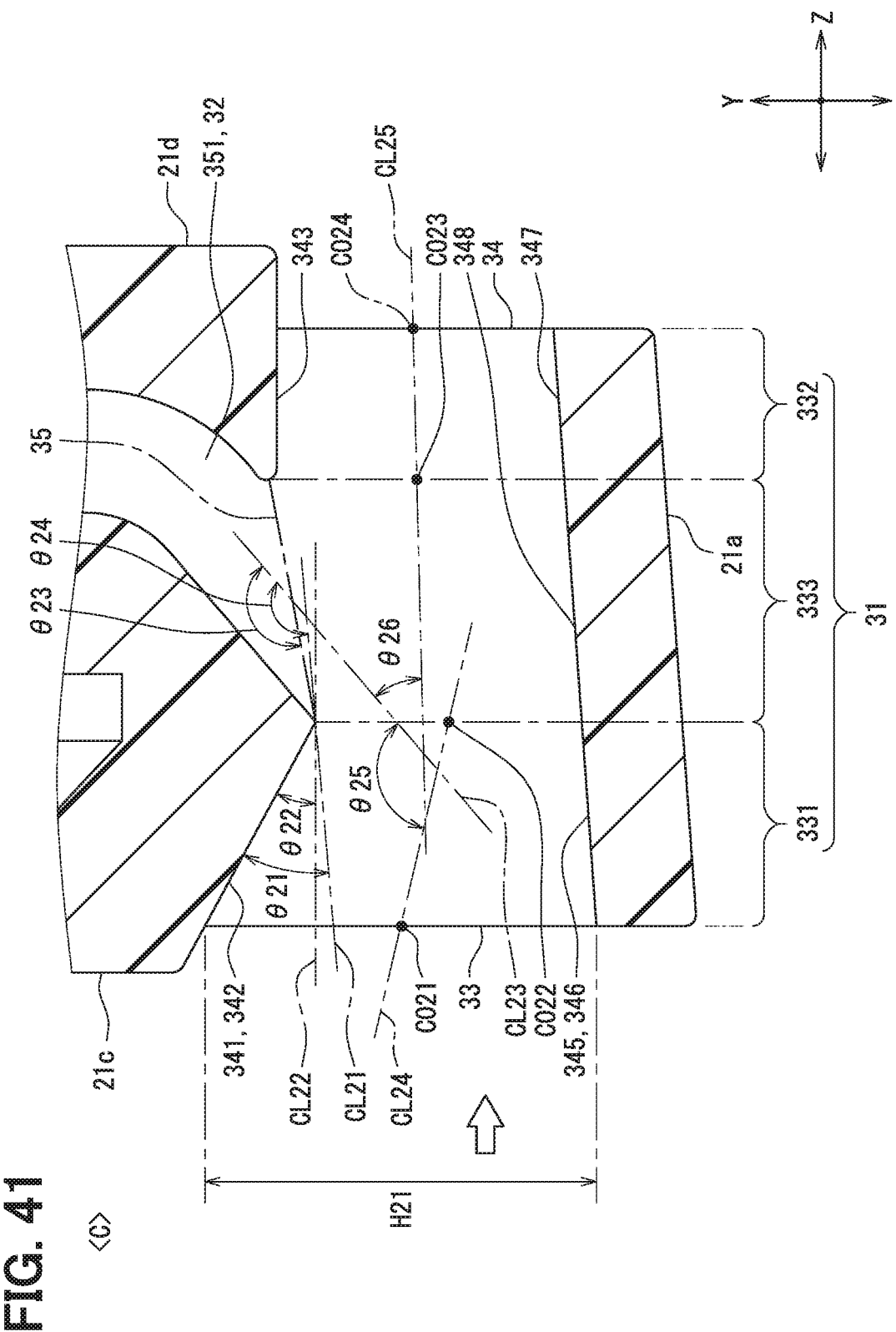
FIG. 41 is an enlarged view around a through flow path of FIG. 40.

As shown in FIGS. 40 and 41, the through flow path 31 includes an inlet through path 331, an outlet through path 332, and a branch through path 333. The inlet through path 331 extends from the through inlet 33 toward a through outlet 34 and is between and connects the through inlet 33 and an upstream end of the measurement inlet 35. The outlet through path 332 extends from the through outlet 34 toward the through inlet 33 and is between and connects the through outlet 34 and a downstream end of the measurement inlet 35. The branch through path 333 is provided between the inlet through path 331 and the outlet through path 332, and connects the inlet through path 331 and the outlet through path 332. The branch through path 333 extends in the depth direction Z along the measurement inlet 35 and is a portion of the through flow path 31 from which the measurement flow path 32 is branched. The branch through path 333 extends from the measurement inlet 35 in the housing distal end direction.

The inner surface of the housing 21 includes a through ceiling surface 341 and the through floor surface 345 as formation surfaces that form the through flow path 31. The through ceiling surface 341 and the through floor surface 345 face each other in the height direction Y, and the through flow path 31 is provided between the through ceiling surface 341 and the through floor surface 345. The through ceiling surface 341 and the through floor surface 345 are between and connect the through inlet 33 and the through outlet 34. Both the through ceiling surface 341 and the through floor surface 345 intersect the height direction Y and extend in the width direction X and the depth direction Z. A measurement outlet 36 is provided on the through ceiling surface 341.

The through ceiling surface 341 includes an inlet ceiling surface 342 and an outlet ceiling surface 343. The inlet ceiling surface 342 forms a ceiling surface of the inlet through path 331, and is between and connects the through inlet 33 and the upstream end of the measurement inlet 35 in the depth direction Z. In this case, the depth direction Z corresponds to a direction in which the through inlet 33 and the through outlet 34 are arranged. The inlet ceiling surface 342 extends straight from the through inlet 33 toward the upstream end of the measurement inlet 35. The outlet ceiling surface 343 forms a ceiling surface of the outlet through path 332, and is between and connects the through outlet 34 and the downstream end of the measurement inlet 35. The outlet ceiling surface 343 extends straight from the through outlet 34 toward the downstream end of the measurement inlet 35.

The through floor surface 345 includes an inlet floor surface 346, an outlet floor surface 347, and a branch floor surface 348. The inlet floor surface 346 forms a floor surface of the inlet through path 331, and extends from the through inlet 33 toward the through outlet 34. The inlet floor surface 346 and the inlet ceiling surface 342 face each other through the inlet through path 331 and the through inlet 33. The outlet floor surface 347 forms a floor surface of the outlet through path 332, and extends from the through outlet 34 toward the through inlet 33. The outlet floor surface 347 and the outlet ceiling surface 343 face each other through the outlet through path 332 and the through outlet 34. The branch floor surface 348 forms a floor surface of the branch through path 333. The branch floor surface 348 is provided between the inlet floor surface 346 and the outlet floor surface 347, and connects inlet floor surface 346 and the outlet floor surface 347. The branch floor surface 348 faces the measurement inlet 35 via the branch through path 333.

Figure 31:
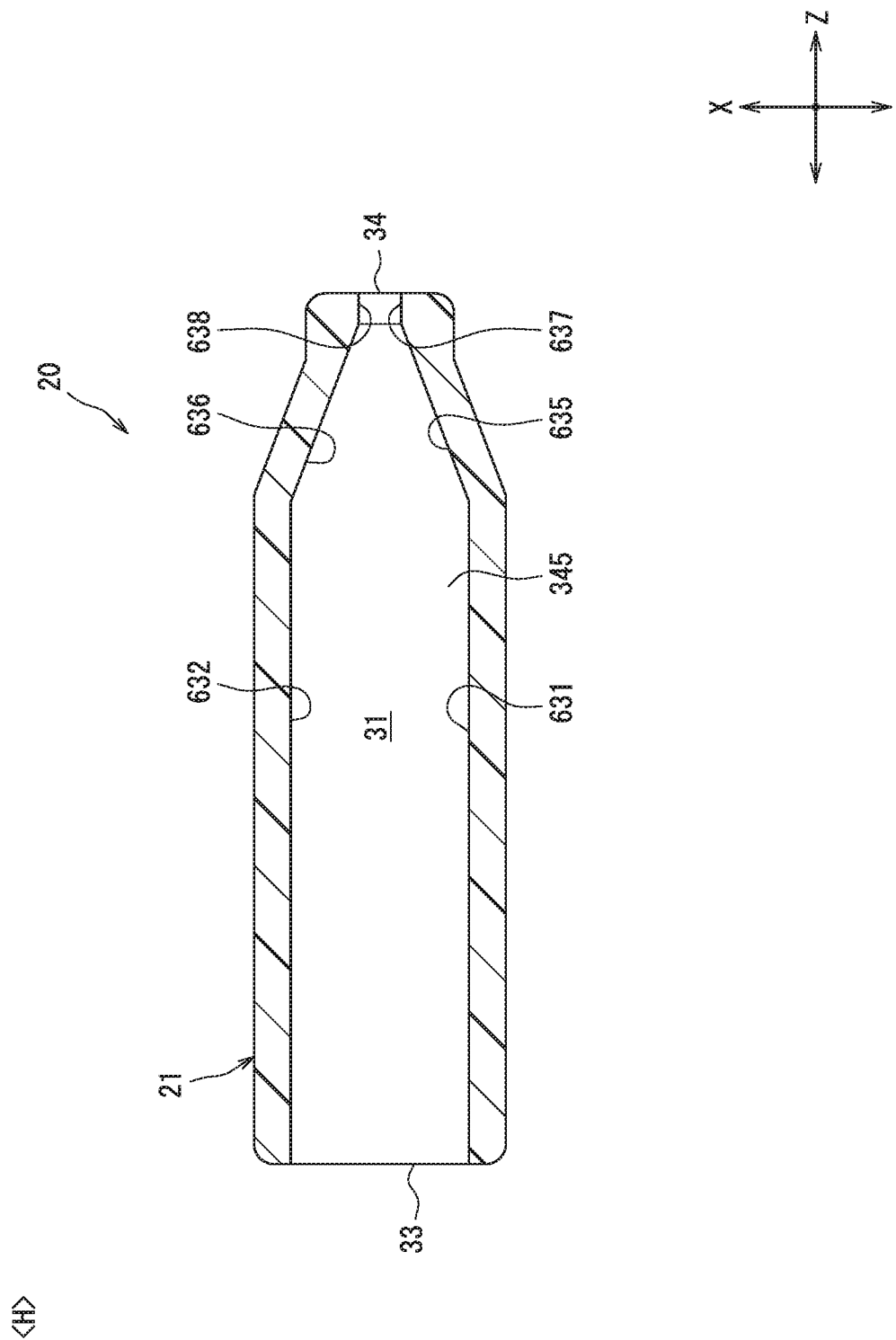
FIG. 31 is a cross-sectional view taken along a line XXXI-XXXI of FIG. 28.

The inlet ceiling surface 342 and the outlet ceiling surface 343 both extend straight in the depth direction Z and are parallel to each other. These ceiling surfaces 342, 343 both extend straight in the width direction X and are parallel to each other. The through floor surface 345 extends straight in the depth direction Z and is parallel to the ceiling surfaces 342, 343. The through floor surface 345 extends straight in the width direction X and is parallel to the ceiling surfaces 342, 343. Accordingly, the ceiling surfaces 342, 343 and the through floor surface 345 extend straight in the width direction X, and through wall surfaces 631, 632 (see FIG. 31) described later extend straight in the height direction Y. Due to these facts, the through inlet 33 and the through outlet 34 have rectangular shapes.

The inlet ceiling surface 342, the outlet ceiling surface 343, and the through floor surface 345 may be curved such that a portion between an upstream end and a downstream end in the depth direction Z is concave or convex. The inlet ceiling surface 342, the outlet ceiling surface 343, and the through floor surface 345 may be curved so that a portion between the through wall surfaces 631, 632 in the width direction X is concave or convex. As described above, the through inlet 33 and the through outlet 34 may be curved so that at least one side is concave or convex. That is, the through inlet 33 and the through outlet 34 may not be rectangular. For example, sides of the through inlet 33 and sides of the through outlet 34 along the width direction X may have a curved convex shape. The inlet ceiling surface 342, the outlet ceiling surface 343, and the through floor surface 345 may be curved so that a portion between the through wall surfaces 631, 632 is convex.

The inlet ceiling surface 342 is inclined with respect to the inlet floor surface 346 such that the inlet ceiling surface 342 faces to the through inlet 33. An inclination angle θ21 of the inlet ceiling surface 342 with respect to the inlet floor surface 346 is more than or equal to 10 degrees. That is, the inclination angle θ21 is a value same as 10 degrees or a value larger than 10 degrees. There is a relationship: $\theta 21 \geq 10°$. As shown in FIG. 41, a floor parallel line CL21 is defined as an imaginary straight line extending parallel to the inlet floor surface 346. The inclination angle θ21 is between the inlet ceiling surface 342 facing the through inlet 33 and the floor parallel line CL21. In the through ceiling surface 341, the inlet ceiling surface 342 and the outlet ceiling surface 343 are different in inclination angle with respect to the floor parallel line CL21. Specifically, the inclination angle θ21 of the inlet ceiling surface 342 with respect to the floor parallel line CL21 is larger than an inclination angle of the outlet ceiling surface 343 with respect to the floor parallel line CL21.

The inlet ceiling surface 342 corresponds to a ceiling inclined surface. A configuration of the present embodiment is basically the same as the configuration of the first embodiment except for a configuration in which the inlet ceiling surface 342 faces the through inlet 33. The descriptions of the same configuration of the present embodiment is also the descriptions of the above first embodiment.

In the inlet through path 331, a distance H21 between the inlet ceiling surface 342 and the inlet floor surface 346 in the height direction Y gradually decreases in a direction from the through inlet 33 to the through outlet 34. The height direction Y here is a direction orthogonal to the main flow line CL22. The reduction rate of the distance H21 is a constant value in the inlet through path 331.

The through floor surface 345 extends straight in the depth direction Z. In the through floor surface 345, the inlet floor surface 346, the outlet floor surface 347, and the branch floor surface 348 are coplanar with each other. As shown in FIG. 41, the main flow line CL22 is defined as an imaginary straight line extending in the depth direction Z that is the main flow direction. The through floor surface 345 is inclined with respect to the main flow line CL22 so as to face the through inlet 33. There is. In this case, each of the inlet floor surface 346, the outlet floor surface 347, and the branch floor surface 348 is inclined with respect to the main flow line CL22. As described above, the main flow line CL22 extends parallel to the angle setting surface 27a because the angle setting surface 27a of the flange 27 extends in the main flow direction.

Not only the inlet floor surface 346 but also the inlet ceiling surface 342 is inclined with respect to the main flow line CL22. An inclination angle θ22 of the inlet ceiling surface 342 with respect to the main flow line CL22 is more than or equal to 10 degrees, similar to the inclination angle θ21. That is, the inclination angle θ22 is a value same as 10 degrees or a value larger than 10 degrees. There is a relationship: $\theta 22 \geq 10°$. In the present embodiment, the inclination angle θ22 is set to, for example, 10 degrees. As shown in FIG. 41, the inclination angle θ22 is between the inlet ceiling surface 342 facing the through inlet 33 and the main flow line CL22. The inclination angle θ22 of the inlet ceiling surface 342 with respect to the main flow line CL22 is smaller than the inclination angle θ21 of the inlet ceiling surface 342 with respect to the inlet floor surface 346.

Figure 42:
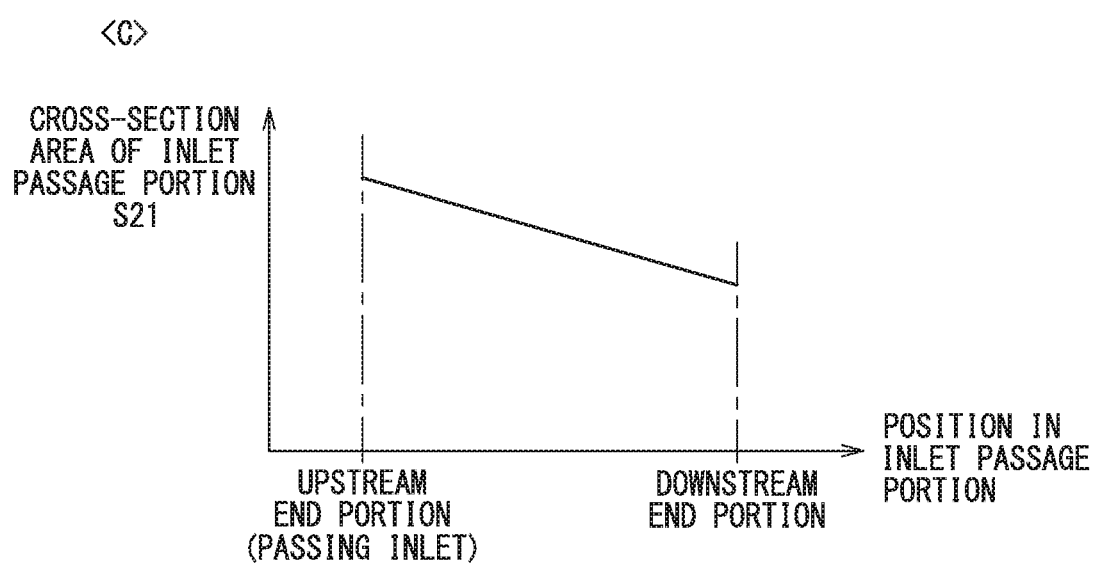
FIG. 42 is a diagram for explaining a cross-sectional area of an inlet passage portion.

The inlet through path 331 has a shape that is gradually narrowed in a direction from the through inlet 33 toward the through outlet 34 by at least the inlet ceiling surface 342 and the inlet floor surface 346. In this case, as shown in FIG. 42, a cross-sectional area S21 of the inlet through path 331 in the directions X, Y orthogonal to the main flow line CL22 gradually decreases in the direction from the through inlet 33 toward the through outlet 34. The cross-sectional area S21 has a largest value at the through inlet 33 which is an upstream end of the inlet through path 331, and has a smallest value at a downstream end of the inlet through path 331. A reduction rate of the cross-sectional area S21 is a constant value in the inlet through path 331, and a graph showing the value of the cross-sectional area S21 in the inlet through path 331 extends linearly as shown in FIG. 42.

The outlet through path 332 has a shape that is gradually narrowed in a direction from an upstream end of the outlet through path 332 toward the through outlet 34. In this case, a cross-sectional area of the outlet through path 332 in the directions X, Y orthogonal to the main flow line CL22 gradually decreases in the direction from the upstream end of the outlet through path 332 toward the through outlet 34. The cross-sectional area of the inlet through path 331 can also be referred to as a flow path area of the inlet through path 331.

As shown in FIG. 40, the measurement flow path 32 has a folded shape folded back between the measurement inlet 35 and the measurement outlet 36. The measurement flow path 32 includes a branch measurement path 351, an introduction measurement path 352, a detection measurement path 353, and a discharge measurement path 354. In the measurement flow path 32, the branch measurement path 351, the introduction measurement path 352, the detection measurement path 353, and the discharge measurement path 354 are arranged in this order in a direction from the measurement inlet 35 toward the measurement outlet 36.

The branch measurement path 351 extends from the measurement inlet 35 in the housing basal end direction, and is a portion of the measurement flow path 32 branched from the through flow path 31. The branch measurement path 351 forms the measurement inlet 35, and an upstream end of the branch measurement path 351 serves as the measurement inlet 35. The branch measurement path 351 is inclined with respect to both the height direction Y and the depth direction Z. The branch measurement path 351 is inclined with respect to the through flow path 31.

The introduction measurement path 352 extends from a downstream end of the branch measurement path 351 in a direction away from the through flow path 31 along the height direction Y. The introduction measurement path 352 guides air flowing from the branch measurement path 351 toward the flow rate sensor 22.

The detection measurement path 353 extends in the depth direction Z from a downstream end of the introduction measurement path 352, and is provided opposite the branch measurement path 351 via the introduction measurement path 352. The flow rate sensor 22 is provided in the detection measurement path 353.

The discharge measurement path 354 extends from a downstream end of the detection measurement path 353 toward the through flow path 31 in the height direction Y, and is provided parallel to the introduction measurement path 352. The discharge measurement path 354 forms the measurement outlet 36, and a downstream end of the discharge measurement path 354 serves as the measurement outlet 36. In this case, the discharge measurement path 354 discharges air flowing from the detection measurement path 353 through the measurement outlet 36.

As shown in FIG. 41, the branch measurement path 351 includes a portion that extends straight from the measurement inlet 35 toward the introduction measurement path 352. A center line of this portion is defined as a branch measurement line CL23. The branch measurement line CL23 extends linearly and is inclined with respect to the inlet ceiling surface 342. The branch measurement line CL23 extends obliquely from the measurement inlet 35 toward a downstream side of the branch measurement path 351 in a direction away from the through inlet 33. In other words, the branch measurement line CL23 extends obliquely from the measurement inlet 35 toward the downstream side of the branch measurement path 351 in a direction toward the through outlet 34.

In FIG. 41, the inner surface of the housing 21 is chamfered at the branch portion between the through flow path 31 and the measurement flow path 32, but the branch measurement line CL23 is set assuming a configuration without this chamfered portion. The branch measurement line CL23 includes an extended line obtained by extending the center line of the branch measurement path 351 from the measurement inlet 35 toward the through flow path 31.

The branch measurement line CL23 is inclined with respect to the inlet floor surface 346. An inclination angle $\theta 23$ of the branch measurement line CL23 with respect to the inlet floor surface 346 is more than or equal to 90 degrees. That is, the inclination angle $\theta 23$ is a value same as 90 degrees or a value larger than 90 degrees. There is a relationship: $\theta 23 \geq 90°$. The inclination angle $\theta 23$ is between the floor parallel line CL21 and the branch measurement line CL23 facing the through inlet 33. In the range of $\theta 23$ which is 90 degrees or more, $\theta 23$ is preferably 150 degrees or less, and more preferably 120 degrees or less.

The branch measurement line CL23 is inclined with respect to not only the inlet floor surface 346 but also the main flow line CL22. An inclination angle $\theta 24$ of the branch measurement line CL23 with respect to the main flow line CL22 is more than or equal to 90 degrees, similar to the inclination angle $\theta 23$. That is, the inclination angle $\theta 24$ is a value same as 90 degrees or a value larger than 90 degrees. There is a relationship: $\theta 24 \geq 90°$. The inclination angle $\theta 24$ is between the main flow line CL22 and the branch measurement line CL23 facing the through inlet 33. The inclination angle $\theta 24$ is included in the obtuse angle. In the range of $\theta 24$ which is 90 degrees or more, $\theta 24$ is preferably 150 degrees or less, and more preferably 120 degrees or less.

The inclination angles $\theta 23$, $\theta 24$ are included in the obtuse angle. The branch measurement line CL23 is inclined with respect to not only the inlet floor surface 346 and the main flow line CL22 but also the inlet ceiling surface 342. An inclination angle of the branch measurement line CL23 with respect to the inlet ceiling surface 342 is more than or equal to 10 degrees, similar to the inclination angle $\theta 21$, $\theta 22$.

The branch measurement path 351 is inclined with respect to the inlet through path 331. In this case, the branch measurement line CL23 that is the center line of the branch measurement path 351 is inclined with respect to the inlet through line CL24 that is the center line of the inlet through path 331. An inclination angle $\theta 25$ of the branch measurement line CL23 with respect to the inlet through line CL24 is more than or equal to 90 degrees. That is, the inclination angle $\theta 25$ is a value same as 90 degrees or a value larger than 90 degrees. There is a relationship: $\theta 25 \geq 90°$. The inclination angle $\theta 25$ is between the branch measurement line CL23 and the inlet through line CL24 facing the through inlet 33. The inlet through line CL24 is a linear imaginary line that passes through the center CO21 of the through inlet 33 that is an upstream end of the inlet through path 331 and a center CO22 of a downstream end of the inlet through path 331.

The branch measurement path 351 is inclined with respect to the outlet through path 332. In this case, the branch measurement line CL23 is inclined with respect to an outlet through line CL25 that is the center line of the outlet through path 332. An inclination angle $\theta 26$ of the branch measurement line CL23 with respect to the outlet through line CL25 is less than or equal to 60 degrees. That is, the inclination angle $\theta 26$ is a value same as 60 degrees or a value smaller than 60 degrees. There is a relationship: $\theta 26 \leq 60°$. For example, the inclination angle $\theta 26$ is set to 60 degrees. The outlet through line CL25 is a linear imaginary line that passes through a center CO23 of an upstream end of the outlet through path 332 and the center CO24 of the through outlet 34 that is a downstream end of the outlet through path 332. The outlet through line CL25 is inclined with respect to the inlet through line CL24.

The inclination angle $\theta 26$ of the branch measurement line CL23 with respect to the outlet through line CL25 is an inclination angle of the branch measurement path 351 with respect to the branch through path 333, and corresponds to a branch angle indicating an angle at which the measurement flow path 32 branches from the through flow path 31.

Next, air flow in the bypass flow path 30 will be described with reference to FIGS. 43 to 46. The air flow through the intake passage 12 includes main flows AF21, AF22 and deflected flows AF23 to AF26.

Figure 43:
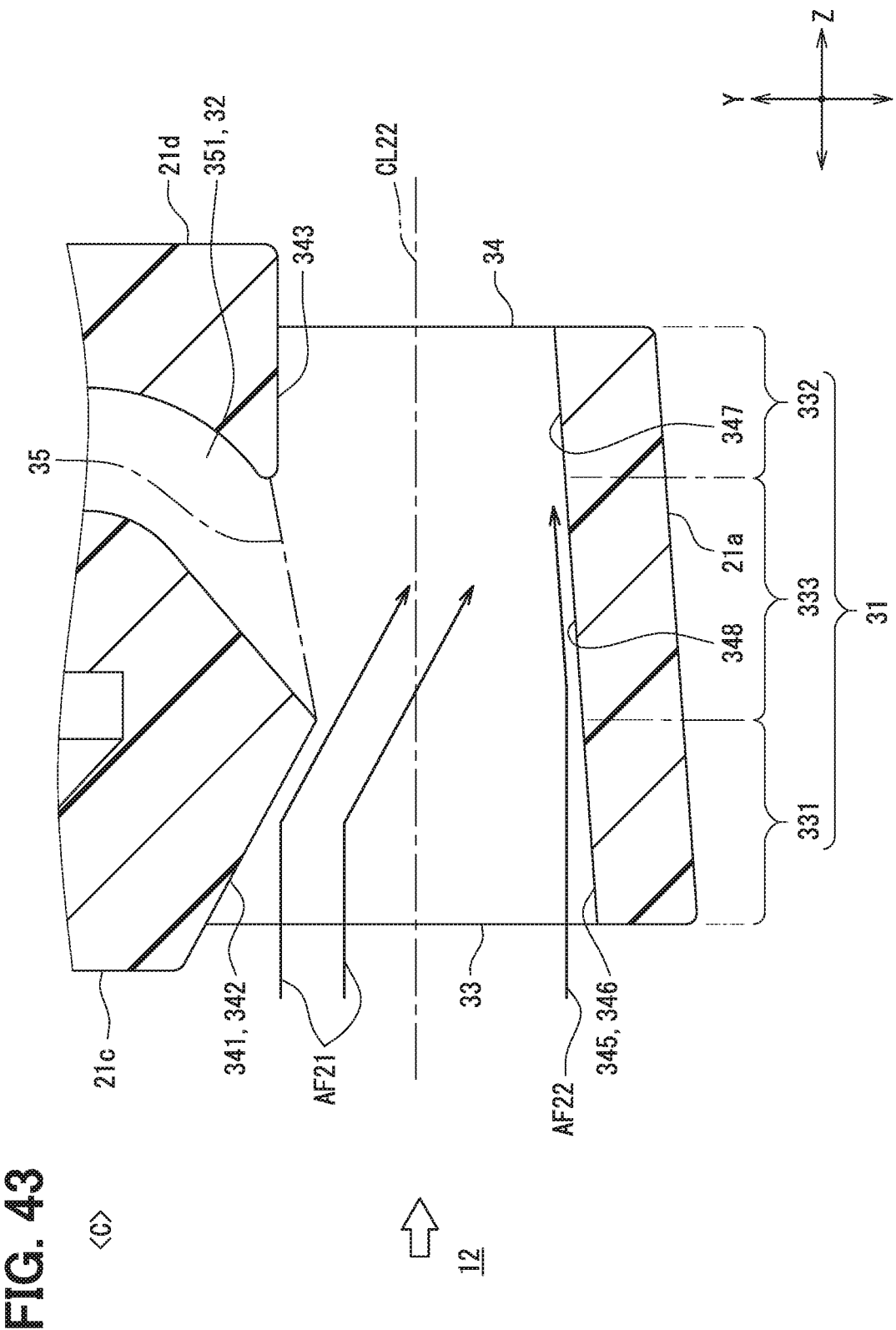
FIG. 43 is a view for explaining a main flow entering the through flow path.

As shown in FIG. 43, the main flows AF21, AF22 travel through the intake passage 12 along the main flow line CL22 in the main flow direction, and enter the inlet through path 331 from the through inlet 33 without change in traveling direction. Among the main flows AF21, AF22, a main flow AF21 enters the through inlet 33 near the inlet ceiling surface 342, and travels toward the inlet ceiling surface 342. When approaching the inlet ceiling surface 342, the main flow AF21 changes in traveling direction by the inlet ceiling surface 342. In this case, the inlet ceiling surface 342 changes the traveling direction of the main flow AF21 into a direction toward the through floor surface 345. Thus, even if a foreign matter such as dust enters the through inlet 33 together with the main flow AF21, the foreign matter easily travels toward the through floor surface 345, and the foreign matter does not easily enter the measurement inlet 35.

On the other hand, another main flow AF22 enters the through inlet 33 near the inlet floor surface 346, and travels toward the through floor surface 345 such as the inlet floor surface 346 or the branch floor surface 348. When approaching the through floor surface 345, the main flow AF22 changes in traveling direction by the through floor surface 345. In this case, the through floor surface 345 changes the traveling direction of the main flow AF22 into a direction toward the through outlet 34. Thus, even if the foreign matter enters the through inlet 33 together with the main flow AF22, the foreign matter easily travels along the through floor surface 345 toward the through outlet 34, and the foreign matter does not easily enter the measurement inlet 35.

Figure 44:
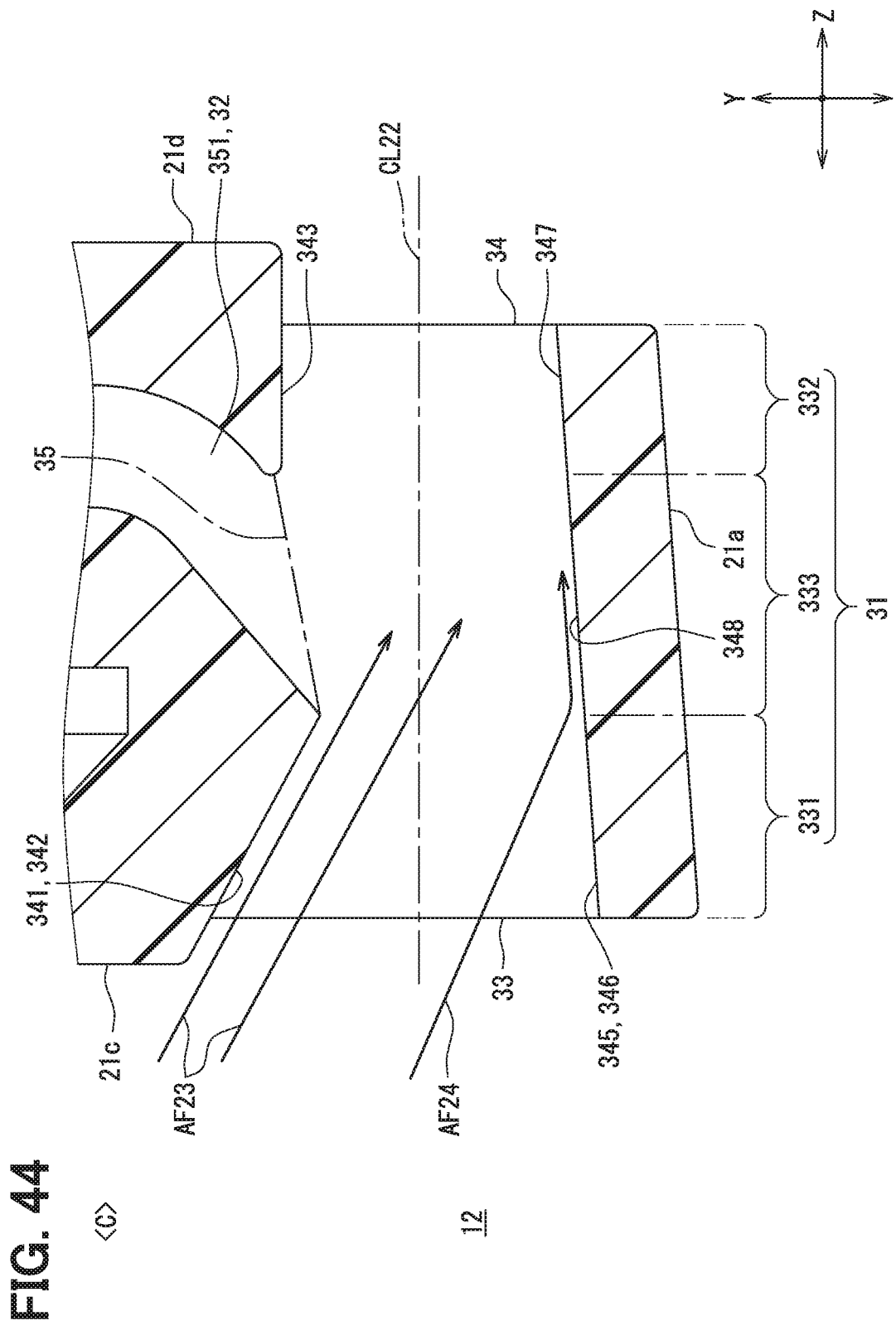
FIG. 44 is a view for explaining a downward deflected flow entering the through flow path.
Figure 45:
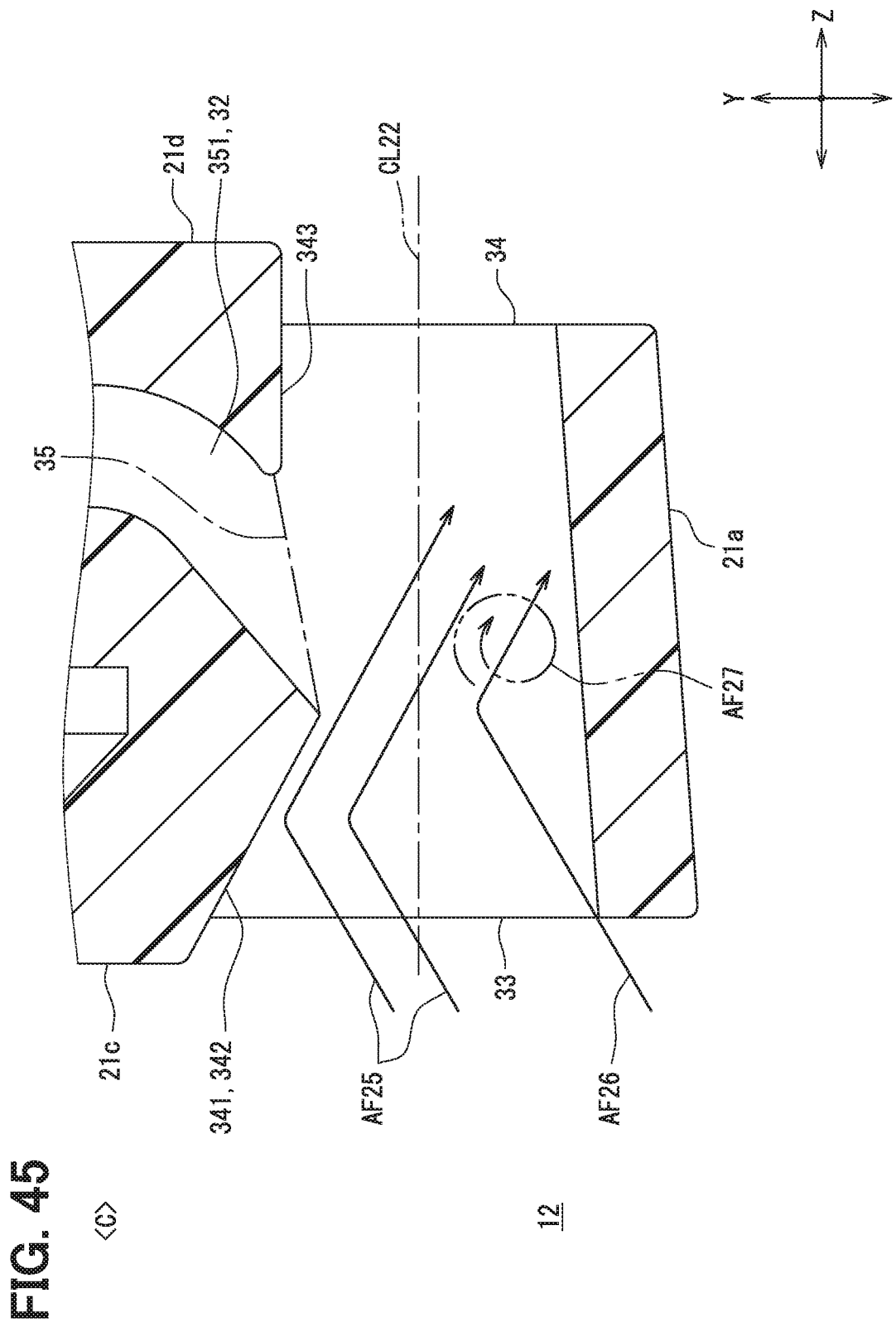
FIG. 45 is a view for explaining an upward deflected flow entering the through flow path.

As shown in FIGS. 44, 45, the deflected flows AF23 to AF26 travel through the intake passage 12 in directions inclined with respect to the main flow line CL22 and the main flow direction in the main flow direction, and enter the inlet through path 331 from the through inlet 33 without change in traveling direction.

As shown in FIG. 44, among the deflected flows AF23 to AF26, downward deflected flows AF23, AF24 are airflows that obliquely travel in the intake passage 12 around the housing 21 in the housing distal end direction which is opposite from the housing basal end direction. Here, the downward deflected flows AF23, AF24 are defined as airflows which are smaller than the inlet ceiling surface 342 in inclination angle with respect to the main flow line CL22.

Among the downward deflected flows AF23, AF24, a downward deflected flow AF23 entering the through inlet 33 near the inlet ceiling surface 342 easily travels toward the through floor surface 345 along the inlet ceiling surface 342. In particular, if the downward deflected flow AF23 and the inlet ceiling surface 342 are substantially the same in inclination angle with respect to the main flow direction, the traveling direction of the downward deflected flow AF23 is unlikely to change due to the inlet ceiling surface 342. In these cases, even if a foreign matter enters the through inlet 33 together with the downward deflected flow AF23, the foreign matter easily travels toward the through floor surface 345, and the foreign matter does not easily enter the measurement inlet 35.

On the other hand, another downward deflected flow AF24 enters the through inlet 33 near the inlet floor surface 346, and travels toward the through floor surface 345. When approaching the through floor surface 345, the downward deflected flow AF24 changes in traveling direction by the through floor surface 345. In this case, the through floor surface 345 changes the traveling direction of the downward deflected flow AF24 into a direction toward the through outlet 34. In this case, even if the foreign matter enters the through inlet 33 together with the downward deflected flow AF24, the foreign matter easily travels along the through floor surface 345 toward the through outlet 34, and the foreign matter does not easily enter the measurement inlet 35.

As shown in FIG. 45, among the deflected flows AF23 to AF26, upward deflected flows AF25, AF26 are airflows that obliquely travel in the intake passage 12 around the housing 21 in the housing basal end direction which is opposite from the housing distal end direction. Here, the upward deflected flows AF25, AF26 are defined as airflows which are larger than the inlet floor surface 346 in inclination angle with respect to the main flow line CL22.

Among the upward deflected flows AF25, AF26, an upward deflected flow AF25 enters the through inlet 33 near the inlet ceiling surface 342, and travels toward the inlet ceiling surface 342. When approaching the inlet ceiling surface 342, the upward deflected flow AF25 changes in traveling direction by the inlet ceiling surface 342. In this case, the inlet ceiling surface 342 changes the traveling direction of the upward deflected flow AF25 into a direction toward the through floor surface 345. Thus, even if a foreign matter such as dust enters the through inlet 33 together with the upward deflected flow AF25, the foreign matter easily travels toward the through floor surface 345, and the foreign matter does not easily enter the measurement inlet 35.

On the other hand, another upward deflected flow AF26 entering the through inlet 33 near the inlet floor surface 346 easily travels toward the inlet ceiling surface 342 and the measurement inlet 35. That is, the upward deflected flow AF26 easily flows in a direction away from the through floor surface 345 such as the inlet floor surface 346 after entering the inlet through path 331 from the through inlet 33. In this case, separation of the upward deflected flow AF26 from the through floor surface 345 causes a vortex AF27 that swirls toward the through floor surface 345, and thus turbulence of the upward deflected flow AF26 is easily generated. When turbulence of the upward deflected flow AF26 is generated in this way, the upward deflected flow AF25 near the inlet ceiling surface 342 is also disturbed by the turbulence of the upward deflected flow AF26, so that the air flow tends to be disturbed throughout the through flow path 31. In this case, the turbulent airflow may flow into the measurement flow path 32 from the measurement inlet 35, which may reduce the accuracy in flow rate detection of the flow rate sensor 22.

However, since the upward deflected flow AF25, which has been changed in traveling direction by the inlet ceiling surface 342, is traveling toward the through floor surface 345, the upward deflected flow AF25 presses the upward deflected flow AF26 toward the through floor surface 345. In this case, the upward deflected flow AF25 traveling toward the through floor surface 345 changes the traveling direction of the upward deflected flow AF26 near the inlet floor surface 346 into a direction toward the through floor surface 345. Thus, the upward deflected flow AF26 is unlikely to be separated from the through floor surface 345, and as a result, the vortex AF27 that occurs in connection with the separation is also unlikely to occur. Therefore, the turbulence of the air flow in the through flow path 31 due to generation of the vortex AF27 is suppressed.

In the air flow meter 20, a fluctuation mode of an output related to the flow rate measurement is correlated with the inclination angle $\theta 21$ of the inlet ceiling surface 342 with respect to the inlet floor surface 346. Specifically, when a fluctuation in measured value of the air flow meter 20 with respect to the true air flow rate in the intake passage 12 is calculated as an output fluctuation, the output fluctuation is properly managed in a configuration in which the inclination angle $\theta 21$ of the inlet ceiling surface 342 with respect to the inlet floor surface 346 is 10 degrees or more. For example, when the inclination angle $\theta 21$ is in a range larger than 0 degree and smaller than 10 degrees, the output fluctuation of the air flow meter 20 becomes smaller as the inclination angle $\theta 21$ is closer to 10 degrees. When the inclination angle $\theta 21$ is in a range lager than or equal to 10 degrees, the output fluctuation of the air flow meter 20 is appropriately kept at a small value. In the range of $\theta 21$ which is 10 degrees or more, $\theta 21$ is preferably 60 degrees or less, and more preferably 30 degrees or less.

Figure 46:
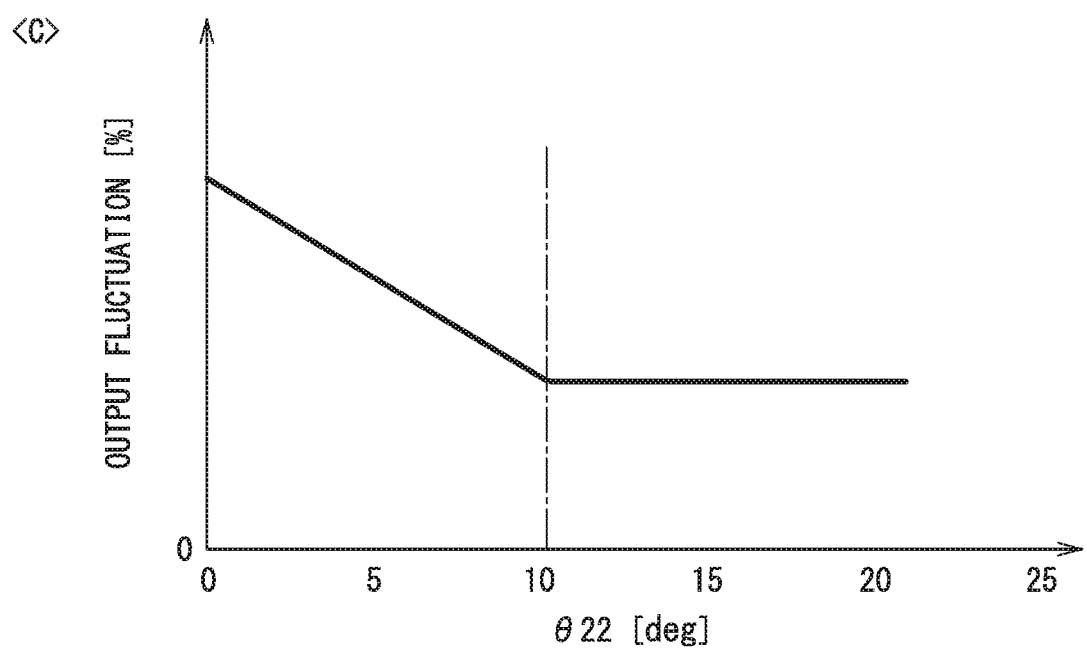
FIG. 46 is a diagram showing a relationship between an inclination angle of an inlet ceiling surface with respect to a main flow line and an output fluctuation of the air flow meter.

The output fluctuation of the air flow meter 20 is also correlated with the inclination angle $\theta 22$ of the inlet ceiling surface 342 with respect to the main flow line CL22. This output fluctuation is properly managed by a configuration in which the inclination angle $\theta 22$ of the inlet ceiling surface 342 with respect to the main flow line CL22 is more than or equal to 10 degrees. For example, as shown in FIG. 46, when the inclination angle $\theta 22$ is in a range larger than 0 degree and smaller than 10 degrees, the output fluctuation of the air flow meter 20 becomes smaller as the inclination angle $\theta 22$ is closer to 10 degrees. When the inclination angle $\theta 22$ is in a range lager than or equal to 10 degrees, the output fluctuation of the air flow meter 20 is appropriately kept at a small value. In the range of θ22 which is 10 degrees or more, θ21 is preferably 60 degrees or less, and more preferably 30 degrees or less.

In the intake passage 12 shown in FIG. 41, when pulsations occur in a flow of the intake air due to an operation state of the engine or the like, not only a forward flow flowing from the upstream side but also a backward flow flowing from the downstream side in the opposite direction to the forward flow may occur in association with the pulsations. While the forward flow flows into the through flow path 31 from the through inlet 33, the backward flow may flow into the through flow path 31 from the through outlet 34. For example, when the forward flow flows in through the through inlet 33 and then flows into the measurement flow path 32 from the through flow path 31, a flow rate of the forward flow is detected by the flow rate sensor 22. On the other hand, when the backward flow generated in the intake passage 12 flows in through the through outlet 34 and then flows into the measurement flow path 32 from the through flow path 31, a flow rate of the backward flow is detected by the flow rate sensor 22.

The flow rate sensor 22 can detect not only a flow rate of air in the measurement flow path 32 but also a flow of the air in the measurement flow path 32. However, if the backward flow from the through outlet 34 flows into the measurement flow path 32, the backward flow flows in the measurement flow path 32 from the measurement inlet 35 to the measurement outlet 36, as with the forward flow from the through inlet 33. Thus, in the measurement flow path 32, a direction of the backward flow from the through outlet 34 and a direction of the forward flow from the through inlet 33 are identical to each other. Therefore, the flow rate sensor 22 cannot distinguishes between the forward flow and the backward flow. For that reason, the air flow meter 20 measures the flow rate of the air, on the assumption that all of the air flowing through the measurement flow path 32 is the forward flow, even though the air flowing through the measurement flow path 32 actually includes the backward flow. As a result, there is a concern that the measurement accuracy of the air flow meter 20 may be lowered.

Further, in the intake passage 12, the turbulence of the air flow such as a vortex flow or stagnation may occur as the air passes around the air flow meter 20. For example, when the air flowing through the intake passage 12 flows past the housing front surface 21e or the housing back surface 21f as a forward flow, a turbulence of air flow may occur due to mixing of an air flow in the main flow direction and an air flow along the housing downstream surface 21d. When the turbulence of air flow exists around the through outlet 34, such as a downstream side of the housing downstream surface 21d, the backward flow generated in the intake passage 12 involves the turbulence and becomes unstable. There is a concern that the unstable backward flow enters the through flow path 31 from the through outlet 34.

In the air flow meter 20, the branch measurement path 351 extends in a direction from the through flow path 31 toward the through outlet 34. Thus, even if the backward flow enters the through flow path 31 from the through outlet 34, the backward flow is less likely to flow into the branch measurement path 351 from the through flow path 31. In particular, as described above, the inclination angle θ26 of the branch measurement line CL23 with respect to the outlet through line CL25 is less than or equal to 60 degrees. Hence, the backward flow is more difficult to flow into the branch measurement path 351 from the through flow path 31.

In the bypass flow path 30, as described above, the measurement inlet 35 does not face to the through inlet 33. Thus, a dynamic pressure of the forward flow from the through inlet 33 is less likely to be applied to the measurement inlet 35 and, a flow velocity of air in the measurement flow path 32 is likely to increase. In the above configuration, even if foreign matters such as sand particle, dust, waterdrops, and oil droplets enter the through flow path 31 from the through inlet 33 together with the forward flow, the foreign matters hardly enters the branch measurement path 351 from the through flow path 31. In that case, the foreign matters reaching the flow rate sensor 22 in the measurement flow path 32 is less likely to break the flow rate sensor 22 or adhere to the flow rate sensor 22. Thus, deterioration in detection accuracy of the flow rate sensor 22 due to the foreign matters can be reduced.

An entire of the through outlet 34 and at least a part of the through inlet 33 overlap in the depth direction Z which is the main flow direction. In this configuration, in the intake passage 12, when foreign matters are contained in a main flow flowing into the part of the through inlet 33 which overlaps the through outlet 34 in the depth direction Z, the foreign matters travel straight together with the main flow in the main flow direction and are discharged from the through outlet 34 to outside. Therefore, foreign matters are difficult to enter the measurement inlet 35.

A state of pulsation generated in the intake passage 12 is defined as a pulsation characteristic. The pulsation characteristic measured by the air flow meter 20 by use of the detection result of the flow rate sensor 22 may include an error as compared with a pulsation characteristic of pulsation actually generated in the intake passage 12. A case where an error is included in the pulsation characteristic measured by the air flow meter 20 includes a case where the backward flow from the through outlet 34 enters the measurement flow path 32 from the through flow path 31.

Figure 47:
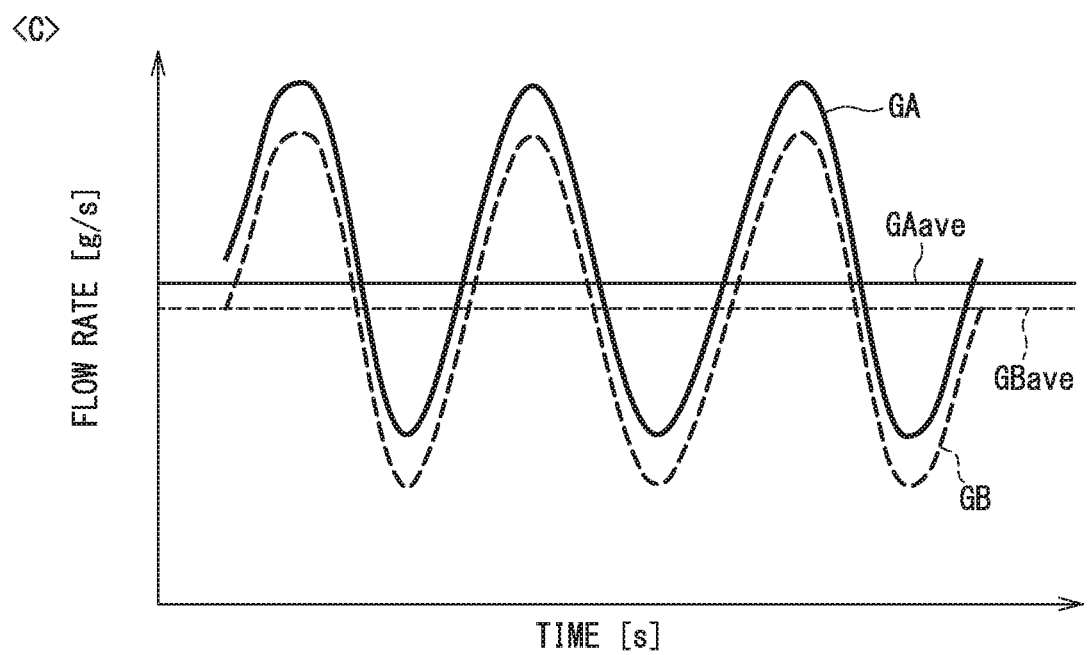
FIG. 47 is a diagram showing a change of a flow rate.

In this example, the flow rate measured by the air flow meter 20 is referred to as a flow rate measurement value GA, an average value of the flow rate measurement values GA is referred to as a measurement average value GAave, the actual flow rate of the intake air flowing through the intake passage 12 is referred to as an actual flow rate GB, and an average value of the actual flow rate GB is referred to as an actual average value GBave. As shown in FIG. 47, when the flow rate measurement value GA becomes smaller than the actual flow rate GB due to the inclusion of an error in the flow rate measurement value GA, the measurement average value GAave also becomes smaller than the actual average value GBave.

Figures 48, 49:
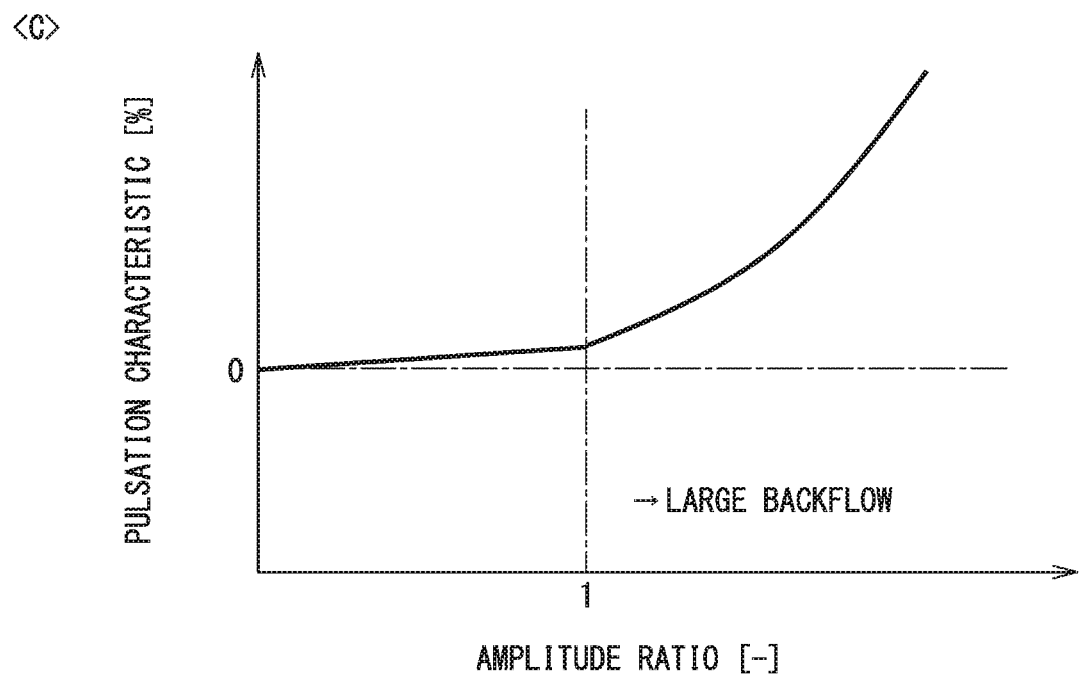
FIG. 48 is a diagram showing a relationship between a pulsation characteristic and an amplitude ratio.
FIG. 49 is a diagram explaining configurations which are different in branch angle.

The pulsation characteristics can be quantified by a value obtained by dividing a difference between the measurement average value GAave and the actual average value GBave by the actual average value GBave. In this instance, a mathematical expression for calculating the pulsation characteristics is expressed as (GAave−GBave)/GBave. The value of the pulsation characteristic tends to increase as the amplitude of the pulsation increases. For example, when a value obtained by dividing a difference between the maximum value GBmax of the actual flow rate GB and the actual average value GBave by the actual average value GBave is referred to as an amplitude ratio, as shown in FIG. 48, a numerical value of the pulsation characteristic increases as the amplitude ratio increases. In particular, in a region where the amplitude ratio is larger than 1, the rate of increase of the pulsation characteristic with an increase in the amplitude ratio is large. In this example, as the amplitude ratio is larger, the amount of the backward flow from the through outlet 34 becomes larger. A mathematical expression for calculating the amplitude ratio can be expressed as (GBmax−GBave)/GBave.

In the present embodiment, the inclination angle $\theta 26$ of the branch measurement line CL23 with respect to the main flow line CL22 is set to, for example, 60 degrees, but a value of the pulsation characteristic is likely to change in accordance with the inclination angle $\theta 26$. For example, as shown in FIG. 49, in the configuration in which the inclination angle $\theta 26$ is 30 degrees, 45 degrees, 60 degrees, or 90 degrees, when the backward flow flows into the through flow path 31 from the through outlet 34, the backward flow is less likely to flow into the measurement flow path 32 with the configuration in which the inclination angle $\theta 26$ is 30 degrees, 45 degrees, or 60 degrees. On the other hand, in the configuration in which the inclination angle $\theta 26$ is 90 degrees, the backward flow is likely to flow into the measurement flow path 32. In this case, the detection accuracy of the pulsation characteristic by the air flow meter 20 is likely to be lowered.

Figure 50:
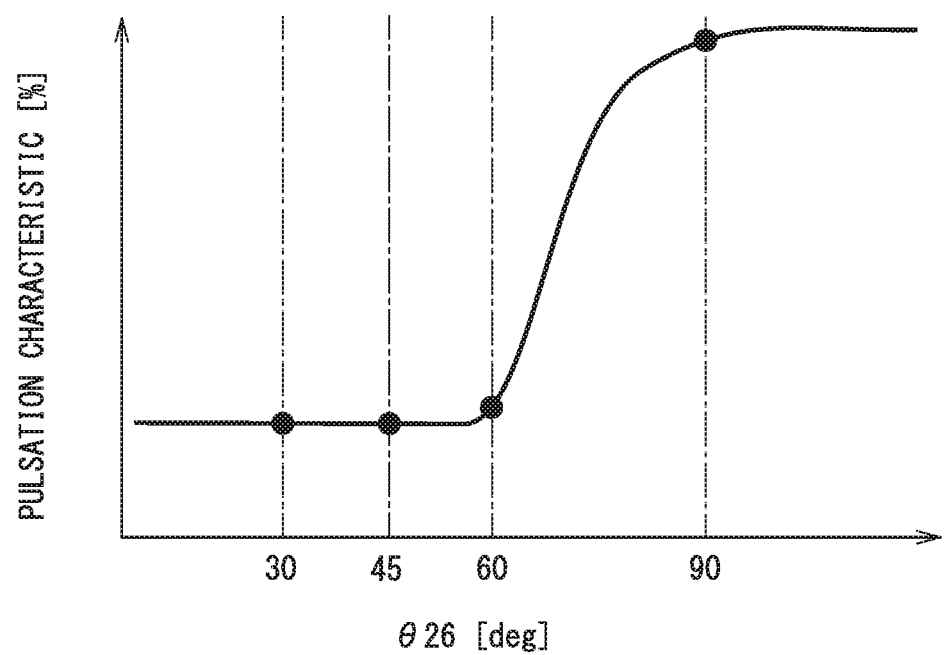
FIG. 50 is a diagram showing a relationship between the branch angle and the pulsation characteristic.

In the air flow meter 20, it is considered that the tendency of the backward flow flowing into the measurement flow path 32 differs depending on the inclination angle $\theta 26$, as a result of which the numerical values of the pulsation characteristic differs from each other. For example, as shown in FIG. 50, in the configuration in which the inclination angle $\theta 26$ is 60 degrees or less, the numerical value of the pulsation characteristic is a relatively small value. It is considered that this is attributable to a phenomenon that when the inclination angle $\theta 26$ is equal to or less than 60 degrees, the backward flow is less likely to flow into the measurement flow path 32. On the other hand, in the configuration in which the inclination angle $\theta 26$ is larger than 60 degrees, the numerical value of the pulsation characteristic is relatively large. This is considered to be attributable to the phenomenon that when the inclination angle $\theta 26$ is larger than 60 degrees, the backward flow is likely to flow into the measurement flow path 32. In addition, in the above configuration, the numerical value of the pulsation characteristic increases as the inclination angle $\theta 26$ increases. This is considered to be attributable to the phenomenon that, in a range in which the inclination angle $\theta 26$ is larger than 60 degrees, as the inclination angle $\theta 26$ is larger, the backward flow is likely to flow into the measurement flow path 32.

According to the present embodiment described above, the inlet ceiling surface 342 is inclined with respect to the inlet floor surface 346. In this configuration, an air flowing into the inlet through path 331 from the through inlet 33, which flows near the inlet ceiling surface 342, such as the upward deflected flow AF25, is changed in traveling direction by the inlet ceiling surface 342. Accordingly, the air easily flows toward the inlet floor surface 346 along the inlet ceiling surface 342. Therefore, even if an air such as the upward deflected flow AF26 separates or almost separates from the inlet floor surface 346, the separating air is pressed against the inlet floor surface 346 by the air such as the upward deflected flow AF25 traveling toward the inlet floor surface 346 along the inlet ceiling surface 342. In this case, occurrence of turbulence such as vortex due to the separation of air from the inlet floor surface 346 is regulated by a fluid flowing along the inlet ceiling surface 342. As a result, the turbulence of air is less likely to occur in the inlet through path 331. Therefore, the flow rate detection accuracy of the flow rate sensor 22 can be increased, and as a result, the flow rate measurement accuracy of the air flow meter 20 can be increased.

According to the present embodiment, the inclination angle $\theta 21$ of the inlet ceiling surface 342 with respect to the inlet floor surface 346 is 10 degrees or more. In this configuration, the inclination angle $\theta 21$ is set to a relatively large value so that the air such as the upward deflected flow AF25 which has been changed in traveling direction by the inlet ceiling surface 342 travels toward the inlet floor surface 346, not toward the through outlet 34. Hence, compared with a configuration in which the inclination angle $\theta 21$ is set to, for example, a value smaller than 10 degrees, the air such as the upward deflected flow AF25 which has been changed in traveling direction by the inlet ceiling surface 342 can certainly reduce occurrence of air separation near the inlet floor surface 346.

According to the present embodiment, the inlet ceiling surface 342 is inclined with respect to the inlet floor surface 346 such that the inlet ceiling surface 342 faces the through inlet 33. In this configuration, air such as the main flow AF21 and the downward deflected flow AF23 entering the through inlet 33 near the inlet ceiling surface 342 is less likely to separate from the inlet ceiling surface 342. Therefore, occurrence of turbulence such as vortex in the air entering the through inlet 33 near the inlet ceiling surface 342 can be reduced.

For example, in a configuration in which the inlet ceiling surface 342 is inclined with respect to the inlet floor surface 346 such that the inlet ceiling surface 342 faces to the through outlet 34, the main flow AF21 entering the through inlet 33 near the inlet ceiling surface 342 is likely to gradually separates from the inlet ceiling surface 342 in the traveling direction toward the through outlet 34. In this case, a turbulence of air flow is likely to occur in the through flow path 31 due to generation of vortex or the like by the main flow AF21.

According to the present embodiment, the inlet ceiling surface 342 is inclined with respect to the main flow direction in which the main flow line CL22 extends such that the inlet ceiling surface 342 faces the through inlet 33. In this configuration, when air such as the main flow AF21 flowing in the main flow direction enters the through inlet 33 near the inlet ceiling surface 342, the air can be guided toward the inlet floor surface 346 by the inlet ceiling surface 342. Therefore, even if an air such as the main flow AF22 along the main flow direction enters the through inlet 33 near the inlet floor surface 346 and separates or almost separates from the inlet floor surface 346, the air can be pressed against the inlet floor surface 346 by air traveling toward the inlet floor surface 346 from the inlet ceiling surface 342. Therefore, occurrence of turbulence such as the vortex AF27 in the air flow around the inlet floor surface 346 can be reduced.

According to the present embodiment, the inclination angle $\theta 22$ of the inlet ceiling surface 342 with respect to the main flow direction is 10 degrees or more. In this configuration, the deflected flows that obliquely travel around the housing 21 in the housing distal end direction, which is opposite from the housing basal end direction, include as much as possible the downward deflected flows AF23, AF24 which are smaller than the inlet ceiling surface 342 in inclination angle with respect to the main flow line CL22. As a result, occurrence of turbulence such as vortex in the air flow due to the deflected flows of air entering the through inlet 33 near the inlet ceiling surface 342 and being separated from the inlet ceiling surface 342 can be reduced.

In contrast to this, for example, in a configuration where the inclination angle $\theta 22$ of the inlet ceiling surface 342 with respect to the main flow direction is smaller than 10 degrees, an inclination angle of the downward deflected flow that obliquely travels around the housing 21 in the housing distal end direction, which is opposite from the housing basal end direction, is likely to be larger than the inclination angle $\theta 22$. Hence, occurrence of turbulence such as vortex in the air flow due to the deflected flows of air entering the through inlet 33 near the inlet ceiling surface 342 and being separated from the inlet ceiling surface 342 is a concern.

According to the present embodiment, the main flow direction in which the main flow line CL22 extends is a direction in which the angle setting surface 27a of the housing 21 extends. Therefore, use of the angle setting surface 27a at the time of setting an attaching angle of the housing 21 with respect to the piping unit 14 can provide attachment of the housing 21 to the piping unit 14 in an appropriate direction according to a flow direction of ambient air in the intake passage 12. That is, the housing 21 can be attached to the piping unit 14 in a direction in which the inlet ceiling surface 342 can exert its separation reducing effect.

According to the present embodiment, the cross-sectional area S21 of the inlet through path 331 gradually decreases in a direction from the through inlet 33 toward the through outlet 34. In this configuration, the degree of narrowing of the inlet through path 331 increases in accordance with traveling of air from the through inlet 33 through the inlet through path 331 toward the through outlet 34. Therefore, the air is easily regulated by the inner surface of the housing 21. Thus, the air such as the upward deflected flow AF25 which has been changed in traveling direction by the inlet ceiling surface 342 is more likely to travel toward the inlet floor surface 346 without spreading in the housing front direction or the housing back direction than the inlet floor surface 346. Accordingly, air turbulence near the inlet floor surface 346 can be reduced. Therefore, the inlet through path 331 can be formed into a shape that easily exhibits the separation reducing effect of the inlet ceiling surface 342.

According to the present embodiment, the inclination angle $\theta 25$ of the branch measurement line CL23 with respect to the inlet through line CL24 is 90 degrees or more. In this configuration, the air flowing from the through inlet 33 through the inlet through path 331 along the inlet through line CL24 can be made to flow into the measurement flow path 32 from the inlet through path 331 by obtuse and gentle change in traveling direction of the air without the need of acute and sharp change. Therefore, when the air flowing through the through flow path 31 flows into the measurement flow path 32, occurrence of turbulence of air flow due to a sharp change in traveling direction can be reduced.

According to the present embodiment, the inclination angle $\theta 26$ of the branch measurement line CL23 with respect to the main flow line CL22 is 60 degrees or less. In this configuration, since the branch angle of the measurement flow path 32 with respect to the through flow path 31 is 60 degrees or less, the air flowing from the through inlet 33 into the inlet through path 331 can be made to flow into the measurement flow path 32 from the inlet through path 331 without the need of sharp change in traveling direction. Therefore, turbulence of the air flow is less likely to occur at the time of the air flowing into the measurement flow path 32 from the through flow path 31.

Further, in this configuration, the backward flow from the through outlet 34 needs to sharply and acutely turn in order to flow into the branch measurement path 351 from the through flow path 31. For this reason, a phenomenon in which the backward flow does not easily flow into the branch measurement path 351 easily occur, and the backward flow reaching the flow rate sensor 22 can be reduced. Occurrence of measurement by the air flow meter 20, in which a flow rate is measured as if the forward flow from the through inlet 33 reaches the flow rate sensor 22 though the backward flow from the through outlet 34 actually reaches the flow rate sensor 22, can be reduced. Therefore, an accuracy of the flow rate measurement of the intake air by the air flow meter 20 can be improved.

Further, in this configuration, when the forward flow flows into the branch measurement path 351 from the through flow path 31, the direction of the forward flow may gradually change into a direction toward the branch measurement path 351. In this case, as described above, the backward flow is less likely to flow into the branch measurement path 351, while the forward flow is likely to flow into the branch measurement path 351. Accordingly, decrease in flow velocity of the forward flow flowing into the measurement flow path 32 can be reduced. Thus, the accuracy in flow rate detection of the forward flow from the through inlet 33 by the flow rate sensor 22 can be enhanced.

According to the present embodiment, the opening area of the through outlet 34 is smaller than the opening area of the through inlet 33. Thus, the backward flow generated in the intake passage 12 is less likely to flow into the through outlet 34. Therefore, the backward flow flowing into the branch measurement path 351 can be more surely reduced.

Other Embodiments

Although a plurality of embodiments according to the present disclosure have been described above, the present disclosure is not construed as being limited to the above-mentioned embodiments, and can be applied to various embodiments and combinations within a scope not departing from the spirit of the present disclosure.

<Modification of Configuration Group A>

As a modification A1, the front peak 111a and the back peak 112a in the measurement flow path 32 may not be arranged in the width direction X. For example, among the peaks 111a, 112a, only the front peak 111a may be arranged on the center line CL5 of the heating resistor 71. In this case, the back peak 112a may be arranged at a position displaced from the center line CL5 in at least one of the height direction Y and the depth direction Z.

As a modification A2, the front peak 111a of the front narrowed portion 111 does not have to be arranged on the center line CL5 of the heating resistor 71. For example, the front peak 111a just have to be aligned with a part of the heating resistor 71 in the width direction X and face a part of the heating resistor 71. Further, the front peak 111a just have to be aligned with a part of the membrane portion 62 in the width direction X and face a part of the membrane portion 62. Furthermore, the front peak 111a just have to be aligned with a part of the flow rate sensor 22 in the width direction X and face a part of the flow rate sensor 22.

As a modification A3, narrowed portions such as the front narrowed portion 111 and the back narrowed portion 112 may be provided on the measurement ceiling surface 102 or the measurement floor surface 101 in the measurement flow path 32. For example, in the measurement flow path 32, the narrowed portion only has to be provided on at least one of the measurement floor surface 101, the measurement ceiling surface 102, the front measurement wall surface 103, and the back measurement wall surface 104.

As a modification A4, a physical quantity sensor for detecting a physical quantity different from the flow rate of the intake air may be provided in the measurement flow path. Examples of the physical quantity sensor provided in the measurement flow path include a detection unit for detecting a temperature, a detection unit for detecting a humidity, a detection unit for detecting a pressure, and the like in addition to the flow rate sensor 22, 202. Those detection units may be mounted on the sensor SA 50, 220 as the detection unit or may be provided as components separated from the sensor SA 50, 220.

As a modification A5, the air flow meter 20, 200 does not need to include the through flow path 31, 211. That is, the bypass flow path 30, 210 may not be branched. For example, the measurement inlet 35, 215 of the measurement flow path 32, 212 may be provided on the outer surface of the housing 21, 201. In this configuration, all of the air that has flowed into the housing 21, 201 from the measurement inlet 35, 215 flows out from the measurement outlet 36, 216.

<Modifications of Configuration Group B>

Figure 51:
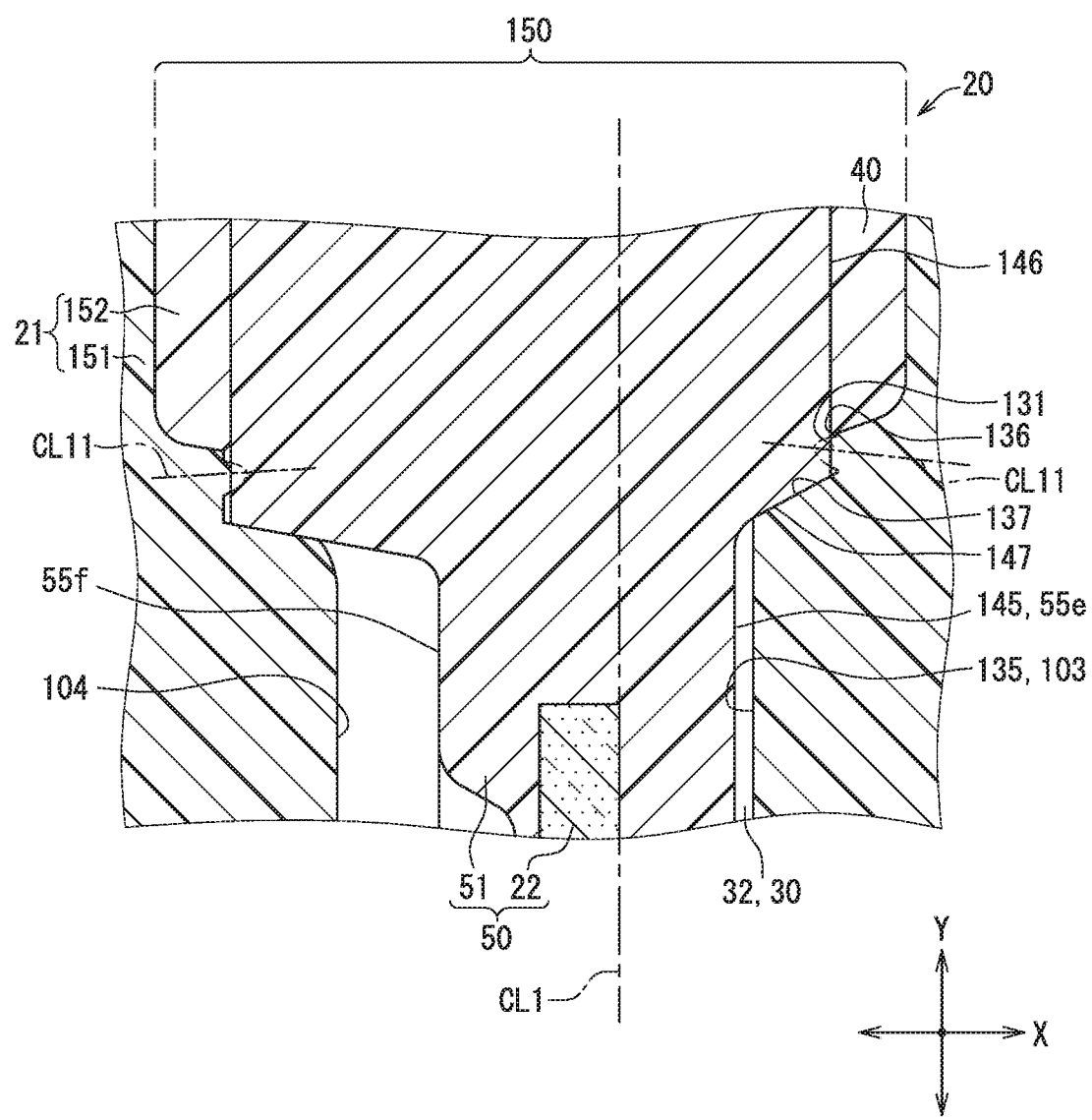
FIG. 51 is a vertical cross-sectional view of an air flow meter around a housing partition according to the first embodiment of a configuration group B1.

As a modification B1, the housing partition may be provided on the housing container surface. For example, in the first embodiment, as shown in FIG. 51, the housing partition 131 is provided on the housing container surface 136. In this configuration, the housing partition 131 extends toward the SA container surface 146 of the sensor SA 50. The center line CL11 of the housing partition 131 extends in a direction intersecting the height direction Y. The housing partition 131 does not extend in the directions X, Z orthogonal to the height direction Y, but extends obliquely from the housing container surface 136 in the housing basal end direction. Therefore, the center line CL11 of the housing partition 131 intersects the housing container surface 136 not orthogonally but obliquely.

In this modification, the housing partition 131 is provided on the housing container surface 136. Therefore, by simply pushing the sensor SA 50 beyond the SA container space 150, the tip end of the housing partition 131 can be deformed so as to be scraped at the external corner between the housing step surface 137 and the housing container surface 136. As a result, the housing partition 131 is easily made into contact with the housing container surface 136. In FIG. 51, a portion of the housing partition 131 which was scraped and deformed by the sensor SA 50 is illustrated by a chain double-dashed line.

Figure 52:
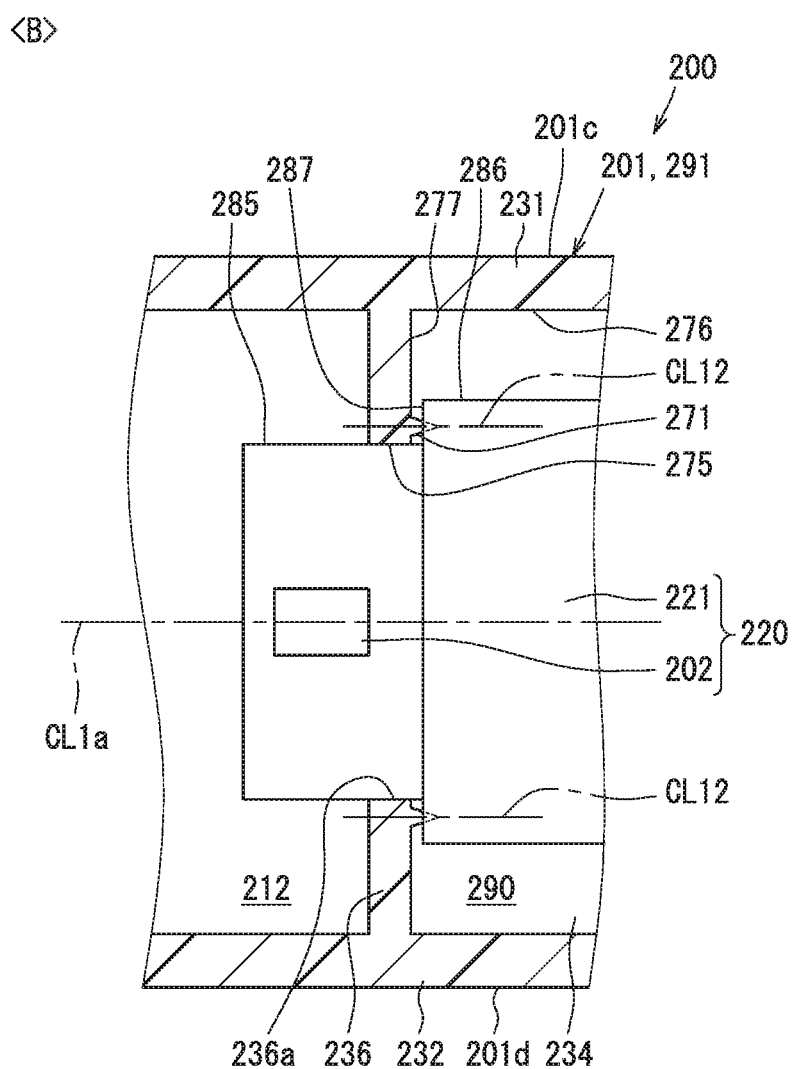
FIG. 52 is a vertical cross-sectional view of an air flow meter around a housing partition according to the second embodiment of a configuration group B2.

As a modification B2, the housing partition may be provided on the housing step surface in the second embodiment as in the first embodiment. For example, as shown in FIG. 52, the housing partition 271 is provided on the housing step surface 277. In this configuration, the first intermediate hole 236a of the first intermediate wall 236 is formed by an end surface of the first intermediate wall 236 rather than the tip end of the housing partition 271. In FIG. 52, a portion of the housing partition 271 which was crushed by the sensor SA 220 is illustrated by a chain double-dashed line.

Figure 53:
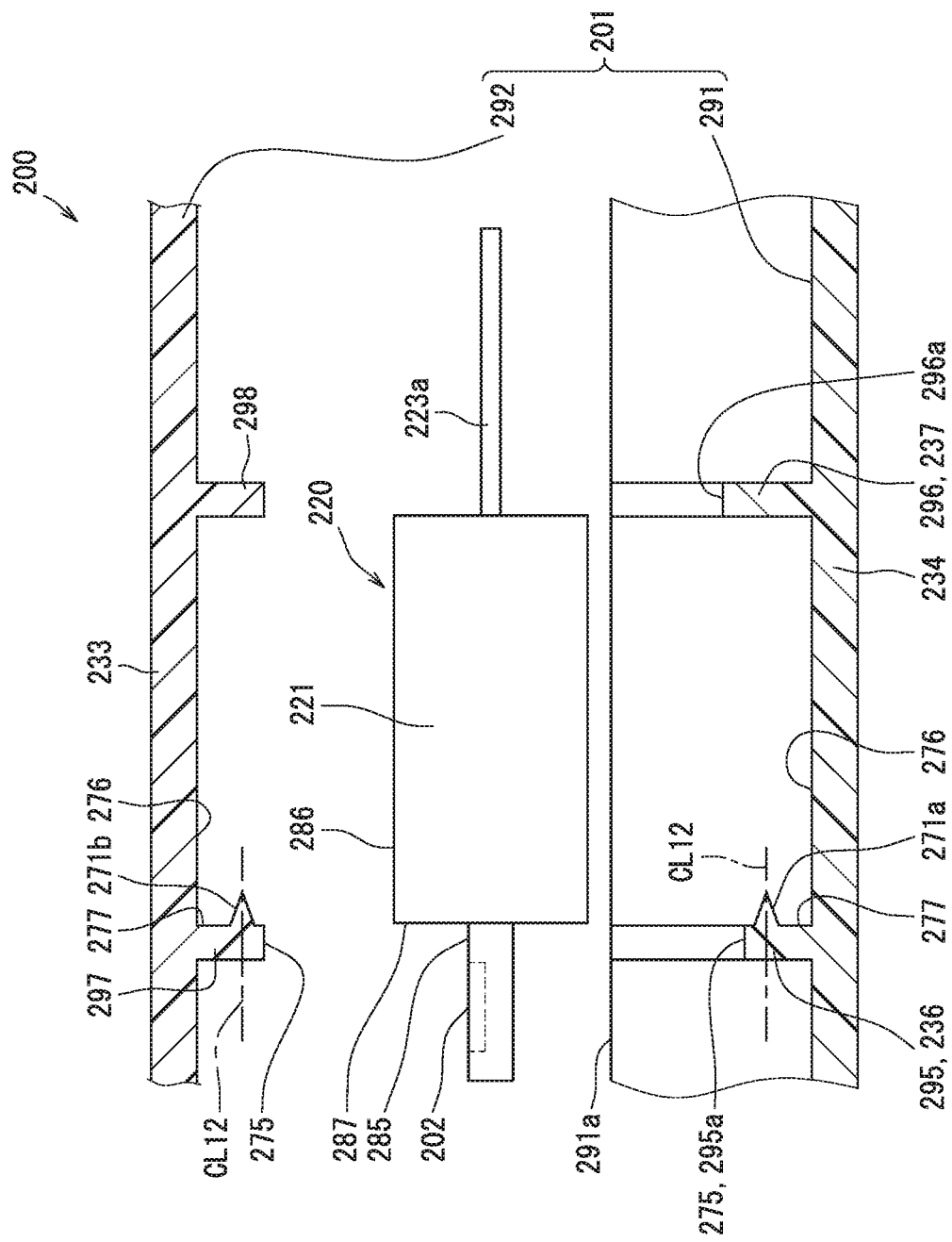
FIG. 53 is an exploded cross-sectional view of a base member, a cover member and the sensor SA.

Further, as shown in FIG. 53, in the base member 291, the base protrusion 271a is provided on a wall surface of the first base protrusion 295 that faces in the housing basal end direction. In the cover member 292, the cover protrusion 271b is provided on a surface of the first cover protrusion 297 that faces in the housing basal end direction.

As a modification B3, the housing partition may be provided on the housing flow path surface in the first embodiment as in the second embodiment. For example, the housing partition 131 is provided on the housing flow path surface 135.

Figure 54:
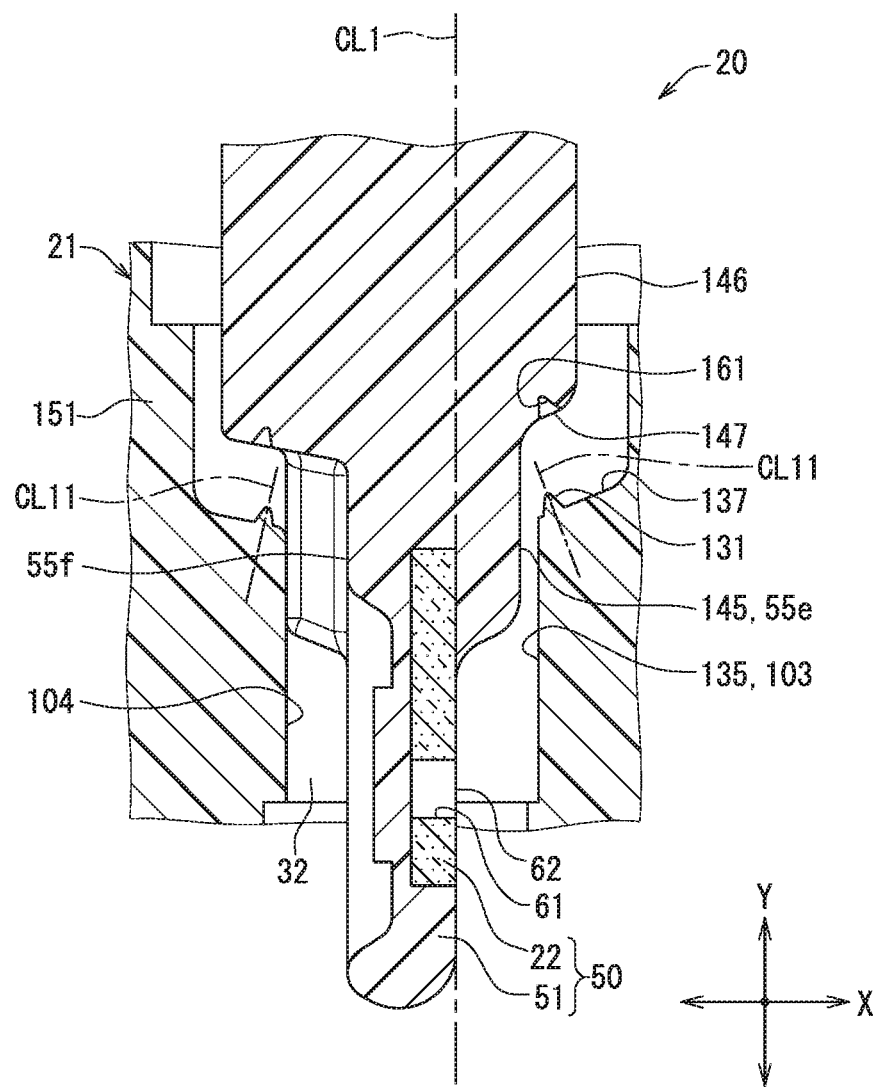
FIG. 54 is a vertical cross-sectional view of an air flow meter around a housing partition according to the first embodiment of a configuration group B4.

As a modification B4, a unit recess into which the housing partition is inserted may be provided on the detection unit. For example, as shown in FIG. 54, in the first embodiment, the SA step surface 147 of the sensor SA 50 is provided with a SA recess 161 as the unit recess. In this configuration, when the sensor SA 50 is mounted on the first housing part 151, the housing partition 131 is inserted into the SA recess 161. A recessing direction of the SA recess 161 from the SA step surface 147 is the same as a protruding direction of the housing partition 131 from the housing step surface 137. That is, the center line of the SA recess 161 coincides with the center line CL11 of the housing partition 131.

According to this configuration, the housing partition 131 and an inner surface of the SA recess 161 are easily brought into contact with each other. More specifically, a depth of the SA recess 161 which is a recess depth from the SA step surface 147 is smaller than a protrusion height of the housing partition 131 from the housing step surface 137. In this case, the sensor SA 50 is inserted through the housing opening 151a, and the housing partition 131 is inserted into the SA recess 161. Then, the sensor SA 50 is further pushed such that the housing partition 131 contacts the inner surface of the SA recess 161 and is deformed via crushing. As a result, the housing partition 131 is easily made into contact with the inner surface of the SA recess 161.

Even if the housing partition 131 is not in contact with the inner surface of the SA recess 161, a gap between the outer surface of the housing partition 131 and the inner surface of the SA recess 161 has a curved shape. Therefore, a foreign matter or air is unlikely to pass through the gap. Therefore, in manufacturing the second housing part 152, the fact that the housing partition 131 is inserted into the SA recess 161 can prevent the molten resin from entering the measurement flow path 32 through the gap between the first housing part 151 and the sensor SA 50.

Figure 55:
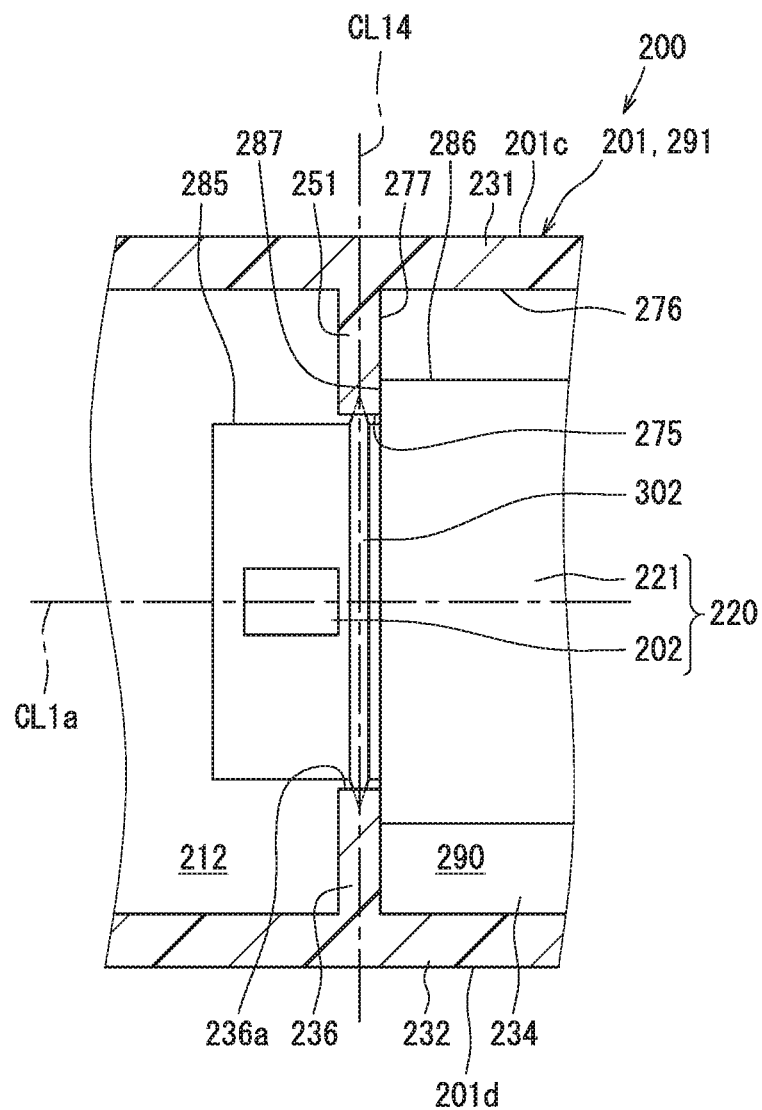
FIG. 55 is a vertical cross-sectional view of an air flow meter around a housing partition according to the second embodiment of a configuration group B5.

As a modification B5, a gap between the housing and the detection unit may be partitioned by a unit partition of the detection unit. For example, as shown in FIG. 55, in the second embodiment, the sensor SA 220 as the detection unit includes a SA partition 302 as the unit partition. The SA partition 302 is a protrusion provided on the outer surface of the sensor SA 220, and projects from the sensor SA 220 toward the housing 201. A tip end of the SA partition 302 is in contact with the inner surface of the housing 201. The SA partition 302 is between the outer surface of the sensor SA 220 and the inner surface of the housing 201 and separates the SA container space 290 from the measurement flow path 212.

The SA partition 302 is provided on the SA flow path surface 285 of the sensor SA 220. The SA partition 302 is provided in a portion of the SA flow path surface 285 that faces the housing flow path surface 275 of the housing 201, and projects outward and toward the housing flow path surface 275 in a direction intersecting the height direction Y. A center line CL14 of the SA partition 302 extends linearly in the direction X, Z orthogonal to the height direction Y. The SA partition 302, together with the SA flow path surface 285, extends to make a loop around an outer circumference of the sensor SA 220. In this case, the SA partition 302 has a portion extending in the width direction X and a portion extending in the depth direction Z. The SA partition 302 has a substantially rectangular frame shape as a whole.

The SA partition 302 has a tapered shape, similar to the housing partition 131 of the first embodiment. In the housing 201, an end surface of the first intermediate wall 236 is a flat surface, and a tip end of the SA partition 302 is in contact with this flat surface.

Figure 56:
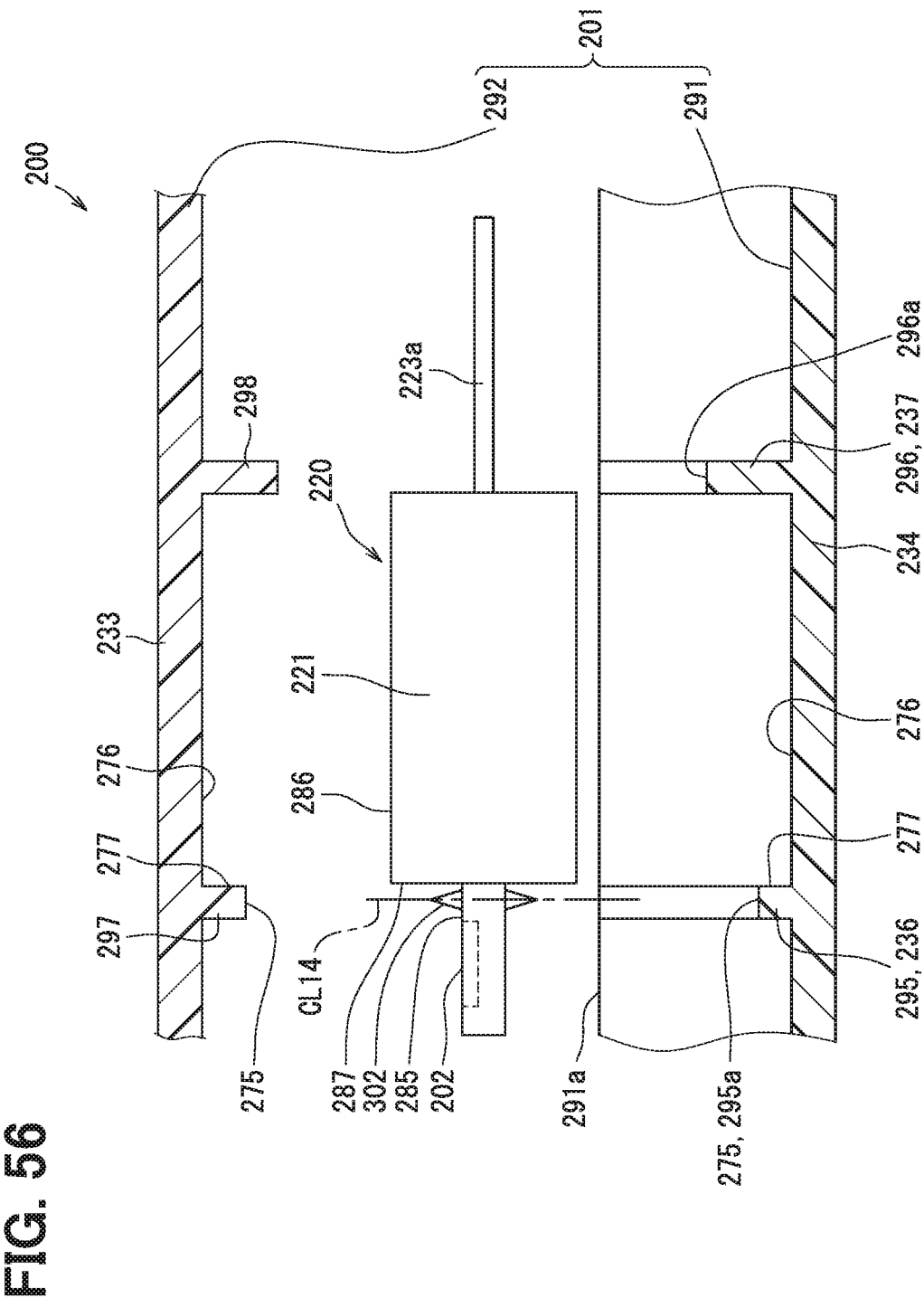
FIG. 56 is an exploded cross-sectional view of a base member, a cover member and the sensor SA.

In the manufacturing process of the air flow meter 200, when the sensor SA 220 is attached to the base member 291, as shown in FIG. 56, the SA partition 302 is deformed like deformation of the base protrusion 271a of the first embodiment. Specifically, the sensor SA 220 is pushed into the base member 291 through the base opening 291a such that the tip end of the SA partition 302 is deformed via crushing or scraping by the first base protrusion 295 of the base member 291. Further, when the cover member 292 is attached to the base member 291, the SA partition 302 is deformed like deformation of the cover protrusion 271b of the first embodiment. Specifically, the cover member 292 is pressed against the sensor SA 220 and the base member 291 such that the tip end of the SA partition 302 is deformed via crushing by the first cover protrusion 297 of the cover member 292. In these cases, the crushing or scraping of the tip end of the SA partition 302 newly generates a tip end surface which is easily come into tight contact with the housing flow path surface 275 of the housing 201. Accordingly, a sealing performance between the SA partition 302 and the housing flow path surface 275 is improved.

Figure 57:
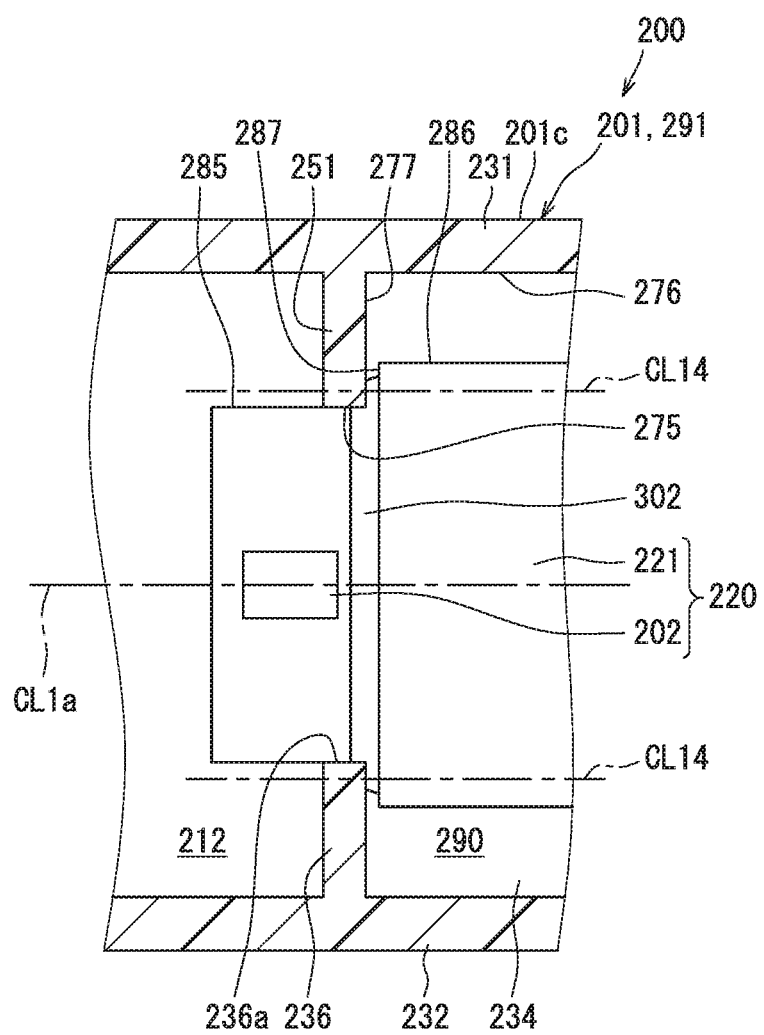
FIG. 57 is a vertical cross-sectional view of an air flow meter around a housing partition according to the second embodiment of a configuration group B6.

As a modification B6, as shown in FIG. 57, the SA partition 302 may be provided on the SA step surface 287 of the sensor SA 220 in the modification B5. The SA partition 302 extends in the height direction Y toward the housing step surface 277. A center line CL4 of the SA partition 302 extends in the height direction Y. The SA partition 302, together with the SA step surface 287, extends to make a loop around an outer circumference of the sensor SA 220.

Figure 58:
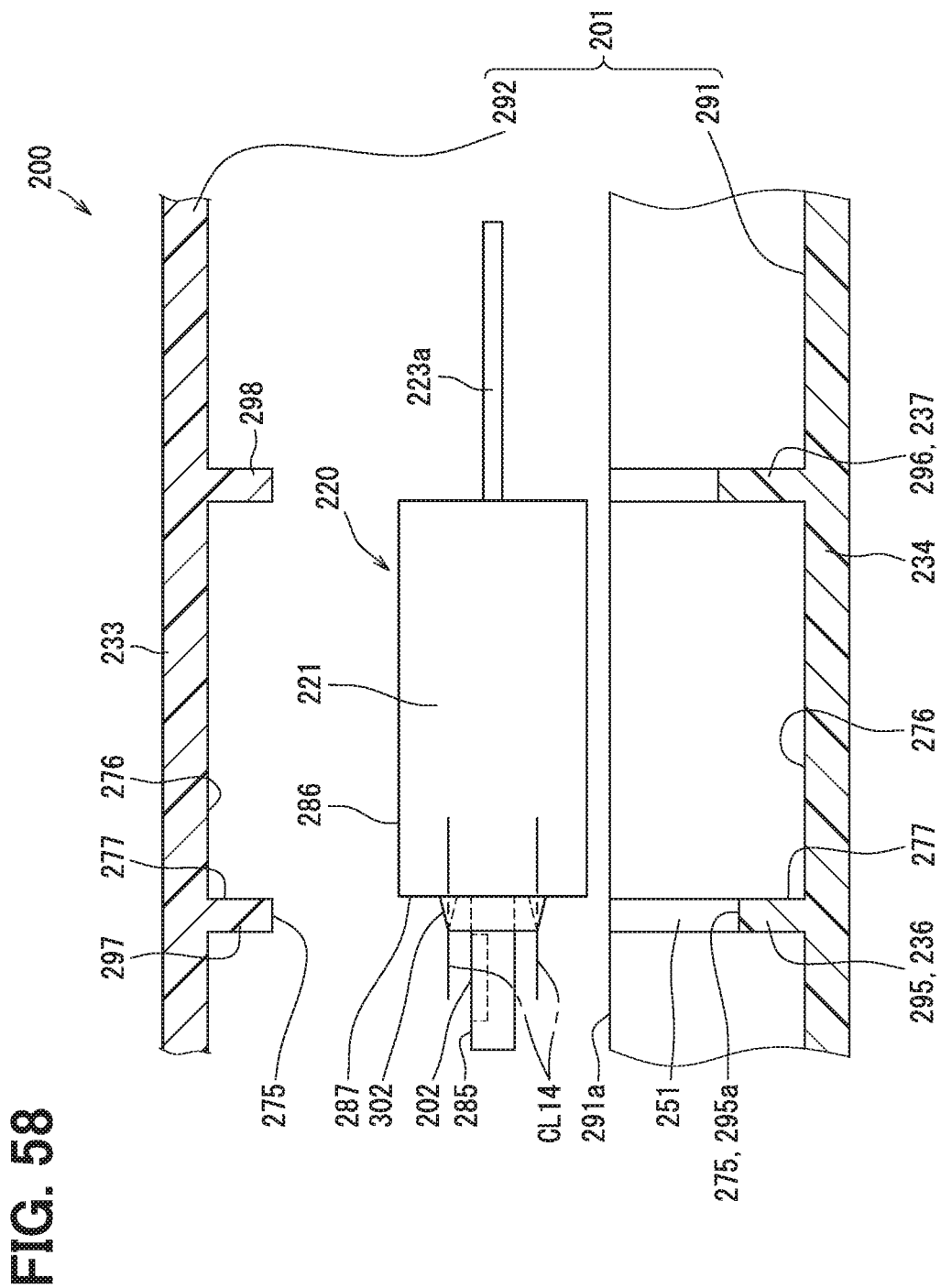
FIG. 58 is an exploded cross-sectional view of a base member, a cover member and the sensor SA.

In the manufacturing process of the air flow meter 200, when the sensor SA 220 is attached to the base member 291, as shown in FIG. 58, the SA partition 302 is deformed by the base member 291, the protrusion 295 of the base member 291 and the protrusion 297 of the cover members 292, like the above modification B5. As a result, a new end surface of the SA partition 302 is easily made into contact with the housing flow path surface 275.

As shown in FIG. 58, the SA partition 302 is provided at a position closer to the SA flow path surface 285 than to the SA container surface 286 on the SA step surface 287. In this structure, the measurement flow path 212 and the SA container space 290 are partitioned by the SA partition 302 at a position as close as possible to the measurement flow path 212. Thus, a part of the gap between the housing 201 and the sensor SA 220 included in the measurement flow path 212 can be made as small as possible. Therefore, since the SA partition 302 is provided at a position as close as possible to the SA flow path surface 285, the detection accuracy of the flow rate sensor 202 can be improved.

As shown in FIGS. 57, 58, in such configuration in which the SA partition 302 provided on the SA step surface 287 is in contact with the housing step surface 277, both the SA step surface 287 and the housing step surface 277 intersect the height direction Y and face each other in the height direction Y. Therefore, when the sensor SA 220 is inserted into the first intermediate hole 236a of the first intermediate wall 236, the SA partition 302 is engaged with the housing step surface 277. Therefore, the SA partition 302 can be brought into tight contact with the housing step surface 277 by simply pushing the sensor SA 220 into the housing 201 toward the measurement flow path 212.

Figure 59:
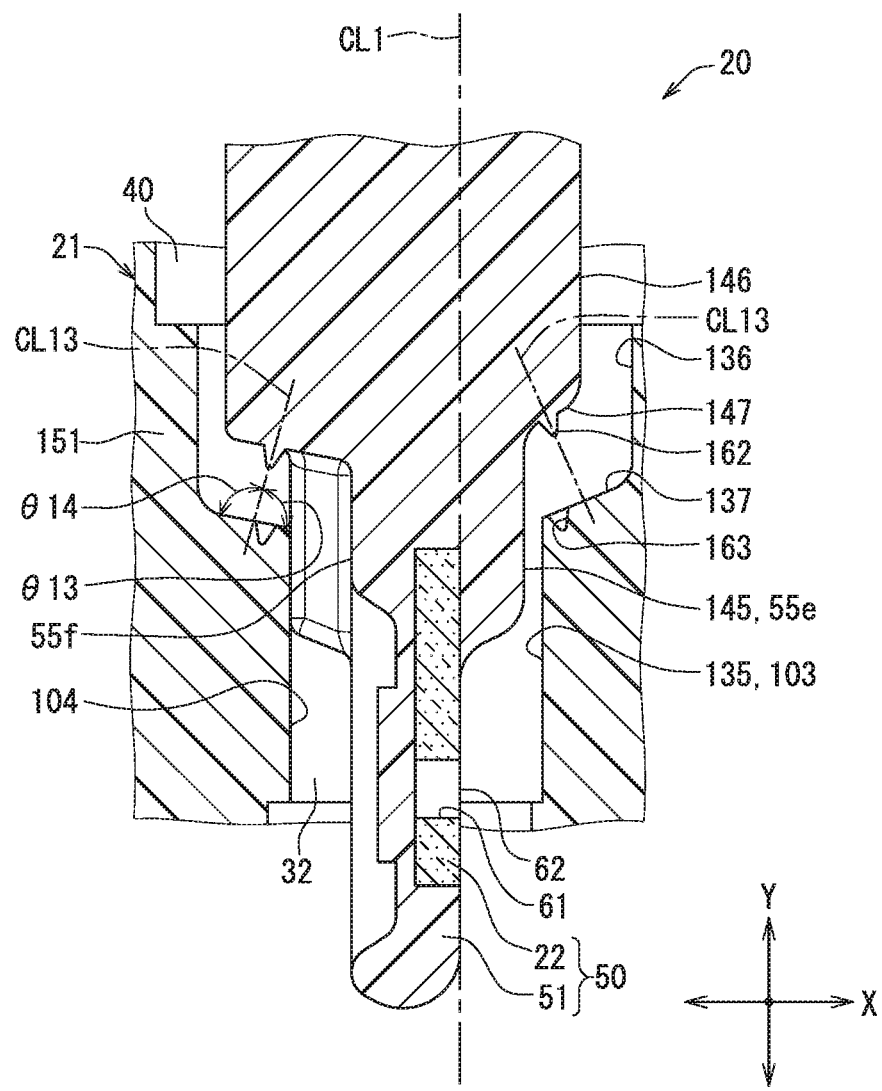
FIG. 59 is a vertical cross-sectional view of an air flow meter around a housing partition according to the first embodiment of a configuration group B7.

As a modification B7, the modifications B4 and B5 may be combined, and a housing recess may be provided on the housing into which the unit partition is inserted. For example, as shown in FIG. 59, in the first embodiment, the sensor SA 50 as the detection unit includes a SA partition 162 as the unit partition, and the housing 21 includes a housing recess 163. In this configuration, the SA partition 162 is a protrusion provided on the outer surface of the sensor SA 50, and projects from the sensor SA 50 toward the housing 21. The SA partition 162 is inserted into the housing recess 163.

The SA partition 162 is provided on the SA step surface 147 of the sensor SA 50. The SA partition 162 extends in the height direction Y, and a center line CL13 of the SA partition 162 extends linearly and inclined with respect to both the SA step surface 147 and the housing step surface 137. The SA partition 162, together with the SA step surface 147, extends to make a loop around an outer circumference of the sensor SA 50. In this case, the SA partition 162 has a portion extending in the width direction X and a portion extending in the depth direction Z. The SA partition 162 has a substantially rectangular frame shape as a whole. The SA partition 162 has a tapered shape, similar to the housing partition 131 of the first embodiment.

The housing recess 163 is provided on the housing step surface 137. A recessing direction of the housing recess 163 from the housing step surface 137 is the same as a protruding direction of the SA partition 162 from the SA step surface 147. That is, the center line of the housing recess 163 coincides with the center line CL13 of the SA partition 162.

The SA partition 162 is inserted into the housing recess 163. According to this configuration, the SA partition 162 and an inner surface of the housing recess 163 are easily brought into contact with each other. Specifically, a depth of the housing recess 163 is smaller than the protrusion height of the SA partition 162. In this case, the sensor SA 50 is inserted through the housing opening 151a, and the SA partition 162 is inserted into the housing recess 163. Then, the sensor SA 50 is further pushed such that the SA partition 162 contacts the inner surface of the housing recess 163 and is deformed via crushing. As a result, the SA partition 162 is easily made into contact with the inner surface of the housing recess 163. Even if the SA partition 162 is not in contact with the inner surface of the housing recess 163, a gap between the outer surface of the SA partition 162 and the inner surface of the housing recess 163 has a curved shape. Therefore, a foreign matter or air is unlikely to pass through the gap.

In FIG. 59, angles between the center line CL13 of the SA partition 162 and the housing step surface 137 include a container angle θ14 facing the SA container space 150 and a flow path angle θ13 facing the measurement flow path 32. The container angle θ14 is larger than the flow path angle θ13. That is, there is a relationship of θ14>θ13. According to this configuration, when the tip end of the SA partition 162 contacts the housing step surface 137, the tip end of the SA partition 162 is more likely to tilt or collapse toward the SA container space 150 than toward the measurement flow path 32. Therefore, even if crushed dust such as fragments is generated at the time of the SA partition 162 being crushed by the housing step surface 137, the crushed dust is unlikely to enter the measurement flow path 32.

As shown in FIG. 59, in such configuration in which the SA partition 162 provided on the SA step surface 147 is in contact with the housing step surface 137, both the SA step surface 147 and the housing step surface 137 intersect the height direction Y and face each other in the height direction Y. Therefore, when the sensor SA 50 is inserted into the first housing part 151, the SA partition 162 is engaged with the housing step surface 137. In this case, the SA partition 162 can be brought into tight contact with the housing step surface 137 by simply pushing the sensor SA 50 into the first housing part 151 toward the measurement flow path 32.

As a modification B8, the position the housing partition provided on the housing step surface may not be closer to the housing flow path surface than to the housing container surface. For example, in the second embodiment, the housing partition 271 is arranged at a position on the housing step surface 277 closer to the housing container surface 276 than to the housing flow path surface 275. Further, on the housing step surface 137, the housing flow path surface 135 and the housing container surface 136 may be the same in distance to the housing partition 131.

As a modification B9, the position the unit partition provided on the unit step surface may not be closer to the unit flow path surface than to the unit container surface. For example, in the modification B6, the SA partition 302 is provided at a position closer to the SA container surface 286 than to the SA flow path surface 285 on the SA step surface 287. Further, on the SA step surface 287, the SA flow path surface 285 and the SA container surface 286 may be the same in distance to the SA partition 302.

As a modification B10, the housing partition may be provided on multiple surfaces selected from among the housing step surface, the housing flow path surface, and the housing container surface. In this configuration, the housing partitions provided on the respective multiple surfaces may be connected to one another or may be independent from one another. For example, in the first embodiment, the housing partitions 131 provided on the housing step surface 137 and the housing flow path surface 135 are arranged in the height direction Y independently from each other.

As a modification B11, the unit partition may be provided on multiple surfaces selected from among the unit step surface, the unit flow path surface, and the unit container surface. In this configuration, the unit partitions provided on the respective multiple surfaces may be connected to one another or may be independent from one another. For example, in the modification B7, the SA partitions 162 provided on the SA step surface 147 and the SA flow path surface 145 are arranged in the height direction Y independently from each other.

As a modification B12, the housing partition and the unit partition may not make a loop around the detection unit. For example, on the housing step surface 137 of the first embodiment, a higher portion and a lower portion in height position in the height direction Y are arranged in the circumferential direction. In this configuration, the housing partition 131 is provided only on the lower portion among the higher portion and the lower portion. In this case, since the higher portion of the housing step surface 137 and the housing partition 131 are in contact with the SA step surface 147, no gap is generated between the inner surface of the first housing part 151 and the sensor SA 50. The housing partition 131 does not have an annular shape though the housing partition 131 extends in the width direction X and the depth direction Z.

As a modification B13, the physical quantity measurement device may have both the housing partition and the unit partition. For example, the housing partition and the unit partition are arranged in the height direction Y. In this configuration, the unit partition may be provided on a surface among the housing step surface, the housing flow path surface and the housing container surface, which does not face a surface on which the housing partition is provided. The unit partition may be provided on a surface which faces the surface on which the housing partition is provided. The housing partition and the unit partition may be in contact with each other. In this configuration, the housing partition and the unit partition are pressed against each other as the detection unit is inserted into the housing. Thus, at least one of the housing partition and the unit partition is easily deformed. In this case, since the housing partition and the unit partition easily come into tight contact with each other, the sealing property at the boundary between the measurement flow path and the container space is improved by both the housing partition and the unit partition.

As a modification B14, a shape of the housing partition does not have to change before and after the detection unit is attached to the housing as long as the housing partition is in contact with the outer surface of the detection unit. Similarly, a shape of the unit partition does not have to change before and after the detection unit is attached to the housing as long as the unit partition is in contact with the inner surface of the housing.

As a modification B15, the direction in which the housing partition extends from the inner surface of the housing is not limited to the above embodiments. For example, in the first embodiment, the container angle θ12 does not have to be larger than the flow path angle θ11. Similarly, the direction in which the unit partition portion extends from the outer surface of the detection unit is not limited to the above embodiments. For example, in the modification B7, the container angle θ14 does not have to be larger than the flow path angle θ13.

As a modification B16, the housing partition and the unit partition may not have the tapered shapes. For example, in the first embodiment, the housing partition 131 may have a rectangular vertical cross section. In this case, the width of the housing partition 131 in the directions X, Z orthogonal to the height direction Y is the same at the base end and the tip of the housing partition 131.

As a modification B17, the container space may be a space in which a gas such as air exists inside the housing. In this configuration, the seal performance at the boundary between the container space and the measurement flow path is improved by the housing partition and the unit partition. Thus, air can be prevented from flowing back and forth between the container space and the measurement flow path. Therefore, deterioration in accuracy of flow rate detection by the flow rate sensor in the measurement flow path due to air leakage from the measurement flow path to the container space and air intrusion from the container space to the measurement flow path can be reduced.

<Modifications of Configuration Group C>

Figure 60:
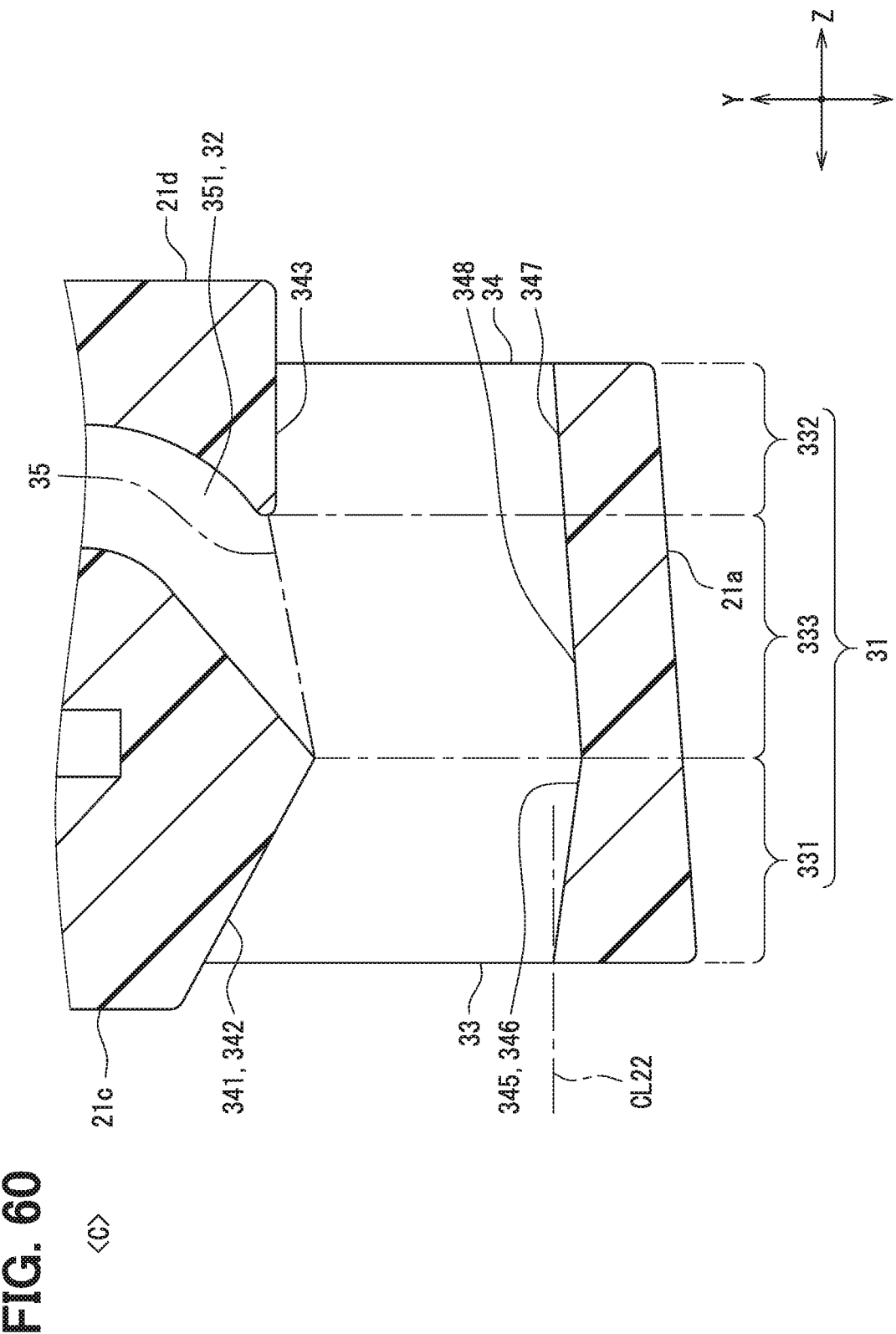
FIG. 60 is a vertical cross-sectional view of an air flow meter around a through flow path according to a third embodiment of a configuration group C1.
Figure 61:
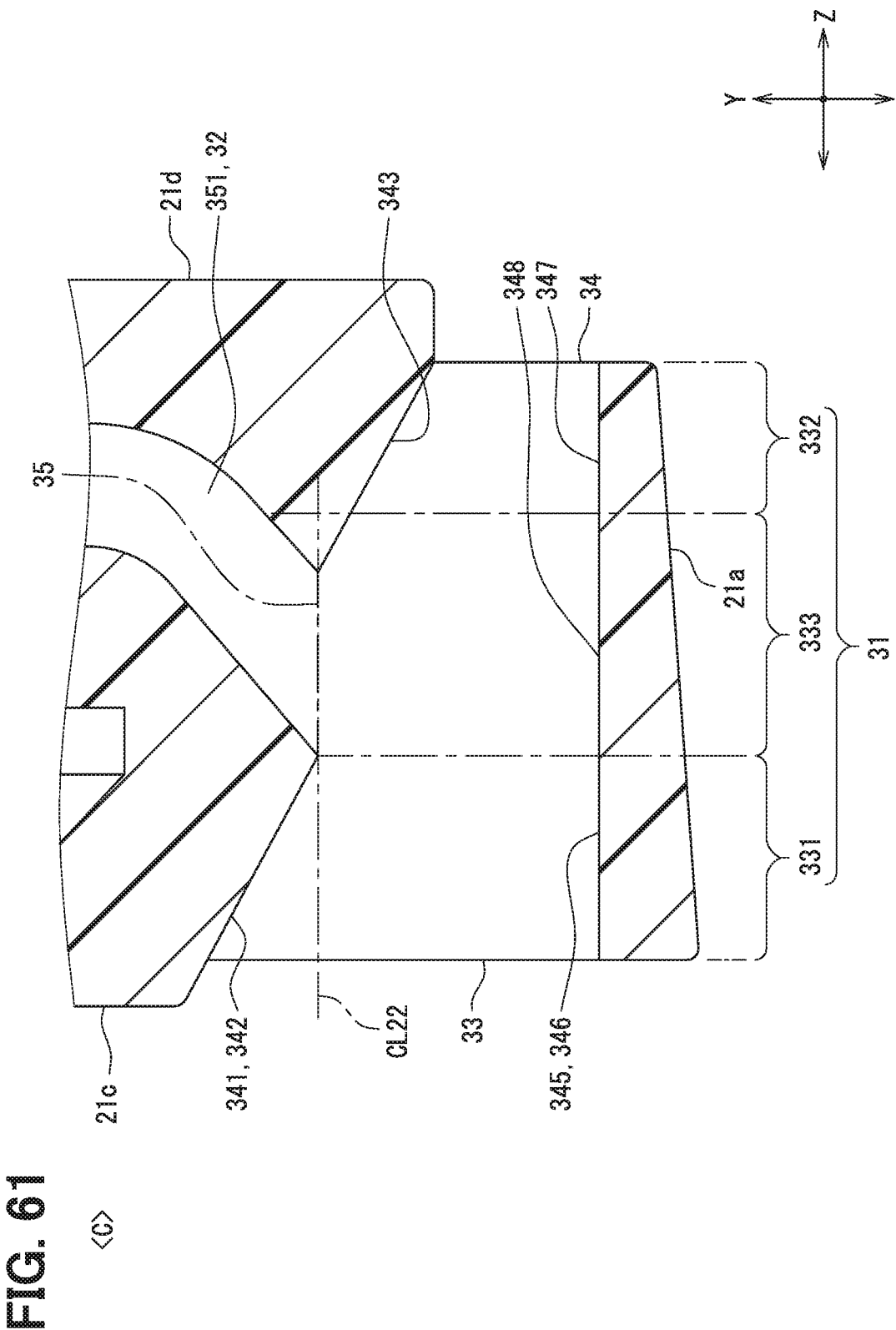
FIG. 61 is a vertical cross-sectional view of an air flow meter around a through flow path according to the third embodiment of a configuration group C2.

As a modification C1, the inlet floor surface does not have to face to the through inlet. For example, in the third embodiment described above, as shown in FIG. 60, the inlet floor surface 346 faces to the through outlet 34. In this configuration, the inlet floor surface 346 is inclined with respect to the main flow line CL22, the outlet floor surface 347, and the branch floor surface 348 such that the inlet floor surface 346 faces in a direction away from the through inlet 33 along the depth direction Z. Further, the inlet floor surface 346 may extend parallel to the main flow line CL22 as shown in FIG. 61. Further, an entire of the through floor surface 345 may face to the through outlet 34, or may extend parallel to the main flow line CL22 as shown in FIG. 61. In either configuration, the inlet ceiling surface 342 only has to be inclined with respect to the inlet floor surface 346.

As a modification C2, the measurement inlet does not have to face to the through outlet. For example, in the third embodiment, as shown in FIG. 61, the measurement inlet 35 does not face to either the through inlet 33 or the through outlet 34. The measurement inlet 35 extends parallel to the main flow line CL22 and faces the through floor surface 345. In this configuration, the through floor surface 345 extends parallel to the main flow line CL22, while the outlet ceiling surface 343 is inclined with respect to the main flow line CL22. The outlet ceiling surface 343 is inclined with respect to the outlet floor surface 347 such that the outlet ceiling surface 343 faces to the through outlet 34.

Figure 62:
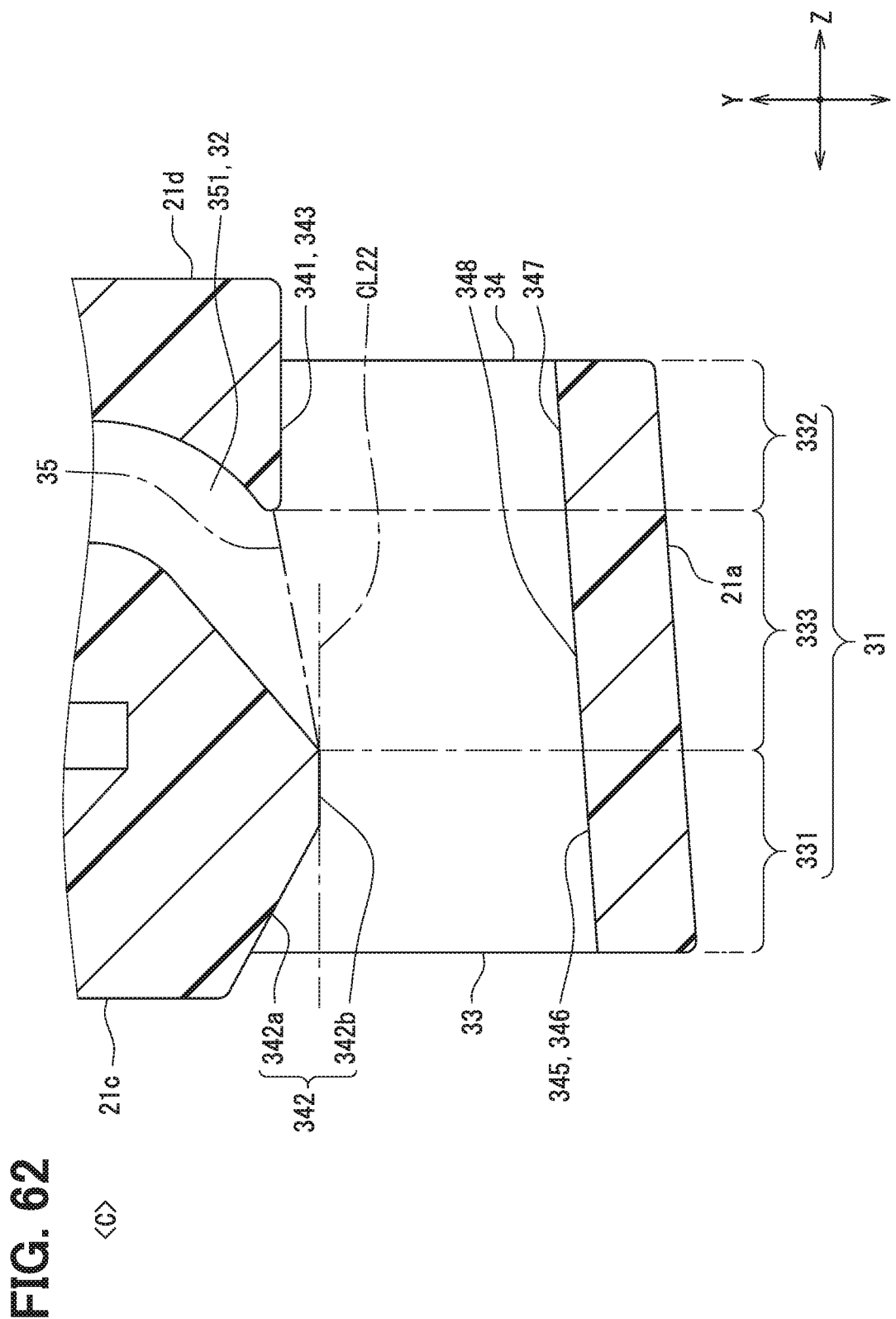
FIG. 62 is a vertical cross-sectional view of an air flow meter around a through flow path according to the third embodiment of a configuration group C3.

As a modification C3, a part of the inlet ceiling surface may be a ceiling inclined surface. For example, in the third embodiment, as shown in FIG. 62, the inlet ceiling surface 342 includes a ceiling inclined surface 342a and a ceiling connecting surface 342b. In this configuration, the ceiling inclined surface 342a extends from the through inlet 33 toward the through outlet 34 and is inclined with respect to the inlet floor surface 346. The ceiling inclined surface 342a faces to the through inlet 33 and is inclined with respect to not only the inlet floor surface 346 but also the main flow line CL22. In the depth direction Z, a length of the ceiling inclined surface 342a is smaller than a length of the inlet floor surface 346. The ceiling connecting surface 342b connects a downstream end of the ceiling inclined surface 342a and an upstream end of the measurement inlet 35 in the depth direction Z. The ceiling connecting surface 342b extends parallel to the main flow line CL22 extending in the main flow direction. In the depth direction Z, for example, the length of the ceiling inclined surface 342a is larger than a length of the ceiling connecting surface 342b.

In this modification, the ceiling inclined surface 342a is a portion corresponding to the inlet ceiling surface 342 of the third embodiment. Therefore, an inclination angle of the ceiling inclined surface 342a with respect to the inlet floor surface 346 is the inclination angle θ21, and an inclination angle of the ceiling inclined surface 342a with respect to the main flow line CL22 is the inclination angle θ22. Further, in the height direction Y, a distance between the ceiling inclined surface 342a and the inlet floor surface 346 is the distance H21.

As a modification C4, in the third embodiment, the inclination angle θ21 of the inlet ceiling surface 342 with respect to the inlet floor surface 346 may be a value equal to or less than the inclination angle θ22 of the inlet ceiling surface 342 with respect to the main flow line CL22. For example, as in the modification C1, the inlet floor surface 346 is inclined with respect to the main flow line CL22 such that the inlet floor surface 346 faces to the through outlet 34.

As a modification C5, in the third embodiment, when the inclination angle θ21 of the inlet ceiling surface 342 with respect to the inlet floor surface 346 is larger than or equal to 10 degrees, the inclination angle θ22 of the inlet ceiling surface 342 with respect to the main flow line CL22 does not have to be larger than or equal to 10 degrees. For example, the inlet ceiling surface 342 faces to the through outlet 34. In this configuration, the inclination angle θ22 of the inlet ceiling surface 342 with respect to the main flow line CL22 is smaller than 10 degrees while the inclination angle θ21 of the inlet ceiling surface 342 with respect to the inlet floor surface 346 is larger than 10 degrees. In this case, the inlet floor surface 346 is largely inclined with respect to the main flow line CL22 such that the inlet floor surface 346 faces to the through inlet 33.

As a modification C6, in the third embodiment, the inclination angle θ23 of the branch measurement line CL23 with respect to the inlet floor surface 346 may be a value equal to or larger than the inclination angle θ24 of the branch measurement line CL23 with respect to the main flow line CL22. For example, as in the modification C4, the inlet floor surface 346 is inclined with respect to the main flow line CL22 such that the inlet floor surface 346 faces to the through outlet 34.

As a modification C7, in the third embodiment, the inclination angle θ21 of the inlet ceiling surface 342 with respect to the inlet floor surface 346 may be a value within a range larger than 0 degree and smaller than 10 degrees. Further, the inclination angle θ22 of the inlet ceiling surface 342 with respect to the main flow line CL22 may be a value within a range larger than 0 degree and smaller than 10 degrees.

As a modification C8, in the third embodiment, the inclination angle θ23 of the branch measurement line CL23 with respect to the inlet floor surface 346 may be a value within a range larger than 0 degree and smaller than 90 degrees. Further, the inclination angle θ24 of the branch measurement line CL23 with respect to the main flow line CL22 may be a value within a range larger than 0 degree and smaller than 90 degrees.

As a modification C9, in the third embodiment, the inlet ceiling surface 342 and the inlet floor surface 346 may be curved so as to bulge or recess in the housing distal end direction. In this configuration, for example, a straight imaginary line passing through an upstream end and a downstream end of the inlet ceiling surface 342 is assumed. An inclination of this imaginary line with respect to the inlet floor surface 346 and the main flow line CL22 is used as the inclination of the inlet ceiling surface 342. On the other hand, a straight imaginary line passing through an upstream end and a downstream end of the inlet floor surface 346 is assumed. An inclination of this imaginary line with respect to the inlet ceiling surface 342 and the branch measurement line CL23 is used as the inclination of the inlet floor surface 346.

As a modification C10, in the third embodiment, the through flow path 31 need not have the outlet through path 332 as long as the through flow path 31 has the inlet through path 331 and the branch through path 333. In this configuration, the downstream end of the branch through path 333 serves as the through outlet 34. Further, in this configuration, the through ceiling surface 341 has the inlet ceiling surface 342, but does not have the outlet ceiling surface 343. Further, in this configuration, the through floor surface 345 has the inlet floor surface 346 and the branch floor surface 348, but does not have the outlet floor surface 347.

As a modification C11, in the third embodiment, the decrease rate of the cross-sectional area S21 of the inlet through path 331 between the upstream end and the downstream end of the inlet through path 331 may not be a constant value. For example, the decrease rate of the cross-sectional area S21 decreases gradually in a direction from the through inlet 33 toward the through outlet 34. In this configuration, a graph showing the value of the cross-sectional area S21 in the inlet through path 331 has a shape convex downward unlike FIG. 42. Alternatively, the decrease rate of the cross-sectional area S21 increases gradually in the direction from the through inlet 33 toward the through outlet 34. In this configuration, a graph showing the value of the cross-sectional area S21 in the inlet through path 331 has a shape convex upward unlike FIG. 42.

As a modification C12, in the third embodiment, the cross-sectional area S21 of the inlet through path 331 may not be the cross-sectional area along the direction orthogonal to the main flow line CL22, but a cross-sectional area along a direction orthogonal to the inlet through line CL24.

As a modification C13, in the third embodiment, the branch measurement path 351 may not extend straight from the measurement inlet 35 but may be curved. In other words, the center line of the branch measurement path 351 may be curved without extending straight. Regarding the configuration in which the center line of the branch measurement path 351 is curved, a tangent line to the center line of the branch measurement path 351 at the measurement inlet 35 is defined as the branch measurement line CL23.

As a modification C14, in the third embodiment, the inclination angle θ26 of the branch measurement line CL23 with respect to the outlet through line CL25 may be a value within a range larger than 0 degree and smaller than 60 degrees.

As a modification C15, in the measurement flow path 32, the flow rate sensor 22 may be provided in the branch measurement path 351, the introduction measurement path 352, or the discharge measurement path 354.

As a modification C16, in the air flow meter 20, the portion having the angle setting surface 27a for setting the installation angle of the housing 21 with respect to the intake passage 12 may not be the flange 27. For example, the housing 21 is fixed to the pipe flange 14c with bolts or the like in a state in which a part of the housing 21 is hooked on an end surface of the pipe flange 14c of the piping unit 14. In this configuration, a surface of the housing 21 that overlaps the end surface of the pipe flange 14c is the angle setting surface. Since the angle setting surface overlaps the end surface of the pipe flange 14c, the installation angle of the housing 21 with respect to the intake passage 12 is set.

<Modification of Configuration Group D>

Figure 63:
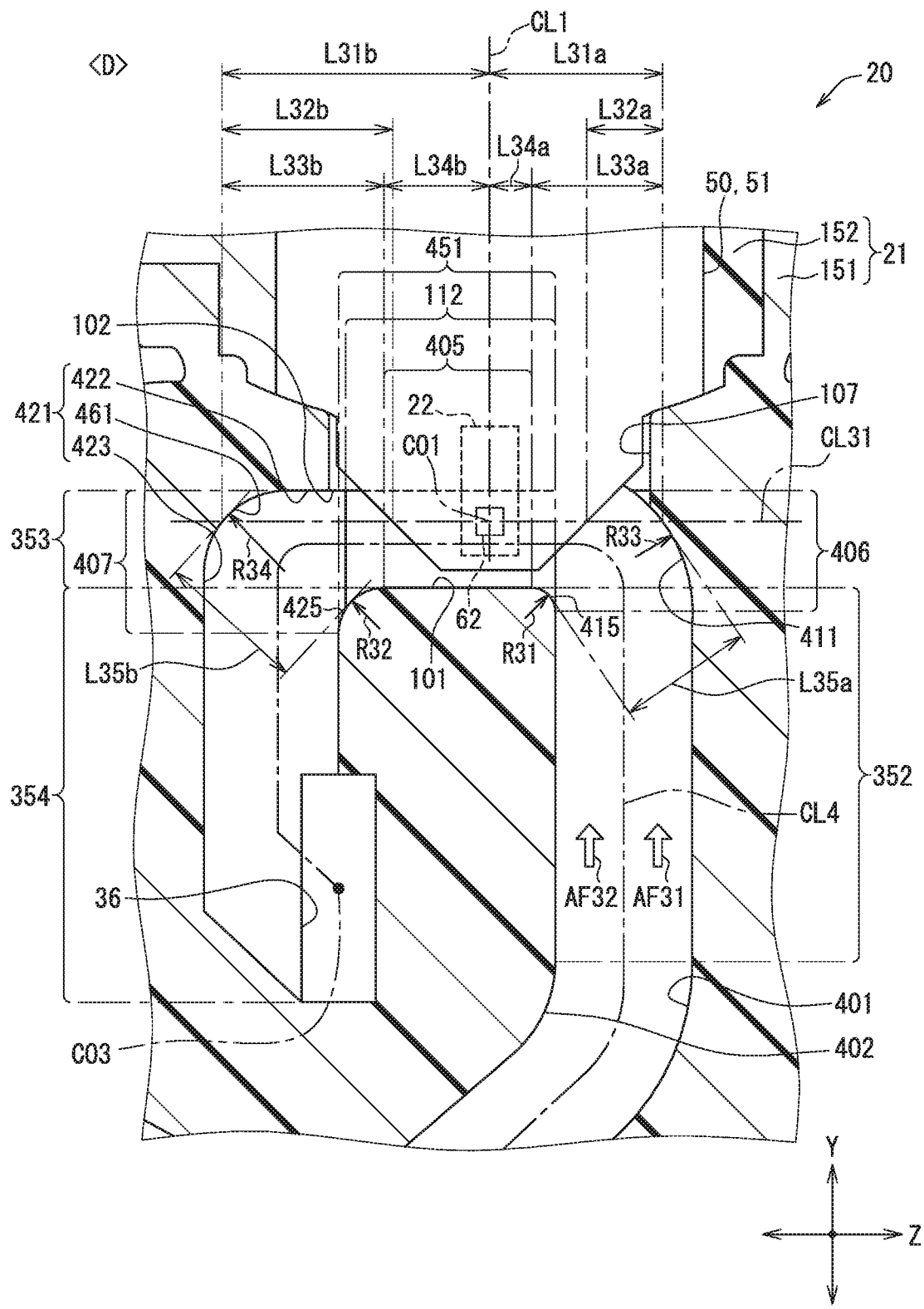
FIG. 63 is a vertical cross-sectional view of an air flow meter according to the first embodiment of a configuration group D1.

As a modification D1, the downstream outer curved surface 421 may have an arched portion. As shown in FIG. 63, for example, the downstream outer curved surface 421 includes a downstream outer arched surface 461 in addition to the downstream outer horizontal surface 422 and the downstream outer vertical surface 423. The downstream outer arched surface 461 concavely extends along the center line CL4 of the measurement flow path 32. The downstream outer arched surface 461 is arched so as to be continuously curved along the center line CL4. The downstream outer arched surface 461 is provided between the downstream outer horizontal surface 422 and the downstream outer vertical surface 423 in the direction in which the center line CL4 extends. The downstream outer arched surface 461 connects the downstream outer horizontal surface 422 and the downstream outer vertical surface 423.

A radius of curvature R34 of the downstream outer arched surface 461 is smaller than the radius of curvature R33 of the upstream outer curved surface 411. Thus, similar to the first embodiment, the curve of the downstream outer curved surface 421 is sharper than the curve of the upstream outer curved surface 411. On the other hand, the radius of curvature R34 of the downstream outer arched surface 461 is larger than the radius of curvature R32 of the downstream inner curved surface 425. Thus, the curve of the downstream outer curved surface 421 is gentler than the curve of the downstream inner curved surface 425.

The arrangement line CL31 passes through the downstream outer arched surface 461 of the downstream outer curved surface 421 without through the downstream outer vertical surface 423. In this configuration, air that has passed through the flow rate sensor 22 and traveled along the arrangement line CL31 changes its flow direction by hitting the downstream outer arched surface 461. Thus, the air is easier to travel toward the downstream side of the downstream curved path 407.

According to the present modification, the downstream outer curved surface 421 includes the downstream outer arched surface 461. Hence, the air blown out from between the sensor support 51 and the narrowed portions 111, 112 toward the downstream curved path 407 is likely to flow along the downstream outer arched surface 461. In this case, the air that has passed through the flow rate sensor 22 is less likely to stay in the downstream curved path 407. Therefore, decrease in the flow rate and flow velocity of the air passing through the flow rate sensor 22 can be reduced.

Further, it is preferable that the radius of curvature R34 of the downstream outer arched surface 461 is smaller than the radius of curvature R33 of the upstream outer curved surface 411 such that the degree of recess of the downstream outer curved surface 421 is larger than the degree of recess of the upstream outer curved surface 411. In this configuration, while the degree of recess of the downstream outer curved surface 421 is made as large as possible, the air reaching the downstream curved path 407 from the flow rate sensor 22 easily flows toward the measurement outlet 36 along an arch of the downstream outer arched surface 461. Therefore, increase in pressure loss in the downstream curved path 407 due to air disruption in the downstream curved path 407 can be reduced by the shape of the downstream outer curved surface 421.

As a modification D2, in the modification D1, the downstream outer curved surface 421 includes the downstream outer arched surface 461, but may not include at least one of the downstream outer horizontal surface 422 and the downstream outer vertical surface 423. For example, the downstream outer curved surface 421 does not include both the downstream outer horizontal surface 422 and the downstream outer vertical surface 423. In this configuration, the downstream outer arched surface 461 connects the upstream end part and the downstream end part of the downstream curved path 407. In this case, the downstream outer curved surface 421 is the downstream outer arched surface 461 as a whole. The downstream outer curved surface 421 corresponds to a downstream outer arched surface.

As a modification D3, the upstream outer curved surface 411 may include at least one of an upstream outer vertical surface and an upstream outer horizontal surface. The upstream outer vertical surface extends straight from the upstream end part of the upstream curved path 406. The upstream outer horizontal surface extends straight from the downstream end part of the upstream curved path 406. In this configuration, the entire of the upstream outer curved surface 411 is not an upstream outer arched surface. The upstream outer curved surface 411 includes not only the at least one of the upstream outer vertical surface and the upstream outer horizontal surface but also the upstream outer arched surface. For example, in a configuration in which the upstream outer curved surface 411 includes the upstream outer vertical surface and the upstream outer arched surface, the arrangement line CL31 may pass through the upstream outer vertical surface. Further, in the upstream outer curved surface 411, an upstream outer internal corner may be formed as an internal corner in which the upstream outer vertical surface and the upstream outer horizontal surface join inwardly with each other.

As a modification D4, the upstream inner curved surface 415 may include at least one of an upstream inner vertical surface and an upstream inner horizontal surface. The upstream inner vertical surface extends straight from the upstream end part of the upstream curved path 406. The upstream inner horizontal surface extends straight from the downstream end part of the upstream curved path 406. In this configuration, the entire of the upstream inner curved surface 415 is not an upstream inner arched surface. The upstream inner curved surface 415 includes not only the at least one of the upstream inner vertical surface and the upstream inner horizontal surface but also the upstream inner arched surface. Further, in the upstream inner curved surface 415, an upstream outer external corner may be formed as an external corner in which the upstream inner vertical surface and the upstream inner horizontal surface join outwardly.

As a modification D5, the downstream inner curved surface 425 may include at least one of a downstream inner vertical surface and a downstream inner horizontal surface. The downstream inner vertical surface extends straight from the downstream end part of the downstream curved path 407. The downstream inner horizontal surface extends straight from the downstream end part of the upstream curved path 407. In this configuration, the entire of the downstream inner curved surface 425 is not a downstream inner arched surface. The downstream inner curved surface 425 includes not only the at least one of the downstream inner vertical surface and the downstream inner horizontal surface but also the downstream inner arched surface. Further, in the downstream inner curved surface 425, a downstream outer external corner may be formed as an external corner in which the downstream inner vertical surface and the downstream inner horizontal surface join outwardly.

As a modification D6, the outer curved surfaces 411, 421 and the inner curved surfaces 415, 425 may have at least one inclined surface inclined with respect to the arrangement line CL31, and thus may be curved not continuously but stepwise. For example, the downstream outer curved surface 421 has a downstream outer inclined surface as the inclined surface that extends straight in a direction inclined with respect to the arrangement line CL31. In this configuration, a connection portion between the downstream outer horizontal surface 422 and the downstream outer vertical surface 423 is chamfered by the downstream outer inclined surface. The downstream outer curved surface 421 does not have the downstream outer internal corner 424. In addition, multiple downstream outer inclined surfaces may be arranged along the center line CL4 of the measurement flow path 32. In this configuration, the downstream outer curved surface 421 has a shape that is curved stepwise by the multiple downstream outer inclined surfaces.

As a modification D7, the configuration in which the degree of recess of the downstream outer curved surface 421 is larger than the degree of recess of the upstream outer curved surface 411 may be realized regardless of the radius of curvature. For example, the entire of the downstream outer curved surface 421 may be the downstream outer arched surface. The entire of the upstream outer curved surface 411 may be the upstream outer arched surface. The radius of curvature R34 of the downstream outer curved surface 421 may be greater than the radius of curvature R33 of the upstream outer curved surface 411. Also in this configuration, as long as the length of the downstream outer curved surface 421 is smaller than the length of the upstream outer curved surface 411 in the direction in which the center line CL4 of the measurement flow path 32 extends, the degree of recess of the downstream outer curved surface 421 is larger than the degree of recess of the upstream outer curved surface 411.

As a modification D8, in the sensor path 405, at least the measurement floor surface 101 only have to extend straight along the arrangement line CL31. Further, an upstream end part of the flow rate sensor 22 may be provided at the upstream end part of the sensor path 405. A downstream end part of the flow rate sensor 22 may be provided at the downstream end part of the sensor path 405. For example, the length of the sensor path 405 and the length of the flow rate sensor 22 may be the same in the depth direction Z.

As a modification D9, in the depth direction Z, the downstream end part of the upstream outer curved surface 411 may be provided at a position closer to the flow rate sensor 22 than the downstream end part of the upstream inner curved surface 415 is. In this case, the upstream end part of the sensor path 405 is defined by the downstream end part of the upstream outer curved surface 411, not by the downstream end part of the upstream inner curved surface 415. Further, in the depth direction Z, the upstream end part of the downstream outer curved surface 421 may be provided at a position closer to the flow rate sensor 22 than the upstream end part of the downstream inner curved surface 425 is. In this case, the downstream end part of the sensor path 405 is defined by the upstream end part of the downstream outer curved surface 421, not by the upstream end part of the downstream inner curved surface 425.

As a modification D10, the arrangement line CL31 only have to pass through the flow rate sensor 22. The arrangement line CL31 does not have to pass through the center CO1 of the heating resistor 71, for example, as long as the arrangement line CL1 passes through a part of the heating resistor 71. Further, the arrangement line CL31 may pass through the center or a part of the membrane portion 62, and may pass through the center or a part of the flow rate sensor 22. Furthermore, the arrangement line CL31 may be inclined with respect to the angle setting surface 27a of the housing 21, the depth direction Z, or the main flow direction as long as the arrangement line CL31 extends in the direction in which the upstream curved path 406 and the downstream curved path 407 are arranged.

As a modification D11, if the flow rate sensor 22 is arranged closer to the upstream outer curved surface 411 than to the downstream outer curved surface 421 on the arrangement line CL31, the sensor support 51 does not need to be located at a position closer to the upstream outer curved surface 411 than to the downstream outer curved surface 421. In this case, in the sensor support 51, the flow rate sensor 22 is arranged at a position closer to the molded upstream surface 55c than to the molded downstream surface 55d on the arrangement line CL31.

As a modification D12, if the flow rate sensor 22 is arranged closer to the upstream outer curved surface 411 than to the downstream outer curved surface 421 on the arrangement line CL31, the flow rate sensor 22 does not need to be located at a position closer to the upstream end part of the sensor path 405 than to the downstream end part of the sensor path 405. In this case, on the arrangement line CL31, a distance between the upstream end part of the downstream curved path 407 and the downstream outer curved surface 421 is larger than a distance between the downstream end part of the upstream curved path 406 and the upstream outer curved surface 411.

As a modification D13, in the measurement flow path 32, the upstream curved path 406 and the downstream curved path 407 may be curved in opposite directions with respect to the sensor path 405. For example, both the upstream curved path 406 and the downstream curved path 407 may not extend from the sensor path 405 in the housing distal end direction. One of them may extend in the housing distal end direction, and another of them may extend in the housing basal end direction. If the upstream curved path 406 extends from the sensor path 405 in the housing distal end direction, and the downstream curved path 407 extends from the sensor path 405 in the housing basal end direction, the downstream outer curved surface 421 extends from the measurement ceiling surface 102 without extending from the measurement floor surface 101. Further, the downstream inner curved surface 425 extends from the measurement floor surface 101 without extending from the measurement ceiling surface 102.

Figure 64:
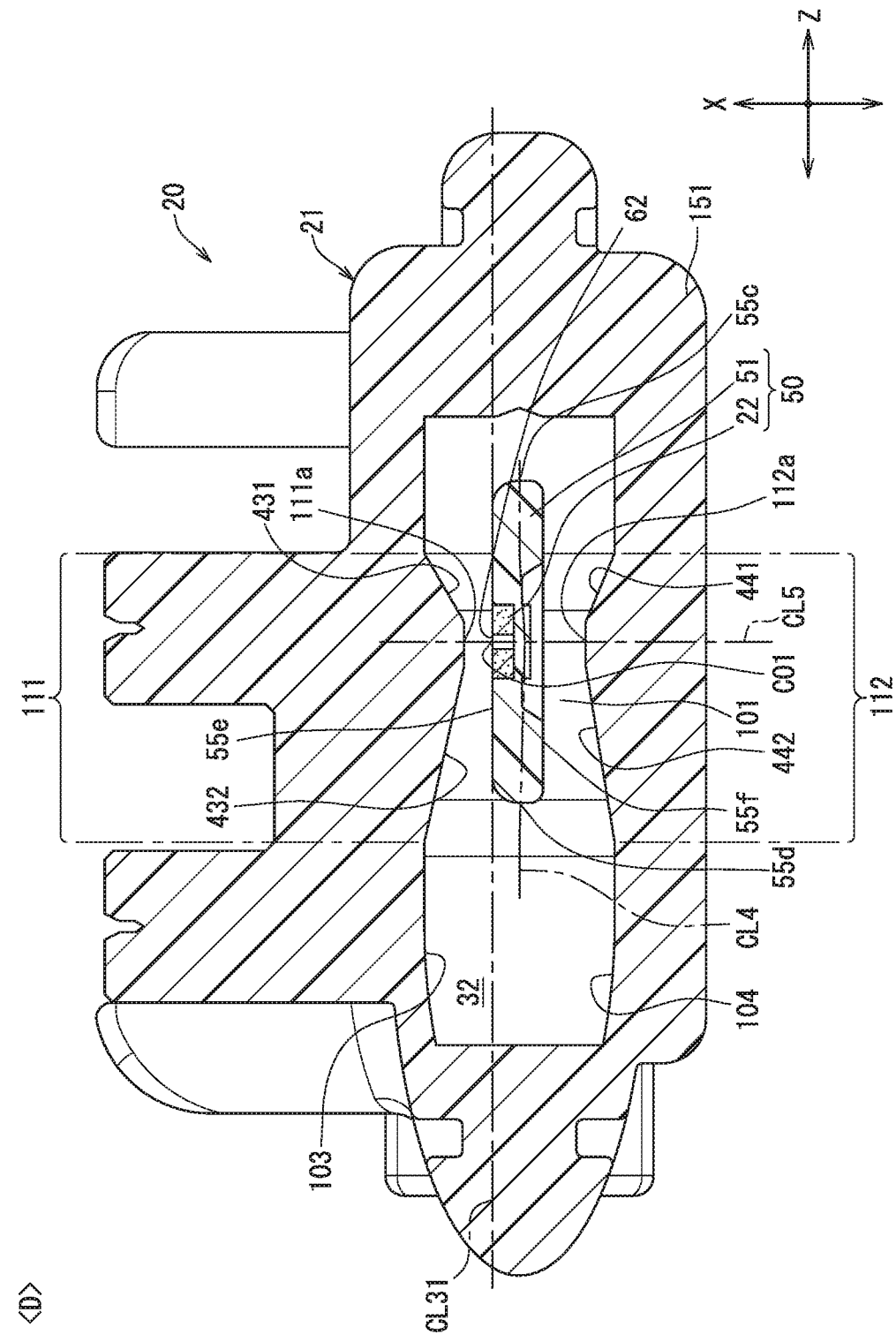
FIG. 64 is a horizontal cross-sectional view of an air flow meter according to the first embodiment of a configuration group D14.

As a modification D14, the measurement narrowing surface and the measurement expanding surface of the measurement narrowed portion may be arched so as to be recessed, or may extend straight without being arched. For example, as shown in FIG. 64, in the narrowed portions 111, 112, the narrowing surfaces 431, 441 extend straight from the peaks 111a, 112a to upstream, and the expanding surfaces 432, 442 extend straight from the peaks 111a, 112a to downstream. The narrowing surfaces 431, 441 are inclined with respect to the arrangement line CL31 so as to face upstream in the measurement flow path 32. The expanding surfaces 432, 442 are inclined with respect to the arrangement line CL31 so as to face downstream in the measurement flow path 32. Increase rates of the protrusion heights of the narrowing surfaces 431, 441 are constant from the narrowing upstream surfaces 433, 443 toward the peaks 111a, 112a. Decrease rates of the protrusion heights of the expanding surfaces 432, 442 are constant from the peaks 111a, 112a toward the expanding downstream surfaces 434, 444.

The narrowed portions 111, 112 have end surfaces extending along the arrangement line CL1, and these end surfaces are the peaks 111a, 112a. The centers of the peaks 111a, 112a in the depth direction Z are at positions closer to the downstream curved path 407 than the center line CL5 of the heating resistor 71 is.

According to this modification, since the front narrowing surface 431 and the back narrowing surface 441 extend straight. Therefore, the air flow regulating effect by these narrowing surfaces 431, 441 can be improved. Further, the front expanding surface 432 and the back expanding surface 442 extend straight. Therefore, turbulence of airflow such as separation of the airflow from the expanding surfaces 432, 442 is likely to be generated without deteriorating the detection accuracy of the flow rate sensor 22. In this case, the velocity energy of the air blown out as a jet flow toward the downstream curved path 407 from between the sensor support 51 and the expanding surfaces 432, 442 can be reduced. Therefore, it can be reduced that the jet flow bounces back on the downstream outer curved surface 421 and returns to the flow rate sensor 22 as a backward flow.

In the measurement narrowed portion, only one of the measurement narrowing surface and the measurement expanding surface may extend straight. Specifically, at least one of the front narrowing surface 431, the front expanding surface 432, the back narrowing surface 441, and the back expanding surface 442 may extend straight. Further, the front peak 111a and the back peak 112a may be convexly arched or may be concavely arched.

As a modification D15, the shapes and sizes of the narrowed portions 111, 112 may be different from the configuration of the first embodiment. For example, in the narrowed portions 111, 112, the length W32a, W32b of the narrowing surfaces 431, 441 are not need to be smaller than the lengths W33a, W33b of the expanding surfaces 432, 442. Further, the front narrowing upstream surface 433 and the front expanding downstream surface 434 may not be coplanar with each other. In this case, the protrusion height of the front narrowing surface 431 from the front narrowing upstream surface 433 is different from the protrusion height of the front expanding surface 432 from the front expanding downstream surface 434. Also in the back narrowed portion 112, as in the front narrowed portion 111, the back narrowing upstream surface 443 and the back expanding downstream surface 444 may not be coplanar with each other. In this case, the protrusion height of the back narrowing surface 441 from the back narrowing upstream surface 443 is different from the protrusion height of the back expanding surface 442 from the back expanding downstream surface 444.

As a modification D16, the front narrowed portion 111 and the back narrowed portion 112 may have different shapes and sizes. For example, the length W31a of the front narrowed portion 111 may be larger or smaller than the length W31b of the back narrowed portion 112. The length W32a of the front narrowing surface 431 may be larger or smaller than the length W32b of the back narrowing surface 441. The length W33a of the front expanding surface 432 may be larger or smaller than the length W33b of the back expanding surface 442. The protrusion height D32a, D36a of the front peak 111a may be the same as or smaller than the protrusion height D32b, D36b of the back peak 112a.

As a modification D17, the narrowed portions 111, 112 may extend outward of the measurement partition 451 in the depth direction Z. Further, the narrowed portions 111 and 112 may be positioned so as not enter an inside of the upstream curved path 406 or an inside of the downstream curved path 407. For example, the narrowed portions 111, 112 may be provided only in the sensor path 405 among the sensor path 405, the upstream curved path 406, and the downstream curved path 407. Further the narrowed portions 111, 112 may not be bridged by the measurement ceiling surface 102 and the measurement floor surface 101. For example, the narrowed portions 111 and 112 may extend from only one of the measurement ceiling surface 102 and the measurement floor surface 101. Further, the narrowed portions 111, 112 may be provided between the measurement ceiling surface 102 and the measurement floor surface 101 but apart from both the measurement ceiling surface 102 and the measurement floor surface 101.

As a modification D18, the measurement narrowed portions such as the narrowed portions 111 and 112 only have to be provided on at least one of the front measurement wall surface 103, the back measurement wall surface 104, the outer measurement curved surface 401, and the inner measurement curved surface 402 in the measurement flow path 32. For example, at least one of the front narrowed portion 111 and the back narrowed portion 112 is provided. Further, the measurement narrowed portions may be provided to each of the measurement wall surfaces 103, 104 and the measurement curved surface 401, 402.

As a modification D19, the degree of bulge of the downstream inner curved surface 425 may not be smaller than the degree of bulge of the upstream inner curved surface 415. Further, the degree of recess of the downstream outer curved surface 421 may be smaller than the degree of bulge of the downstream inner curved surface 425. Moreover, the degree of recess of the upstream outer curved surface 411 may be larger than the degree of bulge of the upstream inner curved surface 415. In any configuration, it is preferable that there is a relationship: L35b>L35a in the measurement flow path 32.

As a modification D20, there may not be the relationship: L35b>L35a in the measurement flow path 32. That is, the distance L35b between the downstream outer curved surface 421 and the downstream inner curved surface 425 may not be larger than the distance L35a between the upstream outer curved surface 411 and the upstream inner curved surface 415.

As a modification D21, the degree of recess of the downstream outer curved surface 421 does not have to be larger than the degree of recess of the upstream outer curved surface 411.

As a modification D22, the flow rate sensor 22 may not be arranged closer to the upstream outer curved surface 411 than to the downstream outer curved surface 421 on the arrangement line CL31.

<Modifications of Configuration Group E>

As a modification E1, a portion of the molded upstream surface 55c of the sensor support 51, which is provided in the measurement flow path 32, may be entirely arranged upstream of the narrowed portions 111, 112. That is, in the measurement flow path 32, as long as the portion of the molded upstream surface 55c included in the arrangement cross section CS41 is provided upstream of the narrowed portions 111, 112, the other portions may not be provided upstream of the narrowed portions 111, 112.

As a modification E2, in the arrangement cross section CS41, the molded upstream surface 55c may be arranged upstream of at least one of the front narrowed portion 111 and the back narrowed portion 112. For example, the back narrowed portion 112 is arranged downstream of the molded upstream surface 55c in the arrangement cross section CS41.

As a modification E3, in the sensor support 51, the molded upstream inclined surface 471 may be inclined with respect to the height direction Y such that the molded upstream inclined surface 471 gradually approach the molded downstream surface 55d in a direction toward the molded basal end surface 55b. Further, the molded upstream inclined surface 471 may be a curved surface such as an arched surface that is curved so as to convex or concave in the depth direction Z.

As modification E4, the molded upstream surface 55c of the sensor support 51 may not have the molded upstream inclined surface 471. For example, the molded upstream surface 55c is not inclined with respect to the height direction Y and extends from the molded distal end surface 55a toward the molded basal end surface 55b.

As a modification E5, at least a part of the molded upstream surface 55c of the sensor support 51 may be provided in the upstream curved path 406. For example, the entire molded upstream inclined surface 471 is provided in the upstream curved path 406. Further, the sensor support 51 may be provided at a position away from the upstream curved path 406.

As a modification E6, a portion of the molded downstream surface 55d of the sensor support 51, which is provided in the measurement flow path 32, may be entirely arranged upstream of the downstream ends 111c, 112c of the narrowed portions 111, 112. That is, in the measurement flow path 32, as long as the portion of the molded downstream surface 55d included in the arrangement cross section CS41 is provided upstream of the downstream ends 111c, 112c of the narrowed portions 111, 112, the other portions may not be provided upstream of the downstream ends 111c, 112c.

As a modification E7, in the arrangement cross section CS41, the molded downstream surface 55d may be arranged upstream of at least one of the front downstream end 111c of the front narrowed portion 111 and the back downstream end 112c of the back narrowed portion 112. For example, the back downstream end 112c of the back narrowed portion 112 is arranged downstream of the molded downstream surface 55d in the arrangement cross section CS41.

As a modification E8, in the sensor support 51, the molded downstream inclined surface 472 may be inclined with respect to the height direction Y such that the molded downstream inclined surface 472 gradually approach the molded upstream surface 55c in a direction toward the molded basal end surface 55b. Further, the molded downstream inclined surface 472 may be a curved surface such as an arched surface that is curved so as to convex or concave in the depth direction Z.

As modification E9, the molded downstream surface 55d of the sensor support 51 may not have the molded downstream inclined surface 472. For example, the molded downstream surface 55d is not inclined with respect to the height direction Y and extends from the molded distal end surface 55a toward the molded basal end surface 55b.

As a modification E10, at least a part of the molded downstream surface 55d of the sensor support 51 may be provided in the downstream curved path 407. For example, the entire molded downstream inclined surface 472 is provided in the downstream curved path 407. Further, the sensor support 51 may be provided at a position away from the downstream curved path 407.

As a modification E11, a portion of the molded downstream surface 55d of the sensor support 51, which is provided in the measurement flow path 32, may be entirely arranged downstream of the narrowed portions 111, 112.

As a modification E12, the flow rate sensor 22 may be provided downstream or upstream of the front peak 111a or the back peak 112a, as long as the flow rate sensor 22 is disposed at a position where the flow velocity is the highest in the measurement flow path 32. Further, the flow rate sensor 22 may be provided at a position different from the position where the flow velocity is the highest in the measurement flow path 32.

As a modification E13, the opening area of the measurement outlet 36 may not be smaller than the opening area of the measurement inlet 35. Further, the opening area of the through outlet 34 may not be smaller than the opening area of the through inlet 33.

<Features of Configuration Group A>

The configurations disclosed in the present specification include the features of the configuration group A as described below.

[Feature A1]

A physical quantity measurement device (20) for measuring a physical quantity of a fluid, the physical quantity measurement device comprising:

a measurement flow path (32) through which the fluid flows;

a housing (21) forming the measurement flow path; and a detection unit (50) including a physical quantity sensor (22) that detects the physical quantity of the fluid in the measurement flow path, and a sensor support (51) that has a plate shape and supports the physical quantity sensor, the detection unit being attached to the housing such that a support end (55a) that is an end of the sensor support and the physical quantity sensor are housed in the measurement flow path, wherein the sensor support includes:
  a support front surface (55e) which is one plate surface of the sensor support on which the physical quantity sensor is disposed; and
  a support back surface (55f) behind the support front surface, the housing includes forming surfaces that form the measurement flow path, and the forming surfaces include:
  a floor surface (101) facing the support end;
  a front wall surface (103) facing the support front surface; and a back wall surface (104) opposite to the front wall surface across the floor surface and facing the support back surface, a front distance (L1) is a distance between the physical quantity sensor and the front wall surface in a front-back direction (X) in which the front wall surface and the back wall surface are arranged, a floor distance (L3) is a distance between the floor surface and the support end in a height direction (Y) in which the floor surface and the support are arranged, the height direction being orthogonal to the front-back direction, and the front distance is larger than the floor distance.

[Feature A2]

The physical quantity measurement device according to Feature A1, wherein the front distance is smaller than a back distance (L2) which is a distance between the back wall surface and the support back surface in the front-back direction.

[Feature A3]

The physical quantity measurement device according to Feature A1 or A2, wherein the housing includes a front narrowed portion (111) forming the front wall surface and bulges toward the back wall surface in the front-back direction, the front narrowed portion narrows the measurement flow path such that a measurement width dimension (W1) that is a distance between the front wall surface and the back wall surface in the front-back direction gradually decreases in a direction from upstream toward the physical quantity sensor, and the front distance is a distance between the physical quantity sensor and the front narrowed portion in the front-back direction.

[Feature A4]

The physical quantity measurement device according to Feature A3, wherein the measurement flow path includes:
  a measurement inlet (35) which is an upstream end of the measurement flow path and through which the fluid flows into the measurement flow path;
  a measurement outlet (36) which is a downstream end of the measurement flow path and through which the fluid flows out of the measurement flow path,
  a center line (CL4) of the measurement flow path extends along the measurement flow path and passes through a center (CO2) of the measurement inlet and a center (CO3) of the measurement outlet, the front narrowed portion has a front peak (111*a*) at which a distance (W2) between the front narrowed portion and the center line of the measurement flow path is the smallest in the measurement flow path, the front narrowed portion is provided at a position where the front peak and the physical quantity sensor face each other in the front-back direction, and the front distance is a distance between the front peak and the physical quantity sensor.

[Feature A5]

The physical quantity measurement device according to Feature A3 or A4, wherein the housing includes a back narrowed portion (112) forming the back wall surface and bulges toward the front wall surface in the front-back direction, and the back narrowed portion narrows the measurement flow path such that the measurement width dimension gradually decreases in the direction from upstream toward the physical quantity sensor.

[Feature A6]

The physical quantity measurement device according to any one of Features A1 to A5, wherein the measurement flow path includes a front region (122) which is a region between the front wall surface and the support front surface in the front-back direction, the front region includes:
  a floor region (122*a*) between the physical quantity sensor and the floor surface in the height direction; and
  a ceiling region (122*b*) opposite to the floor region across the physical quantity sensor in the height direction, a cross-sectional area (S1) of a portion of the measurement flow path in which the physical quantity sensor is provided includes:
  a floor area (S2) which is an area of the floor region; and
  a ceiling area (S3) which is an area of the ceiling region, and
  the ceiling area is smaller than the floor area.

[Feature A7]

The physical quantity measurement device according to Feature A6, wherein the measurement flow path is curved so that the floor surface becomes an inner curve of the measurement flow path, and the floor region is provided between the inner curve and the ceiling region in the front region.

[Feature A8]

The physical quantity measurement device according to any one of Features A1 to A7, wherein the physical quantity sensor includes:
  a heater (71) that generates heat; and
  a temperature detector (72, 73) that detects a temperature, the temperature detector and the heater being arranged along one surface (65*a*) of the physical quantity sensor, and the front distance is a distance between the front wall surface and the heater.

[Feature A9]

The physical quantity measurement device according to any one of Features A1 to A7, wherein the sensor support includes:
  a sensor substrate (65) which is a substrate on which the physical quantity sensor is mounted; and
  a protective resin (55) formed of a resin material and protecting the sensor substrate and the physical quantity sensor, and the protective resin forms the support front surface and the support back surface.

<Features of Configuration Group B>

The configurations disclosed in the present specification include the features of the configuration group B as described below.

[Feature B1]

A physical quantity measurement device (20, 200) for measuring a physical quantity of a fluid, the physical quantity measurement device comprising:

a measurement flow path (32, 212) through which the fluid flows;

a detection unit (50, 220) including a physical quantity sensor (22, 202) that is provided in the measurement flow path and detects the physical quantity of the fluid, and a sensor support (51, 221) that supports the physical quantity sensor; and a housing (21, 201) forming the measurement flow path and a container space (150, 290) that houses a part of the detection unit, wherein
  an inner surface of the housing includes:
    a housing intersecting surface (137, 277) that intersects an arrangement direction (Y) in which the measurement flow path and the container space are arranged;
    a housing flow path surface (135, 275) extending from the housing intersecting surface toward the measurement flow path; and
    a housing container surface (136, 276) extending from the housing intersecting surface toward the container space,
  the housing includes a housing partition (131, 271) provided on at least one of the housing intersecting surface, the housing flow path surface and the housing container surface, and
  the housing partition protrudes toward the detection unit and contacts the detection unit between the housing and the detection unit such that the housing partition separates the measurement flow path and the container space from each other.

[Feature B2]
The physical quantity measurement device according to Feature B1, wherein the housing partition makes a loop around the detection unit.

[Feature B3]
The physical quantity measurement device according to Feature B1 or B2, wherein the housing partition is arranged at a position on the housing intersecting surface closer to the housing flow path surface than to the housing container surface.

[Feature B4]
The physical quantity measurement device according to any one of Features B1 to B3, wherein
  the housing intersecting surface and a center line (CL11) of the housing partition provided on the housing intersecting surface intersect with each other and form therebetween a container angle (θ12) facing the container space and a flow path angle (θ11) facing the measurement flow path, and
  the container angle is larger than the flow path angle.

[Feature B5]
The physical quantity measurement device according to any one of Features B1 to B4, wherein
  the detection unit includes a unit recess (161) that is a recess provided on the detection unit, and
  the housing partition is inserted into the unit recess and is in contact with an inner surface of the unit recess.

[Feature B6]
The physical quantity measurement device according to any one of Features B1 to B5, wherein
  an outer surface of the detection unit includes:
    a unit intersecting surface (147, 287) that intersects the arrangement direction (Y) in which the measurement flow path and the container space are arranged;
    a unit flow path surface (145, 285) extending from the unit intersecting surface toward the measurement flow path; and
    a unit container surface (146, 286) extending from the unit intersecting surface toward the container space, and
  the housing partition is in contact with at least one of the unit intersecting surface, the unit flow path surface and the unit container surface.

[Feature B7]
The physical quantity measurement device according to Feature B6, wherein the housing partition is provided on the housing intersecting surface and is in contact with the unit intersecting surface.

[Feature B8]
A physical quantity measurement device (20, 200) for measuring a physical quantity of a fluid, the physical quantity measurement device comprising:
  a measurement flow path (32, 212) through which the fluid flows;
  a detection unit (50, 220) including a physical quantity sensor (22, 202) that is provided in the measurement flow path and detects the physical quantity of the fluid, and a sensor support (51, 221) that supports the physical quantity sensor; and
  a housing (21, 201) forming the measurement flow path and a container space (150, 290) that houses a part of the detection unit, wherein
    an outer surface of the detection unit includes:
      a unit intersecting surface (147, 287) that intersects an arrangement direction (Y) in which the measurement flow path and the container space are arranged;
      a unit flow path surface (145, 285) extending from the unit intersecting surface toward the measurement flow path; and
      a unit container surface (146, 286) extending from the unit intersecting surface toward the container space,
    the detection unit includes a unit partition (162, 302) provided on at least one of the unit intersecting surface, the unit flow path surface and the unit container surface, and
    the unit partition protrudes toward the housing and contacts the housing between the housing and the detection unit such that the unit partition separates the measurement flow path and the container space from each other.

[Feature B9]
The physical quantity measurement device according to Feature B8, wherein the unit partition makes a loop around the detection unit.

[Feature B10]
The physical quantity measurement device according to Feature B8 or B9, wherein the unit partition is arranged at a position on the unit intersecting surface closer to the unit flow path surface than to the unit container surface.

[Feature B11]
The physical quantity measurement device according to any one of Features B8 to B10, wherein
  the unit intersecting surface and a center line (CL13) of the unit partition provided on the unit intersecting surface intersect with each other and form therebetween a container angle (θ14) facing the container space and a flow path angle (θ13) facing the measurement flow path, and
  the container angle is larger than the flow path angle.

[Feature B12]
The physical quantity measurement device according to any one of Features B8 to B11, wherein
  the housing includes a housing recess (163) that is a recess provided on the housing, and
  the unit partition is inserted into the housing recess and is in contact with an inner surface of the housing recess.

[Feature B14]
The physical quantity measurement device according to any one of Features B8 to B13, wherein
  an inner surface of the housing includes:
    a housing intersecting surface (137, 277) that intersects the arrangement direction (Y) in which the measurement flow path and the container space are arranged;

a housing flow path surface (135, 275) extending from the housing intersecting surface toward the measurement flow path; and a housing container surface (136, 276) extending from the housing intersecting surface toward the container space, and the unit partition is in contact with at least one of the housing intersecting surface, the housing flow path surface and the housing container surface.

[Feature B15]

The physical quantity measurement device according to Feature B14, wherein the unit partition is provided on the unit intersecting surface and is in contact with the housing intersecting surface.

<Features of Configuration Group C>

The configurations disclosed in the present specification include the features of the configuration group C as described below.

[Feature C1]

A physical quantity measurement device (20) for measuring a physical quantity of a fluid, the physical quantity measurement device comprising:

a through flow path (31) including:
a through inlet (33) through which the fluid flows into the through flow path; and
a through outlet (34) through which the fluid flowing from the through inlet flows out of the through flow path;

a measurement flow path (32) branching from the through flow path for measurement of the physical quantity of the fluid, the measurement flow path (32) including:
a measurement inlet (35) which is provided between the through inlet and the through outlet and through which the fluid flows into the measurement flow path; and
a measurement outlet (36) through which the fluid flowing from the measurement inlet flows out of the measurement flow path;

a physical quantity sensor (22) that is provided in the measurement flow path and detects the physical quantity of the fluid; and a housing (21) that forms the through flow path and the measurement flow path, wherein an inner surface of the housing includes:
an inlet ceiling surface (342) that defines an inlet through path (331) which is between and connects the through inlet and the measurement inlet in the through flow path, the inlet ceiling surface being between and connecting the through inlet and the measurement inlet in a direction (Z) in which the through inlet and the through outlet are arranged; and
an inlet floor surface (346) that defines the inlet through path and faces the inlet ceiling surface through the inlet through path, and
the inlet ceiling surface includes a ceiling inclined surface (342, 342a) that extends from the through inlet toward the measurement inlet and is inclined with respect to the inlet floor surface such that a distance (H21) between the ceiling inclined surface and the inlet floor surface gradually decreases in a direction from the through inlet toward the through outlet.

[Feature C2]

The physical quantity measurement device according to Feature C1, wherein an inclination angle (θ21) of the ceiling inclined surface with respect to the inlet floor surface is larger than or equal to 10 degrees.

[Feature C3]

The physical quantity measurement device according to Feature C1 or C2, wherein the ceiling inclined surface is inclined with respect to the inlet floor surface such that the ceiling inclined surface faces to the through inlet.

[Feature C4]

The physical quantity measurement device according to any one of Features C1 to C3, wherein the ceiling inclined surface is inclined with respect to a main flow direction (Z) which is a direction of a main flow of the fluid flowing into the through inlet such that the ceiling inclined surface faces to the through inlet.

[Feature C5]

The physical quantity measurement device according to Feature C4, wherein an inclination angle (θ22) of the ceiling inclined surface with respect to the main flow direction is larger than or equal to 10 degrees.

[Feature C6]

The physical quantity measurement device according to Feature C4 or C5, wherein
the housing includes an angle setting surface (27a) that sets an attaching angle of the housing with respect to an attachment object (14) to which the housing is attached, and
the main flow direction is a direction in which the angle setting surface extends.

[Feature C7]

The physical quantity measurement device according to any one of Features C1 to C6, wherein a cross-sectional area (S21) of the inlet through path gradually decreases in a direction from the through inlet toward the measurement inlet.

[Feature C8]

The physical quantity measurement device according to any one of Features C1 to C7, wherein an inclination angle (θ25) of a center line (CL23) of the measurement flow path at the measurement inlet with respect to an inlet through line (CL24) that is a center line of the inlet through path is larger than or equal to 90 degrees.

[Feature C9]

The physical quantity measurement device according to any one of Features C1 to C8, wherein a branch angle (θ26) of the measurement flow path with respect to the through flow path is smaller than or equal to 60 degrees.

<Features of Configuration Group D>

The configurations disclosed in the present specification include the features of the configuration group D as described below.

[Feature D1]

A physical quantity measurement device (20) for measuring a physical quantity of a fluid, the physical quantity measurement device comprising:

a measurement flow path (32) including a measurement inlet (35) through which the fluid flows into the measurement flow path, and a measurement outlet (36) through which the fluid flowing from the measurement inlet flows out of the measurement flow path;

a physical quantity sensor (22) that is provided in the measurement flow path and detects the physical quantity of the fluid; and a housing (21) that defines the measurement flow path, wherein the measurement flow path includes a sensor path (405) in which the physical quantity sensor is disposed;

an upstream curved path (406) provided between the sensor path and the measurement inlet in the measurement flow path, the upstream curved path being curved in the housing so as to extend from the sensor path toward the measurement inlet; and a downstream curved path (407) provided between the sensor path and the measurement outlet in the measurement flow path, the downstream curved path being curved in the housing so as to extend from the sensor path toward the measurement outlet, an inner surface of the housing includes:

an upstream outer curved surface (411) that defines an outer outline of a curved part of the upstream curved path; and a downstream outer curved surface (421) that defines an outer outline of a curve part of the downstream curved path, a degree of recess of the downstream outer curved surface in a direction expanding the measurement flow path is larger than a degree of recess of the upstream outer curved surface in the direction expanding the measurement flow path.

[Feature D2]

The physical quantity measurement device according to Feature D1, wherein the upstream outer curved surface includes an upstream outer arched surface (411) arched along the upstream curved path, the downstream outer curved surface includes a downstream outer arched surface (461) arched along the downstream curved path, and a radius of curvature (R34) of the downstream outer arched surface is smaller than a radius of curvature (R33) of the upstream outer arched surface such that the degree of recess of the downstream outer curved surface is larger than the degree of recess of the upstream outer curved surface.

[Feature D3]

The physical quantity measurement device according to Feature D1, wherein the upstream outer curved surface includes an upstream outer arched surface (411) arched along the upstream curved path, and the downstream outer curved surface forms an internal corner (424) which has surfaces inwardly joined to each other to be recessed in the downstream curved path such that the degree of recess of the downstream outer curved surface is larger than the degree of recess of the upstream outer curved surface.

[Feature D4]

The physical quantity measurement device according to any one of Features D1 to D3, wherein the inner surface of the housing includes:

an upstream inner curved surface (415) that defines an inner outline of a curved part of the upstream curved path; and a downstream inner curved surface (425) that defines an inner outline of the curve part of the downstream curved path, and in a direction orthogonal to a center line (CL4) of the measurement flow path, a largest distance (L35b) between the downstream outer curved surface and the downstream inner curved surface is larger than a largest distance (L35a) between the upstream outer curved surface and the upstream inner curved surface.

[Feature D5]

The physical quantity measurement device according to Feature D4, wherein a degree of protrusion of the downstream inner curved surface in the direction expanding the measurement flow path is smaller than a degree of protrusion of the upstream inner curved surface in the direction expanding the measurement flow path.

[Feature D6]

The physical quantity measurement device according to Feature D4 or D5, wherein the upstream inner curved surface includes an upstream inner arched surface (415) arched along the upstream curved path, the downstream inner curved surface includes a downstream inner arched surface (425) arched along the downstream curved path, and a radius of curvature (R32) of the downstream inner arched surface is larger than a radius of curvature (R31) of the upstream inner arched surface such that the degree of protrusion of the downstream inner curved surface is smaller than the degree of protrusion of the upstream inner curved surface.

[Feature D7]

The physical quantity measurement device according to any one of features D1 to D6, wherein the sensor path extends in a direction (Z) in which the upstream curved path and the downstream curved path are arranged.

[Feature D8]

The physical quantity measurement device according to any one of Features D1 to D7, wherein the housing includes a measurement narrowed portion (111, 112) that gradually reduces and narrows the measurement flow path in a direction from the measurement inlet toward the physical quantity sensor, and gradually expands the measurement flow path in a direction from the physical quantity sensor toward the measurement outlet, and the measurement narrowed portion is provided in the measurement flow path between an upstream end part of the upstream curved path and a downstream end part of the downstream curved path.

[Feature D9]

The physical quantity measurement device according to Feature D8, wherein the measurement narrowed portion includes:

a measurement narrowing surface (431, 441) that forms the inner surface of the housing and gradually reduces and narrows the measurement flow path in the direction from the measurement inlet toward the physical quantity sensor; and a measurement expanding surface (432, 442) that gradually expands the measurement flow path in the direction from the physical quantity sensor toward the measurement outlet, and a length (W33a, W33b) of the measurement expanding surface is larger than a length (W32a, W32b) of the measurement narrowing surface in an arrangement direction (Z) in which the upstream curved path and the downstream curved path are arranged.

[Feature D10]

The physical quantity measurement device according to Feature D8 or D9, wherein the measurement expanding surface extends straight from the physical quantity sensor toward the measurement outlet.

[Feature D11]

The physical quantity measurement device according to any one of Features D8 to D10, wherein a distance (W34a, W35a) between the downstream outer curved surface and the measurement narrowed portion in an arrangement direction (Z) in which the upstream curved path and the downstream curved path are arranged is larger than a distance (W34b, W35b) between the upstream outer curved surface and the measurement narrowed portion in the arrangement direction.

[Feature D12]

The physical quantity measurement device according to any one of Features D8 to D11, wherein the inner surface of the housing includes a pair of measurement wall surfaces (103, 104) defining the measurement flow path and facing each other across the upstream outer curved surface and the downstream outer curved surface, and the measurement narrowed portion is provided on at least one of the pair of measurement wall surfaces.

[Feature D13]

The physical quantity measurement device according to any one of Features D1 to D12, wherein the inner surface of the housing includes a pair of wall surfaces (103, 104) defining the measurement flow path and facing each other across the upstream outer curved surface and the downstream outer curved surface, and the measurement outlet is provided on at least one of the pair of wall surfaces such that the measurement flow path is open through the measurement outlet in a direction (X) in which the pair of wall surfaces are arranged.

[Feature Da1]

A physical quantity measurement device (20) for measuring a physical quantity of a fluid, the physical quantity measurement device comprising:

a measurement flow path (32) including a measurement inlet (35) through which the fluid flows into the measurement flow path, and a measurement outlet (36) through which the fluid flowing from the measurement inlet flows out of the measurement flow path;

a physical quantity sensor (22) that is provided in the measurement flow path and detects the physical quantity of the fluid; and a housing (21) that defines the measurement flow path, wherein the measurement flow path includes
  a sensor path (405) in which the physical quantity sensor is disposed;
  an upstream curved path (406) provided between the sensor path and the measurement inlet in the measurement flow path, the upstream curved path being curved in the housing so as to extend from the sensor path toward the measurement inlet; and
  a downstream curved path (407) provided between the sensor path and the measurement outlet in the measurement flow path, the downstream curved path being curved in the housing so as to extend from the sensor path toward the measurement outlet,
the inner surface of the housing includes
  an upstream outer curved surface (411) that defines an outer outline of a curved part of the upstream curved path; and
  a downstream outer curved surface (421) that defines an outer outline of a curve part of the downstream curved path,
an arrangement line (CL31) is defined as an imaginary straight line that passes through the physical quantity sensor and extends in an arrangement direction (Z) in which the upstream curved path and the downstream curved path are arranged, and a distance (L31b) on the arrangement line between the downstream outer curved surface and the physical quantity sensor is larger than a distance (L31a) on the arrangement line between the upstream outer curved surface and the physical quantity sensor.

[Feature Da2]

The physical quantity measurement device according to Feature Da1, wherein the sensor path extends along the arrangement line.

[Feature Da3]

The physical quantity measurement device according to Feature Da1 or Da2, wherein, in the sensor path, a distance (L34b) between the physical quantity sensor and the downstream curved path is larger than the distance (L34a) between the physical quantity sensor and the upstream curved path.

[Feature Da4]

The physical quantity measurement device according to any one of Features Da1 to Da3, further comprising a sensor support (51) supporting the physical quantity sensor in the measurement flow path, wherein a distance (L32b) on the arrangement line between the downstream outer curved surface and the sensor support is larger than a distance (L32a) on the arrangement line between the upstream outer curved surface and the sensor support.

[Feature Da5]

The physical quantity measurement device according to any one of Features Da1 to Da4, wherein the downstream outer curved surface includes a downstream outer vertical surface (423) provided at a position through which the arrangement line passes, the downstream outer vertical surface extending straight upstream from a downstream end part of the downstream curved path.

[Feature Da6]

The physical quantity measurement device according to any one of Features Da1 to Da5, wherein the inner surface of the housing includes a downstream inner curved surface (425) that defines an inner outline of the curve part of the downstream curved path, and the downstream inner curved surface includes a downstream inner arched surface (425) which is arched along the downstream curved path.

[Feature Da7]

The physical quantity measurement device according to any one of Features Da1 to Da6, wherein the housing includes a measurement narrowed portion (111, 112) that gradually reduces and narrows the measurement flow path in a direction from the measurement inlet toward the physical quantity sensor, and gradually expands the measurement flow path in a direction from the physical quantity sensor toward the measurement outlet, and the measurement narrowed portion is provided in the measurement flow path between an upstream end part of the upstream curved path and a downstream end part of the downstream curved path.

[Feature Da8]

The physical quantity measurement device according to Feature Da7, wherein the measurement narrowed portion includes:
  a measurement narrowing surface (431, 441) that forms the inner surface of the housing and gradually reduces and narrows the measurement flow path in the direction from the measurement inlet toward the physical quantity sensor; and
  a measurement expanding surface (432, 442) that gradually expands the measurement flow path in the direction from the physical quantity sensor toward the measurement outlet, and
  a length (W33a, W33b) of the measurement expanding surface in the arrangement direction is larger than a length (W32a, W32b) of the measurement narrowing surface in the arrangement direction.

[Feature Da9]

The physical quantity measurement device according to Feature Da8, wherein the measurement expanding surface extends straight from the physical quantity sensor toward the measurement outlet.

[Feature Da10]

The physical quantity measurement device according to any one of Features Da7 to Da9, wherein a distance (W34a, W35a) between the downstream outer curved surface and the measurement narrowed portion on the arrangement line is larger than a distance (W34b, W35b) between the upstream outer curved surface and the measurement narrowed portion on the arrangement line.

[Feature Da11]

The physical quantity measurement device according to any one of Features Da7 to Da10, wherein
the inner surface of the housing includes a pair of measurement wall surfaces (103, 104) defining the measurement flow path and facing each other across the upstream outer curved surface and the downstream outer curved surface, and
the measurement narrowed portion is provided on at least one of the pair of measurement wall surfaces.

[Feature Da12]

The physical quantity measurement device according to any one of Features Da1 to Da11, wherein the upstream outer curved surface includes an upstream outer arched surface (411) which is arched along the upstream curved path and connects an upstream end part of the upstream curved path and a downstream end part of the upstream curved path.

[Feature Da13]

The physical quantity measurement device according to any one of Features Da1 to Da12, wherein the inner surface of the housing includes an inner measurement curved surface (402) that is curved to bulge toward the physical quantity sensor and connects the measurement inlet and the measurement outlet, the inner measurement curved surface defining an inner outline of a curved part of the measurement flow path.

[Feature Da14]

The physical quantity measurement device according to any one of Features Da1 to Da13, wherein
the inner surface of the housing includes a pair of wall surfaces (103, 104) defining the measurement flow path and facing each other across the upstream outer curved surface and the downstream outer curved surface, and
the measurement outlet is provided on at least one of the pair of wall surfaces such that the measurement flow path is open through the measurement outlet in an orthogonal direction (X) which is orthogonal to the arrangement line and in which the pair of wall surfaces face each other.

<Features of Configuration Group E>

The configurations disclosed in the present specification include the features of the configuration group E as described below.

[Feature E1]

A physical quantity measurement device (20) for measuring a physical quantity of a fluid, the physical quantity measurement device comprising:
a measurement flow path (32) including a measurement inlet (35) through which the fluid flows into the measurement flow path, and a measurement outlet (36) through which the fluid flowing from the measurement inlet flows out of the measurement flow path;
a physical quantity sensor (22) that is provided in the measurement flow path and detects the physical quantity of the fluid; and
a sensor support (51) supporting the physical quantity sensor in the measurement flow path; and
a housing (21) that defines the measurement flow path, wherein
the measurement flow path includes
a sensor path (405) in which the physical quantity sensor is disposed;
an upstream curved path (406) provided between the sensor path and the measurement inlet in the measurement flow path, the upstream curved path being curved in the housing so as to extend from the sensor path toward the measurement inlet; and
a downstream curved path (407) provided between the sensor path and the measurement outlet in the measurement flow path, the downstream curved path being curved in the housing so as to extend from the sensor path toward the measurement outlet,
the housing includes a measurement narrowed portion (111, 112) that gradually reduces and narrows the measurement flow path in a direction from the measurement inlet toward the physical quantity sensor,
an arrangement line (CL31) is defined as an imaginary straight line that passes through the physical quantity sensor and extends in an arrangement direction (Z) in which the upstream curved path and the downstream curved path are arranged, and
an upstream end (55c, 471) of the sensor support is provided upstream of the measurement narrowed portion in an arrangement cross section (CS41) along the arrangement line.

[Feature E2]

The physical quantity measurement device according to Feature E1, wherein the upstream end of the sensor support includes an upstream inclined portion (471) that is inclined with respect to the arrangement cross section and extends across an upstream end of the measurement narrowed portion in the arrangement direction.

[Feature E3]

The physical quantity measurement device according to Feature E1 or E2, wherein a downstream end (55d, 472) of the sensor support is provided upstream of a downstream end (111c, 112c) of the measurement narrowed portion in the arrangement cross section.

[Feature E4]

The physical quantity measurement device according to Feature E3, wherein a downstream end of the sensor support includes a downstream inclined portion (472) that is inclined with respect to the arrangement cross section and extends across a downstream end of the measurement narrowed portion in the arrangement direction.

[Feature E5]

The physical quantity measurement device according to any one of Features E1 to E4, wherein
the measurement narrowed portion includes:
a measurement narrowing surface (431, 441) that forms an inner surface of the housing and gradually reduces and narrows the measurement flow path in the direction from the measurement inlet toward the physical quantity sensor; and
a measurement expanding surface (432, 442) that gradually expands the measurement flow path in a direction from the physical quantity sensor toward the measurement outlet, and a length (W33a, W33b) of the measurement expanding surface in the arrangement direction is larger than a length (W32a, W32b) of the measurement narrowing surface in the arrangement direction.

[Feature E6]

The physical quantity measurement device according to any one of Features E1 to E5, wherein the physical quantity sensor is mounted on a front surface (55e) which is one surface of the sensor support, an inner surface of the housing includes a pair of wall surfaces which form the measurement flow path and face each other across the sensor support, the pair of wall surfaces are:
- a front measurement wall surface (103) facing the front surface of the sensor support; and
- a back measurement wall surface (104) facing a back surface (55f) of the sensor support behind the front surface, and the housing includes a front narrowed portion (111) as the measurement narrowed portion, positioned on the front measurement wall surface so as to face the physical quantity sensor.

[Feature E7]

The physical quantity measurement device according to Feature E6, wherein the housing includes a back narrowed portion (112) as the measurement narrowed portion, positioned on the back measurement wall surface so as to opposite to the front narrowed portion across the physical quantity sensor.

[Feature E8]

The physical quantity measurement device according to Feature E7, wherein a distance (D33a) between the sensor support and the front narrowed portion is smaller than a distance (D33b) between the sensor support and the back narrowed portion in the arrangement cross section.

[Feature E9]

The physical quantity measurement device according to Feature E7 or E8, wherein a center line (CL4) of the measurement flow path extends along the measurement flow path and passes through a center (CO2) of the measurement inlet and a center (CO3) of the measurement outlet, the front narrowed portion includes a front peak (111a) as a peak at which a distance (W2) between the front narrowed portion and the center line of the measurement flow path is the smallest in the measurement flow path, the back narrowed portion includes a back peak (112a) as a peak at which a distance (W3) between the back narrowed portion and the center line of the measurement flow path is the smallest in the measurement flow path, and a reduction rate at which the front narrowed portion reduces the measurement flow path is larger than a reduction rate at which the back narrowed portion reduces the measurement flow path.

[Feature E10]

The physical quantity measurement device according to any one of Features E1 to E9, wherein the physical quantity sensor is provided in the measurement flow path in accordance with a position at which a flow velocity is maximized by the measurement narrowed portion narrowing the measurement flow path.

[Feature E11]

The physical quantity measurement device according to any one of Features E1 to E10, wherein the upstream end of the sensor support is provided in the upstream curved path in the arrangement cross section.

[Feature E12]

The physical quantity measurement device according to any one of Features E1 to E11, wherein an opening area of the measurement outlet is smaller than an opening area of the measurement inlet.

[Feature E13]

The physical quantity measurement device according to any one of Features E1 to E12, further comprising a through flow path (31) including a through inlet (33) through which the fluid flows into the through flow path, and a through outlet (34) through which the fluid flowing from the through inlet flows out of the through flow path, wherein the measurement flow path is a branch flow path branched from the through flow path, and an opening area of the through outlet is smaller than an opening area of the through inlet.

<Features of Configuration Group Z>

The configurations disclosed in the present specification include the features of the configuration group Z as described below.

[Feature Z1]

A physical quantity measurement device (20) for measuring a physical quantity of a fluid, the physical quantity measurement device comprising:

a measurement flow path (32) including a measurement inlet (35) through which the fluid flows into the measurement flow path, and a measurement outlet (36) through which the fluid flowing from the measurement inlet flows out of the measurement flow path;

a physical quantity sensor (22) that is provided in the measurement flow path and detects the physical quantity of the fluid; and a housing (21) that defines the measurement flow path.

According to this feature Z1, the physical quantity can be detected by the physical quantity sensor for the fluid flowing from the measurement inlet to the measurement flow path. Among the configurations disclosed in the present specification, configurations not included in the Feature Z1 are not essential. Although some problems are described in this specification, the Feature Z1 is a necessary configuration for solving these problems.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A physical quantity measurement device for measuring a physical quantity of a fluid, the physical quantity measurement device comprising:
   a measurement flow path including a measurement inlet through which the fluid flows into the measurement flow path, and a measurement outlet through which the fluid flowing from the measurement inlet flows out of the measurement flow path;
   a physical quantity sensor that is provided in the measurement flow path and detects the physical quantity of the fluid;
   a sensor support supporting the physical quantity sensor in the measurement flow path;
   a through flow path including a through inlet through which the fluid flows into the through flow path, and a through outlet through which the fluid flowing from the through inlet flows out of the through flow path; and a housing that defines the measurement flow path and the through flow path, wherein the measurement flow path includes:

a sensor path in which the physical quantity sensor is disposed;

an upstream curved path provided between the sensor path and the measurement inlet in the measurement flow path, the upstream curved path being curved in the housing so as to extend from the sensor path toward the measurement inlet; and a downstream curved path provided between the sensor path and the measurement outlet in the measurement flow path, the downstream curved path being curved in the housing so as to extend from the sensor path toward the measurement outlet, the housing includes a measurement narrowed portion that gradually reduces and narrows the measurement flow path in a direction from the measurement inlet toward the physical quantity sensor, an arrangement line is defined as an imaginary straight line that passes through the physical quantity sensor and extends in an arrangement direction in which the upstream curved path and the downstream curved path are arranged, an upstream end of the sensor support is provided upstream of the measurement narrowed portion in an arrangement cross section along the arrangement line, the measurement flow path is a branch flow path branched from the through flow path, an opening area of the through outlet is smaller than an opening area of the through inlet, and a downstream end of the sensor support is provided upstream of a downstream end of the measurement narrowed portion in the arrangement cross section.

2. The physical quantity measurement device according to claim 1, wherein the upstream end of the sensor support includes an upstream inclined portion that is inclined with respect to the arrangement cross section and extends across an upstream end of the measurement narrowed portion in the arrangement direction.

3. The physical quantity measurement device according to claim 1, wherein the downstream end of the sensor support includes a downstream inclined portion that is inclined with respect to the arrangement cross section and extends across a downstream end of the measurement narrowed portion in the arrangement direction.

4. The physical quantity measurement device according to claim 1, wherein the measurement narrowed portion includes:

a measurement narrowing surface that forms an inner surface of the housing and gradually reduces and narrows the measurement flow path in the direction from the measurement inlet toward the physical quantity sensor; and a measurement expanding surface that gradually expands the measurement flow path in a direction from the physical quantity sensor toward the measurement outlet, and a length of the measurement expanding surface in the arrangement direction is larger than a length of the measurement narrowing surface in the arrangement direction.

5. The physical quantity measurement device according to claim 1, wherein the physical quantity sensor is mounted on a front surface which is one surface of the sensor support, an inner surface of the housing includes a pair of wall surfaces which form the measurement flow path and face each other across the sensor support, the pair of wall surfaces are:

a front measurement wall surface facing the front surface of the sensor support; and a back measurement wall surface facing a back surface of the sensor support behind the front surface, and the housing includes a front narrowed portion as the measurement narrowed portion, positioned on the front measurement wall surface so as to face the physical quantity sensor.

6. The physical quantity measurement device according to claim 5, wherein the housing includes a back narrowed portion as the measurement narrowed portion, positioned on the back measurement wall surface so as to be positioned opposite to the front narrowed portion across the physical quantity sensor.

7. The physical quantity measurement device according to claim 6, wherein a distance between the sensor support and the front narrowed portion is smaller than a distance between the sensor support and the back narrowed portion in the arrangement cross section.

8. The physical quantity measurement device according to claim 6, wherein a center line of the measurement flow path extends along the measurement flow path and passes through a center of the measurement inlet and a center of the measurement outlet, the front narrowed portion includes a front peak as a peak at which a distance between the front narrowed portion and the center line of the measurement flow path is the smallest in the measurement flow path, the back narrowed portion includes a back peak as a peak at which a distance between the back narrowed portion and the center line of the measurement flow path is the smallest in the measurement flow path, and a reduction rate at which the front narrowed portion reduces the measurement flow path is larger than a reduction rate at which the back narrowed portion reduces the measurement flow path.

9. The physical quantity measurement device according to claim 1, wherein the physical quantity sensor is provided in the measurement flow path in accordance with a position at which a flow velocity is maximized by the measurement narrowed portion narrowing the measurement flow path.

10. The physical quantity measurement device according to claim 1, wherein the upstream end of the sensor support is provided in the upstream curved path in the arrangement cross section.

11. The physical quantity measurement device according to claim 1, wherein an opening area of the measurement outlet is smaller than an opening area of the measurement inlet.

12. The physical quantity measurement device according to claim 1, wherein an upstream end surface of the sensor support includes an upstream inclined surface extending straight and oblique to the arrangement cross section, the measurement narrowed portion includes a front narrowed portion and a back narrowed portion which face each other across the sensor support and protrude to each other to gradually narrow the measurement flow path, and in the arrangement cross section, a distance between the upstream inclined surface and the front narrowed portion is same along the arrangement line as a distance between the upstream inclined surface and the back narrowed portion.

13. The physical quantity measurement device according to claim 1, wherein
a downstream end surface of the sensor support includes a downstream inclined surface extending straight and oblique to the arrangement cross section,
the measurement narrowed portion includes a front narrowed portion and a back narrowed portion which face each other across the sensor support and protrude to each other to gradually narrow the measurement flow path, and
in the arrangement cross section, the downstream inclined surface is separated from the front narrowed portion along the arrangement line, and the downstream inclined surface is separated from the back narrowed portion along the arrangement line.

14. The physical quantity measurement device according to claim 13, wherein
in the arrangement cross section, a distance between the downstream inclined surface and the front narrowed portion is same along the arrangement line as a distance between the downstream inclined surface and the back narrowed portion.

* * * * *